(12) United States Patent
Rankin, Jr. et al.

(10) Patent No.: US 9,152,946 B2
(45) Date of Patent: Oct. 6, 2015

(54) APPARATUSES, METHODS AND SYSTEMS FOR A LEAD GENERATING HUB

(75) Inventors: Claiborne R. Rankin, Jr., Chicago, IL (US); Patrick A. O'Brien, Chicago, IL (US)

(73) Assignee: Brokersavant Inc., Chicago, IL (US)

( * ) Notice: Subject to any disclaimer, the term of this patent is extended or adjusted under 35 U.S.C. 154(b) by 150 days.

(21) Appl. No.: 12/977,700

(22) Filed: Dec. 23, 2010

(65) Prior Publication Data

US 2011/0289106 A1 Nov. 24, 2011

Related U.S. Application Data

(63) Continuation-in-part of application No. 12/960,637, filed on Dec. 6, 2010, now abandoned, and a continuation-in-part of application No. 12/883,110, filed on Sep. 15, 2010, now abandoned, and a continuation-in-part of application No. 12/872,011, filed on Aug. 31, 2010, now abandoned, and a continuation-in-part of application No. 12/784,845, filed on May 21, 2010, now abandoned.

(51) Int. Cl.
*G06F 17/30* (2006.01)
*G06Q 10/10* (2012.01)

(52) U.S. Cl.
CPC .......... *G06Q 10/10* (2013.01); *G06F 17/30011* (2013.01); *G06F 17/30595* (2013.01)

(58) Field of Classification Search
CPC .............. G06F 17/30; G06F 17/30011; G06F 17/30595
USPC ................................................ 707/769, 749
See application file for complete search history.

(56) References Cited

U.S. PATENT DOCUMENTS

| | | | |
|---|---|---|---|
| 4,870,576 A | 9/1989 | Tornetta | |
| 7,013,290 B2 | 3/2006 | Ananian | |
| 7,353,183 B1 | 4/2008 | Musso | |
| 7,539,725 B2 | 5/2009 | Nutkis | |
| 7,548,884 B1 * | 6/2009 | Thomas | 705/38 |
| 7,640,204 B2 | 12/2009 | Florance et al. | |
| 7,912,910 B2 | 3/2011 | Banerjee et al. | |
| 8,290,836 B2 | 10/2012 | McNelley et al. | |
| 2002/0103697 A1 * | 8/2002 | Lockhart et al. | 705/14 |

(Continued)

OTHER PUBLICATIONS

Non-Final Office Action issued by USPTO on Nov. 16, 2012 for U.S. Appl. No. 12/883,110, filed Sep. 15, 2010.

(Continued)

*Primary Examiner* — Hosain Alam
*Assistant Examiner* — Johnese Johnson
(74) *Attorney, Agent, or Firm* — Walter G. Hanchuk

(57) ABSTRACT

The APPARATUSES, METHODS AND SYSTEMS FOR A LEAD GENERATING HUB ("HUB") facilitates the generation, evaluation, and recording of information and activities related to property transactions and associated communications. In embodiments, the HUB may be configured to identify leads for users based on user-entered information, user contacts, and/or the properties associated with a user and/or in which a user is interested. Leveraging connectivity between contract relationship management functionality, property listing service features, intelligent inbox coordination capabilities, and/or the like, the HUB may identify connections between user requirements and/or assets and opportunities to fulfill those requirements and/or to transact those assets.

41 Claims, 86 Drawing Sheets

(56) References Cited

U.S. PATENT DOCUMENTS

| | | | |
|---|---|---|---|
| 2002/0188483 A1 | 12/2002 | Fisher | |
| 2003/0078897 A1 | 4/2003 | Florance et al. | |
| 2003/0107596 A1 | 6/2003 | Jameson | |
| 2003/0107606 A1 | 6/2003 | Capps et al. | |
| 2003/0187756 A1 | 10/2003 | Klivington et al. | |
| 2004/0133493 A1 | 7/2004 | Ford et al. | |
| 2004/0158488 A1 | 8/2004 | Johnson | |
| 2005/0182743 A1 | 8/2005 | Koenig | |
| 2005/0203768 A1 | 9/2005 | Florance et al. | |
| 2005/0240617 A1 | 10/2005 | Lund et al. | |
| 2005/0288957 A1 | 12/2005 | Eraker et al. | |
| 2005/0288958 A1 | 12/2005 | Eraker et al. | |
| 2006/0059238 A1* | 3/2006 | Slater et al. | 709/206 |
| 2006/0075052 A1 | 4/2006 | Oostendorp | |
| 2006/0143083 A1* | 6/2006 | Wedeen | 705/14 |
| 2006/0184448 A1 | 8/2006 | Polston et al. | |
| 2006/0277208 A1* | 12/2006 | Starbuck et al. | 707/102 |
| 2006/0277210 A1 | 12/2006 | Starbuck | |
| 2007/0233730 A1* | 10/2007 | Johnston | 707/104.1 |
| 2007/0248221 A1 | 10/2007 | Chatterjee et al. | |
| 2008/0010257 A1 | 1/2008 | Tolfa et al. | |
| 2008/0109756 A1 | 5/2008 | Stambaugh | |
| 2008/0126170 A1 | 5/2008 | Leck et al. | |
| 2008/0126476 A1 | 5/2008 | Nicholas et al. | |
| 2008/0140494 A1 | 6/2008 | Charuk et al. | |
| 2008/0172628 A1 | 7/2008 | Mehrotra et al. | |
| 2008/0177744 A1 | 7/2008 | Eldering et al. | |
| 2008/0200153 A1 | 8/2008 | Fitzpatrick et al. | |
| 2008/0208651 A1 | 8/2008 | Johnston et al. | |
| 2008/0270948 A1 | 10/2008 | Lazzaro et al. | |
| 2008/0281927 A1* | 11/2008 | Vanderwende et al. | 709/206 |
| 2008/0294584 A1 | 11/2008 | Herz | |
| 2008/0307512 A1 | 12/2008 | Tandon | |
| 2008/0313154 A1 | 12/2008 | Wallis et al. | |
| 2009/0063232 A1 | 3/2009 | Lissack et al. | |
| 2009/0074159 A1 | 3/2009 | Goldfarb et al. | |
| 2009/0138533 A1* | 5/2009 | Iwasaki et al. | 707/206 |
| 2009/0150216 A1 | 6/2009 | Milman et al. | |
| 2009/0172714 A1 | 7/2009 | Gruia et al. | |
| 2009/0240550 A1 | 9/2009 | McCarty | |
| 2011/0078085 A1* | 3/2011 | Clement | 705/313 |
| 2011/0106892 A1* | 5/2011 | Nelson et al. | 709/206 |

OTHER PUBLICATIONS

Non-Final Office Action issued by USPTO on Mar. 9, 2012, for U.S. Appl. No. 12/784,845, filed May 21, 2010.

Final Office Action issued by USPTO on Oct. 25, 2012 for U.S. Appl. No. 12/784,845, filed May 21, 2010.

Office Action issued by USPTO on Dec. 20, 2012 for U.S. Appl. No. 12/960,637, filed Dec. 6, 2010.

PCT International Search Reports and Written Opinion, mailed Oct. 26, 2011 for PCT/US11/37017, filed May 18, 2011.

International Preliminary Report on Patententability issued Nov. 27, 2012, for PCT/US11/37017, filed May 18, 2011.

* cited by examiner

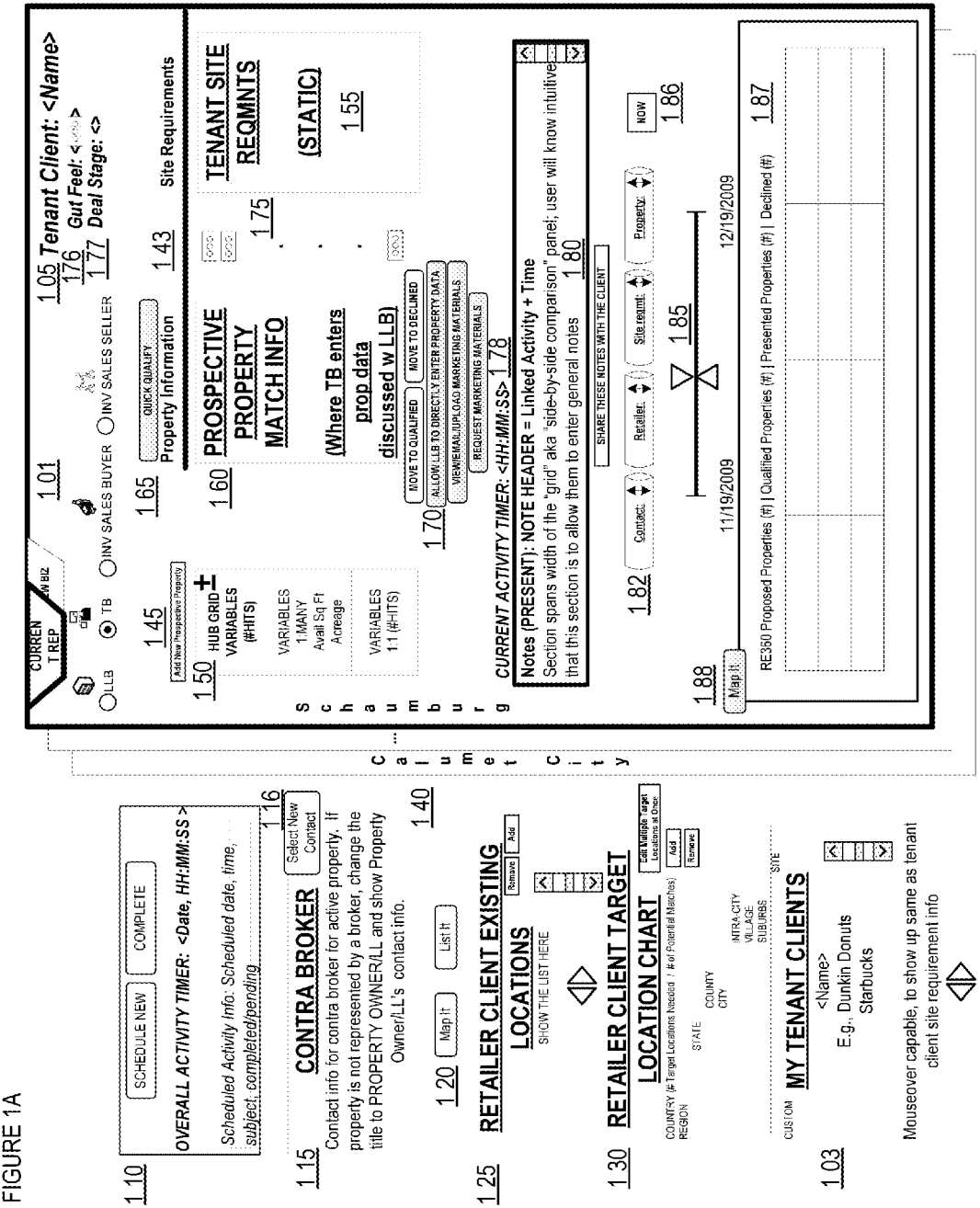

| FUNCTIONALITY (OBJECT) 560 | | LLB->TB | LLB->Direct Retailer | LLB->Existing LL Client (relationship management) | INV Sales (Sell Side)->TB/Investor Broker | INV Sales (Sell Side)->Direct Investor (Private, Institutional, or Retailer) | INV Sales (Sell Side)->Existing Property Owner (relationship management) | TB->LLB |
|---|---|---|---|---|---|---|---|---|
| LEFT SIDE MARGIN EXECUTIONS | | | | | | | | |
| Schedule New Button | | Yes | Yes | Yes | Yes | Yes | Yes | Yes |
| Complete Button | | Yes | Yes | Yes | Yes | Yes | Yes | Yes |
| New Sale and Overall Timer | | | Yes | Yes | Yes | Yes | Yes | Yes |
| View Scheduled Activity Info | | Yes | Yes | Yes | Yes | Yes | Yes | Yes |
| View Contact Info for Person user is talking to (e.g., for Contra Broker, Direct Property Owner, Direct Retailer, Direct Investor, Client, etc) | | Yes | Yes | Yes | Yes | Yes | Yes | Yes |
| Retailer Client Existing Locations | | No | No | No | No | No | No | No |
| Target Location Chart | | Yes | Yes | Yes | Yes | Yes | Yes | Yes |
| "List it" + "Map it" Buttons | | Yes | Yes | Yes | Yes | Yes | Yes | Yes |
| Contra Broker's Tenant Clients | | No | No | No | No | No | No | No |
| Tenant and or Retailer Client's Target Location Chart | | NA | NA | NA | NA | NA | NA | NA |
| My Properties | | | | | | | | Yes |
| Landlord/Prop Owners My Client's Properties | | Yes | Yes | | Yes | Yes | | Yes |
| My Tenant Clients | | Yes | Yes | | Yes | Yes | | Yes |
| RIGHT SIDE PAPER EXECUTIONS | | | | | | | | |
| Switch Business Modes | | Yes | Yes | Yes | Yes | Yes | Yes | Yes |
| Switch Hats | | Yes | Yes | Yes | Yes | Yes | Yes | Yes |
| <NAME>->Our Firm Status | | Yes | Yes | Yes | Yes | Yes | Yes | Yes |
| LLB Data | | Yes | Yes | Yes | Yes | Yes | Yes | Yes |
| | Default HUB Grid Variables | Yes | Yes | Yes | Yes | Yes | Yes | Yes |
| | View Site Requirements | Yes | Yes | Yes | Yes | Yes | Yes | Yes |
| | View Property Info | Yes | Yes | Yes | Yes | Yes | Yes | Yes |
| | Send Link Button | Yes | Yes | Yes | Yes | Yes | Yes | Yes |
| | View Site-to-Property Rating Indicators (R-Y-G) | Yes | Yes | Yes | Yes | Yes | Yes | Yes |
| Property Side of Hub Grid | View/Upload/Email Mktg Materials | Yes | Yes | Yes | Yes | Yes | Yes | Yes |
| Property Side of Hub Grid | Request Marketing Materials (Property Specs, Demos, Site Plans) | Yes | Yes | Yes | Yes | Yes | Yes | Yes |
| Tenant Site Req Side of Hub Grid | View/Upload/Email Mktg Materials | Yes | Yes | Yes | Yes | Yes | Yes | Yes |
| Tenant Site Req Side of Hub Grid | Request Marketing Materials (Retailer Side Tear Sheet) | Yes | Yes | Yes | Yes | Yes | Yes | Yes |

| POTENTIAL FIELD RESETS: | Creating a new property | Selecting a new property | Editing property info | Selecting new retailer | Selecting a different "Gut Feel" status for a property |
|---|---|---|---|---|---|
| Reset Current Site Requirement data values | N | N | N | Y (Use Membership Profile for the selected retailer (otherwise, Blank)) | N |
| Reset Current Site Requirement Line item variables | N | N | N | Y (Use Membership Profile for the selected retailer (otherwise, Blank)) | N |
| Reset Current Property Detail Info | N/A | N/A | N/A | N/A | N |
| Reset Current Activity Timer | Y | Y | N | Y | N |
| Reset Overall Activity Timer | N | N | N | N | N |
| Reset Deal Status | Y | Y | N | Y | N |
| Reset Property Match Status (Gut Feel) | Y | Y | N | Y | N/A |
| Reset Line Item Status Indicators (R-G-Y) | Y (reset indicators for all) | Y (reset indicators for all lines) | Y (line-by-line reset) | Y (reset indicators for all lines) | N |
| Reset scheduled activity info | N | N | N | N | N |
| Add Relevant Contact Info | N | N | N | N | N |
| Reset Retailer Target Location Chart | N | N | N | Y | Y (reset color scheme) |
| Reset Cylinder Order of Time Machine | N | N | N | N | N |
| Reset Cylinders Lock/Unlock of Time Machine | N | N | N | N | N |
| Reset Cylinders Current Displayed Value of Time Machine (e.g., property: 1332 N. Waco, N. Brook) | Y | Y | Y (if location or sq ft) | Y | N |
| Reset RE 360 Proposed/Qualified/Presented List | Y | Y | Y | Y | Y (reset list prioritization) |
| Notes (Current) | Y | Y | Y | Y | N |
| Grid Position | N/A | N/A | N/A | N/A | N |

| Creating a new site (Click on "New" or "Clone" button to add New Paper to the stack) | Selecting a different site (Click on a different Paper CURRENTLY in the stack--move to top) | Editing a site requirement | Completing HUB Activity | Initiating a new HUB Activity | Changing Roles |
|---|---|---|---|---|---|
| Y | N | N | N/A | Populate with HUB Statistical Profile | Y |
| Y | N | N | N/A | Populate with HUB Statistical Profile (when a retailer is designated) | Y |
| N | N | N | N/A | When user selects from My Properties, then the property details populates in the grid. | Y |
| Y | Y | N | N/A | N/A | Y |
| N | N | N | N/A | N/A | N |
| Y | Y | N | N/A | N/A | Y |
| Y | N (pull current values) | N | N/A | N/A | Y |
| Y (reset indicators for all lines) | N | N | N/A | N/A | Y |
| N | N | N | N/A | N/A | N |
| N | N | N | N/A | Prompted to lookup if not already designated | Y (if multiple franchisees involved) |
| N | N | N | N/A | N/A | Y |
| N | N | N | N/A | N/A | Maybe (depending on role change) |
| N | N | N | N/A | N/A | Maybe (depending on role change) |
| Y | Y | Y (depending on the field) | N/A | Y | Y |
| Y | N | N | N/A | Populate based on site requirements | Y |
| Y | N | N | N/A | N/A | Y |
| N/A | N/A | N/A | N/A | N/A | If change from buy to sell side |

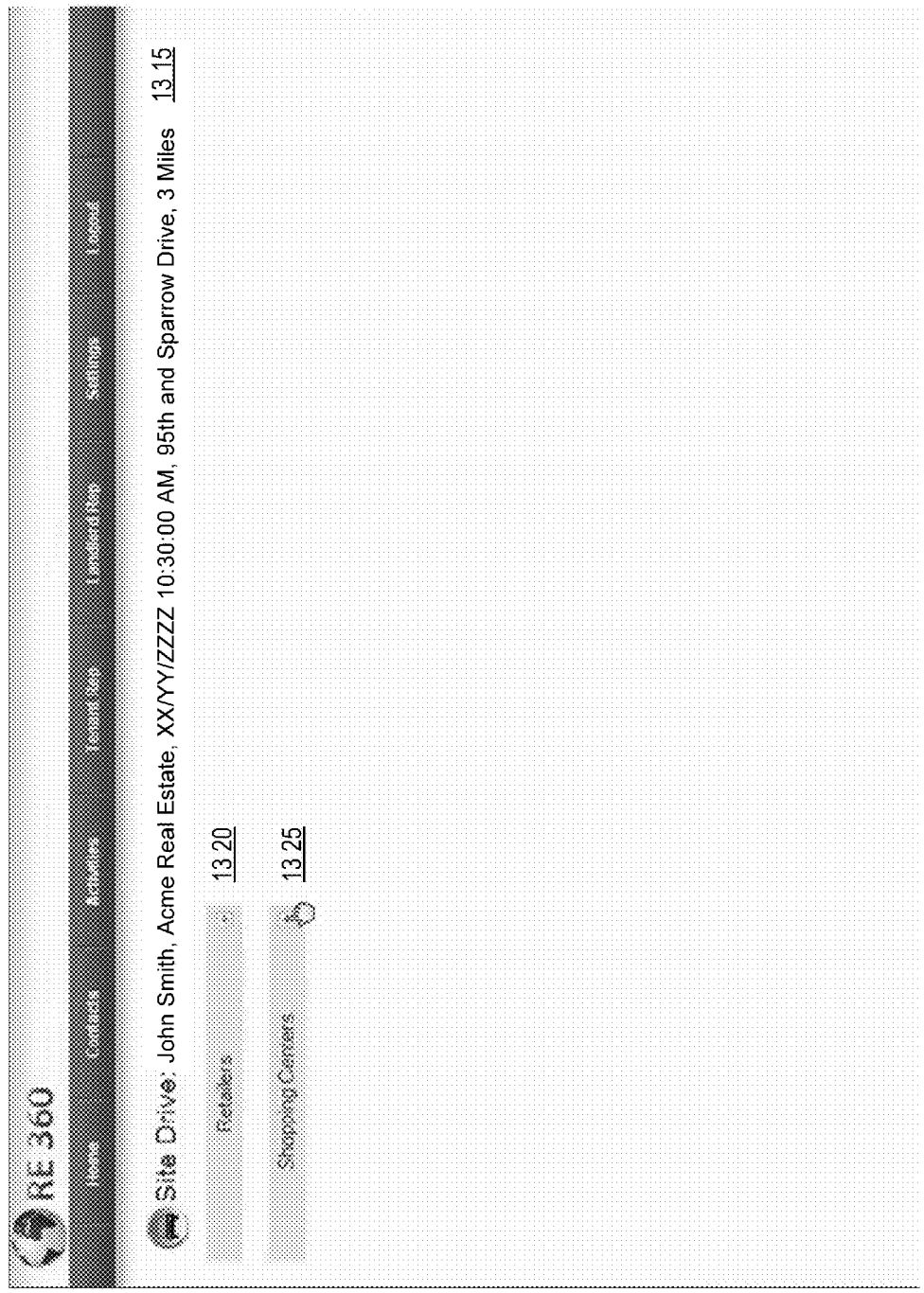

FIGURE 32B-1

| | 32 40 | 32 45 | 32 50 | 32 55 | 32 60 |
|---|---|---|---|---|---|
| Flyer | Company | Property Type | Transaction Type | Address |
| Patriot's plaza | 1. Use the from email address and/or website/emails at bottom of flyer and parse the domain out of it. Likely use a table of domains to company names. Cross check 1 and 2. If both return same result then more likely to be correct. | 1. Check for matches in property type table and return matches. Eg end cap, outlot, etc. | Unknown | 1. Look left of the City and find numbers, then take everything to the left from the city including the numbers. Extract this is the address field. |
| 345 E Ohio | 1. Use the from email address and/or website/emails at bottom of flyer and parse the domain out of it. Likely use a table of domains to company names. Cross check 1 and 2. If both return same result then more likely to be correct | 1. Check for matches in property type table and return matches. Eg end cap, outlot, freestanding, etc. | Unknown | 1. Look for "&" in the header, if found then look to the left left until we find any number, if gap between the number and word is less than 4 words then it's most likely one street. Then look to the right until we find the end of the line, or a number, that would be another street. |
| FreedomCommons | 1. Use the from email address and/or website/emails at bottom of flyer and parse the domain out of it. Likely use a table of domains to company names. Cross check 1 and 2. If both return same result then more likely to be correct. | Unknown | Unknown | Look for & in the header, check left and right of & for "Drive/dr, Circle/cir, Road/rd, Lane/ln, ave/avenue, st/street", if found, then take take everything to right until "Drive/dr, Circle/cir, Road/rd, Lane/ln, ave/avenue, st/street", and 3 words to the left. |
| Woodridge Plaza | 1. Look for "Real Estate, Inc" and take the words before it as a company. 2. Use the from email address and/or website/emails at bottom of flyer and parse the domain out of it. Likely use a table of domains to company names. Cross check 1 and 3. If all return same result then more likely to be correct. | Unknown | 1. Look for "Available for" and match next word with transaction type (eg For Sale, For Lease, etc) in the table | Look for word "AND" and the following words around it "Drive/dr, Circle/cir, Road/rd, Lane/ln, ave/avenue, st/street", if any of those words are in left and right of the "AND" then take 2 words from the left and everything to the right until the word from the list(dr/ave/cir...). |
| 1118 State | 1. Look for "Real Estate GROUP" and the the words before it as a company. 2. Use the from email address and/or website/emails at bottom of flyer and parse the domain out of it. Likely use a table of domains to company names. Cross check 1 and 3. If all return same result then more likely to be correct. | Unknown | Unknown | 1. Look in the line of city and one line above for words "Drive/dr, Circle/cir, Road/rd, Lane/ln, ave/avenue, st/street", if found use the the line as address |

| City | County | State | SQ FT |
|---|---|---|---|
| 1. Look to the left of ", state", extract the first word to the City field. If the 2nd word to the left is not matching a value in the street type table (eg, Driveln, Circle(s), Road(s), Lane/ln, etc), extract the 2nd word also. | Do a table look up based on the address | 1. Look for the string ", $state"(comma space $state) in the states table. Extract this value the state field. | 1. Look find numbers after "Available:" or "Space:" in the same or line below. 2. Look for words "SQ FT", "S.F.","Square Feet", etc. and parse numbers before them. 3. Cross check 1 and 2. If both return same result then more likely to be correct. |
| 1. Look to the left of ", state", extract the first word to the City field. If the 2nd word to the left is not matching a value in the street type table (eg, Driveln, Circle(s), Road(s), Lane/ln, etc), extract the 2nd word also. | Do a table look up based on the address | 1. Look for the string ", $state"(comma space $state) in the states table. Extract this value the state field. | 1. Look for words "SQ FT", "S.F.","Square Feet", etc. and extract the preceeding numbers and commas |
| 1. Look to the left of ", state", extract the first word to the City field. If the 2nd word to the left is not matching a value in the street type table (eg, Driveln, Circle(s), Road(s), Lane/ln, etc), extract the 2nd word also. | Do a table look up based on the address | 1. Look for the string ", $state"(comma space $state) in the states table. Extract this value the state field. | 1. Look for words "SQ FT", "S.F.","Square Feet", etc. and extract the preceeding numbers and commas |
| 1. Look to the left of ", state", extract the first word to the City field. If the 2nd word to the left is not matching a value in the street type table (eg, Driveln, Circle(s), Road(s), Lane/ln, etc), extract the 2nd word also. | Do a table look up based on the address | 1. Look for the string ", $state"(comma space $state) in the states table. Extract this value the state field. | 1. Look for words "SQ FT", "S.F.","Square Feet", etc. and extract the preceeding numbers and commas |
| 1. Look to the left of ", state", extract the first word to the City field. If the 2nd word to the left is not matching a value in the street type table (eg, Driveln, Circle(s), Road(s), Lane/ln, etc), extract the 2nd word also. | Do a table look up based on the address | 1. Look for the string ", $state"(comma space $state) in the states table. Extract this value the state field. | 1. Look for words "SQ FT", "S.F.","Square Feet", etc. and extract the preceeding numbers and commas |

Column headers: 32 65, 32 70, 32 75, 32 80

LEAD REQUEST FORM 46 01

REQUEST TYPE: ☐ All  ☒ Contact Info  ☐ Marketing Idea  ☐ Site Drive
46 05              ☐ Calendar Time  ☐ Personal Introduction

REQUEST PARAMETER(S):
46 10

| John Doe | | [v] or | "lead agent" | | [v] and | Illinois OR Indiana |
| Lead Name | | | Title | | | Location |

[v] not
Commercial and rent*
Property Type

46 15 BOUNTY OFFER:  | 35 | . | 00 |  ⦿ US Dollars  ◯ Euros  ◯ HUB Credits  [v] Other

TARGET PARAMETERS:
46 20

SUBMIT REQUEST   46 25

FIGURE 47A

REQUEST RESULTS 47 01

◄ MODIFY REQUEST PARAMETERS  47 05

| Lead Provider 47 10 | Lead Provider Quality Rating 47 15 | Quality Premium 47 20 | Accept? 47 25 |
|---|---|---|---|
| Jack White | 98 | 10 US dollars | ☐ |
| Jane Brown | 80 | 4 US dollars | ☐ |
| Mike Black | 45 | -- | ☒ |

RETRIEVE REQUESTED INFO  47 30

REQUEST RESULTS

| Lead Provider | Provider Rating | Quality Premium | Accept? |
|---|---|---|---|
| Jack White | 80 | 10 US dollars | ☐ |
| Jane Brown | 45 | 4 US dollars | ☐ |
| Mike Black | | -- | ☒ |

Contact photo 47 40

Contact information 47 45

◄ MODIFY REQUEST PARAMETERS

RETRIEVE REQUESTED INFO

REQUEST RESULTS

◄ MODIFY REQUEST PARAMETERS

| Lead Provider | Lead Provider Quality Rating | Quality Premium | 47 50 Contact Title | 47 55 Location | Accept? |
|---|---|---|---|---|---|
| Jack White | 98 | 10 US dollars | Lead Agent | Chicago Metro | ☐ |
| Jane Brown | 80 | 4 US dollars | Executive Broker | Chicago Metro | ☐ |
| Mike Black | 45 | -- | Lead Agent | Calumet City | ☒ |
| -- | 99 | 15 US dollars | Lead Agent | Chicago Metro | Bounty Too Low 47 60 |

RETRIEVE REQUESTED INFO

DRAFT: PRIVILEGED AND CONFIDENTIAL

DRAFT: PRIVILEGED AND CONFIDENTIAL

APPARATUSES, METHODS AND SYSTEMS FOR A LEAD GENERATING HUB

RELATED APPLICATIONS AND PRIORITY CLAIMS

This is a Continuation-In-Part of and claims priority under 35 U.S.C. §120 to: U.S. Non-Provisional patent application Ser. No. 12/960,637 entitled, "Apparatuses, Methods and Systems for a Lead Exchange Facilitating HUB," filed Dec. 6, 2010; U.S. Non-Provisional patent application Ser. No. 12/883,110 entitled, "Apparatuses, Methods and Systems for an Intelligent Inbox Coordinating HUB," filed Sep. 15, 2010; U.S. Non-Provisional patent application Ser. No. 12/872,011 entitled, "Apparatuses, Methods and Systems for an Activity Tracking and Property Transaction Facilitating Hub User Interface," filed Aug. 31, 2010; and U.S. Non-Provisional patent application Ser. No. 12/784,845 entitled, "Apparatuses, Methods and Systems for an Activity Tracking and Property Transaction Facilitating Hub," filed May 21, 2010. The entire contents of the aforementioned applications are herein expressly incorporated by reference.

FIELD

The present invention is directed generally to an apparatuses, methods, and systems of commerce, and more particularly, to APPARATUSES, METHODS AND SYSTEMS FOR A LEAD GENERATING HUB

BACKGROUND

Contact management systems have come about to allow users to store information about individuals and organizations known to them, such as contact information, job titles, impressions, personal details, and the like. Contacts stored in contact management systems may be organized and sorted based on a variety of criteria, such as name, affiliation, or category. Contact management systems may include e-mail or calendar systems to allow for communications with or management of contacts in the contact management systems, such as the generation of correspondence with contacts or the scheduling of tasks or events associated with the contacts.

SUMMARY

The APPARATUSES, METHODS AND SYSTEMS FOR A LEAD GENERATING HUB (hereinafter "HUB") facilitates the generation, evaluation, and recording of information and activities related to property transactions and the communications surrounding them as well as the relationships' dependencies, work flows, activities related to activity tracking, and/or the like. HUB systems facilitate a more organized and efficient approach to coordinating activities (e.g., sales activities) around a centralized database of contacts. By linking pending and/or historical activities to a contact, company, sales opportunity, data resource, and/or the like, a user or team of users may more readily discover linkages and interrelationships between parties and linked data along with more readily discovering new business opportunities via side-by-side and bifurcated comparisons. Linking activities to users may also allow for the prioritization of tasks according to urgency, due date, client, counterparty, and/or the like. Such organization of activities around users, contacts, and/or the like facilitates higher order and efficiency, which is likely to yield greater productivity.

In embodiments, the HUB may be configured to identify leads for users based on user-entered information, user contacts, and/or the properties associated with a user and/or in which a user is interested, and/or identifying leads through properties associated with a property listing database. Leveraging connectivity between contract relationship management functionality, property listing service features, intelligent inbox coordination capabilities, and/or the like, the HUB may identify connections between user requirements and/or assets and opportunities to fulfill those requirements and/or to transact those assets.

In one embodiment, a lead generating processor implemented method is disclosed, comprising: receiving a plurality of property, tenant client, site drive and/or other field/market activity parameters; discerning an input activity associated with the plurality of such parameters; determining a complementary activity that is complementary to the input activity; generating a query statement based on the plurality of such parameters and the complementary activity; querying lead records based on the query statement to identify at least one matching lead record; and providing the at least one matching lead record.

In another embodiment, a lead generating processor-implemented method is disclosed, comprising: identifying a transactional counterparty associated with a current activity; querying at least one record associated with the transactional counterparty to retrieve at least one lead prospect; retrieving at least one lead prospect record associated with the at least one lead prospect; comparing data field entries of the at least one lead prospect record with activity data elements associated with the current activity to yield a lead match rating; and generating a lead notification when the lead match rating is greater than a threshold.

BRIEF DESCRIPTION OF THE DRAWINGS

The accompanying appendices and/or drawings illustrate various non-limiting, example, inventive aspects in accordance with the present disclosure:

FIGS. 1A-C show implementations of a tenant-broker user interface in embodiments of HUB operation;

FIGS. 2A-B show examples of landlord-broker user interfaces in one embodiment of HUB operation;

FIGS. 2C-D show alternative implementations of HUB user interfaces in embodiments of HUB operation;

FIG. 5B shows an implementation of role-based user interface profiles in one embodiment of HUB operation;

FIG. 6B shows an implementation of activity based HUB UI field resets in one embodiment of HUB operation;

FIGS. 11A-D show an implementation of user interface for contact exchange in one embodiment of HUB operation;

FIGS. 13A-E show an implementation of user interface for site drive information acquisition in one embodiment of HUB operation;

FIGS. 32A-B show implementations of logic flow and data parsing rules for data scraping in one embodiment of HUB operation;

FIGS. 36A-B show implementations of summary screen user interfaces in one embodiment of HUB operation;

FIGS. 37A-B show implementations of summary screen user interfaces in another embodiment of HUB operation;

FIG. 46 shows an implementation of user interface for lead request submission in one embodiment of HUB operation;

FIGS. 47A-C show implementations of user interface for lead candidate selection in one embodiment of HUB operation;

Figure 1B:
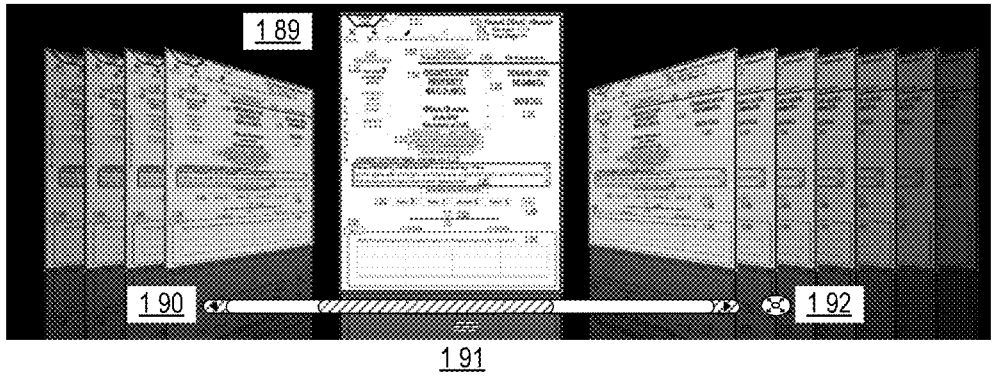

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Hub

This disclosure details aspects of APPARATUSES, METHODS AND SYSTEMS FOR A LEAD GENERATING HUB (hereinafter, "HUB"). HUB embodiments may serve to facilitate contact relationship management, lead generation, property/retailer and/or real estate browsing and/or searching, transactions, broker activity tracking, and/or the like features and functionality. In one embodiment, the HUB may allow a user to specify a role or "hat" in the context of a prospective transaction of property (e.g., a buyer, seller, tenant, landlord, buyer/tenant or buyer broker, seller/landlord or landlord or investment sales broker, investor, leasing agent, property manager, business developer, dispositioner, real estate professional, Municipality contact, and/or the like). That role specification may then be used to configure a user interface, such as in accordance with a role-based user interface profile, for presentation to the user. The user may then interact with the user interface to specify desired, required, or available property/tenant attributes, based on which queries of property listings/tenants may be performed to find matching results. The HUB may also include an integrated contact relationship management (CRM) system configured to track and manage contact information, such as may be associated with properties in the aforementioned property listing, with transactions related to those properties, and/or the like. By integrating prospective property/tenant transactional listings with a CRM system, the HUB enables a wide array of new features and expanded functionality, further discussion of which is provided below.

It is to be understood that, depending on the particular needs and/or characteristics of a HUB user, counterparty, property characteristic, client device, server device, control configuration, data payload, communication and/or network framework, monetization model, and/or the like, various embodiments of the HUB may be implemented that enable a great deal of flexibility and customization. The instant disclosure discusses embodiments and/or applications of the HUB primarily directed to real estate listings and transactions, especially as mediated by real estate brokers. However, it is to be understood that the systems described herein may be readily configured and/or customized for a wide range of other applications and/or implementations. For example, aspects of the HUB may be adapted for other types of commerce, transactions of services, chattels, and/or the like, non-commercial exchanges, service requirements fulfillment, side-by-side and bifurcated product and/or lead comparison, matching and discovery, transactions of property and/or real estate in a virtual world, and/or the like. For example, in various implementations, the HUB may be adapted to any application having different parties wherein one party has requirements to fulfill and the other party has capabilities, materials, expertise, assets, and/or the like to fulfill those requirements. In other variations, the HUB may be used for side-by-side recruitment, skill-set, product and/or pricing comparison and discovery, and/or the like. It is to be understood that the HUB may be further adapted for other implementations or transactional applications.

Figure 1C:
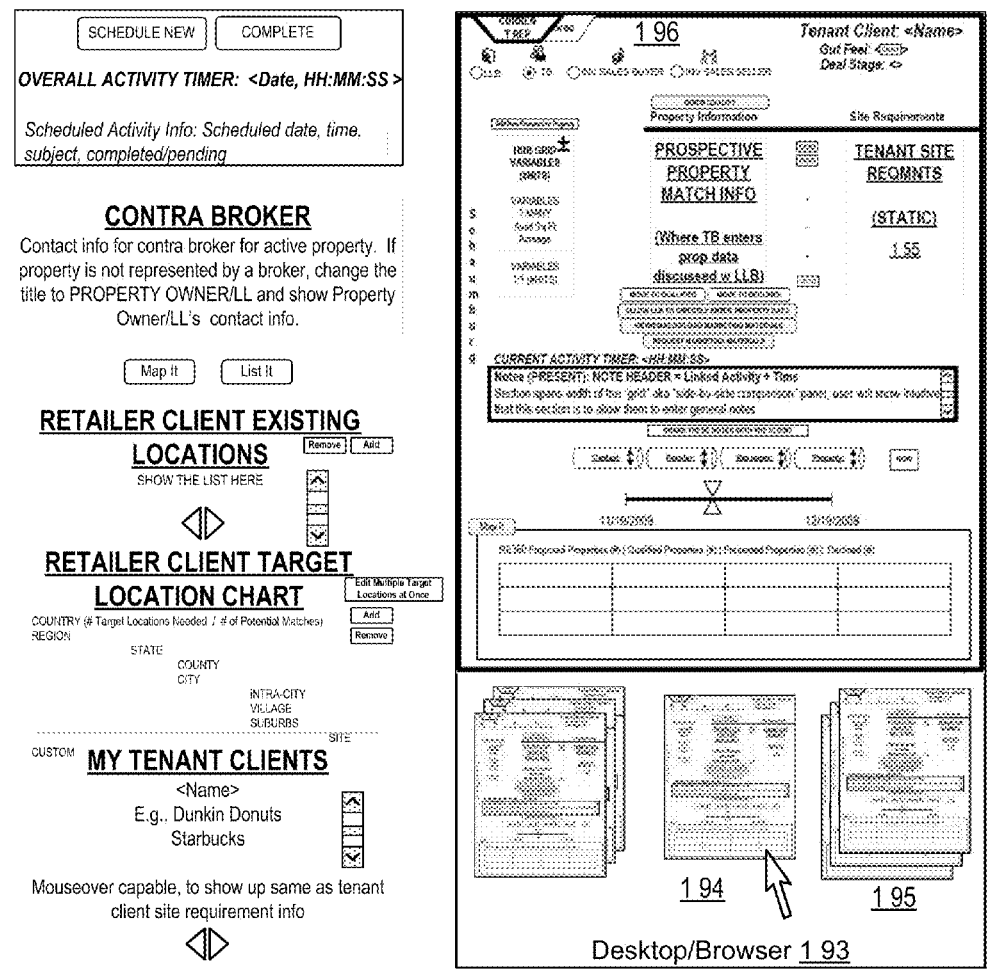

FIGS. 1A-C show implementations of a user interface in embodiments of HUB operation. The illustrated interface in FIG. 1A may, in one implementation, provide access to HUB features and functionality, and may, in one implementation, be employed by a real estate professional acting on behalf of a tenant to engage possible counterparties, landlords, landlord brokers, and/or the like to seek possible and/or find potential properties for the tenant client. Although the instant specification may use the term "broker," this term should be understood to encompass any real estate professional, agent, broker, service provider, and/or the like. The role of the user as tenant broker is specified, in the illustrated implementation, via the radio button elements shown at 101, where the tenant broker (i.e., "TB") button has been selected. The illustrated implementation further includes buttons for landlord broker (i.e., "LLB"), investment sales buyer (i.e., "INV SALES BUYER"), and investment sales seller (i.e., "INV SALES SELLER"). Selection of a particular role may cause reconfiguration of the user interface, reconfiguration of the manner in which states and/or values of user interface elements are used to build database queries, and/or the like, as described in further detail below.

The TB may be provided with a list of all of his clients 103, wherefrom each client may be selectable to populate a tenant client name 105 and/or tenant site requirements 155, indicating desired property attributes for that tenant client (e.g., square footage, location, layout, features, amenities, view, type of location, price, terms, and/or the like). A broker's client information may, in one implementation, be stored in a contacts table of a HUB database. The availability of ready access to a list of clients associated with the user allows for quick and easy access to clients who may have property requirements or desires matching a counterparty with which the broker is engaged at any given time.

In one implementation, the interface may include a timer box 110 which may provide a scheduling button to allow a user to generate a new scheduled activity and/or a complete button to allow a user to indicate completion of a given activity and or set of activities. In one implementation, scheduling a new activity may allow a user to interact with a calendar and/or to enter a scheduled date, time, subject, completion status, and/or the like in association with a scheduled event, such as a meeting, phone call, teleconference, and/or the like. In one implementation, scheduling a new activity may cause the HUB to take a snapshot of a current set of user interface element states, values, linkages, and/or the like and associate that snapshot with the scheduled activity, such as for later retrieval and/or review. In one implementation, selection of activity completion may cause conclusion of a given session, such as by terminating automatic recording of the session by a HUB activity recorder, as discussed in further detail below. In one implementation, completion of an activity will automatically trigger re-initialization and recording of a new activity subsequent to the termination of the first activity recording session. For example, an activity associated with one property may have an assigned timer that will terminate and/or pause and/or reset when the activity for that property has concluded and/or when an activity associated with another property has begun. In one implementation, an overall and/or global timer may monitor the total time of a user session (e.g., such as may be associated with a given user, communication with a given contact, and/or the like) while various and/or multiple activities with their own timers begin, pause and/or end. In various HUB implementations, pluralities of activity timers may be employed, including timers that depend on other timers, are independent, begin or end upon a user interaction with the UI, and/or the like. In one implementation, a user may select a completion button, or otherwise manifest termination of a given activity, in order to terminate the timer for that activity only, while the global timer continues to run. In another implementation, selection of the completion button may cause the conclusion of a global session, possibly comprising more than one activity recording session, and may terminate an overall timer associated with the overall session. In one implementation, a single activity and/or a single activity recording session may be associated with each interaction with a given counterparty, contra broker, and/or the like, regardless of whether a user changes roles during the session. In one implementation, changing roles may cause additional activity timers to stop and start. In one implementation, the timer box 110 may also include an overall timer display, indicating a global time for the global session. The timer box 110 may also, in one implementation, indicate other information about the current or other scheduled activity, such as the scheduled date and/or time, subject, activity status, priority, and/or the like. In one implementation, a user may be permitted to edit the scheduled activity information, which may then be appended to a data record corresponding to the scheduled activity and/or an activity recording session, as described in further detail below. In one implementation, this may change the appropriate calendar record and associated scheduled date, time, subject, completion status, and/or the like.

In one implementation, the interface may further include contact information 115, such as may be derived from an integrated CRM system and/or may be associated with another party with whom the user is engaged in an activity, such as a phone call, meeting, teleconference, instant messaging session, and/or the like communications. Contact information may correspond to any of a wide variety of different parties with whom the user may be engaged and/or about whom the user may wish to investigate, such as but not limited to a contra broker, client, direct contact, prospect for new business, transactional counterparty, and/or the like. The contact type may, in one implementation, be stored in association with the contact and may appear in the interface display upon selection of the contact. In one implementation, a user may be permitted to edit the contact type and/or to select a corresponding contact type from a selectable list for association with the contact. Displayed contact information may include any information stored in the CRM system in association with the contact, such as but not limited to contact name, phone number, e-mail address, postal address, recent activity, personal notes on the contact, and/or the like. In one implementation, the interface may include an element, such as a button, integrated address book, and/or the like 116 to allow the user to select a new contact with whom they are engaged. For example, in one implementation, selection of a button such as that shown at 116 may cause the display of an address book, rolodex, user profile selection page, and/or the like from which a user may select a new contact, whose information will then be displayed at 115. In one implementation, selection of a new contact may trigger resetting of the overall activity timer 110, a particular activity timer or other subsidiary timer, and/or the like.

In one implementation, the interface may further include a listing, mapping, and/or other presentation of clients, existing client locations 125, target client locations 130, and/or the like associated with the contact. For example, in an implementation wherein the contact is a contra broker comprising a landlord broker (e.g., where the user is a tenant broker), the client's existing locations may be, for example, existing rented and/or owned properties of the retailer client. Rented and/or owned properties may, in one implementation, be listed at 125, while properties and/or property characteristics sought and/or desired for rent and/or purchase may be listed at 130 and/or 175. In another implementation, the same information and/or subsets thereof may be included at 125 and 130, except organized differently. For example, the information at 125 may comprise information pertaining to clients' properties configured as a list, while the information at 130 may comprise information to clients' properties organized according to a hierarchical and/or telescoping arrangement of locations corresponding to a desired property location, such as may be specified by a tenant client of the tenant broker user. For example, a tenant may specify one or more target locations comprising location information, such as a country/region, state, county, city, intra-city/village/suburbs/neighborhood, street, and/or the like. The client locations may then be organized into a hierarchical chart of the target locations, at varying degrees of target location specificity, so as to indicate which if any of the client locations match the target country, target state, target city, and/or the like. In one implementation, a user may click on the location hierarchy at any level to be provided with a list of client properties matching that location. In one implementation, such a provided list of client properties may be provided in the listing area at 125 in response to selection of a location from the location chart at 130.

The interface may also include facilities, such as "map it" and/or "list it" buttons 120, which may allow a user to switch between views of the property listings, from a list view to a view in which the properties are shown in their positions on a map. In one implementation, these buttons may engage Google Maps application programming interface tools to display listing elements on an embedded Google Map. Any of a wide variety of other mapping tools and/or systems may be employed in alternate implementations, such as but not limited to Yahoo Maps, Mapquest, Bing Maps, and/or the like. In one implementation, a map may be displayed as an opaque, translucent, or transparent overlay on top of the HUB UI. A user may, for example, then be allowed to move the overlay map, to switch between an opaque overlay view and a regular map view, and/or otherwise interact with the map and/or a mapping window. In one implementation, the HUB may allow for overlaying of multiple maps, different views of a single map, may allow the user to select different mapping applications showing the same subject property from different views in the same window or view, different geographic and/or other property and/or contact information on a single map, and/or the like. In one implementation, such information may be added or removed from the map by checking or unchecking boxes or the like In one implementation, client listings may be sorted and/or arranged based on any of a variety of criteria, such as, but not limited to proximity to a specified location, recentness of entry and/or availability for a given listing, contact rating, contact history and/or existence of scheduled activity with the contact, and/or the like. In one implementation, mouse-over and/or selection of a client in the client listing may result in display of any contact information stored for that client in the integrated CRM system. In one implementation, selection of a client in the client listing may allow a property associated with that client to be loaded into an existing prospective property match information area 160 and/or may cause creation of a new search "paper" 140, both of which are described further below.

A search paper 140 may, in one implementation, comprise a graphical representation of a field of view, search area, sheet of paper, and/or the like aggregating modules and/or data for a target location, property, activity, search session, and/or the like. For example, in one implementation, a paper 140 may be displayed for each target location (the cities of Schaumburg and Calumet City in the implementation illustrated in FIG. 1). A new paper may be created, for example, upon user selection of a new paper generation button (e.g., the add new prospective property button at 145), upon selection of a new contra broker and/or contra broker property, and/or the like. Different papers may then be activated and/or brought to the foreground by clicking on the paper tabs, such as those displayed at the left of each paper with the location name at 140. Paper tab names may be allowed to take values at varying levels of specificity, such as, in one implementation, varying from county to a specific building address. In one implementation, multiple papers may be associated with different prospective property matches and, thus, not available for a user adopting a landlord broker role. In one implementation, when a tenant broker clicks on a new tenant client, the number of papers may change accordingly, to reflect the existence of multiple papers generated based on prior activity. In one implementation, there may exist a unique and/or independent stack of papers for each tenant client. In various implementations, the HUB interface may provide the ability to create a plurality of new papers at and maintain them on-screen at any given time.

The interface may further include a bifurcated display 143 showing a side-by-side representation of site requirements and prospective property information, to allow for attribute-by-attribute comparison of desired and available property attributes. A list of property attributes, grid variables, and/or the like 150 may be provided next to and/or as part of the bifurcated display to show identifiers of those attributes next to the attribute values listed at 160 and 155. In one implementation, the list of attributes, grid variables, and/or the like displayed and/or for which corresponding fields exist in the property information and/or site requirement areas, may depend on a variety of factors, such as but not limited to the role selected by the user, fields customized by the user, a current user activity, client characteristics, and/or the like. In one implementation, the site requirement information 155 for a tenant client may be static, corresponding to the property attributes specified as desired by the tenant, while the prospective property match information 160 may admit inputs of property information by a user. In one implementation, the interface may include a button or other interface element such as that shown at 145 for initiating entry of new prospective property match information, attributes, and/or the like. In one implementation, selection of that interface element may cause the HUB to store any prior prospective property match information entered at 160 and clear the property information area for new entry. In one implementation, a user may be prompted, prior to storage and clearance of the prior property information, as to whether and/or how the prior property information should be stored (e.g., as a proposed property, qualified property, presented property, declined property, and/or the like). In one implementation, all UI elements or a specified subset of UI elements may be removed, selectively added, moved, customized, and/or the like by a HUB user, such as to maximize usability, promote efficiency, and/or optimize usage of features important to the user.

In alternative implementations or embodiments of HUB operation, the bifurcated display at 143 and/or any other HUB features may be adapted for transactions of chattels, transactions of services, non-transactional comparisons, and/or the like. For example, in one implementation, a user may populated the requirements side 155 of the bifurcated display 143 with skill requirements for a particular task and populate the prospective match side 160 of the display with existing skills of various employees to find an employee best suited for a particular task. In another example, a requirements side 155 may be populated with hardware requirements for a piece of software and the prospective match side 160 may be populated with hardware devices having various capabilities (wherein the contacts may, for example, be owners, controllers, and/or the like of those hardware devices). The HUB system may generally be adapted for any other application having interacting parties wherein one party has specified requirements and one or more other parties have capabilities, availabilities, skills, assets, services, and/or the like. In some implementations, the HUB may be employed for side-by-side recruitment, skill-set, product and/or pricing comparison and discovery, and/or the like.

The bifurcated display may also include a plurality of buttons, or other such interface elements configured to allow a user to transact marketing materials, provide input access for property information, associate a status with prospective property information entered at 160 and/or to move that information into a separate table, such as that shown at 187 and discussed in further detail below, and/or the like. For example, in the illustrated implementation, interface buttons are provided including "move to qualified," "move to declined," "allow LLB to directly enter property data," "view/email/upload marketing materials," and "request marketing materials." A move to qualified button may allow a user to store entered prospective property match information, label it as qualified property information, populate a qualified properties area of a table such as that shown at 187 with the prospective property information, and/or the like. A move to declined button may allow a user to store entered prospective property information, label it as declined property information, populate a declined properties area of a table such as that shown at 187 with the prospective property information, and/or the like. An allow LLB to directly enter property data button may allow for direct entry of property information into the property information portion of the bifurcated display 160 by a contra broker or other counterparty of the user, such as via an instant messaging protocol. In one implementation, a contra broker or counterparty may enter property information, and the user may employ an auto-form fill whereby line items in the form are received by the tenant broker, who may then automatically accept the filled information and use it to fill the display at next viewing. A view/email/upload marketing materials button may allow for quick generation and/or transmission of marketing materials associated with property information shown in the bifurcated display. A request marketing materials button may cause generation and/or transmission of a request for marketing materials, such as may be associated with information shown in the bifurcated display.

In one implementation, the interface may include a plurality of rating indicators 175, such as one for each property attribute and/or grid variable listed in the bifurcated display. Such rating indicators may, in one implementation, allow a user to specify and/or quantify how well a value of a grid variable of a prospective property matches the required value of the grid variable in the site requirements. For example, in one implementation, the rating indicators may comprise three radio buttons resembling a traffic light (e.g., red, yellow, and green buttons), and whereby a user may specify a good, medium, or bad match between prospective property match information and tenant site requirements. Any of a wide variety of other forms of rating indicators may be used in various implementations, such as, but not limited to: numerical and/or textual input fields, sliding bar rating indicators, thumbs up/down indicators, and/or the like. In one implementation, an overall rating indicator 176 may also be included in the interface. In one implementation, the overall rating indicator 176 may be independent of the rating indicators at 175, and may allow a user to specify an overall impression of a given activity, transaction, lead, opportunity, and/or the like. In another implementation, the overall rating indicator 176 may be determined by values entered to the rating indicators at 175, such as reflecting an average, weighted average, and/or the like of the values of those indicators. The interface may further include a deal stage field or other such interface element (e.g., radio button, pull-down menu, and/or the like) allowing a user to specify a stage of the deal-making process in which a given activity, search, prospect, lead, and/or the like is situated. In one implementation, attribute and/or global rating indicator values and/or a deal stage may be stored in association with a given activity, such as part of an activity recording session.

In one implementation, the interface may further include a current activity timer 178, indicating a time associated with a current activity, activity recording session, and/or the like. The interface may further, in one implementation, include a facility, such as a text entry window, to allow a user to enter notes, such as general notes, impressions, and/or the like related to the current activity. In one implementation, a note header may be automatically included indicating the linked activity and a time at which each note was begun and/or edited.

In one implementation, the interface may further include a "time machine" facility comprising components to allow a user to scroll through a history of HUB activities, notes, search queries, results, and/or the like and/or to dynamically filter and/or branch that history by specifying filter variables. In one implementation, the time machine facility may include interface elements, such as the rolling cylinders shown in the illustrated implementation at 182, to allow a user to enter desired values, ranges, and/or the like of variables which may be used to filter returned activity information. For example, the rotating cylinders in the illustrated implementation allow a user to specify contact information (e.g., contact identity, location, and/or the like), retailer and/or client information (e.g., retailer identity, location, and/or the like), site requirement information, property information, and/or the like. In one implementation, the variables that a user can adjust values for via the roller cylinders may depend on the role that a user has assumed for a given activity. In one implementation, one or more cylinders may be locked on a given filter variable value to set the locked value as the value to be used in a query of historical activities, notes, and/or the like. In one implementation, locking of a filter variable value on one cylinder may cause the space of available values for the other filter variables to be limited to those corresponding to existing records having the requisite value for the locked filter variable. For example, if a user locks the contact wheel on "John Smith," then thereafter only the retailers, site requirements, and property information associated with John Smith may be provided for selection on the remaining cylinders. The interface may further include a timeline element 185 allowing a user to scroll through a range of dates to set a specified desired date and/or the specify a range of dates over which a search of prior activities is to be conducted. For example, in one implementation, setting filter variable values will call a list of activity records having filter variable values matching those set by the user via the cylinders 182 and will populate the timeline 185 with times of those matching records. Then, a user may move from record to record by scrolling along the timeline. In one implementation, a page flow such as that shown in FIG. 1B may be provided for display to a user to show matching historical records, allowing for sequential review of activity snapshots and/or the like. In one implementation, selection of each record will cause the bifurcated display and/or other aspects of the interface of FIG. 1A to reflect the activities, notes, property information, site requirements, and/or the like associated with the selected recorded activity. A user may select a button, such as the "Now" button shown at 186, to return the interface to the current activity and/or to toggle between current activity and selected historical activity.

The interface may further include a table such as that shown at 187 displaying tabs for property information, activities, notes, and/or the like that have been labeled with various statuses. For example, in one implementation, a user may label properties with statuses such as, but not limited to, prospective properties, qualified properties, presented properties, declined properties, and/or the like. In one implementation, prospective properties may comprise HUB system-determined possible match recommendations, such as may be based on various property factors in comparison with site requirements (e.g., proximity to target location, similarity of square footage requirements, property attributes, and/or the like). In one implementation, prospective property tabs may be populated with property information scraped and/or otherwise extracted from marketing materials (e.g., documents in a variety of electronic formats, such as Word documents, Portable Document Format documents, and/or the like), emails, websites, and/or the like. In one implementation, qualified property information may comprise property information identified by the user as a qualified candidate property awaiting approval from a tenant, retailer, client, and/or the like. In one implementation, presented property information may comprise property information that has been discussed with the tenant, retailer, client, and/or the like. In one implementation, declined property information may comprise property information rejected by the user and or rejected by a tenant, retailer, client, and/or the like. In one implementation, the interface may include a button or other such feature 188 allowing the user to map properties in the table at 187, such as by representing properties with different statuses using different colors, symbols, and/or other differentiators on the map display at their respective locations. In one implementation, property mapping may be implemented with multiple layers that can be checked or unchecked, such as with each layer corresponding to a given property status. A user may then, for example, selectively include or exclude layers in the map for various purposes, such as to only view qualified properties, or to view qualified properties together with proposed properties. In one implementation, table values at 187 may be dictated and/or otherwise influenced by user entries at 160.

FIGS. 1B and 1C show alternative implementations of HUB papers (cf. 140 in FIG. 1A) in embodiments of HUB operation. In FIG. 1B, papers are implemented as a page flow interface 189 whereby a user may quickly flip through different HUB papers, select a desired paper, and/or the like. In various implementations, a selected HUB paper may be shown enlarged, may occupy a separate display area, may be fillable in its place in the page flow, and/or the like. For example, HUB pages configured as Flash packaged HTML may be displayed in a page flow such as that shown at 189 and still be configured for form filling. In one implementation, the interface such as that shown at 189 may also include other interface elements to adjust page viewing, such as a scrollbar 190, a size-adjustment handle to increase or decrease the viewing area of the interface 189, and a full-screen button 192 to cause the interface 189 to occupy an entire display area. In FIG. 1C, papers are implemented as selectable and/or movable icons on a desktop and/or browser area 193. A page may be displayed as an icon 194 and, in one implementation, multiple icons may be stacked 195, such as to form groups or collections of pages. In one implementation, stacking of pages may cause records associated with the pages to be associated with each other, in representation of the stacking. In one implementation, a stack of papers such as that shown at 191 may be associated with each other and/or with a unique tenant client. A selected page icon may then be enlarged and/or populate a full-scale display area of the interface 196. In one implementation, a single click, mouse-over, and/or the like on a given stack of papers may show a preview of information associated with the stack and/or pop-up a window indicating a tenant client identity, location, property attribute collection, and/or the like associated with the stack for quick and economical user review. It should be noted that the paper configurations shown in FIGS. 1B and/or 1C may be employed in conjunction with user interfaces configured for various user roles and/or hats, including a tenant broker role, a landlord broker role, and/or the like. With regard to items 191 and 193, in one implementation, these views may extend as a shelf 193, and/or be overlaid atop a portion of the HUB interface 196.

Figure 2A:
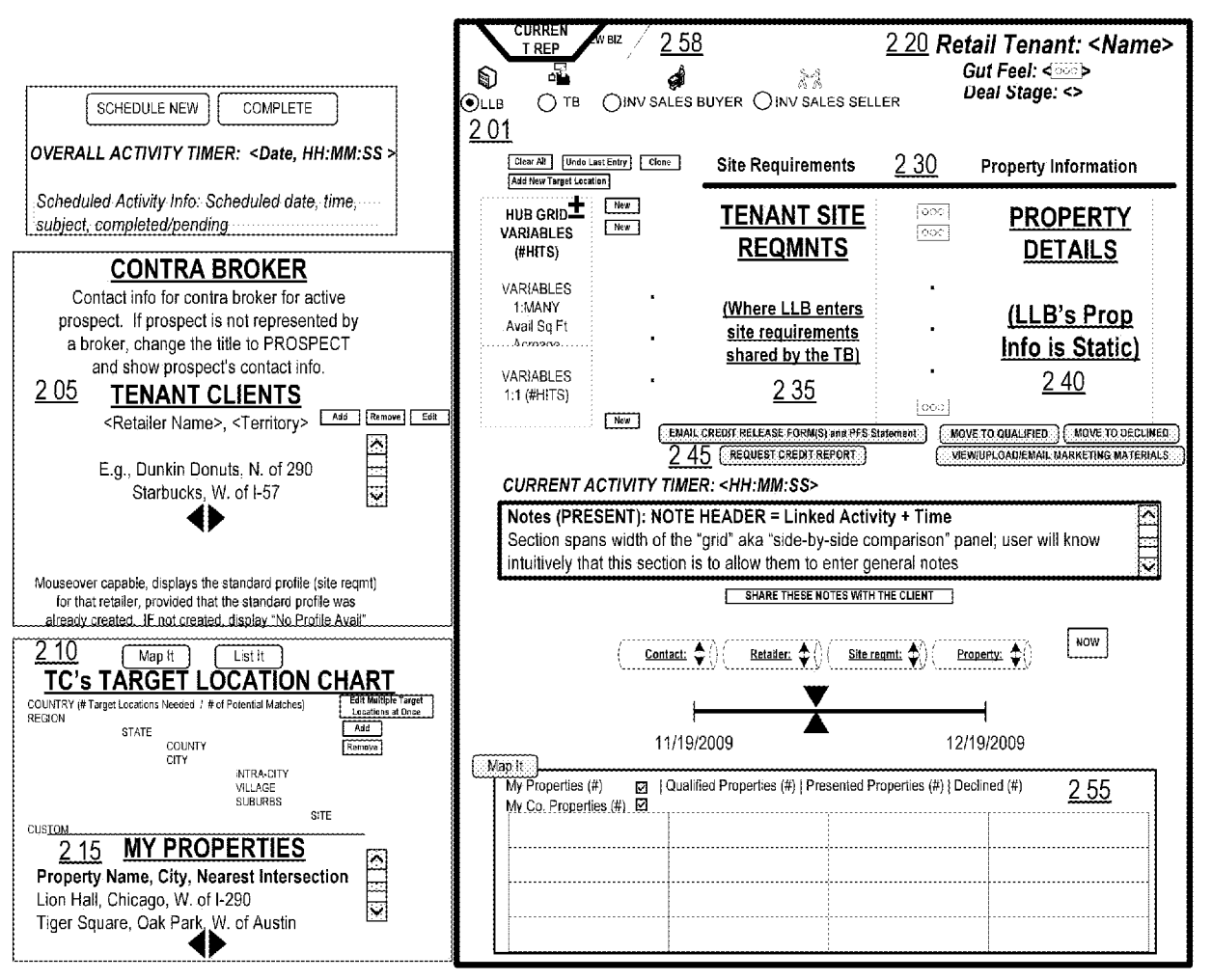

FIG. 2A shows an example landlord-broker user interface in one embodiment of HUB operation. In the implementation illustrated in FIG. 2A, the LLB role has been selected at the role selection element 201. In one implementation, the interface may include, proximate to the contra broker contact information, a list of the tenant clients 205 associated with and/or known to be associated with the contra broker. Selection, mouseover, and/or the like of a tenant client in the list of tenant clients may cause display of one or more site requirements associated with that tenant client, allowing the user to quickly identify possible opportunities for transacting client properties. The interface may further provide a listing of those tenant client site requirements organized in a location chart similar to that shown at 130 in FIG. 1A. The interface may further include a listing of the user's and/or user's clients' properties 215 for quick review and/or selection. When a retail tenant has been selected for discussion or other activity, that retail tenant's name 220 may appear in an activity area of the interface. The LLB interface may also provide a modified version of the bifurcated display 230 whereby the property details 240, such as may be related to a particular property and/or a particular client, are static, while the tenant site requirements 235 admit inputs. In one implementation, as inputs are added, the my properties and/or my company properties fields at 255 may be filled in real-time to reflect a broad range of potential property matches narrowing as additional tenant site requirements are added at 235. Depending on selection or un-selection of interface elements such as the boxes at 255, the list of potential property matches may be narrowed and/or expanded in accordance. The interface may also include facilities, such as the button elements shown near 245, to allow a user to request a credit report, email credit release forms, personal financial specialist statement, and/or the like from a contra broker, counterparty, tenant, buyer, and/or the like. In one implementation, the table at 255 may include properties with various statuses (e.g., qualified, presented, declined) as well as prospective properties of the user and/or the user's company.

In one implementation, the interface shown in FIG. 2A may be shown for user activities related to a current landlord client. The user may select a tab such as that shown near 258 to switch between an interface suitable for existing clients and another interface suitable for prospective clients. In one implementation, a HUB interface for new business, prospective clients, and/or the like may take a form similar to the example shown in FIG. 2B, where the "New Biz" tab has been selected at 260. Contact information associated with a prospective client may be displayed 262, as well as a listing of potential new property representations for that client 264. In one implementation, clicking on a potential new property representation from the listing at 264 may cause the display at 265 to populate with any known information about the property. Thereafter, a user's entry of property information at the area near 265 may cause the information for that property listing to be updated, including, in one implementation, in the listing displayed at 264. The interface may further include a complete listing of known properties for the prospective client 266, beyond merely those listings for which the user may seek potential representation (i.e., those shown at 264). In one implementation, potential new property representations for a given prospective client may also be accessed by means of papers or tabs such as that shown at 268, wherein each paper or tab may, for example, correspond to a given potential new property representation for the prospective client. The interface may also, in one implementation, include a table area 270 configured to display information such as properties associated with the user which neighbor a potential new property representation, properties associated with the user's company which neighbor a potential new property representation, completed deals having attributes similar to the potential new property representation, and/or the like which, in one implementation, can be customized by the user. Display of this information to the user may enable the user to quickly relate relevant information to the prospective client to demonstrate a familiarity with the locations, types of properties, and/or the like associated with the prospective client and/or to demonstrate success in prior transactions with such properties so as, in one implementation, to help the sales pitch of winning the new business. The interface may also, in one implementation, include "pending activity" and/or "completed activity" tabs to allow a user to view all recorded pending and/or completed activities related to the new business solicitation.

Figure 2B:
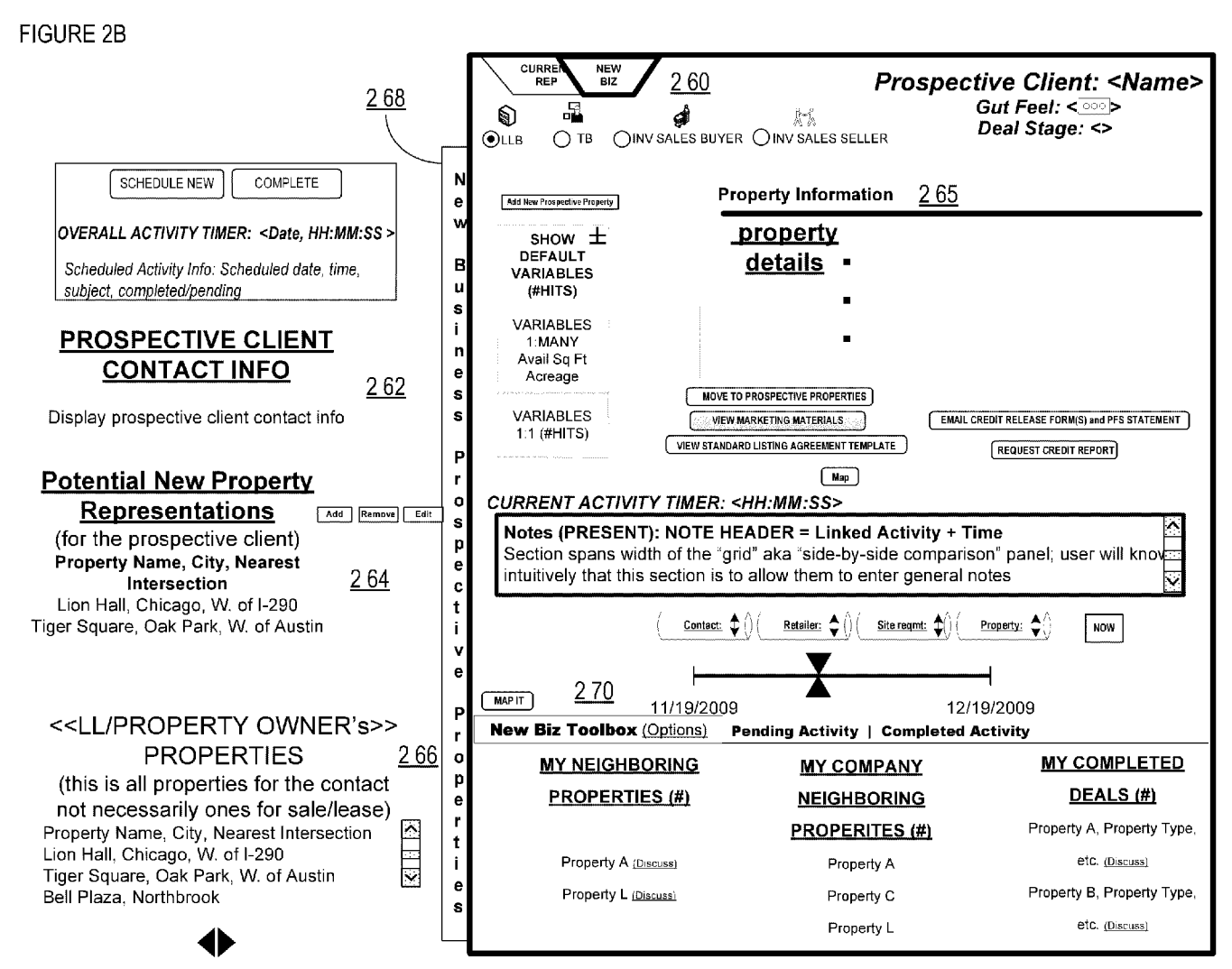

In one implementation, aspects of interfaces such as those shown in FIG. 1A and FIGS. 2A-B may be time-dependent and/or time sensitive and/or may be shown or hidden or minimized or maximized at different phases of system operation and/or user interaction. Selective display of user interface elements may, in one implementation, facilitate user interaction with and/or understanding of HUB features and functionality, such as based upon user role, by providing clean and non-cumbersome presentation of HUB UI tools. For example, in one implementation, the left side of the interface, such as that shown in FIG. 1A and FIGS. 2A-B, may be made to appear immediately upon engaging the HUB, but may disappear after 10 seconds (or other designated time period) absent user interaction, click, mouseover, and/or the like. Similarly, in one implementation, UI elements for role and/or current activity specification may be provided for display immediately, but me made to disappear, such as after 11 seconds. The bifurcated display, an example of which is shown at 143 in FIG. 1A, as well as associated UI features such as user notes, and/or the like, may, in one implementation, not be displayed at the initial engagement of the HUB, but may be made to appear some time thereafter, such as after 5 seconds. In one implementation, the bifurcated display may never disappear after first appearing. In one implementation, the time machine UI features may appear at the same time as the bifurcated display and disappear some time thereafter, such as after 10 seconds. In one implementation, a table such as that shown at 187 in FIG. 1A may be made to appear at the same time as the bifurcated display and disappear some time thereafter, such as after 10 seconds. In one implementation, other UI elements, such as the UI buttons shown at 170 in FIG. 1A, may be displayed or hidden on an as-needed and/or availability basis (e.g., shown when the user's activities have made the use of that button useful or desirable). Other timings and/or combinations, arrangements, orders, and/or the like of showing and hiding UI elements may be employed in alternative implementations. In one implementation, the time periods for display and/or hiding of UI elements may be specified by a HUB administrator and/or customized by a HUB user. In one implementation, recent user activities and/or historical user activity patterns may influence and/or determine the timing, order, and/or scope of selective display of UI elements. In one implementation, a user may be permitted to manually open or hide one or more UI elements and/or to turn off the hiding of UI features altogether. In one implementation, mousing over an area of the UI may cause one or more hidden UI elements, UI areas, information areas, and/or the like to be displayed for a period of time (e.g., temporarily, until minimized by the user, and/or the like).

Figure 2C:
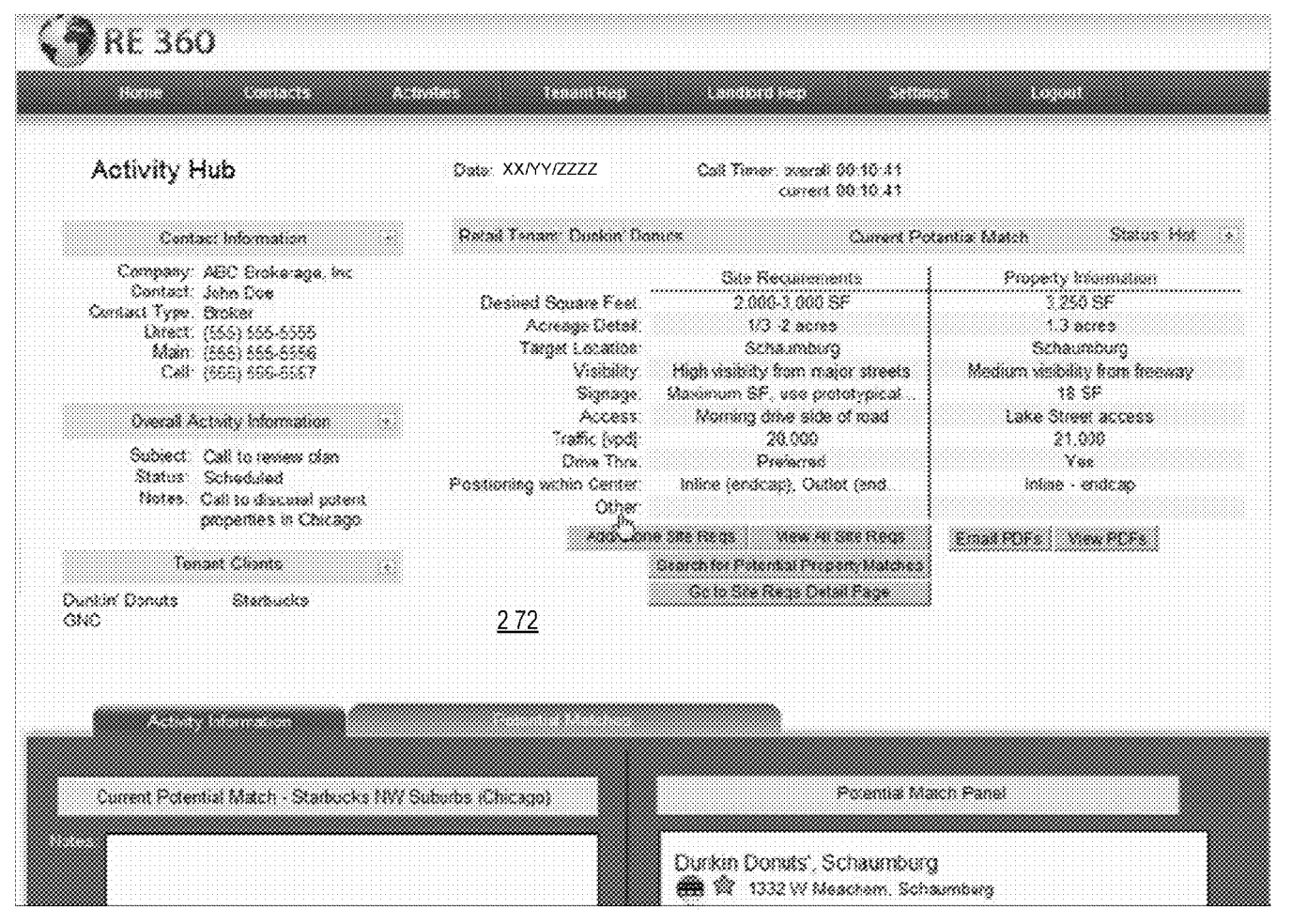
Figure 2D:
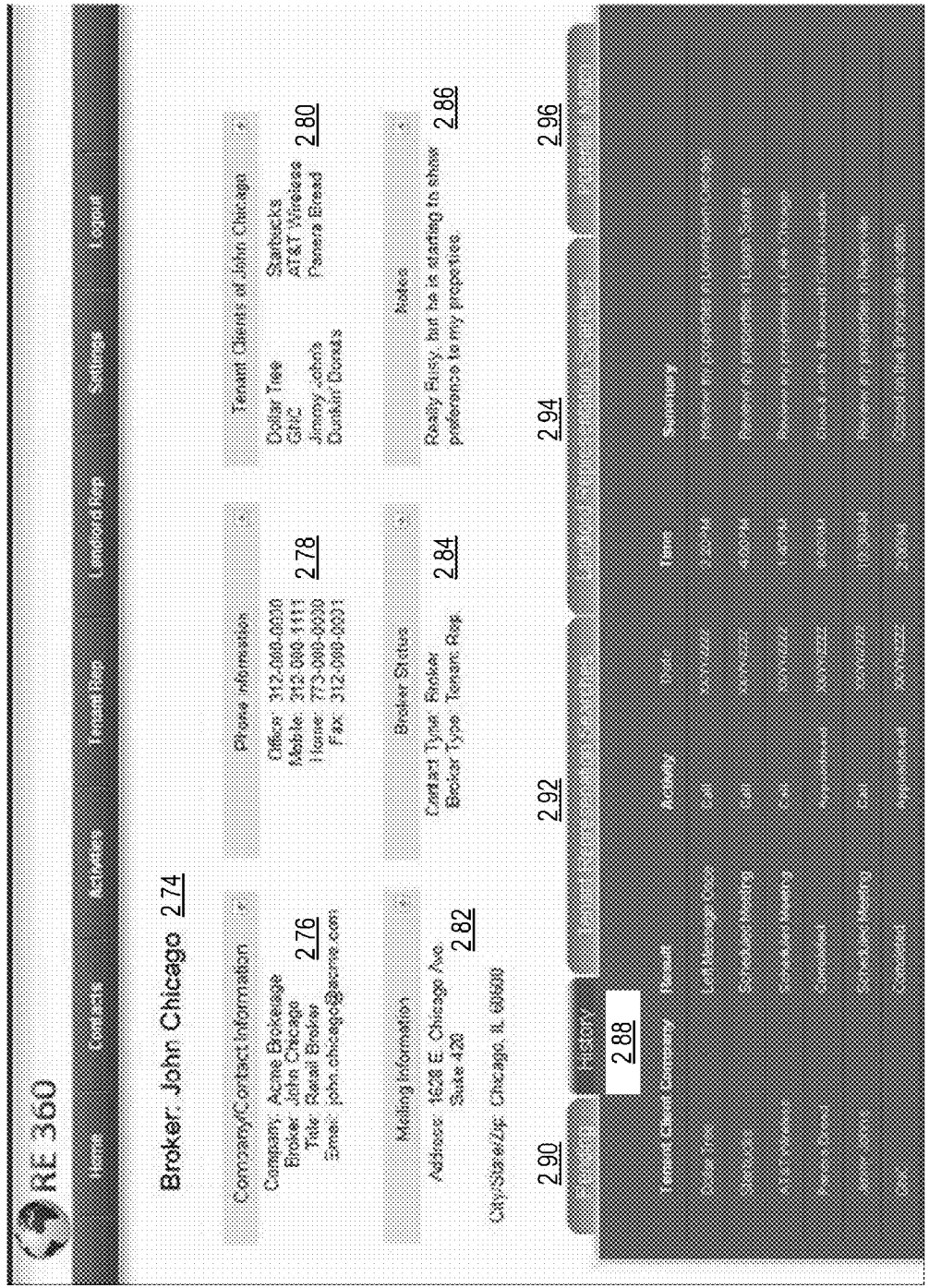

FIGS. 2C-D show alternative implementations of HUB user interfaces in embodiments of HUB operation. FIG. 2C shows an alternative implementation of a HUB user interface 272 configured for a landlord broker role in one embodiment of HUB operation. FIG. 2D shows an implementation of a contact information and/or profile page in one embodiment of HUB operation. The page, in one implementation, may include the contact name 274; company and/or contact information 276; telephone information 278; known or suspected tenant clients associated with the contact 280; address and/or mailing information 282; broker status, type, and/or the like information 284; notes, comments, and/or the like 286; and/or the like. The interface may further include a plurality of tabs, which are selectable to view corresponding information, records, and/or the like. For example, the interface may include a History tab 288, which displays a selectable listing of prior activity information, such as but not limited to: the name of a contact, tenant client, company, and/or the like, who may also have been engaged in the activity (e.g., as a counterparty); a result or status of the activity; a type or label for the activity; a date and/or time of the activity; a summary, comments, notes, and/or the like associated with the activity; and/or the like. In one implementation, selection of an activity from the list at 288 may allow for review of further information associated with the activity and/or may trigger display of an interface such as that shown in FIG. 2C with an auto-populated bifurcated display and/or other interface elements reflecting a state snapshot from the selected activity. Other tabs may, in one implementation, include: a pending tab 290, allowing the viewing of pending activities; tenant representation searches 292, allowing for viewing of information, histories, and/or the like associated with searches performed in a tenant representation role; landlord representation searches 294, allowing for viewing of information, histories, and/or the like associated with searches performed in a landlord representation role; a potential match tab 296, allowing the viewing of self-identified, system-identified, or user suggested property matches; and/or the like.

Figure 3A:
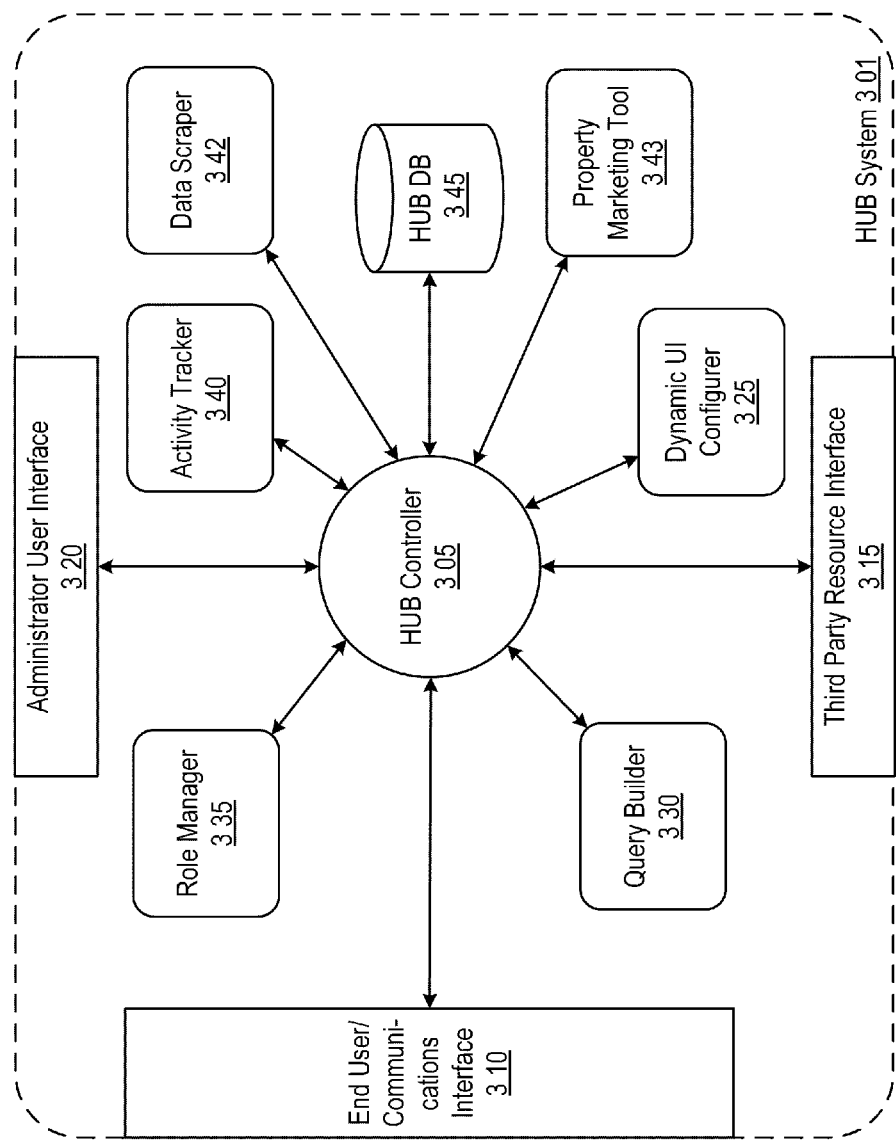
FIG. 3A shows an implementation of data flow between and among HUB components in block-diagram form in one embodiment of HUB operation.

FIG. 3A shows an implementation of data flow between and among HUB components in block-diagram form in one embodiment of HUB operation. A HUB system 301 may include a number of operational modules and/or data stores configured to carry out HUB features and/or functionality. A HUB controller 305 may serve a central role in some embodiments of HUB operation, serving to orchestrate the reception, generation and distribution of data and/or instructions to, from and between HUB modules and/or allow further analysis of data generated during HUB operation. The HUB controller 305 may be coupled to one or more operational modules configured to implement various features associated with embodiments of HUB operation. In one implementation, the HUB controller 305 may be coupled to an end user/communications interface 310 configured to provide HUB UI features and functionality; receive user interactions, query requests and/or parameters, role specifications, and/or the like; transmit query results and/or other requested information; and/or the like. The HUB controller 305 may further be coupled to a third-party resource interface 315 configured to communicate with one or more third-party data resources, submit data requests thereto, receive data therefrom, and/or the like. For example, in one implementation, a third-party resource coupled to the HUB system may comprise an external database housing property specifications, such as real estate listings, contact relations information, and/or the like. The HUB controller 305 may further be coupled to an administrator user interface 320 configured to provide an interface through which an administrator can monitor and/or interact with HUB system settings, manage data, and/or the like. For example, in one implementation, a HUB administrator may interact with the HUB system via the administrator user interface to adjust the values of a role-based query matrix which defines how UI element states are input to a query builder for a given role selection, how those states affect a particular query, and/or the like.

The HUB controller 305 may further be coupled to a dynamic UI configurer module 325 which may, in one implementation, configure and provide a user interface for property querying. In one implementation, the dynamic UI configurer may build a user interface based on a user interface profile, such as may be generated or received in response to a role specification by a user, may be configured as an interface template, XML document, and/or the like, and wherein the interface elements provided for display to the user and/or the manner in which queries are constructed from the values thereof may be instructed by the interface profile. In one implementation, the HUB system may, via the dynamic UI configurer, provide a bifurcated interface for display to a user where one half of the bifurcated display is a fixed representation of a query result (e.g., available property attributes) and the other half of the display is receptive to query inputs (e.g., desired property attributes). In one implementation, the dynamic UI configurer may configure the bifurcated display with attention to which side is fixed and which admits inputs depending on the role specified by the user (e.g., when a user is a buyer, tenant, or buyer/tenant broker, fixing the property requirements and configuring the prospective matching properties to receive inputs; and when a user is a seller, landlord, or seller/landlord broker, fixing the property attributes and configuring the property requirements to receive inputs).

The HUB controller 305 may further be coupled to a query builder module 330, configured to draw values from inputs and/or states of user interface elements and generate one or more query statements, such as may be used to query a database of property listings and/or attributes, contact information, and/or the like.

The HUB controller 305 may further be coupled to a role manager module 335 configured to receive specification of a user role and retrieve one or more role profiles associated therewith. A role profile may, in one implementation, include and/or instruct the retrieval of one or more user interface profiles for provision to the dynamic UI configurer for generation of a user interface appropriate to the selected role. The role manager may also, in one implementation, determine how queries are built from user interface element states and/or values, such as by providing a map of query states and/or values to query statement positions for use by the query builder module 330. In one implementation, the role manager may further be configured to specify under what circumstances an activity tracker module should initialize an activity timer and/or start a new tracking session. Such specification may be made in the form of a matrix, table, profile, and/or the like specifying relationships between user roles and interface actions that trigger the beginning of a new activity session.

The HUB controller 305 may further be coupled to an activity tracker module 340 configured to record aspects of user interactions and/or activities involving the HUB system via the user interface. In one implementation, the activity tracker may initiate a timer for each new activity and record interface states and values and/or changes thereof over the course of a given recording session. In one implementation, the activity tracker may divide the session time into a plurality of time slices, such as may be of equal size, and record the values and/or states of the complete set of interface elements, and/or of a selected subset thereof, at the conclusion of each time slice. In another implementation, the activity tracker may record changes in selected interface element states and/or values whenever they occur during a given session. Recorded session information may, in one implementation, be stored by the activity tracker in an activities table of a HUB system database for later searching, retrieval, review, and/or the like.

The HUB controller 305 may further be coupled to a data scraper module 342 configured to extract, interpret, and/or reconfigure data received from any of a variety of sources. For example, in one implementation, the HUB may be configured to receive e-mails containing property data, such as data pertaining to attributes of available properties. Property data may be contained in the body of the e-mail, may be embedded in the email, and/or in one or more attachments, such as PDF files, XML files or other structured documents, MS Word documents or other word processing documents, MS Excel files or other spreadsheet documents, and/or other formatted files. The data scraper may extract property information from the e-mail and/or attachments and populate records of a database therewith. Extracted information may then be retrieved in response to subsequent user queries, to generate reports and/or e-blasts for dissemination to users, and/or the like.

The HUB controller 305 may further be coupled to a property marketing tool module 343 configured to process property information and to generate one or more types of marketing materials based thereon, transfer and/or exchange marketing of such materials between interested parties, and/or the like. For example, in one implementation, the property marketing tool may receive property information directly from a user and/or a third party data repository, and/or extract property information from a properties database, retrieve a marketing template such as from a marketing templates database, and populate fields of the marketing template with elements of the retrieved property information. The property marketing tool may, in one implementation, be further configured to generate marketing materials such as webpages, PDF documents, flyers and/or other printed documents, cellular phone text and/or email messages, listing service entries, and/or the like. In one implementation, the property marketing tool may further be configured to generate links to generated marketing materials. For example, the property marketing tool may generate a URL or other link to a generated webpage. In another implementation, the property marketing tool may generate a barcode, QR code, matrix code, and/or the like one dimensional or two dimensional barcode, the scanning of which may cause the automatic linking of a scanning device (e.g., a cellular phone) to a webpage displaying property information, the retrieval of a file containing property information, and/or the like. In one implementation, the scanning device may be configured to upload and/or download scanned property information. In one implementation, the property marketing tool may employ any of a wide variety of barcode generating tools, such as Zint, Barbecue, Kaywa, and/or the like. In one implementation, the property marketing tool may further allow for e-blasts and/or other distributions of marketing materials, including the selective provision of generated marketing materials to a list of participant e-mails, SMS text addresses, and/or the like. In one implementation, participants may specify what types of materials they are interested in receiving, and the property marketing tool may analyze property information, generated marketing materials, associated metadata, and/or the like to determine if a given marketing material should be provided to a given user or set of users. In one implementation, the property marketing tool may further allow for the automatic population of property information, contact information, scheduled activities, and/or the like based on detected interactions of users with generated links, barcodes, and/or the like.

In one implementation, HUB components, such as the property marketing tool, data scraper, and/or the like may permit users to enter property and/or contact information associated with scanned barcodes into corresponding HUB databases. For example, in one implementation, the HUB may allow a user to sync (e.g., one-way or two-way syncing) property and/or contact information downloaded to a mobile device (e.g., cellular phone), obtained by scanning a barcode, with that user's stored property and/or contact information in a HUB account. Syncing may be achieved, for example, by entering an instruction on the mobile device to remotely sync the device with the HUB account via one or more communication networks. Alternatively, a user may be allowed and/or prompted to sync mobile device property and/or contact information with his or her HUB account when the user attaches the mobile device to a HUB terminal computing device.

In one implementation, scanning barcodes may have different results depending on the character of the barcode and/or associated property and/or contact, depending on the role of the user scanning the barcode, and/or the like. For example, in one implementation, a tenant broker scanning a code at a remote location (e.g., from a billboard, sign placed at the property location, flyer, magazine, website, and/or the like) may initiate the automatic sending of a message (e.g., via email, text message, instant message, and/or the like) to a property and/or landlord broker to engage in further discussion, request additional property information (e.g., price, extras, square footage available, and/or the like), and/or the like. In another example, a landlord broker may scan a property code to automatically sync with a CRM account, capture geographical coordinates of an associated property (e.g., latitude and longitude), such as may be based on data stored in association with the scanned code and/or which may be automatically pulled from a GPS element of the scanning device, leverage coordinates to incorporate the property onto a map within HUB facilities and/or otherwise integrated with the HUB contact relation management elements, and/or the like. In one implementation, the scanning of barcodes associated with properties may effectuate accurate labeling of mapped properties in a HUB equipped mapping system. A user may scan a barcode associated with a property and obtain geographic coordinates associated with the property, such as from the code itself, a lookup based on the code, integrated GPS components of the scanning device, and/or the like. The property information and geographic coordinates may then be used to specifically and accurately label a building, lot, and/or the like location on a graphically displayed map with property name, type, and/or other property information. Various property information may also be used to allow for filtering of the mapped properties in a variety of ways.

In one implementation, scanning of a barcode associated with a property may trigger a comparison of property attributes associated with that property with other property attributes associated with the scanning user. For example, in one implementation, a tenant broker scanning a barcode may have property attributes of the property associated with the barcode automatically compared with the tenant broker's site requirements information to determine whether or not a match exists. In another example, a landlord broker scanning a barcode of another landlord broker's property may have property attributes of that property automatically compared with one or more of the scanning landlord broker's existing properties, such as to determine competitive threat or advantage, relative pricing, and/or the like. Scanning a barcode associated with one of the landlord broker's own properties may, in one implementation, provide a comparison of attributes of the property associated with the scanned barcode with other properties managed by the landlord broker. In another implementation, scanning of a barcode by a landlord broker may initiate a query on a database of individual and/or company clients based on property attributes associated with the scanned barcode to quickly identify potential matches for vacant spaces, generate call lists (e.g., exportable to Excel or another spreadsheet program), and/or the like.

The HUB controller 305 may further be coupled to a HUB database (DB) 345 configured to store a variety of data associated with HUB operation in various embodiments. For example, in one implementation, the HUB database may include tables for storing information associated with contacts and/or contact relationship management; properties, property attributes, real estate listings, and/or the like; user activities, activity records, user interface configurations, and/or the like; role profiles, role based user interface configurations, query building instructions, and/or the like; marketing templates, and/or the like. Further detail surrounding such tables is provided below.

Figure 3B:
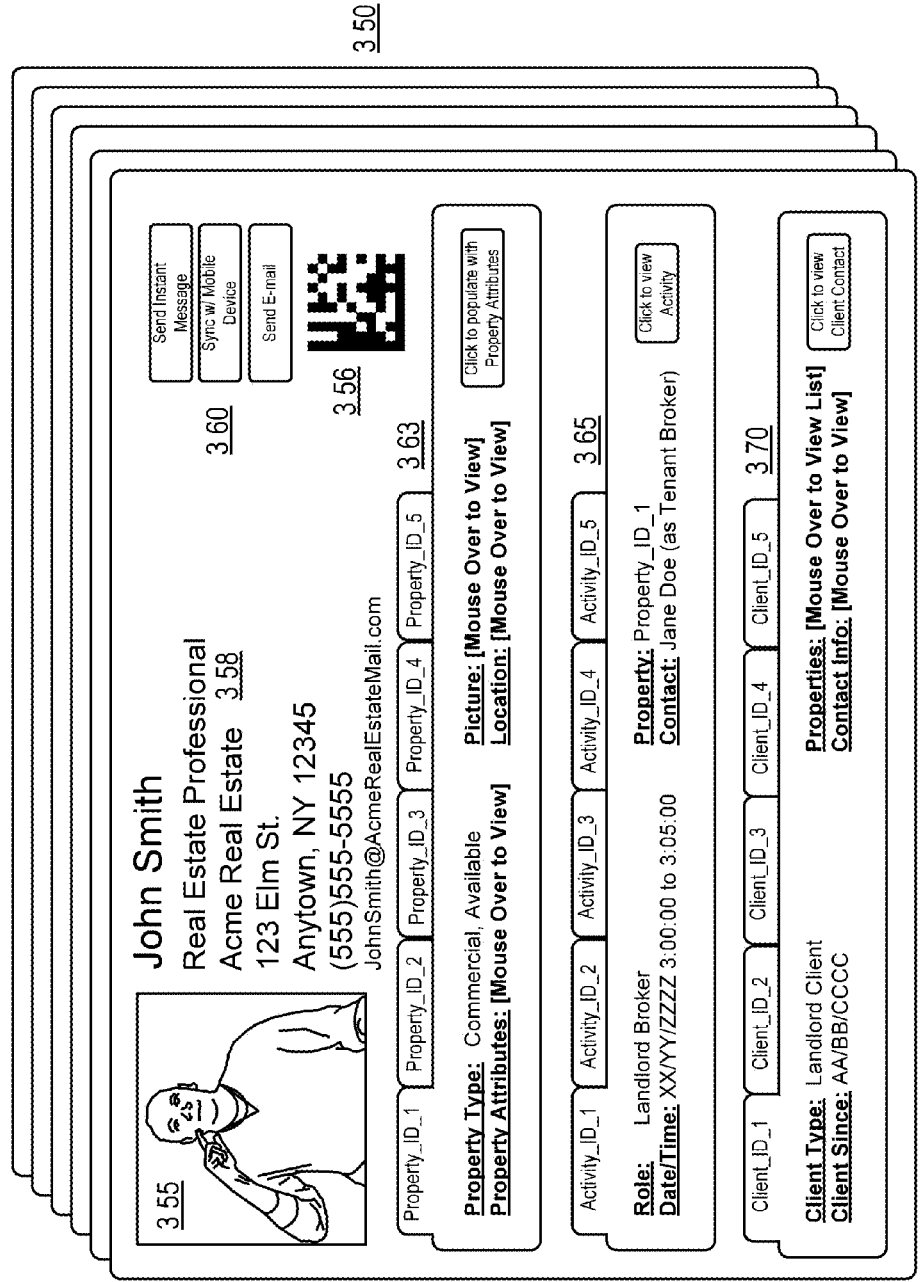
FIG. 3B shows an implementation of a contact profile or contact data record in one embodiment of HUB operation.

FIG. 3B shows an implementation of a contact profile or contact data record in one embodiment of HUB operation. A plurality of cards are shown 350, where each card may be associated with a unique contact and/or user identifier (ID). The example illustrated in FIG. 3B may, in one implementation, be part of a HUB user interface, such as an address book, rolodex, and/or the like, whereby a user may flip through, select, view, edit, and/or the like information associated with his or her contacts. In an alternative implementation, the information shown in FIG. 3B may be reflective of some of the contents and/or structure of a contact profile and may not be implemented as an actual user interface. The contact information shown in the illustrated implementation may include a picture of the contact 355, one or more barcodes 356 (e.g., such as may be associated with the user, with user properties, activities, and/or the like), as well as contact information 358 such as name, title, contact type, employer, address, phone number, e-mail address, fax number, and/or the like. When implemented as a user interface, the illustrated implementation may also include interface elements such as the buttons shown at 360 to allow for quick actions associated with the contact, such as sending an e-mail message, sending an instant message, syncing the contact information with a mobile device, and/or the like. The profile may further include a collection of associated properties 363, such as properties owned by the contact, properties or property attributes desired by or required by the contact, properties owned by a client of the contact, properties or property attributes desired by or required by a client of the contact, and/or the like. A variety of property information may be included, such as but not limited to: a property ID, property type, property attributes, pictures, location information, barcodes associated with the property, and/or the like. In one embodiment, the contact profile/contact data record, i.e., contact information, may be implemented as a series of interlinked HUB database tables, whereby each table is interlinked by way of unique key fields. In one implementation, a user interface button may be provided to allow the user to quickly populate an interface such as that shown in FIGS. 1A and 2A-B with selected property information (e.g., to populate the bifurcated display). The profile may further include a collection of associated activities 365. In one implementation, the activities shown at 365 are activities engaged in by the contact, such as with any other user. In another implementation, the activities shown at 365 are specifically the activities engaged in between the contact and the viewing user whose contact it is. Activity information may include, but is not limited to: an activity ID; a property ID, property attributes, and/or the like associated with the activity; a date and/or time period associated with the activity; one or more roles associated with the activity and/or with the users engaged in the activity, such as a role of each party engaged in a transactional exchange, negotiation, and/or the like; contact IDs of contacts engaged in or otherwise associated with the activity; and/or the like. The profile may further include client information 370, reflecting the clients associated with and/or belonging to the contact and/or user. Client information may include, but is not limited to: a client ID; a client name; client contact information, associated properties; a date and/or time period indicative of the amount of time that the client relationship has existed; one or more roles assumed by the client; one or more roles assumed by the user in relation to the client (e.g., tenant broker, landlord broker, and/or the like); and/or the like. It should be noted that the particular example shown in FIG. 3B directed to contact information relevant to a real estate professional is for illustrative purposes only, and other configurations, profile contents, linkages, and/or the like are contemplated as being within the scope of HUB operation in particular embodiments or implementations. For example, in an implementation directed to recruitment, the information at 363 may be representative of skills and/or skill profiles instead of properties.

Figure 4:
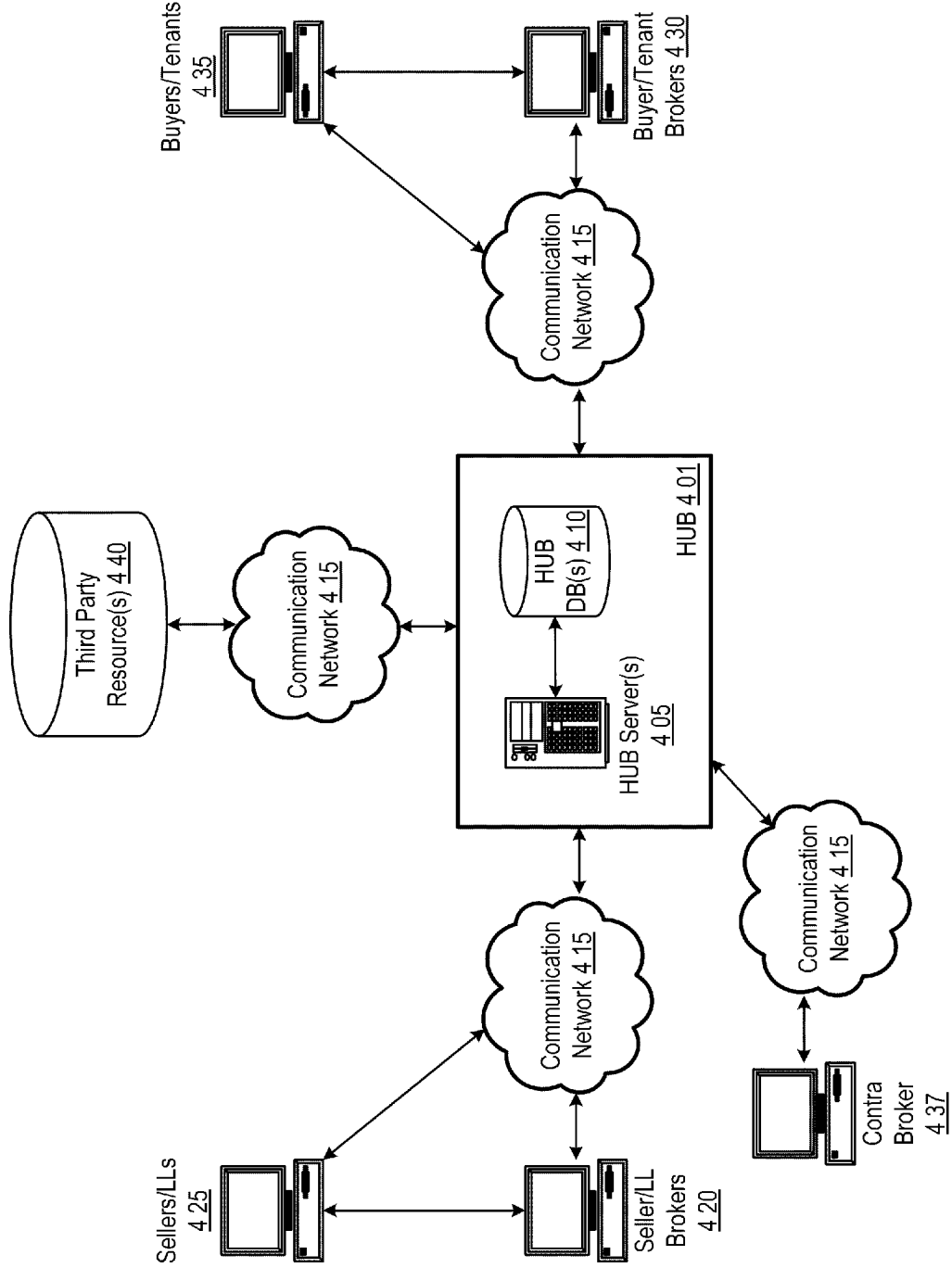
FIG. 4 shows an implementation of data flow between and among HUB components and affiliated entities in one embodiment of HUB operation.

FIG. 4 shows an implementation of data flow between and among HUB components and affiliated entities in one embodiment of HUB operation. The HUB 401 may include one or more HUB servers 405, configured to implement HUB features and/or functionality, and one or more HUB databases 410, configured for storage of HUB data. The HUB 401 may serve to mediate interactions and/or transactions of sellers and/or landlords (LLs) 425 with buyers and/or tenants 435, who may communicate with each other and with the HUB via one or more communication networks 415, which may, in various implementations, include the Internet, intranets, extranets, mobile networks and/or associated mobile databases, and/or the like networks. In addition to or instead of sellers/LLs and/or buyers/tenants, brokers of those parties 420, 430 may interact with each other and/or with HUB facilities. In some implementations, the HUB may also facilitate communications between a user broker and one or more contra brokers 437 which may, in one implementation, comprise real estate brokers having clients who do not have their own access to HUB data, features, and/or functionality. The HUB may also be communicatively coupled, such as via a communication network 415, with one or more third-party resources 440, such as property information repositories, contact relations management resources, and/or the like.

Figure 5A:
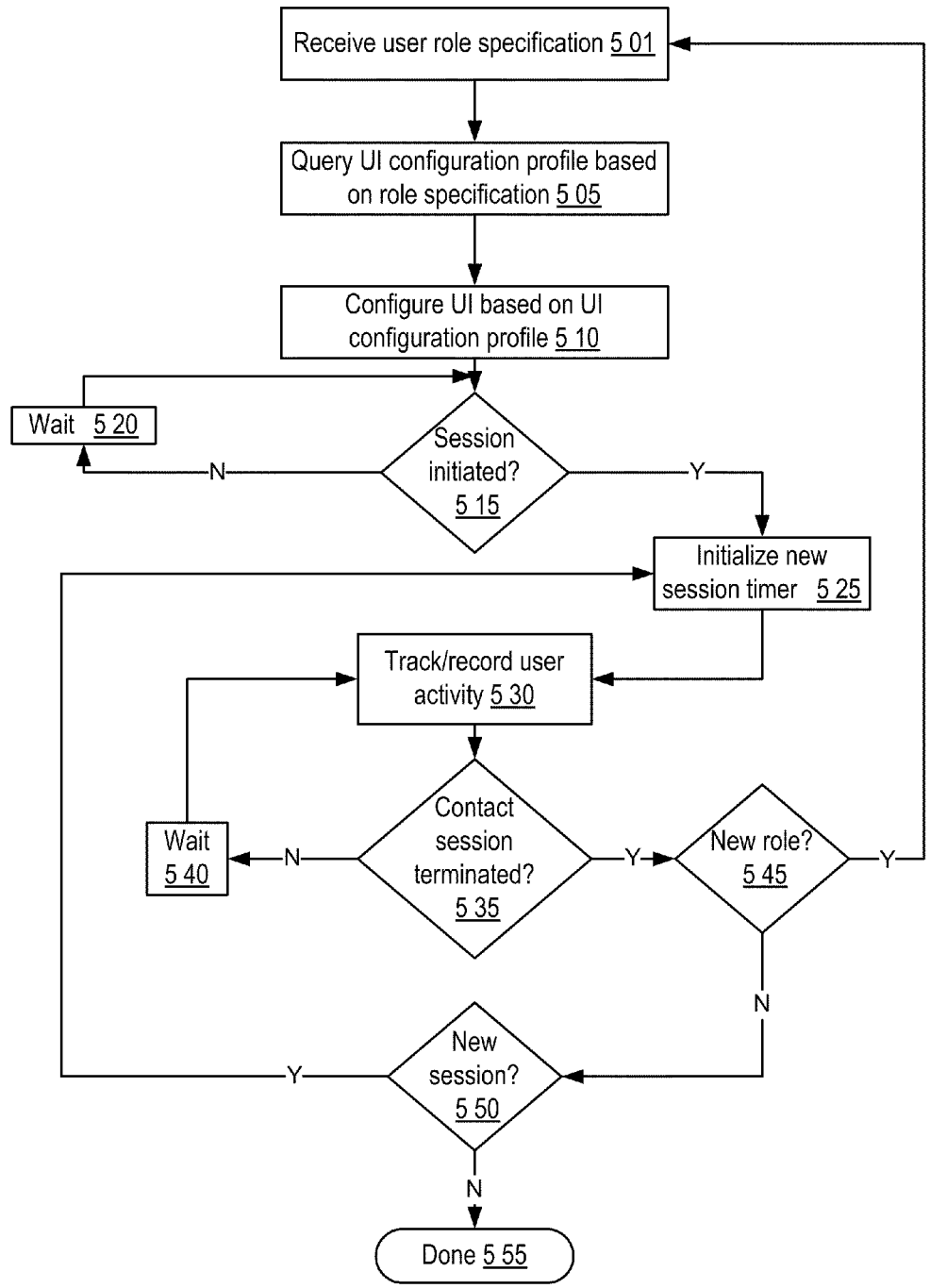
FIG. 5A shows an implementation of logic flow for HUB system-user interaction in one embodiment of HUB operation.
Figure 5B-2:
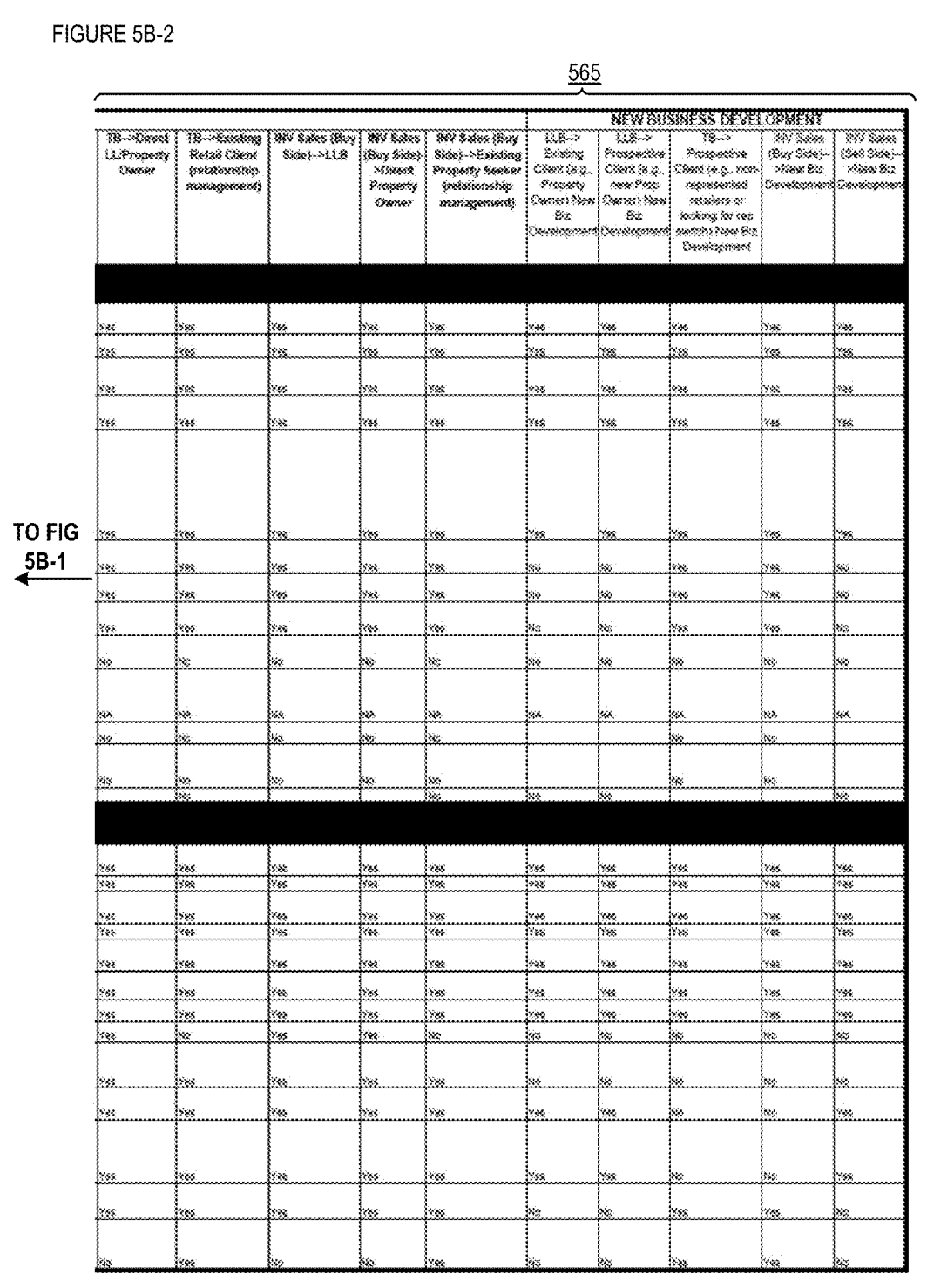

FIG. 5A shows an implementation of logic flow for HUB system-user interaction in one embodiment of HUB operation. A user role specification may be received 501, such as via a user interface similar to that shown at FIG. 1A and/or FIG. 2A-B. In one implementation, a user role specification may be selected from roles such as a landlord-broker, a tenant-broker, an investment sales buyer, an investment sales seller, a tenant, a landlord, a buyer, a seller, and/or the like. Subsequent to receipt of a role specification, the HUB may query a UI configuration profile based on the role specification 505 and retrieve a UI configuration profile suited to the role specified by the user. In one implementation, UI configuration profiles may be associated with role specifications in accordance with the table shown, in one implementation, at FIG. 5B. In the illustrated implementation, various HUB UI elements, functionalities, objects, and/or the like 560 may be displayed in correspondence with user specification of particular roles 565 (e.g., landlord broker communicating with tenant broker, landlord broker communicating directly with retailer, landlord broker communicating with existing landlord broker client, and/or the like, such as shown in the examples in FIG. 5B). In one implementation, some UI elements may appear universally the same throughout each scenario and/or use mode. The UI profiles shown in FIG. 5B are for illustrative purposes only, and other profiles, including designations of UI elements in association with user roles, may be used in alternative implementations of the HUB and HUB operation. The HUB may then configure a UI based on the retrieved UI configuration profile 510, such as may include a plurality of user interface elements, fields, inputs, access privileges, query building rules, and/or the like.

Once a UI has been configured and provided for user display, the HUB may monitor and record user activities to generate retrievable and/or searchable records thereof. A determination may be made as to whether a user session, activity recording session, and/or the like has been initiated 515. In one implementation, session initiation may be indicated by user selection of a session initiation UI element. In another implementation, session initiation may be indicated by HUB detection of the initiation of communication with a contact. If no session is initiated, the HUB may wait for a period of time 520 (which, in one implementation, may depend on user circumstances, role, and/or the like) before checking again for an initiated session 515. When a new session is initiated, a new session timer may be initialized 525, and user activities may be tracked and recorded 530. An implementation of user activity tracking and recording is provided in FIG. 6A. A determination may be made as to whether a given session has been or is to be terminated 535. For example, in one implementation, cessation of a communication with a contact may signal session termination to the HUB. In another implementation, selection of a session termination UI element by the user may cause the session to terminate. If session termination is not detected or determined, then the HUB may wait 540 and continue to track/record user activities 530. Otherwise, a determination may be made as to whether the user has selected a new role 545 and, if so, the system may receive the new role specification and return to 501. Otherwise, a determination may be made as to whether a new session has been initiated 550. If so, a new session timer may be initialized and the system may return to 525. Otherwise, the flow may conclude 555. In one implementation, the selection of a new role, the initiation of a new session, and/or any of a set of designated user interactions with the interface may qualify to terminate a prior session and/or to initiate a new session, timer initialization, and/or the like.

Figure 6A:
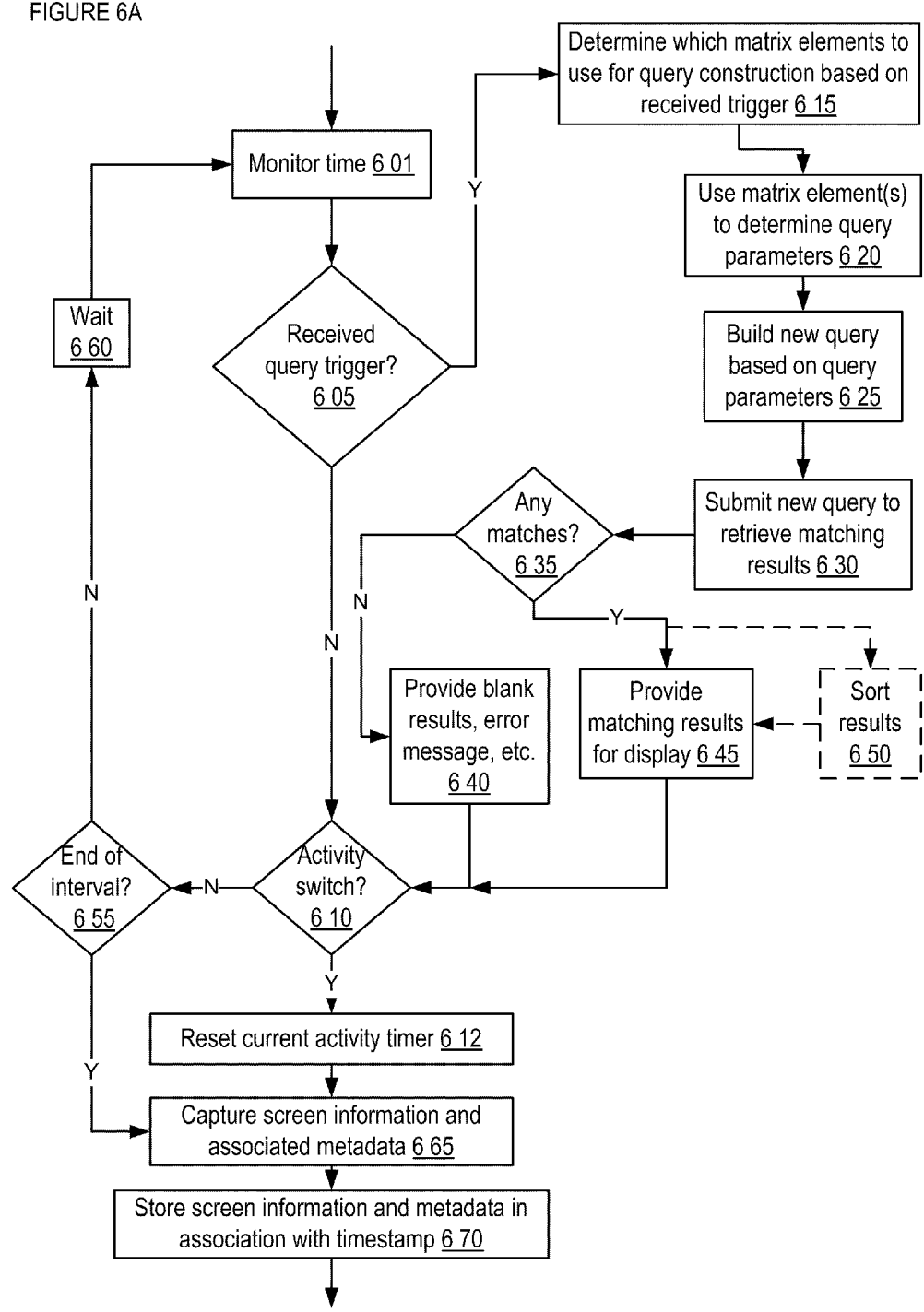
FIG. 6A shows an implementation of logic flow for query generation and activity recording in one embodiment of HUB operation.

FIG. 6A shows an implementation of logic flow for query generation and activity recording in one embodiment of HUB operation. In tracking and/or recording user activities and interactions with the HUB UI, the HUB may monitor time 601, such as via a system clock. A determination may be made as to whether any query triggers have been received, for example as a result of user interactions with the UI 605. For example, in one implementation, a role-based query matrix may define which UI element states are inputs to a query builder for a given role selection, how those states affect a particular query, and/or the like. User manipulation of any of these UI elements may then cause a new query to be generated. If no new query parameters are received, the HUB may proceed to check for an activity switch 610 and/or end of interval 655, which is discussed more fully below. If, on the other hand, the HUB discerns that one or more new query parameters have been received, the HUB may check the query matrix corresponding to the particular role selected by the user 615 to determine, based on the received query trigger(s), which one or more matrix element(s) to use for query construction. Those matrix elements may then be used to determine query parameters 620 to be employed in building a new query 625. In one implementation, the query may comprise a SQL statement, with components selected based on the user's UI interactions, as may be instructed, in one implementation, by the query matrix.

The new query may be submitted, such as to a database management system, to retrieve any matching results 630. For example, in one implementation, the user interface may include interface elements allowing a user to specify attributes of a desired property, and the query may be submitted to a database of property information to seek properties having attributes matching the user specifications. A determination may be made as to whether any results are retrievable in response to the query 635. If there are no matching results, a blank results area may be provided and/or an error message indicating that no matching results were found 640. On the other hand, if matches are found at 635, they may be provided for display to the user 645, such as in a results listing. In one implementation, results may be sorted prior to display 650, wherein such sorting may be based on any of a variety of different criteria, such as, but not limited to: automatic or user-selected criteria; alphabetical ordering; relevance; temporal ordering, such as based on a time at which a product listing was added to the database, updated, and/or the like; a reliability, quality, or other rating or ranking of a lister, seller, broker, and/or the like associated with a given product listing; a determined likelihood of interest or opportunity rating associated with the product listing; and/or the like. In one implementation, matching results may be provided for display in a geographic display. For example, in an implementation directed to real estate listings, retrieved matching results may be displayed on a map based on addresses associated with those listings. A HUB system may, for example, employ Google Maps application programming interface tools to provide matching real estate listings for display on an embedded Google Map.

A determination may be made at 610 as to whether an activity switch has occurred. An activity switch may, for example, be detected as a particular interaction or sequence of interactions with a user interface, such as the selection of a particular UI element, submission of a query, selection and/or changing of a user role, and/or the like. In one implementation, UI interactions registering as a qualifying activity switch may depend on a user role and may be specified in a table, matrix, and/or the like relating user roles to qualifying UI interactions. If no activity switch is detected, a determination may be made 655 as to whether the end of an interval has been reached. For example, in one implementation, a snapshot of the current states and/or values associated with UI elements may be taken periodically after each pre-set interval of time has transpired. In an alternative implementation, a snapshot may be taken any time a UI element of a designated set of UI elements has a value changed or state change, any time a user activity type is switched, and/or the like. If the end of interval has been reached at 655 or if an activity switch is detected at

610, screen information and/or associated metadata may be captured 665. The HUB may further reset a current activity timer 612 if an activity switch has been detected. In various implementations, screen information and/or associated data may include, but is not limited to, states and/or values associated with all or selected UI elements, screenshots, recent and/or current queries, retrieved results, prospective property match information, tenant site requirements, proposed properties, qualified properties, presented properties, declined properties, rating indicators, contact information, client information, notes, query results, timestamp, user identifier, and/or the like. One or more of these data may be captured, queried, and/or otherwise retrieved from HUB UI data records, user inputs, third party data sources, and/or the like sources. If the end of interval has not been reached at 655, the HUB may wait for a period of time 660 and continue to monitor time 601.

Captured screen information and/or associated metadata may then be stored in association with a timestamp 670. In one implementation, UI states are stored as activity records in an activity table, wherein each activity record contains and/or is linked to records containing fields specifying quantities, such as the states and/or values associated with UI elements, time and/or date stamps, user identification, counterparty identification, activity type, role, current and/or recent queries, current and/or recent retrieved results, and/or the like. In one implementation, an activity record may take a form similar to the following example XML record:

```
<TimeSlice>
    <Time>
        <Date> April 20, 2010 </Date>
        <Start_time> 12:00:00 </Start_time>
        <End_time> 12:00:40 </End_time>
    </Time>
    <HUB_Details>
        <Site_Requirements>
            <Square_Footage> 1500-2000 </Square_Footage>
            <Location>
                <City> Calumet City </City>
                <State> IL </State>
            </Location>
            <Type> urban commercial </Type>
        </Site_Requirements>
        <Property_Details>
            <Square_Footage> 1750 </Square_Footage>
            <Location>
                <City> Hammond </City>
                <State> IL </State>
            </Location>
            <Type> suburban commercial </Type>
        </Property_Details>
        <Status_Indicators>
            <Line_Status_Indicators>
                <Square_Footage> green </Square_Footage>
                <Location>
                    <City> yellow </City>
                    <State> green </State>
                </Location>
                <Type> yellow </Type>
            </Line_Status_Indicators>
            <Header_Status_Indicators> green
            </Header_Status_Indicators>
        </Status_Indicators>
        <Contact_Info>
            <Name> John Smith </Name>
            <Email> JohnSmith@johnsmith.e-mail.com </Email>
            <Phone> (555)555-5555 </Phone>
        </Contact_Info>
        <Client_Info>
            <Name> Jane Brown </Name>
            <Email> JaneBrown@janebrown.e-mail.com </Email>
            <Phone> (555)555-4444 </Phone>
        </Client_Info>
```

-continued

```
    </HUB_Details>
</TimeSlice>
```

Stored activity records may be retrieved at a later time, used to generate reports, and/or the like. For example, in one implementation, a user may load a given activity record to cause an interface, such as that shown in FIGS. 1 and 2A-B, to return to the state at which the activity snapshot corresponding to that record was taken. A user may then be permitted to play and/or step-through subsequent or prior activity snapshots connected in time to the loaded record. In one implementation, activity records may be shared among different HUB users to allow them to see activity snapshots of the user generating the record. For example, in one implementation, employee activity records may be automatically accessible to a manager user, who may sort, filter, search, and/or otherwise inspect employee activity records to find information, review employee performance, and/or the like. In another implementation, a user may generate one or more reports based on stored activity records. For example, a user may generate a report of all activities, deal stages, properties, and/or the like in a given time period; all contacts with which activities have been undertaken in a given time period; all activities for a given deal stage, contact, client, property, and/or the like; and/or any other combination, sorting, filtering, and/or the like of stored activity data. In one implementation, report generation may be automated, such as on a scheduled basis, such that reports may be periodically generated and sent to a user's manager/supervisor, to a transactional counterparty, to a client, to a records-retention department, and/or the like.

FIG. 6B shows an implementation of activity based HUB UI field resets in one embodiment of HUB operation. The column at 675 shows possible HUB UI elements and/or other fields, variables, and/or the like which may be reset by a particular user action or activity. A number of activities, in turn, are shown at 680. The table entries, then, indicate which fields 675 may be reset by which activities 680 in one implementation, including some special cases where fields are auto-populated, resets are role-based, and/or the like.

Figure 7A:
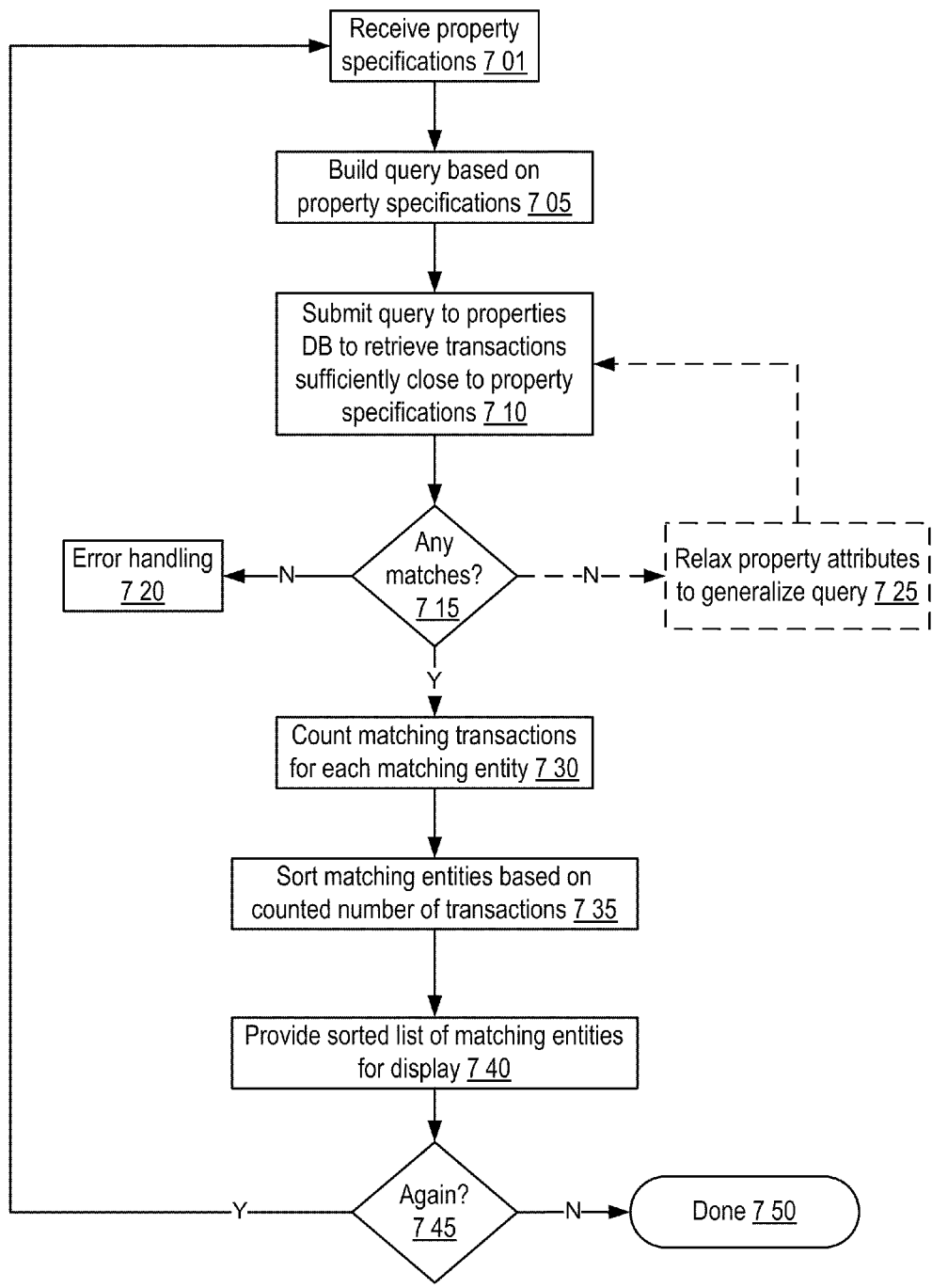
FIG. 7A shows an implementation of logic flow for lead generation in one embodiment of HUB operation.

FIG. 7A shows an implementation of logic flow for lead generation in one embodiment of HUB operation. The HUB may employ a logic flow similar to that shown in FIG. 7A in response to a submitted query to identify and/or provide candidate transactional counterparties who may have information, contacts, and/or the like relevant to a particular set of desired property attributes. The HUB may receive property attribute specifications 701 and build a query based thereon 705. The query may be submitted to a database of consummated transactions to retrieve transactions of properties having attributes sufficiently matching those of the query. In one implementation, a HUB properties table, activities table, and/or the like may include transactional information and may be queried at 710 to retrieve transactions with matching properties. A determination may be made as to whether any such matching transactions are found in response to the query 715. If not, an error handling procedure may be undertaken 720, such as providing a blank set of results for display, providing an error message, requesting relaxation of query parameters and/or property attributes, and/or the like. In one implementation, query parameters and/or property attributes may be automatically relaxed and the query resubmitted 725 to find approximate matches to the submitted query.

If one or more matching transactions are retrieved, they may be counted for each associated entity 730. Entities associated with a given transaction may, for example, comprise a buyer, seller, tenant, landlord, investor, broker, and/or the like. Entities with matching transactions may then be sorted based on the counted number of matching transactions associated with each entity 735, such as in descending order. The sorted list of entities may then be provided for display 740. This may, for example, allow a user to view entities that have completed many transactions of properties similar to that in which a user is interested, thereby potentially providing leads to transactional counterparties for a future property transaction. A determination may be made as to whether a user wishes to refine and/or input different property specifications and, if so, the HUB may return to 701. Otherwise, the flow may conclude 750.

Figure 7B:
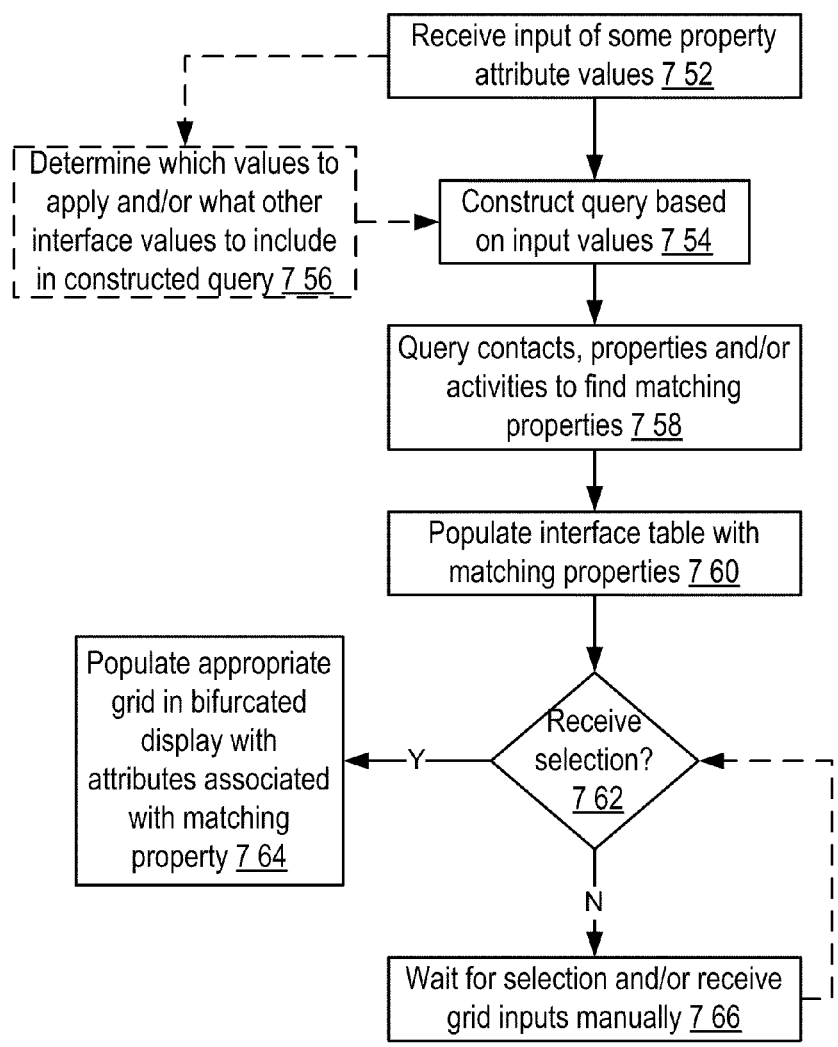
FIG. 7B shows an implementation of logic flow for query construction in one embodiment of HUB operation.

FIG. 7B shows an implementation of logic flow for query construction in one embodiment of HUB operation. A logic flow similar to that shown in the implementation of FIG. 7B may be employed by the HUB in a variety of contexts, such as when a user adopts a landlord broker or other such property provision role, to generate queries of existing property, contact, and/or activity records in real time based on input information. Property attribute values input by a user may be received 752, such as via the bifurcated display at 230 in FIG. 2A. In one implementation, tenant site requirements entered at 235 may be employed for query construction in accordance with the flow shown in FIG. 7B. Received property attribute values may then be used to construct a query (e.g., a SQL query statement) 754. In one implementation, which entered values may be used to construct a query, how the values are organized within the query, whether and how other interface field element values are used in construction of the query, and/or the like may be determined and/or instructed based on certain criteria 756, such as the role that a user has adopted, interface element settings and/or values, and/or the like. The constructed query statement may then be used to query contact records, property records, activity records, and/or the like to find properties matching and/or corresponding to the input property attribute values 758. Retrieved matching property information may then be used to populate elements of the user interface, such as the table at 255 in FIG. 2A, and/or the like. A determination may then be made as to whether a selection has been received of a table element populated by retrieved matching property attributes 762. Selection may, in one implementation, comprise a click, mouse-over, and/or the like of a table element by a user. If selected, the HUB may automatically populate an appropriate side of a bifurcated display, such as that shown at 230 in FIG. 2A, with the retrieved matching property attributes. If no table element selection is detected at 762, then the HUB may wait for a period of time and recheck for selection and/or may receive entry of grid inputs manually to the bifurcated display 766. In one implementation, tenant site requirements entered at 235 may be employed for query construction and the retrieved matching properties may be incorporated into a map for display to the user. For example, the HUB may query property location information and generate a map display with the properties located thereon based on the queried locations. In one implementation, the map may be populated, in real-time, and be brought to the foreground or background of the user interface and/or be displayed as translucent, semi-transparent, and/or the like to allow for quick review of property locations while continuing with other HUB activities.

Figure 8A:
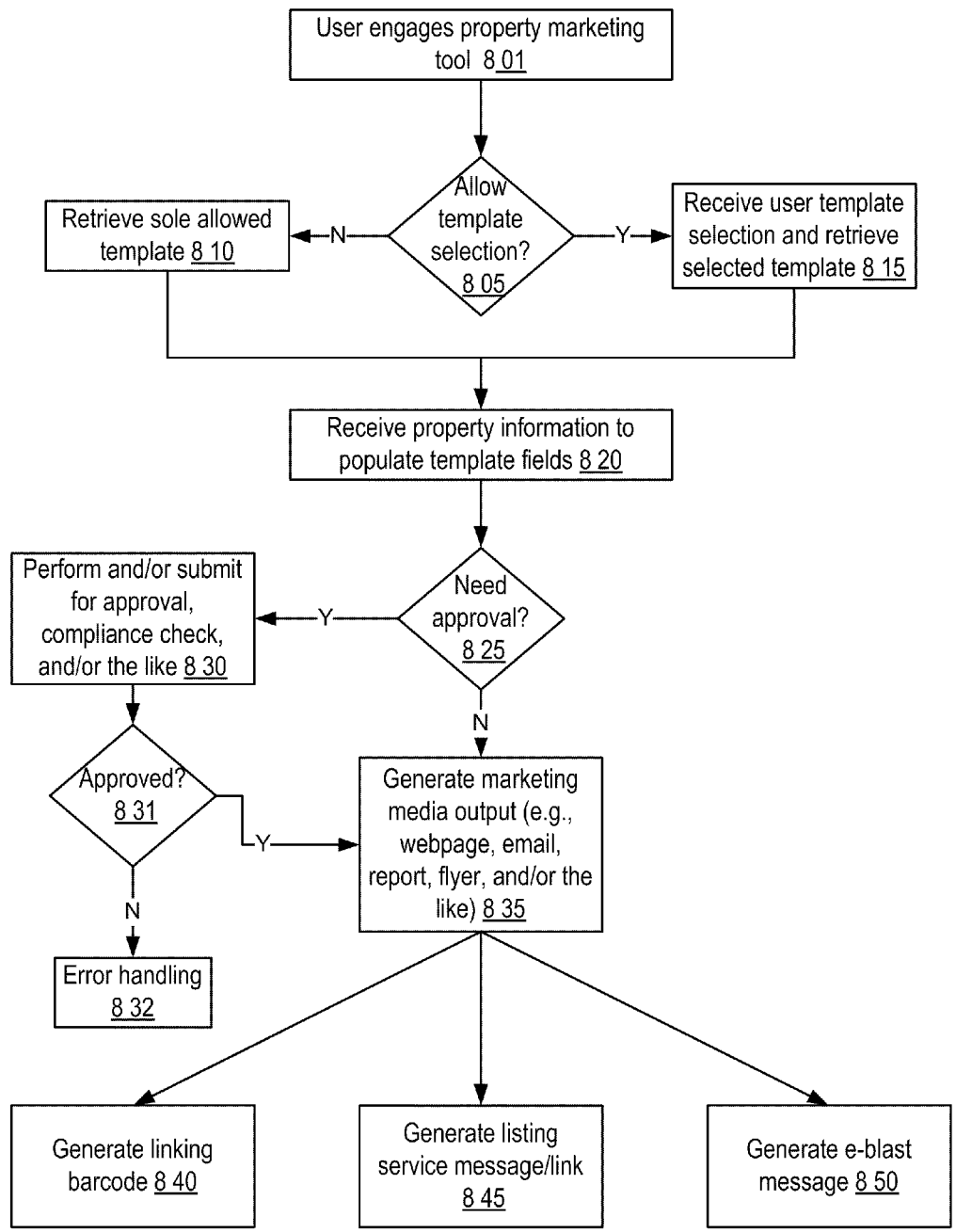
FIG. 8A shows an implementation of logic flow for generating marketing materials and links to those materials in one embodiment of HUB operation.

FIG. 8A shows an implementation of logic flow for generating marketing materials and links to those materials in one embodiment of HUB operation. A user may engage a HUB property marketing tool 801, such as by selecting a link and/or other associated UI element. A determination may be made as to whether selection of a marketing template is allowed 805. For example, in one implementation, only some users may be authorized to select from a multiplicity of marketing templates. In another implementation, only one template may be available for a given activity, material type, and/or the like. If selection is not allowed, then the HUB may retrieve the sole available marketing template 810, such as from a marketing templates database. If selection is available, then the HUB may provide a selectable list of templates, receive a user selection of a desired template, and retrieve the template 815, such as from a marketing templates database. In one implementation, a marketing template may be configured as an XML file or other structured file specifying a plurality of fields corresponding to various property information (e.g., picture, contact, property type, address, owner info, square footage, price, and/or the like) that may be filled out with specific property information 820. In one implementation, property information may be directly entered by a user, such as via a web interface. In another implementation, a user may select a property information identifier, and the HUB may auto-populate the template with corresponding property information corresponding to the selected identifier. In still another implementation, the HUB may automatically populate a template with property information automatically retrieved from an internal database, retrieved from a third party property data repository, extracted and/or scraped from a website, email, PDF file, and/or the like. A determination may be made as to whether approval is needed for the populated marketing template 825. For example, in one implementation, a manager or other administrator may specify that all marketing materials generated by employees require prior approval. In another implementation, the HUB may be configured to automatically perform a compliance check on all populated templates to ensure that all required fields have been filled, entered information is properly formatted, and/or the like. If approval is needed, the HUB may perform a compliance check, submit the populated template for compliance check, submit the populated template for manager approval, and/or the like 830. A determination may be made as to whether approval has been granted 831 (e.g., if an approval message has been generated and/or received). If not, then an error handling procedure may be undertaken 832, such as requesting modification, additional information and/or clarification for the information populating the template, providing an error message to an originating user, and/or the like. Otherwise, marketing materials may be generated based on the populated template 835. Any of a wide variety of marketing materials may be generated by the HUB in different embodiments of HUB operation. For example, the HUB may generate a webpage, PDF or other formatted document, email message, electronic report, printer flyer, listing service submission, and/or the like. The HUB may further generate and/or provide one or more links to generated marketing materials. For example, the HUB may be configured to generate a barcode, QR code, matrix code, and/or the like one dimensional or two dimensional code 840, the scanning of which may link to a webpage and/or instruct the retrieval of a page, document, and/or the like containing property information associated with the code. It should be understood that the term "barcode" as used herein includes any one dimensional or two dimensional barcode, matrix code, QR code, and/or the like optically machine-readable representation of data. The HUB may also generate and/or retrieve and/or provide a link, URL, and/or the like to a webpage, document, and/or the like containing and/or comprising the generated marketing materials 845. In still another implementation, the HUB may generate an email message and/or e-blast message comprising a message sent to a plurality of users, such as may be based on user-specified preferences and/or provision criteria in comparison with marketing material characteristics, metadata, and/or the like 850.

Figure 8B:
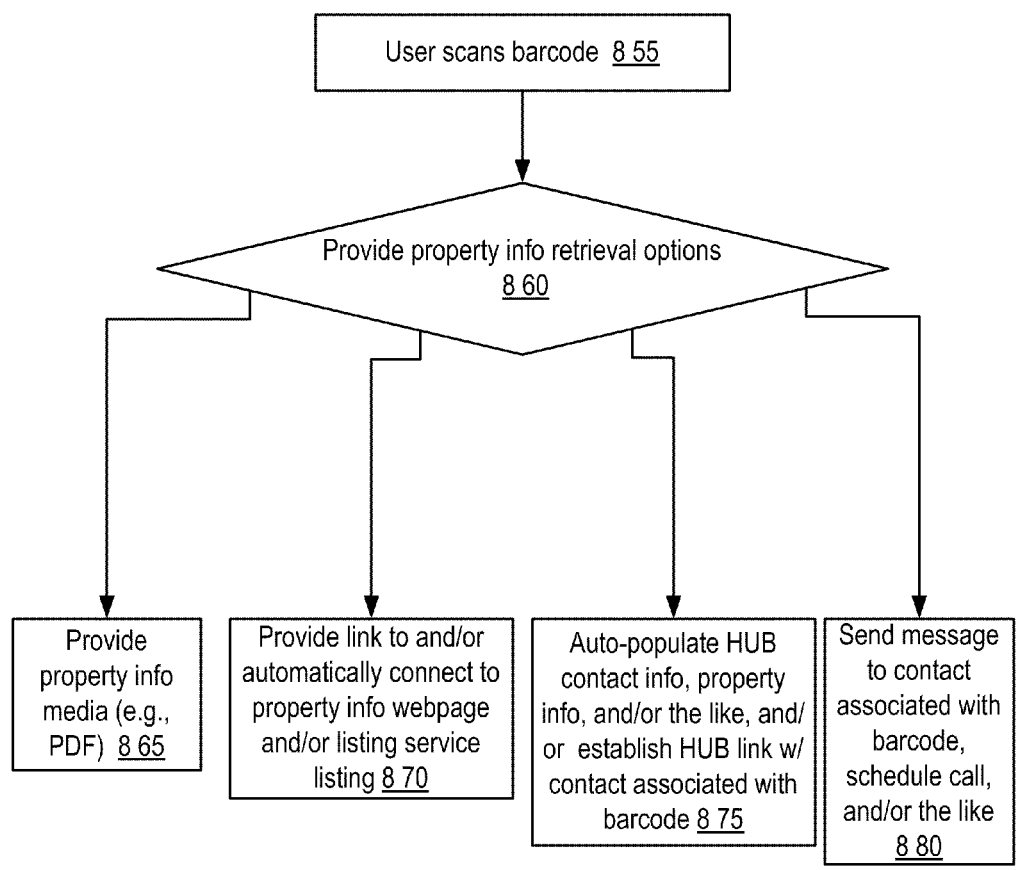
FIG. 8B shows an implementation of logic flow for user engagement of marketing material links in one embodiment of HUB operation.

FIG. 8B shows an implementation of logic flow for user engagement of marketing material links in one embodiment of HUB operation. A wide variety of different results may be connected to user engagement of marketing material links, and in particular with scanning of HUB generated barcodes, in different embodiments of HUB operation. FIG. 8B shows several possible implementations for illustrative purposes, but it is to be understood that other possibilities are contemplated as being within the scope of HUB embodiments. A user may scan a barcode 855, such as by using a cellular telephone camera or other scanning device. In one implementation, the user may then be provided with a selectable list of options as to which action he or she would like to take 860. In one implementation, the user may be provided with property information media, such as a PDF file or other document, email message, image files, video, and/or the like 865. In another implementation, the user may be provided with a link to a webpage and/or may automatically be connected to the webpage containing property information 870. In one implementation, the webpage may be a listing service listing. In another implementation, the user may be redirected to a listing service application. In one implementation, the user's HUB account may be auto-populated with contact information, property information, and/or the like associated with the scanned barcode, and/or the user may automatically "friend" the associated contact in a social network context. In yet another implementation, property information may be downloaded to a mobile device upon scanning of a barcode, and the mobile device information may then be synced with a user's HUB account at a later time, such as by interfacing the mobile device with a HUB account resource. In one implementation, the HUB may send a message containing user information to the contact associated with the barcode, schedule a call or other activity, and/or the like 880.

Figure 9:
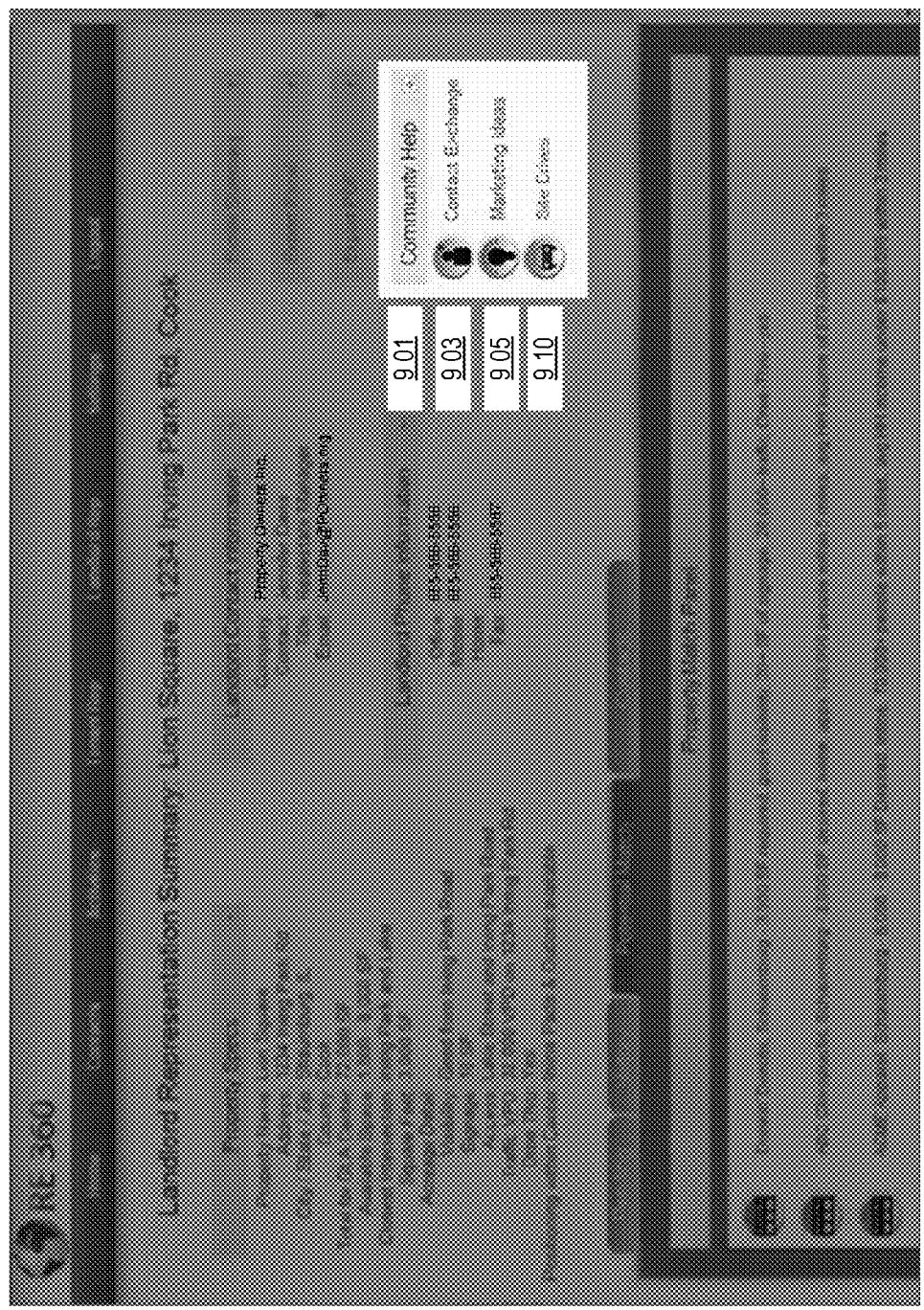
FIG. 9 shows an implementation of user interface for accessing HUB community features in one embodiment of HUB operation.

FIG. 9 shows an implementation of user interface for accessing HUB community features in one embodiment of HUB operation. A HUB page may include a window 901 for accessing HUB community features and/or otherwise engaging certain HUB features centered around interactions with other HUB users. For example, in one implementation, the community features may include an internal and/or external (e.g., such as may depend on user preference settings) contact exchange feature 903, allowing users to trade, buy, sell, and/or otherwise transact contact information, leads, and/or the like. In one implementation, community features may further include a marketing ideas feature 905, allowing users to confer, exchange marketing ideas, leads, and/or the like. In one implementation, community features may further include site drives 910, allowing users to review relevant locations proximate to a given property which may act as site drives.

Figure 10:
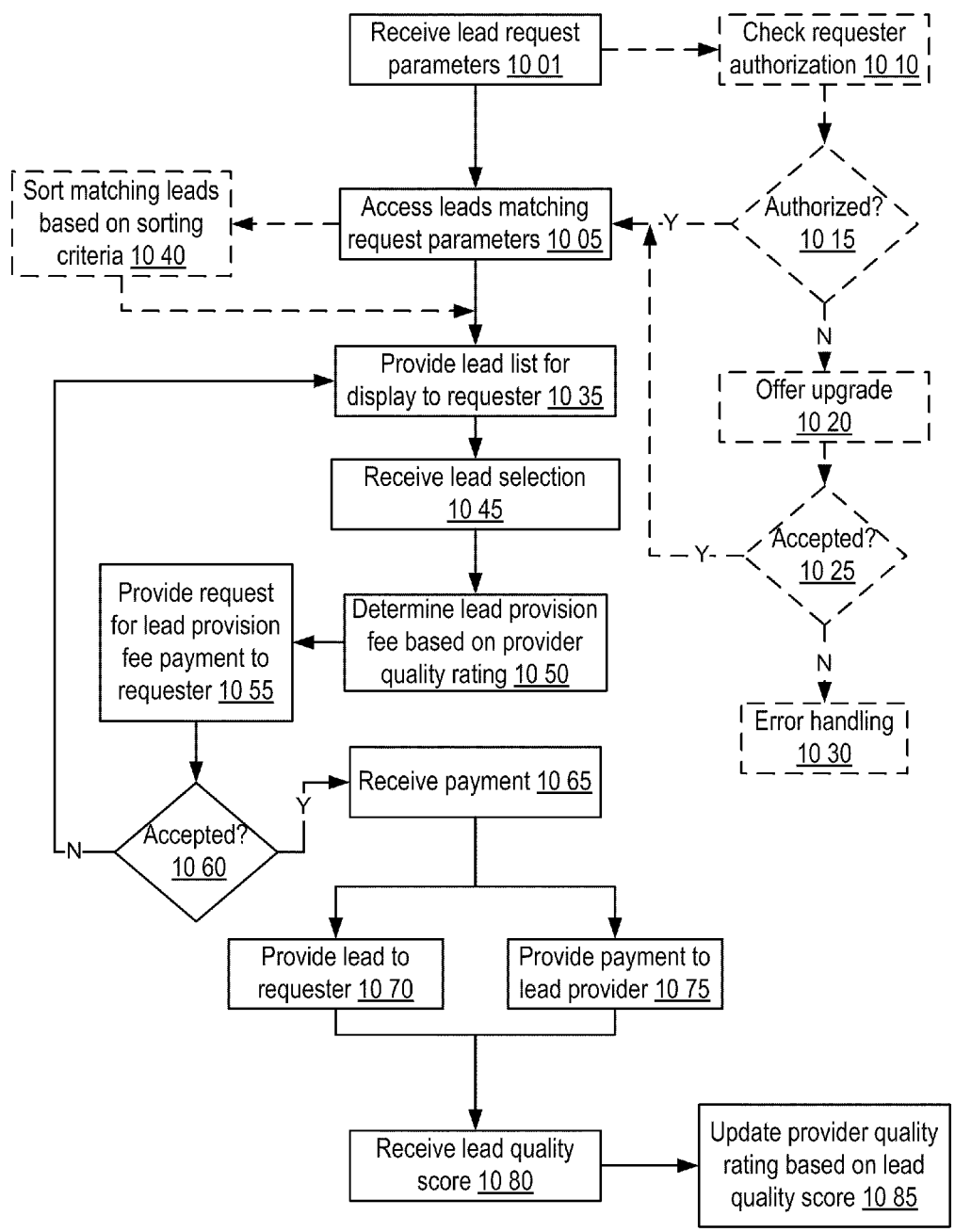
FIG. 10 shows an implementation of logic flow for effectuating lead transactions in one embodiment of HUB operation.

FIG. 10 shows an implementation of logic flow for effectuating lead transactions in one embodiment of HUB operation. A lead request and/or lead request parameters may be received 1001. For example, in one implementation, a lead request may comprise a company name, such as may correspond to a company which a HUB user may want to introduce a given property for a possible transaction, lead, and/or the like. In various implementations, other lead request parameters may be provided, such as but not limited to: a contact name, a contact address, property parameters, company type, company attributes, and/or the like. In one implementation, the user may also submit a bid as part of the lead request parameters, wherein the bid is indicative of a total amount, base amount, estimate, and/or the like of money, tokens, and/or the like that the user is willing to pay in exchange for the receiving the lead information. The HUB may then access leads matching the received request parameters 1005. For example, the HUB may perform a query of contact information, property information, activity information, and/or the like for all other users, a subset of users, only users who are contacts of the requesting user, and/or the like to determine which if any of the users may have one or more contacts matching the lead request parameters. In one implementation, prior to accessing matching leads, the HUB may perform a check of user authorization for lead request services. For example, requester authorization information may be checked 1010 and a determination made as to whether the user is authorized 1015 (e.g., whether the user has subscribed to lead request services, whether any holds exist on such services for a user account, and/or the like). If authorized, leads may be accessed 1005. Otherwise, the HUB may, in some instances, offer a user the opportunity to upgrade his or her account to acquire the lead request services 1020. A determination may be made as to whether that offer has been accepted 1025 and, if so, leads may be accessed 1005. If not accepted, an error handling procedure may be undertaken 1030, such as may include the display of a message to the user that lead request services are not available.

Once leads matching the input request parameters have been accessed, they may be provided for display to the requester 1035. In one implementation, matching leads are displayed as a selectable list showing information of the contact and/or user holding the lead, but not information about the lead itself. A user may then select a contact and/or user from the listing 1045 in order to retrieve lead information. In one implementation, prior to providing a list of matching leads for display, the HUB may sort matching leads based on some criteria 1040. For example, in one implementation, leads may be sorted based on the quality rating of the contact providing the lead (discussed in further detail below). In another implementation, a user may specify criteria for sorting, selection of a subset, and/or the like manipulation of the list of leads. Thus, for example, a user may sort results alphabetically based on contact name, may select only those leads corresponding to a desired geographic area, and/or the like. In still another implementation, potential lead providers may pay a fee for prioritized and/or advantaged placement in a list of matching leads. In various implementations, such a prioritized placement fee may be fixed, may depend on the quality ratings of lead providers in the listing, may depend on the lead provider's own quality rating, and/or the like. Lead selection may be received 1045, such as by a user selecting an element of the matching leads list with a mouse click, and a determination of the lead provision fee may be made, such as may be based on a provider quality rating associated with the selected lead provider 1050. In one implementation, the lead provision fee may be equal to the bid amount input by the user at 1001. In another implementation, the lead provision fee may be based on the bid amount input by the user at 1001 and on one or more other factors. For example, an amount may be added to and/or subtracted from the bid to yield the lead provision fee based on the quality rating of the lead provider (e.g., adding a premium for very high quality ratings, adding nothing or subtracting something for very low rated lead providers, and/or the like). In one implementation, an amount may only be added to the bid made by the user to determine the lead provision fee, whereby the bid is indicative of an amount the user is willing to pay regardless of the quality of the lead or lead provider. In one implementation, the lead provision fee may further be based on an amount specified by the lead provider, such as a minimum amount required before the lead will be shared.

In one implementation, the user may be provided with a request to pay the lead provision fee 1055, and a determination may be made as to whether or not the payment of that fee has been agreed to 1060. In an alternative implementation, the fee would be displayed to and/or otherwise known by the user prior to selection of a lead provider, and selection would automatically trigger the debiting of a payment account associated with the user, the generation of a bill, or other payment mechanism. Payment is received from the user 1065, such as by entry of credit card information, automatic debiting of a user account, receipt of a signed promise to pay, and/or the like, and the HUB proceeds to provide the hidden lead information to the requester 1070 and to provide payment and/or an indication of payment to the lead provider 1075, such as via crediting of a lead provider account, sending of a message to the lead provider, and/or the like. Subsequent to receipt of the lead, the lead requester may be provided the opportunity to rate the quality of the lead received 1080, such as may be based on the reliability of the lead information, the friendliness and/or helpfulness of the lead and/or lead provider, and/or the like. In one implementation, a user who has received the lead may submit one rating for that lead at any time in the future. In another implementation, the user may submit one rating, but only for a specific time period following receipt of the lead. In still another implementation, the user may submit a rating and subsequently change that rating. The HUB may then update the quality rating of the lead provider based on the lead quality score received from the user 1085, and the updated lead provider score may then be provided for display to future lead requesters in determining whether or not to pursue a lead with that provider.

Figure 11A:
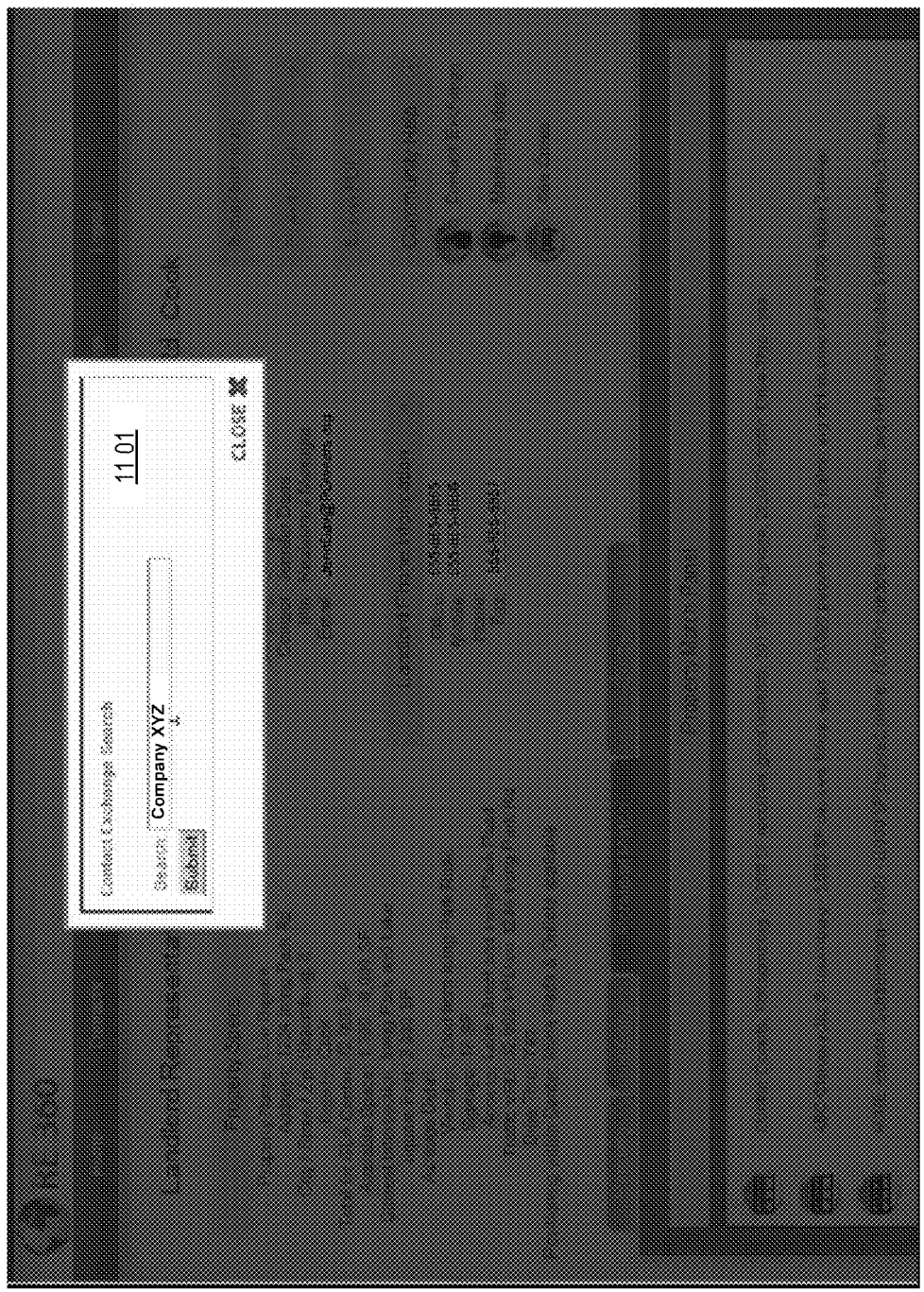
Figure 11B:
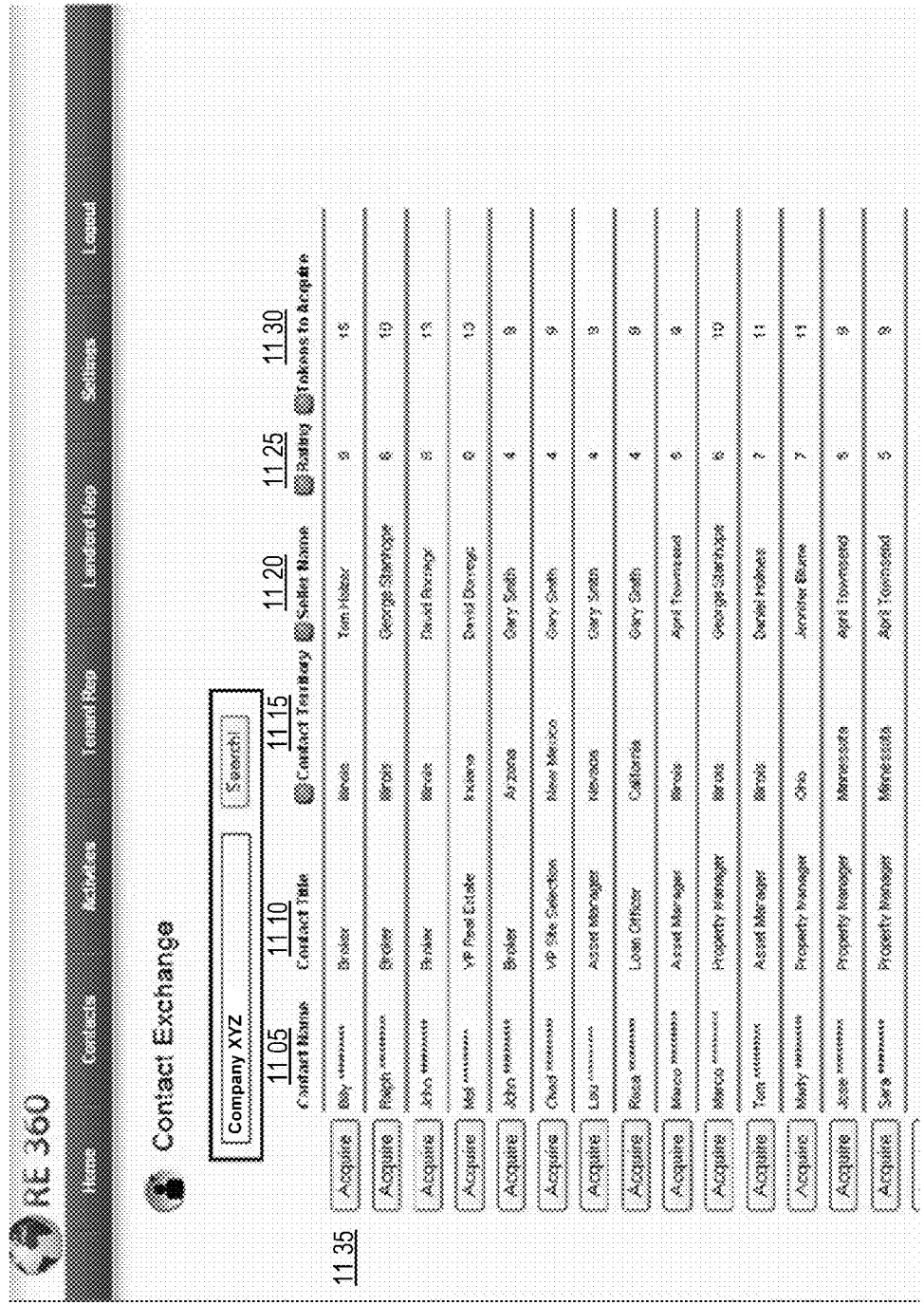
Figure 11C:
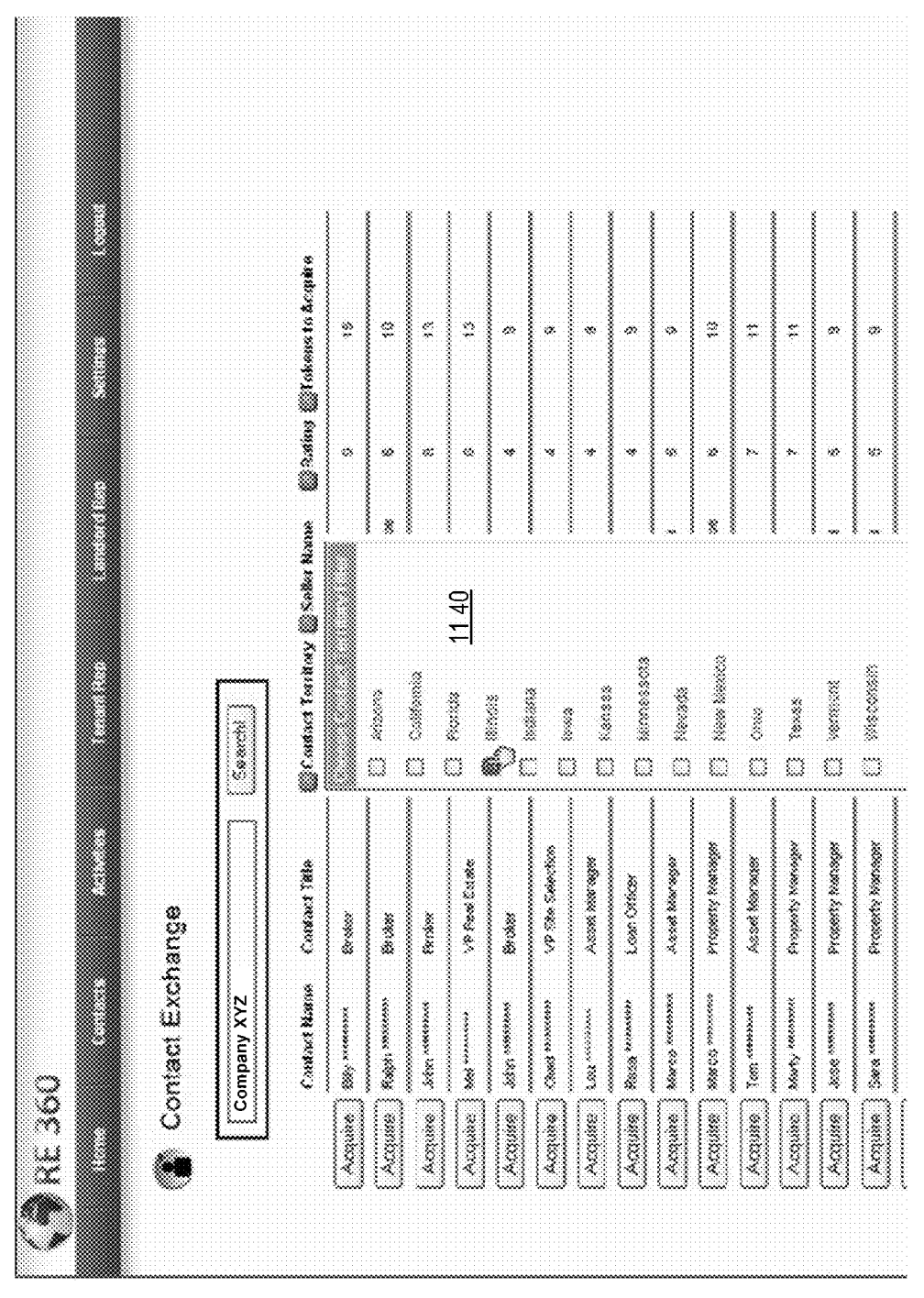
Figure 11D:
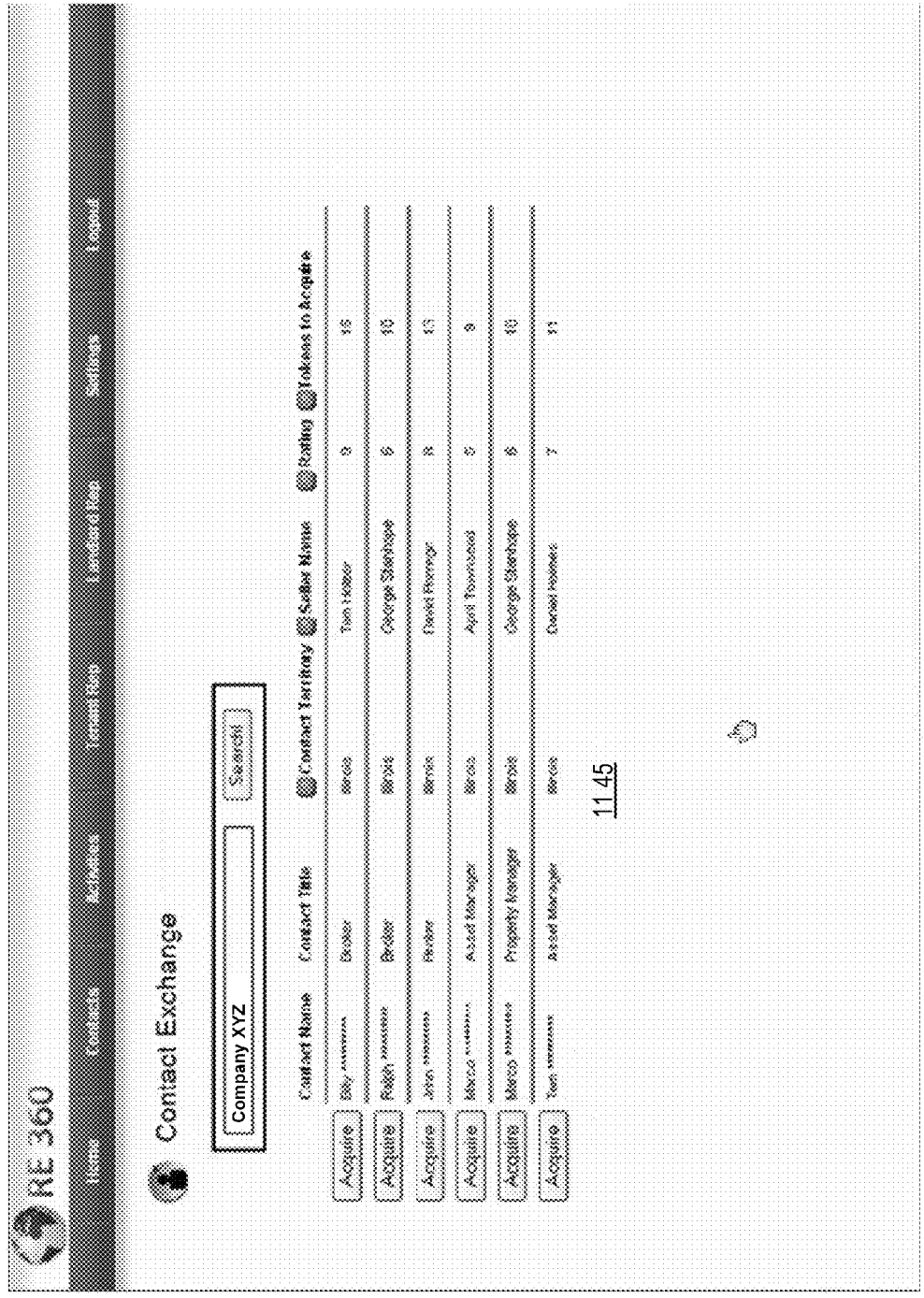

FIGS. 11A-D show an implementation of user interface for contact exchange in one embodiment of HUB operation. In FIG. 11A, a window is presented to the user 1101 to allow him or her to submit lead request parameters (in the illustrated implementation, a company name has been entered). A user seeking to acquire a particular lead, contact, and/or the like may experience a particularly acute and/or urgent need in light of commercial and competitive pressures. The HUB may facilitate alleviation of that need via an economical interface such as that shown in FIG. 11A, asking the user only to specify basic information to assist the HUB in identifying possible sources of the requested information. A list of possible leads and/or lead providers may then be provided, such as that shown in FIG. 11B. The list in the illustrated implementation includes the name of the contact (who is the lead provider) 1105, the contact's title 1110, the contact's territory 1115, the name of the contact (who is a seller in this case) 1120, a quality rating associated with the contact, and a lead provision fee 1130 (configured here as a number of tokens required to acquire the lead information). The list in the illustrated implementation also may include selectable interface elements 1135 by which the user may manifest his or her selection of an element of the list.

The list may also be sorted based on any of the list information categories. For example, FIG. 11C illustrates one implementation where a user has selected the contact territory category, and is provided with a dialog box 1140 by which the user may select a contact territory filter in order to narrow down the returned results. The resulting filtered list 1145 is displayed, in one implementation, in FIG. 11D.

Figure 12A:
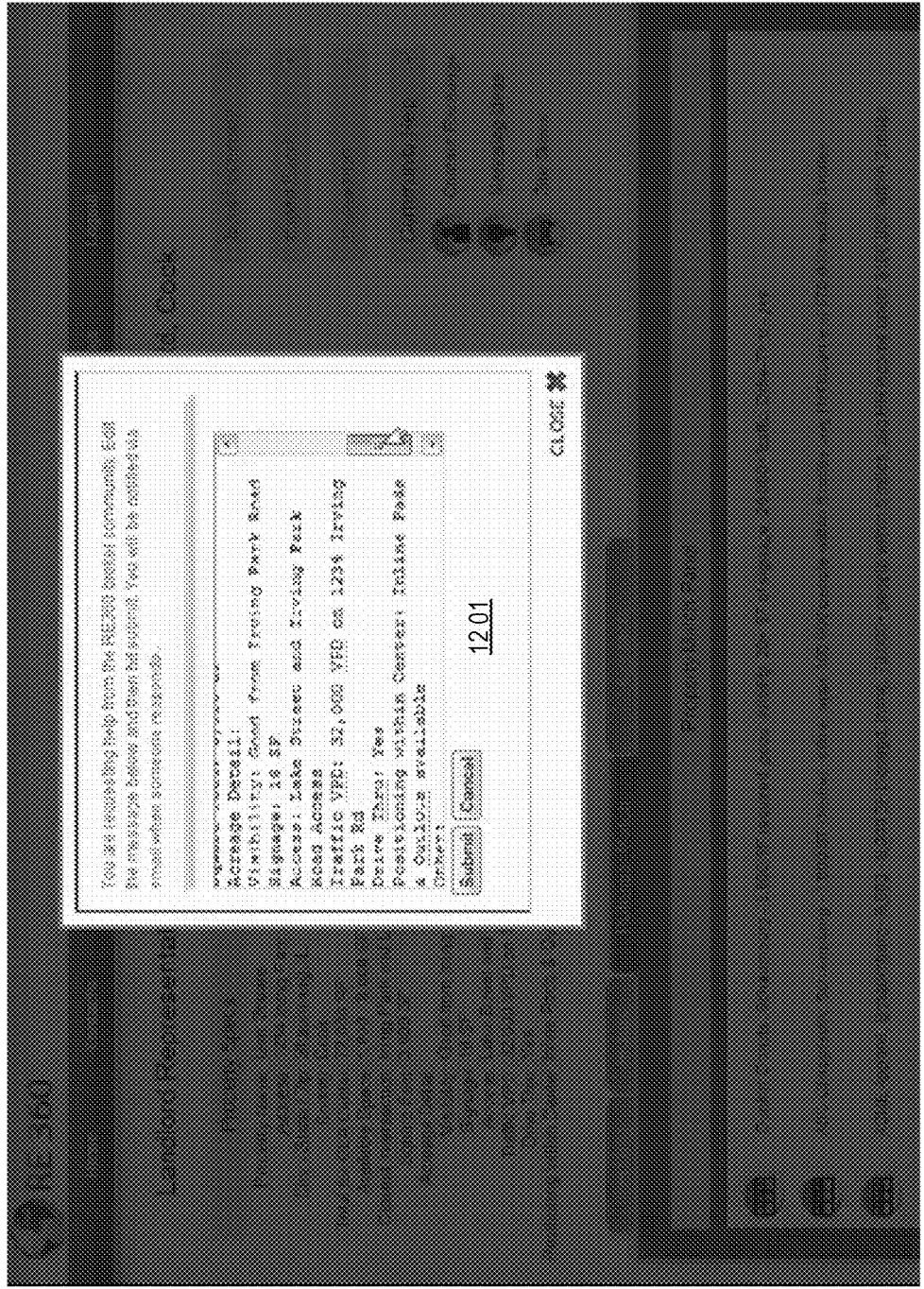
FIGS. 12A-C show an implementation of user interface for marketing idea exchanging in one embodiment of HUB operation.
Figure 12B:
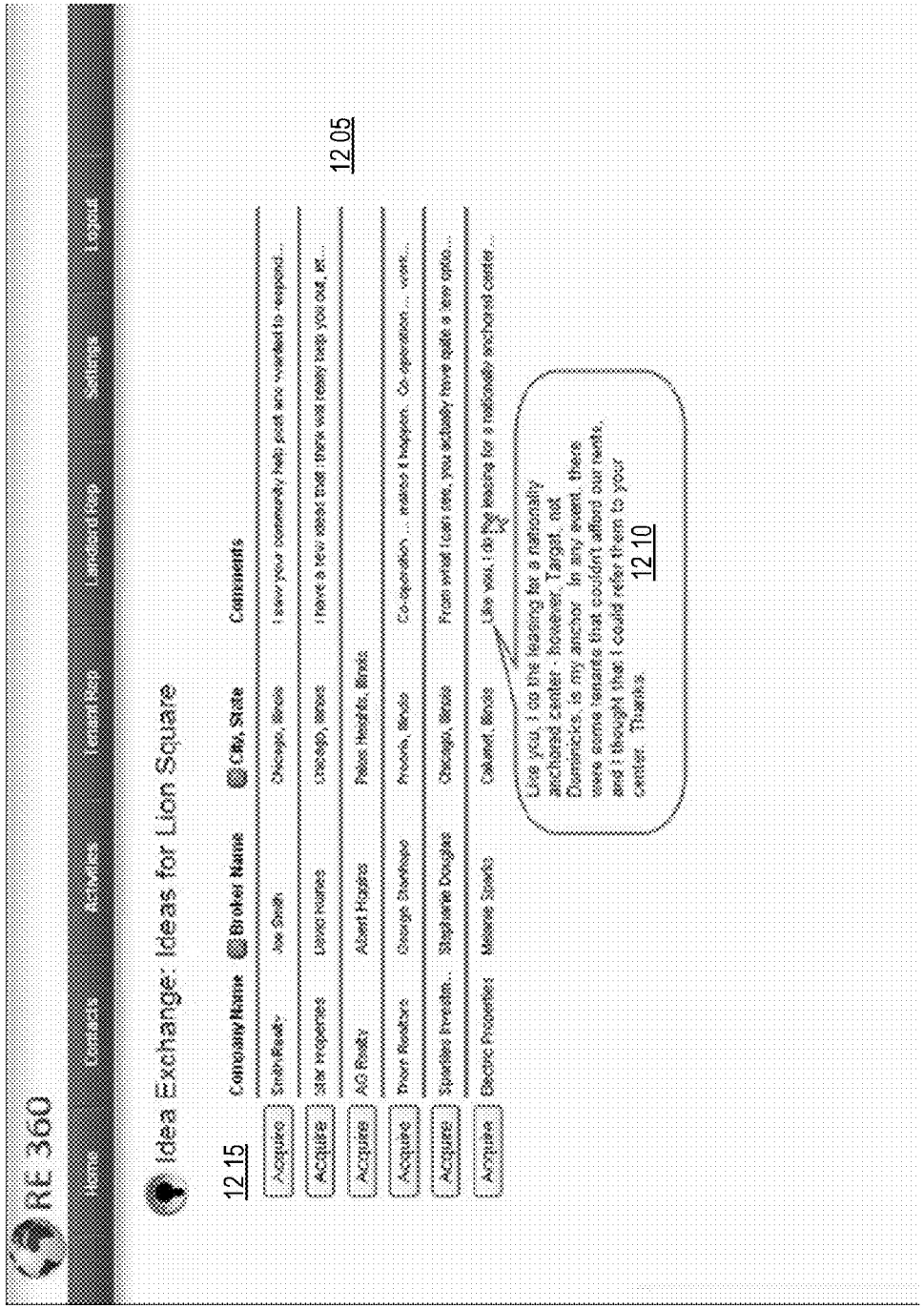
Figure 12C:
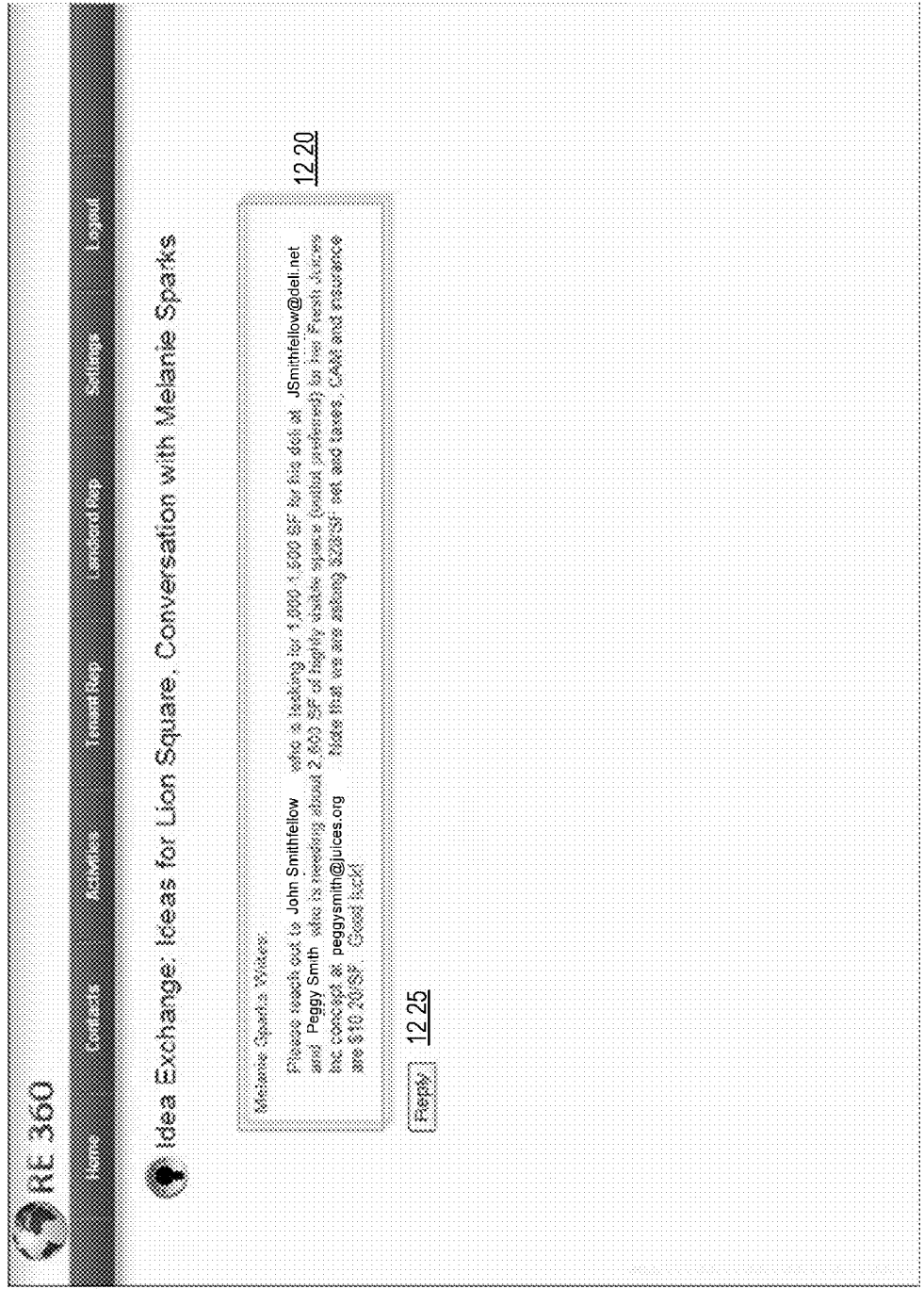
Figure 13A:
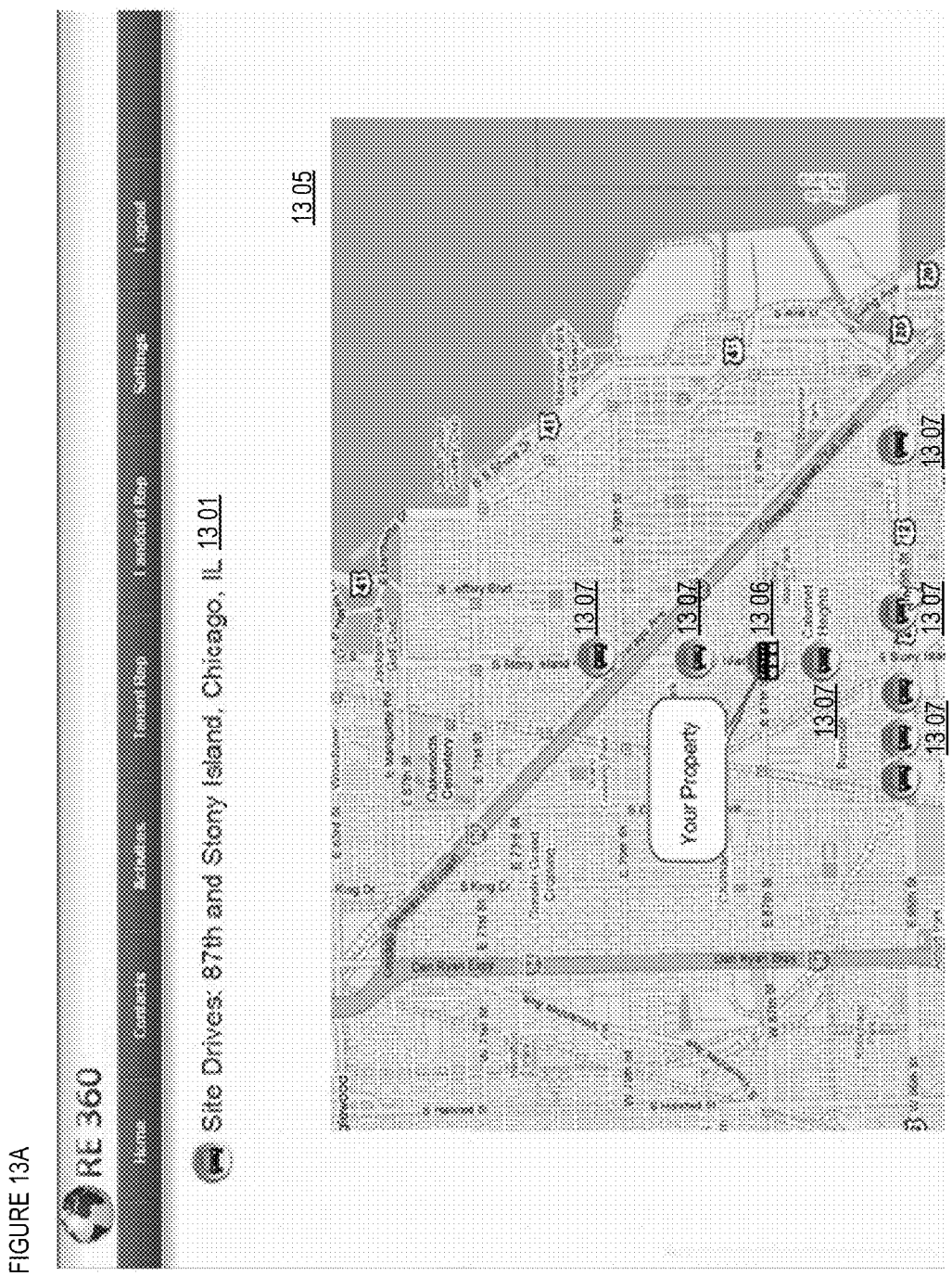
Figure 13B:
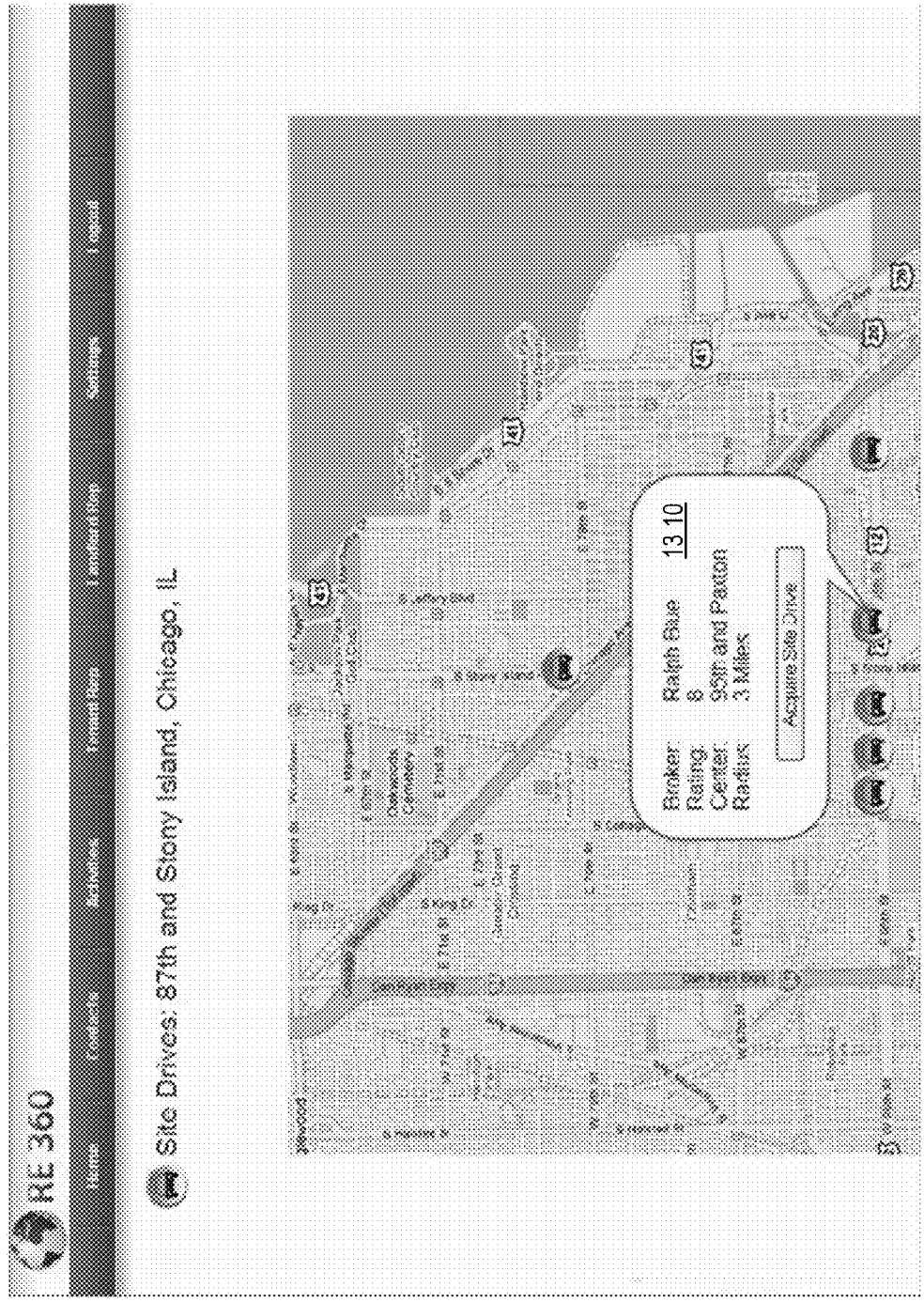
Figure 13D:
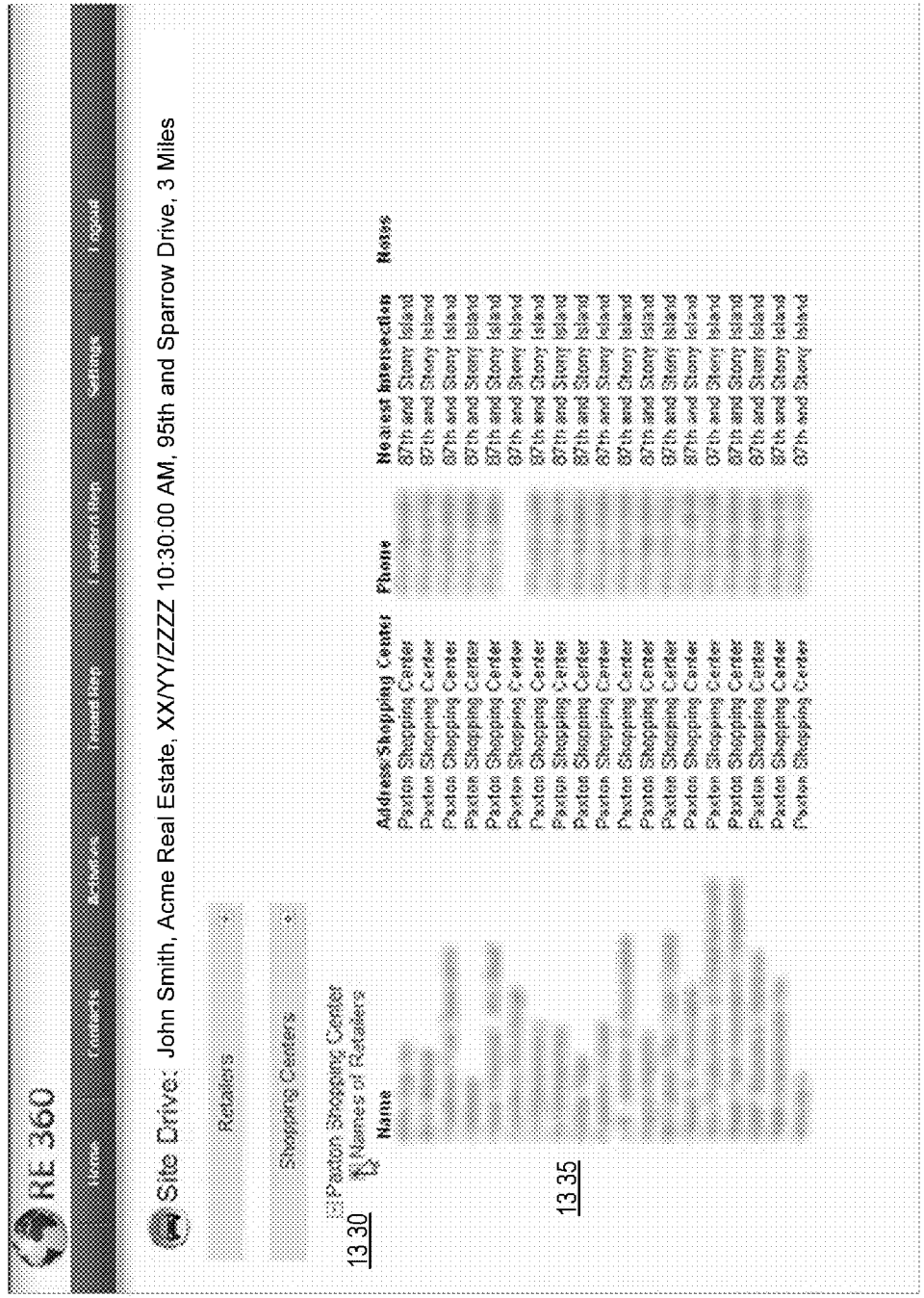
Figure 13E:

FIGS. 12A-C show an implementation of user interface for marketing idea exchanging in one embodiment of HUB operation. A user may seek assistance with leads, marketing ideas, and/or the like by selection of an associated user interface element such as the marketing ideas button at 905 in FIG. 9. A user may then be presented with a dialog box 1201 admitting entry of a message requesting assistance from other users. In various implementations, the message may be provided for display to all HUB users, HUB users who have acknowledged willingness to receive marketing idea requests, HUB users who are contacts of the requesting user, and/or the like. In response to a submitted message, the requesting user may be presented with a listing of ideas, advice, leads, and/or the like, similar to that shown at 1205 in the example in FIG. 12B. In one implementation, mousing over an element of the list at 1205 may cause the generation of a pop-up window 1210 providing further information about the advice, lead, ideas, and/or the like associated with that element. The interface may further include interface components 1215 configured to allow a user to manifest selection of an element of the listing. Selection of an element may result in the display of a screen similar to that shown in the example of FIG. 12C, wherein the message 1220 of a responding user is displayed in full. The interface may also include a component 1225 allowing the user to manifest a desire to reply to the message.

FIGS. 13A-E show an implementation of user interface for site drive information acquisition in one embodiment of HUB operation. The HUB may allow for leveraging of the power of an industry community to share information in such a manner as to assist one user or group of users in taking advantage of and/or improving the experience of another in various areas of community knowledge, such as marketing, lead generation, contacts, and/or the like. The HUB may, in one implementation, leverage such data generated by community interaction to increase the effectiveness of HUB profiles, real-time population of properties, and/or the like and/or use of historical accuracy of a HUB ranking and/or rating system to provide potential and/or valuable marketing ideas. A user may request site drive locations and/or information in association with a given property, such as one of their own properties, a client property, a desired property, and/or the like, such as by selecting an associated user interface element like that shown at 910 in FIG. 9. The address of the property for which the site drive information has been requested may be displayed 1301, and a map provided 1305 indicating the location of the reference property 1306 and of the associated and/or nearby site drives 1307, such as may be present within a specified distance of the reference property. A user may select, mouse-over, and/or otherwise choose a site drive and be shown a pop-up window 1310 of information associated with the selected site drive, such as the name of an associated broker, a rating associated with the broker, a center of the site drive, a radius, and/or the like. The pop-up window may also include a button or other UI element allowing the user to acquire complete information about the site drive. Selection of that element may cause the display of a screen similar to that shown in the example of FIG. 13C, wherein additional site drive information is provided 1315, and including selectable listings of retailers 1320 and/or shopping centers 1325 associated with the site drive. Selection of a shopping center allows for the user to view names of retailers 1330 associated with the selected shopping center, such as by the listing of retailers shown at 1335. The HUB may also, in one implementation, allow a user to view missing retailers 1340 associated with a shopping center, such as by identifying retailers by name, retail category, and/or the like who are not located in the shopping center but are, for example, a qualified distance away from it to be included in a list 1345 for display to the user. Although the description of the site drive facilities referencing FIGS. 13A-E is primarily directed to real property transactions, it should be understood that these facilities are adaptable to a wide variety of other applications within different embodiments or implementations of the HUB. For example, in an implementation directed to recruitment, the HUB may provide information analogous to site drives, such as may include a graphical representation analogous to a map, showing candidates for a position and their various skill-set positions relative to one another.

Figure 14A:
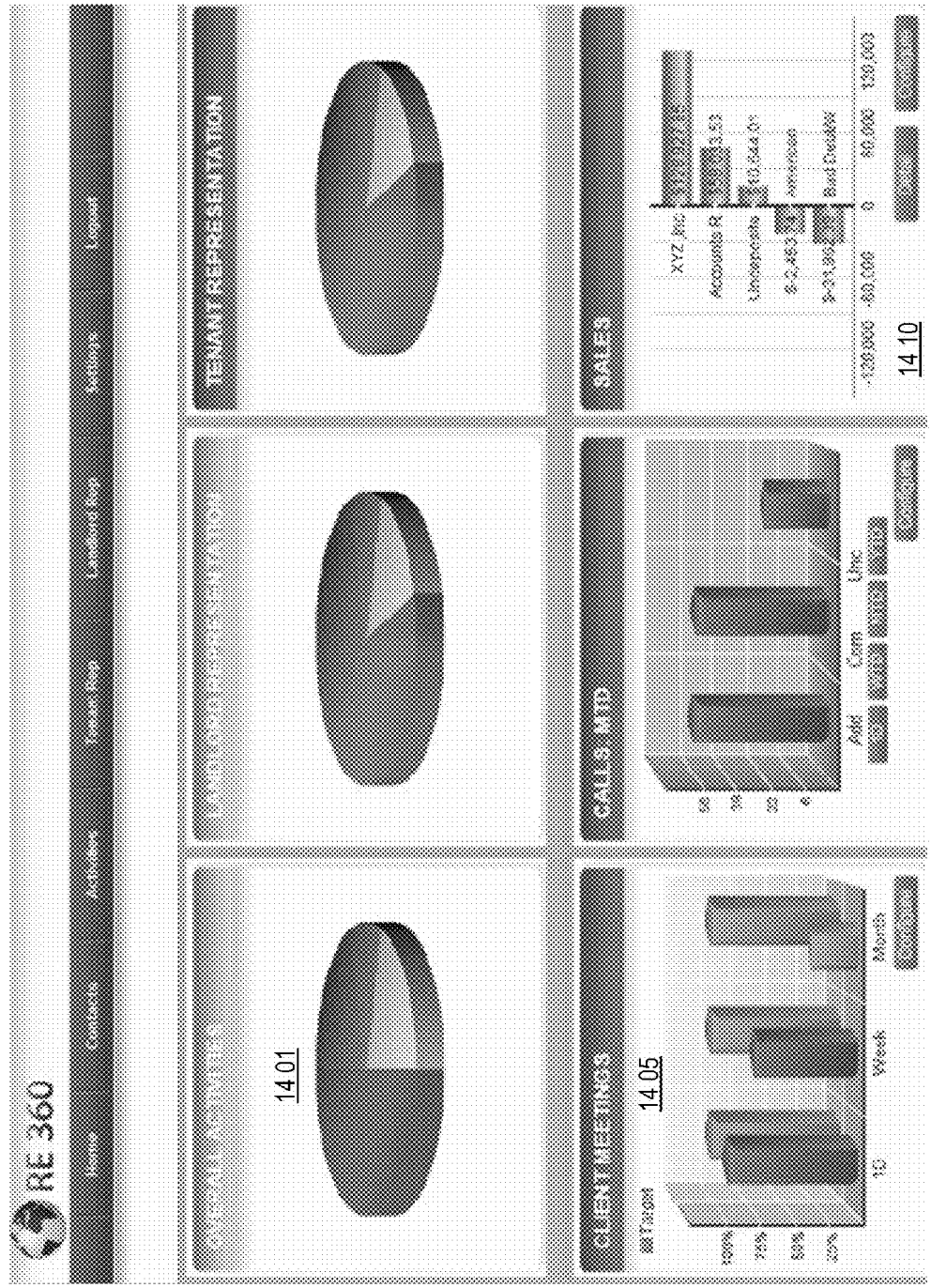
FIGS. 14A-E show an implementation of user interface for activity diagnostics and reporting in one embodiment of HUB operation.
Figure 14B:
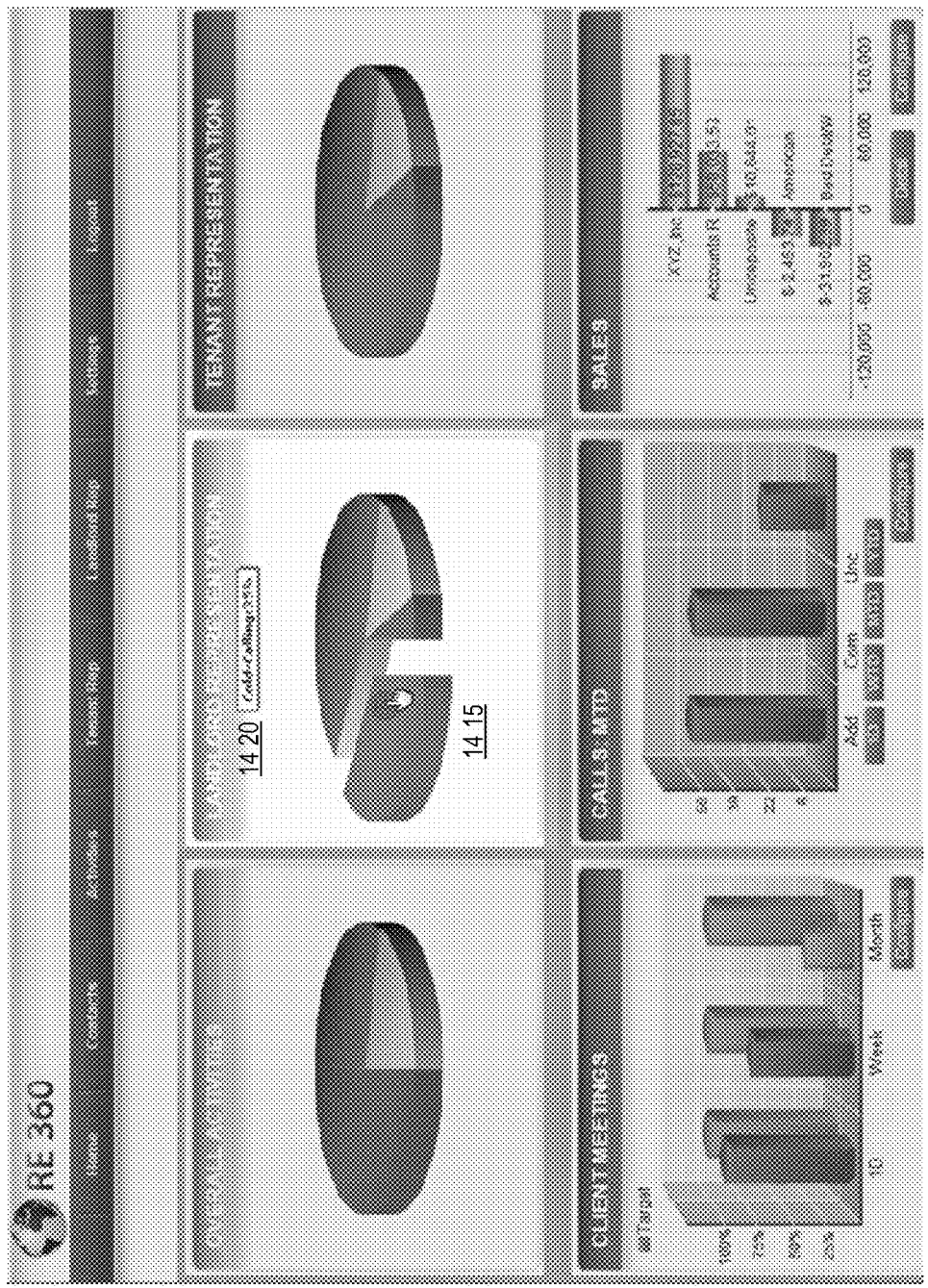
Figure 14C:
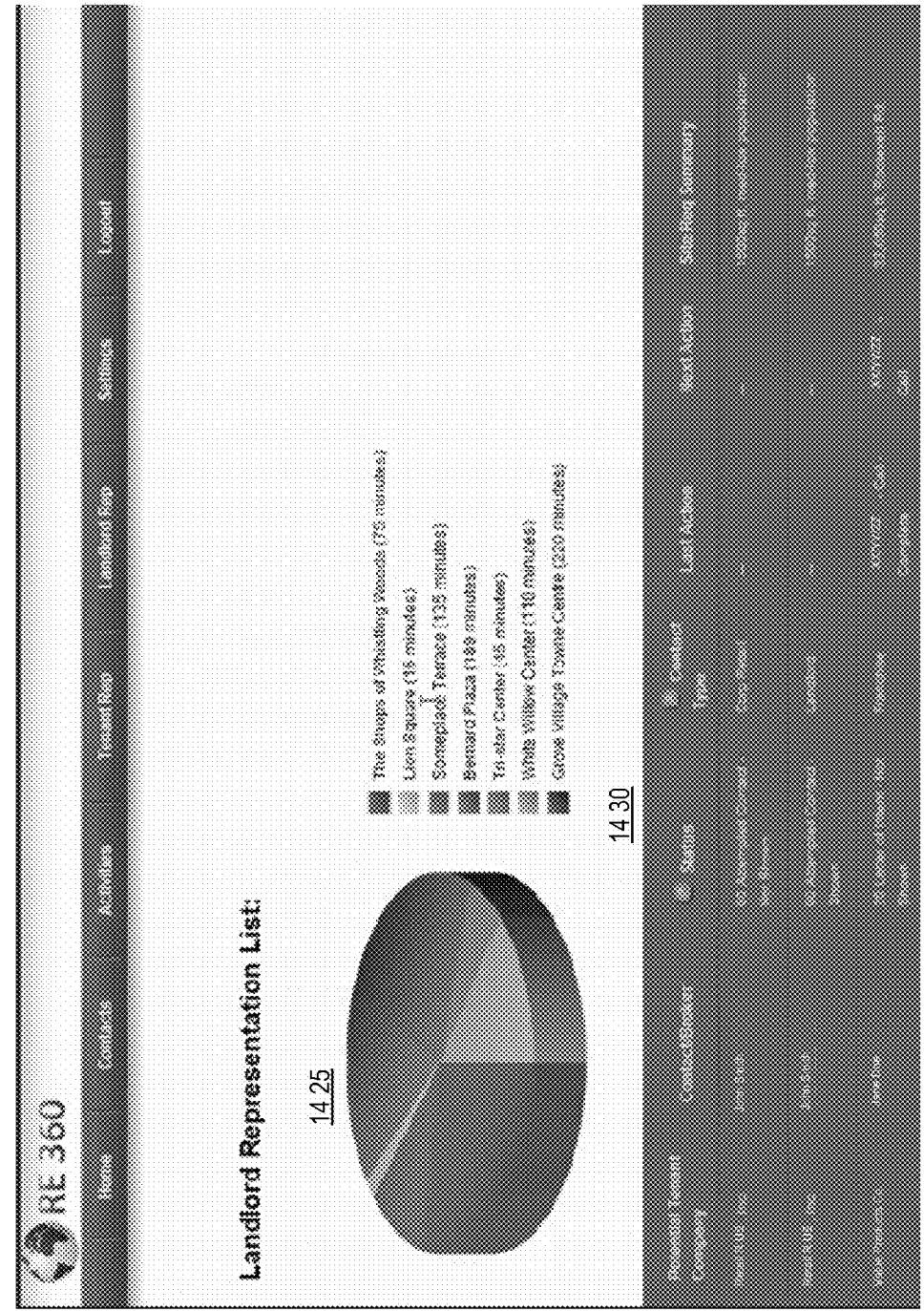
Figure 14D:
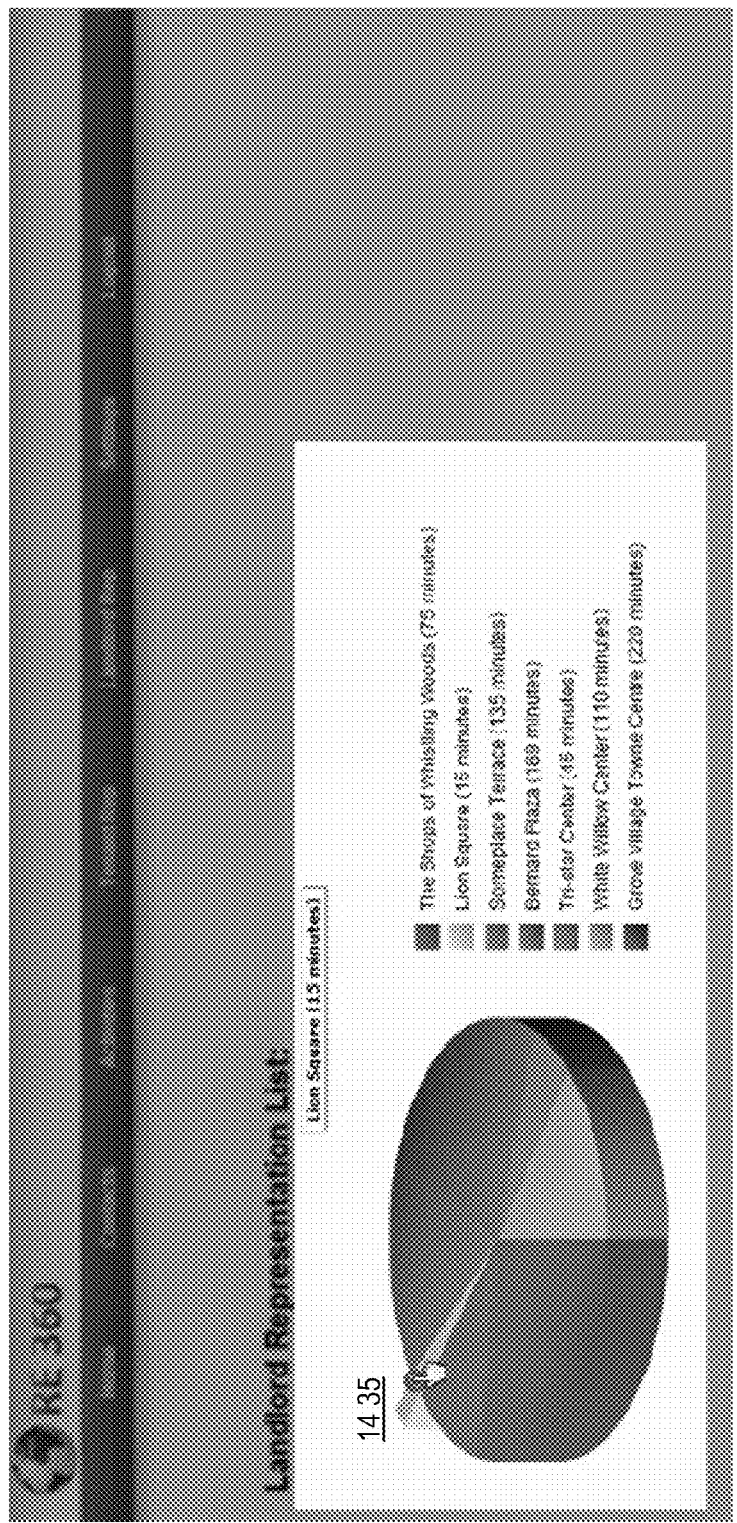
Figure 14E:
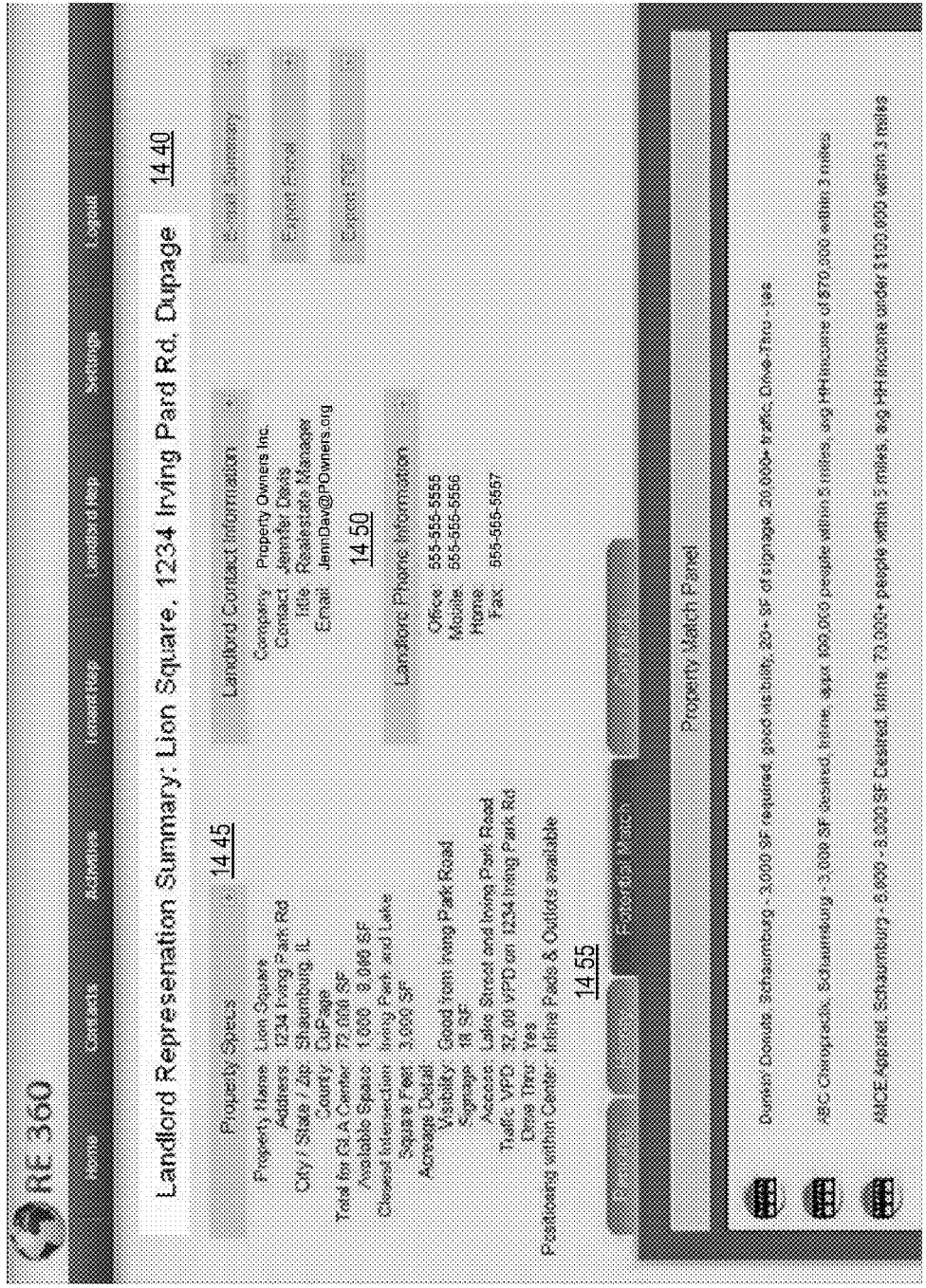

FIGS. 14A-E show an implementation of user interface for activity diagnostics and reporting in one embodiment of HUB operation. As noted above, the HUB may include a variety of facilities to allow for the evaluation, analysis, and reporting of user activities and/or relationships. In the illustrated implementation, a variety of charts, graphs, and/or other modes of display are provided as part of a dashboard interface to allow quick evaluation of user activities. For example, the illustrated implementation includes a pie chart showing a breakdown of overall user activities 1401. The illustrated implementation also includes a three dimensional bar graph displaying information related to client meetings 1405, and a two dimensional bar graph displaying information related to sales 1410. In one implementation, a user may customize the displayed information and/or modes of display in the dashboard interface to suit his or her specific needs and/or requirements. For example, a user may select data categories to include in a graph as well as the type of graph, position on the screen, display size, display colors, labels, scales, and/or the like. In one implementation, the dashboard components and/or the facilities to allow for user customization may be implemented by means of multimedia platform tools such as those of Adobe Flash. In one implementation, a user may click on, mouse over, and/or otherwise select a component of a displayed graph, chart, and/or the like to receive additional information. For example, in FIG. 14B, mousing over the pie chart wedge at 1415 yields display of the associated label at 1420. The user may then click the wedge at 1415 to be provided with more granular data about that category of landlord representation. For example, in one implementation, the user may be provided with a display similar to that shown in the example of FIG. 14C, where the pie chart 1425 now represents information associated with the selected wedge 1415. Additional information associated with the properties and/or clients displayed at 1425 may be provided in an associated table 1430, such as a listing of potential tenants who may be interested in the properties for which the user is the landlord broker. The user may, in one implementation, be allowed to again select a wedge of the pie chart (as shown at 1435 in FIG. 14D) to receive still more detailed information about the client, relationship, one or more properties, and/or the like associated with the selected wedge. An example of such information is shown in FIG. 14E, wherein a summary of the representation for a particular landlord client 1440 is shown, including property attributes 1445, contact information 1450, and/or the like. The interface may also include tabbed areas 1455 allowing the user to view pending and/or future scheduled activities with this client; historical records of activities associated with this client; potential matching contacts, tenants, clients, and/or other parties who may be interested in this client's property (e.g., such as may be discerned based on historical activities, inquiries from tenant brokers, queries built based on the property attributes at 1445, and/or the like); information pertaining to contacts associated with the client (e.g., other brokers spoken to about the client's properties); and/or the like.

Figure 15:
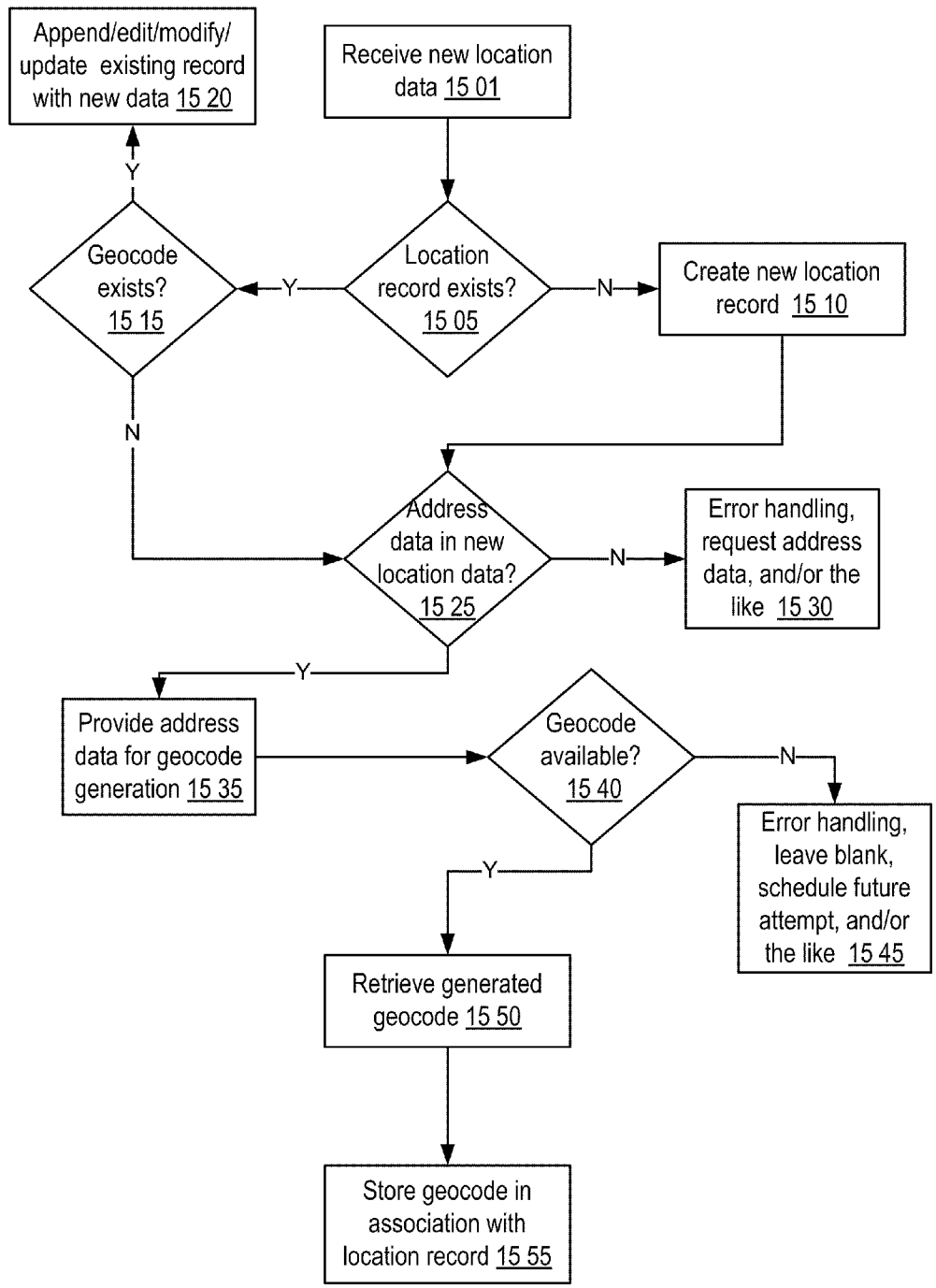
FIG. 15 shows an implementation of logic flow for geocode acquisition in one embodiment of HUB operation.

FIG. 15 shows an implementation of logic flow for geocode acquisition in one embodiment of HUB operation. Geocodes may be obtained in relation to stored information received from mobile phones or other mobile devices, associated with barcodes, scraped and/or otherwise extracted from online sources (e.g., websites, URLs, and/or the like) and/or scanned documents, stored within HUB databases, and/or the like, such as properties, contacts, appointments, and/or the like. In one implementation, the HUB may obtain geocodes in a batch process for multiple locations at a time, while in an alternative implementation, a geocode may be obtained for newly added location data at the time it is added to a HUB database. In the implementation illustrated in FIG. 15, new location data is received 1501 (e.g., from a HUB interface, such as entries to a HUB bifurcated display; from a barcode, matrix code, and/or the like scanned by a mobile device, and/or information queried from a database based on scanning one or more such codes; retrieved by scraping and/or otherwise extracting location information from a website, electronic document, scanned brochure, and/or the like; and/or the like). In various implementations, location data may take any of a variety of forms, such as but not limited to: postal address information, latitude and longitude coordinates, GPS coordinates, and/or any other location identifying information. A determination is made as to whether a record exists in one or more HUB databases representing the received location 1505. Such a determination may be made, for example, by comparing location identifying information to corresponding record information. If a record does not exist, a new location record may be created 1510 for the data being received. If a matching record does exist, a determination may be made as to whether a geocode already exists in the record. If so, then whatever new data has been received, if any, may be used to append, edit, update, and/or otherwise modify the existing data record 1520. If no geocode exists in the record, or if a new record was created to accommodate the new data, then a determination may be made as to whether address data exists in the newly received data 1525. Address data may comprise a street address, cross-street, telephone number, building name, location description, and/or any information sufficient to discern a specific location associated with the data. If no address data exists, then an error handling procedure may be undertaken, such as requesting entry of the address data, storing the record with a flag to identify it as lacking address data and/or to re-request address data at a future time, deleting the record, and/or the like 1530. In one implementation, information scraped or otherwise extracted from one or more listing services, scanned documents, and/or the like may be queried to attempt to find address data corresponding to the received location data. If address data does exist at 1525, that address data may be provided for geocode generation 1535. In one implementation, address data may be provided to a one or more tools in a Google Maps JavaScript API toolkit, Bing Maps API toolkit, Yahoo Maps Developers API toolkit, and/or the like in order to retrieve corresponding geocodes. A determination may be made as to whether geocodes are available 1540. If not, an error handling procedure may be undertaken 1545, such as to leave a data record's geocode field blank, schedule a future attempt to convert the address information to geocode information, request additional address information input, and/or the like. If the geocode information is available, it may be retrieved 1550 and stored in association with the location record 1555 for later access, retrieval and/or use.

Figure 16A:
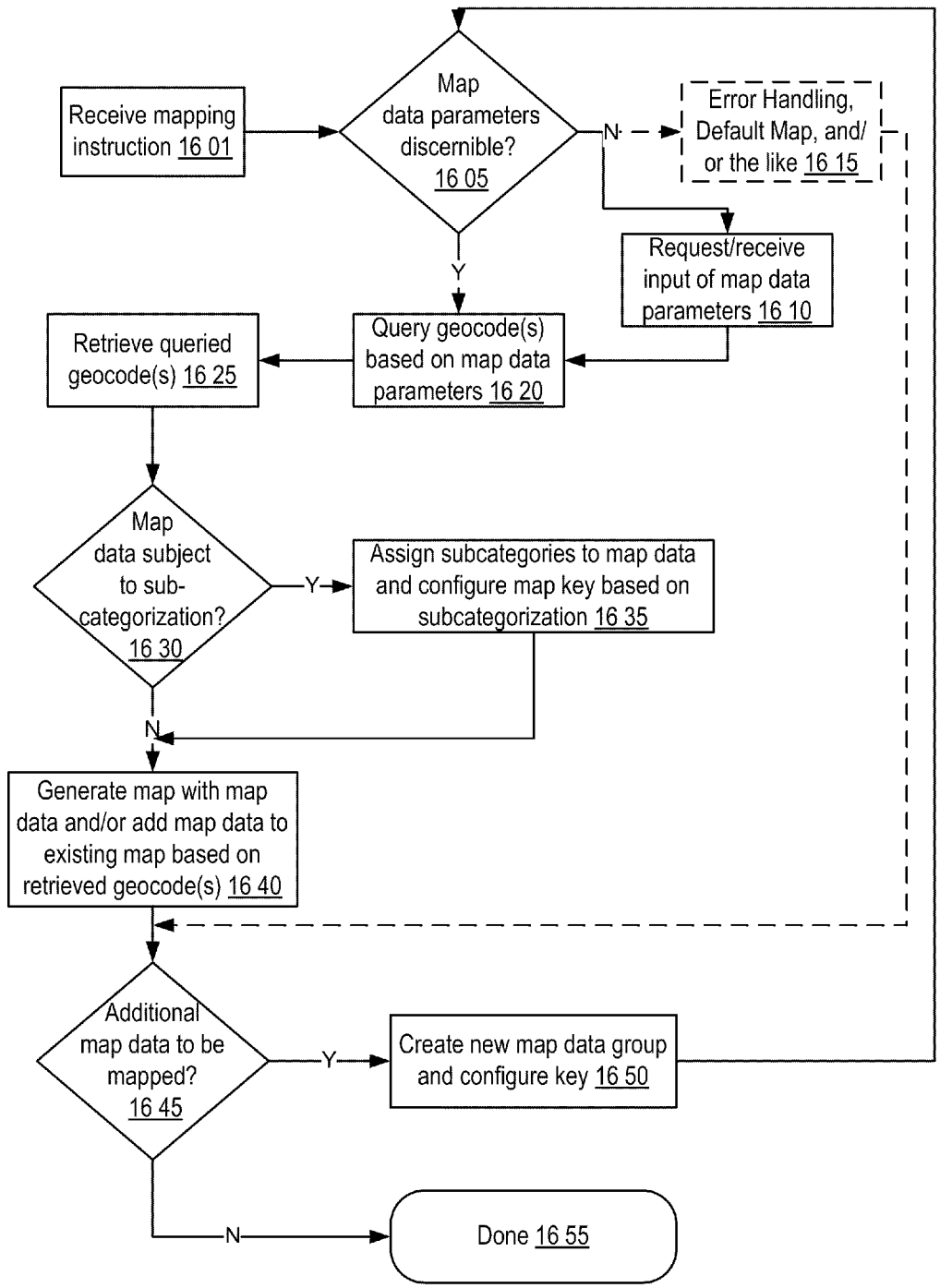
FIG. 16A shows an implementation of logic flow for mapping HUB data in one embodiment of HUB operation.

FIG. 16A shows an implementation of logic flow for mapping HUB data in one embodiment of HUB operation. A mapping instruction may be received 1601, such as a result of a user action, selection of a HUB interface element (e.g., elements 120 and/or 188 of FIG. 1A), a map generation subroutine of an automatic HUB system process, and/or the like. In one implementation, a mapping instruction may include specification of a set and/or subset of mappable data to be included in a map. For example, a user may highlight and/or otherwise select client target locations in nested folders, such as from a portion of the HUB interface like those shown at 125 and 130 in FIG. 1 or 210 in FIG. 2A, and instruct the HUB to map those selected locations. A determination may then be made as to whether map data parameters are discernible in association with the received mapping instruction. For example, such a determination made in response to selection of a "Map It" button like that shown at 188 of FIG. 1A may be based on an inspection of whether or not the table at 187 is populated with location information or sufficient location identifying information to allow for the further acquisition of map data parameters. Examples of map data parameters may include, but are not limited to: addresses, building names, cross streets, zip codes, city names, property owner identifiers, identifiers of contacts having associated properties, property broker identifiers, and/or the like. If map data parameters are not discernible, the HUB may request and receive input of map data parameters sufficient to produce a map 1610. In an alternative implementation, an error handling procedure may be undertaken, such as providing an error message to the user, producing a blank or default map, and/or the like 1615. If sufficient information is received to allow for discernment of map data parameters, the HUB may use received map data parameters to query location data records 1620 in order to retrieve geocode information associated with the map data parameters 1625. A determination may then be made as to whether the map data corresponding to the geocodes and/or map data parameters is subject to subcategorization. Such a determination may be made, for example, based on subcategory identifiers or other categorizable information contained in and/or connected to location data records queried at 1620. Examples of map data subcategorization may include identifying properties as qualified properties; proposed properties; presented properties; declined properties; tenant client target properties; tenant client existing properties; landlord client properties; market comparables; site drives; contact-associated properties; and/or the like. In one implementation, the determination of whether map data is subject to subcategorization may further be based on a user designation (e.g., of user hat and/or role) or interface element selection, such as the selection of a checkbox indicating a desire to group mapped properties by subcategories or related attributes. If map data is subject to subcategorization, appropriate subcategories may be assigned to the map data and a map key may be configured based on that subcategorization, such map data within a particular subcategory will appear as having a unique icon or other identifier on a generated map 1635. The map may then be generated with the map data, in accordance with any applied subcategorization 1640. If a map has already been generated and the new map data is to be appended thereto, the new map data may be added to the existing map at 1640. A determination may then be made as to whether additional map data is to be mapped 1645, such as based on a user inquiry. If so, a new map data group may be created, corresponding to the map data to be added to the existing map, and the map key may be configured accordingly 1650, and the HUB may return to 1605. Otherwise, map generation may be done 1655.

Figure 16B:
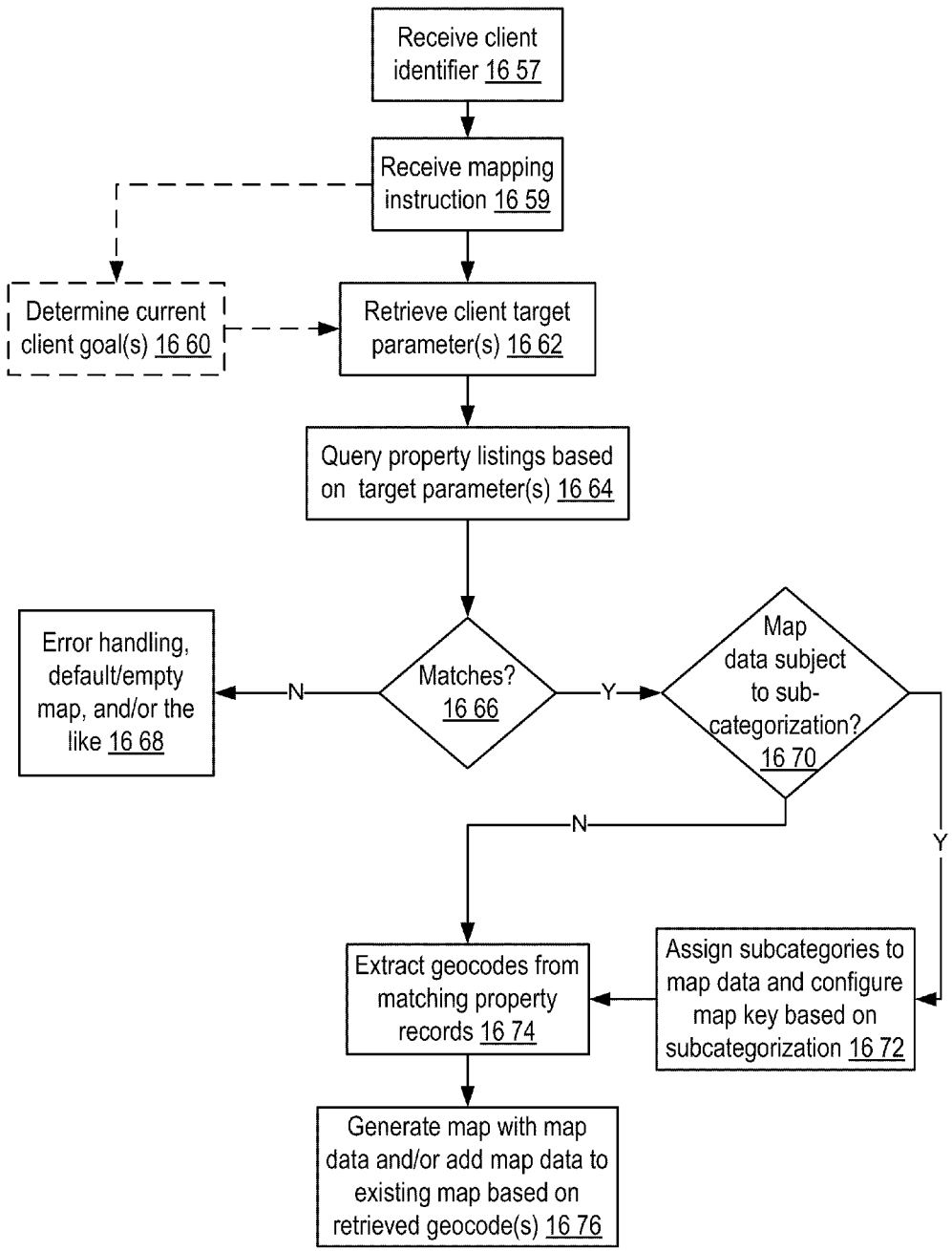
FIG. 16B shows an implementation of logic flow for intelligent mapping in one embodiment of HUB operation.

FIG. 16B shows an implementation of logic flow for intelligent mapping in one embodiment of HUB operation. A flow similar to that shown in the example of FIG. 16B may be implemented in order to auto-populate a generated map with property and/or other location geospatial information that is determined to be of possible contextual relevance for a user and/or a user's client. For example, the HUB may receive a client identifier 1657, such as the name and/or other identity information associated with a client with which a broker or other user is currently engaged in communication. A mapping instruction may also be received 1659, such as a result of a user action, selection of a HUB interface element, a map generation subroutine of an automatic HUB system process, and/or the like. The HUB may then retrieve client target parameter(s), such as client target property requirements and/or characteristics, target tenant requirements and/or characteristics, and/or the like 1662. Target parameters may, in some implementations, be derived from entries into a bifurcated display portion of a HUB interface (e.g., from entries into area 155 of FIG. 1), from a user and/or client profile and/or data record, and/or the like. In one implementation, the HUB may further discern one or more current client goal(s) 1660, such as a goal to rent, buy, sell, view as an open house, and/or the like. Such goals may be discerned, for example, from a user entry, from contextual cues detected from user interactions with a HUB interface during a communication session with the client, and/or the like. In one implementation, discerned client goals may affect retrieval of target parameters (e.g., only a client's target property characteristics corresponding to rental targets may be retrieved if the client's current goal is determined to be associated with renting). Based on the retrieved target parameters, and in one implementation on the current client goals, the HUB may query property listings 1664. In some implementations, property listings queried at 1664 may include a user's properties, a user's company's properties, properties gleaned from a third party source and/or stored in a third party database, properties scraped and/or otherwise extracted from analyzed websites, scanned and/or digital documents, flyers, and/or the like. A determination may be made as to whether any listings exist matching the parameters of the query and, if not, then an error handling procedure may be undertaken, such as to provide a default, empty, and/or unpopulated map for display 1668. Otherwise, if one or more matches are found, a determination may be made as to whether the matching map data is subject to sub-categorization 1670 (e.g., if there exist one or more common characteristics across the matching data based on which the data may be grouped into subcategories). If so, then subcategories may be assigned to the map data and a map key may be configured based on those assignments and/or subcategorizations 1672. Geocode data may be extracted from data records, barcodes, digital files, and/or the like associated with the map data 1674 and one or more maps may be generated, displaying and/or adding the map data, based on the retrieved geocode information 1676.

Figure 17:
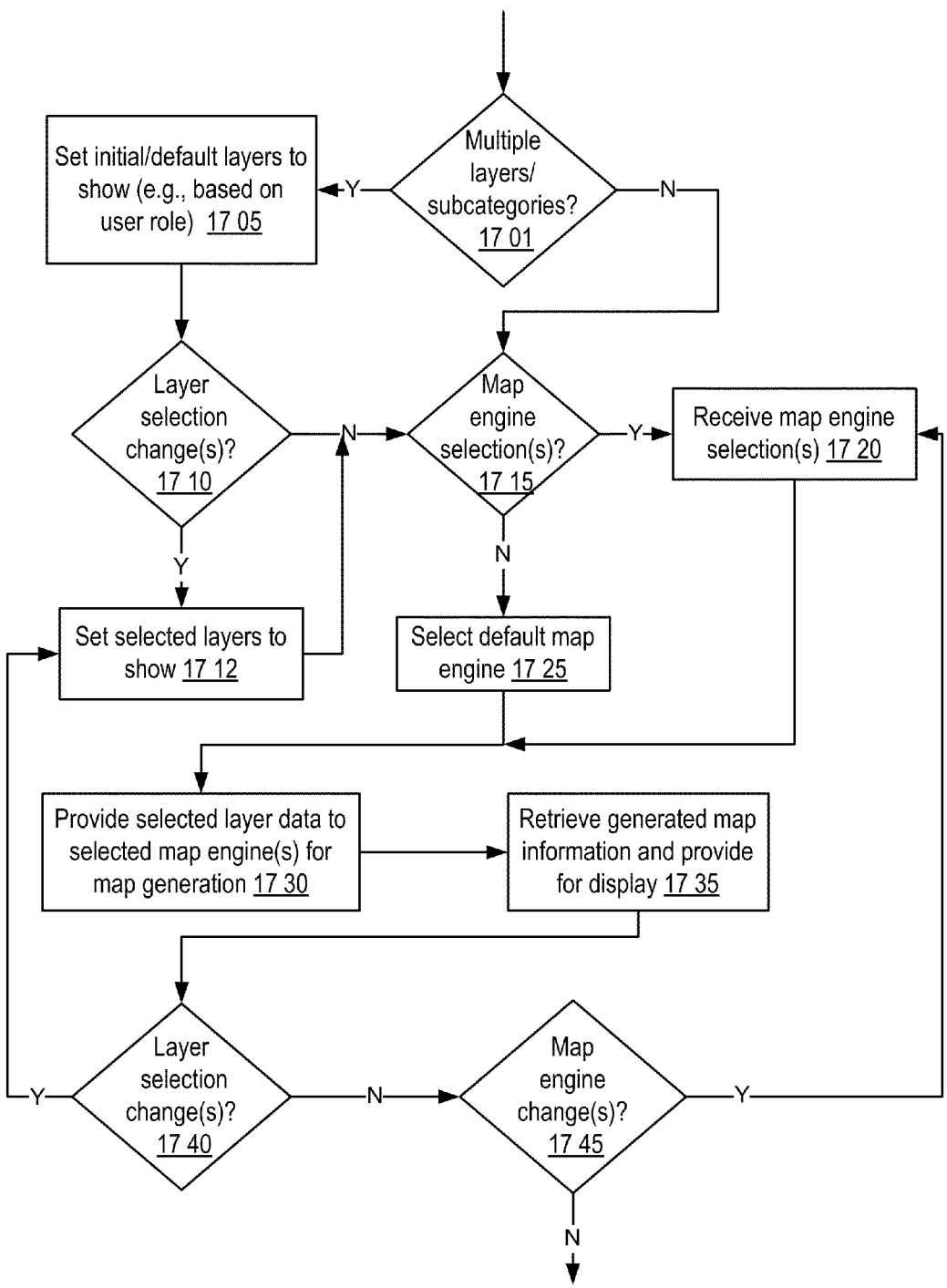
FIG. 17 shows an implementation of logic flow for map generation in one embodiment of HUB operation.

FIG. 17 shows an implementation of logic flow for map generation in one embodiment of HUB operation. In one implementation, the logic flow shown in FIG. 17 may be implemented at 1640 in FIG. 16A. A determination may be made as to whether there exist multiple layers and/or subcategories of map data for presentation 1701. Such a determination may be made, for example, based on inspection of layer descriptors, subcategory identifiers, and/or the like associated with location records to be mapped. If multiple layers and/or subcategories of map data exist, the HUB may set an initial and/or default set of layers for display, such as may be based on a user role, user preference setting, and/or the like 1705. A determination may then be made as to whether layer selection changes are desired or received from the user 1710. For example, in one implementation, a user may change layer display settings by clicking on one or more interface elements to register a selection and/or deselection of one or more layers. If layer selections are detected, the HUB may set selected layers to show in a generated map 1712, such as by designating selected layers as displayable in a location data record. Once layers are set, or if there are no multiple layers, the HUB may determine if one or more map engine selections are desired 1715. For example, a HUB user may be provided with the option of selecting one or more map engines for presentation of map data, such as but not limited to: Google Maps, Yahoo Maps, Mapquest, Bing Maps, and/or the like. In one implementation, such a determination may be made based on the availability of map engine selection options to a HUB user, the accessibility of map engine tools, the nature of mapped data, selected map settings, and/or the like. In one implementation, the HUB may automatically determine, apply and/or recommend a preferred map engine, such as may be based on characteristics of a user, map data, interface context, and/or the like. For example, if the HUB detects that a user is engaged in a discussion with a commercial real estate tenant client interested in leasing retail store space, the HUB may default to a street-view presentation (e.g., Google Maps street-view, Microsoft Street Slide view, and/or the like). The HUB may include and access data records storing associations between client goals and/or other interface contextual cues and map engines or other selected display features in order to provide such contextually relevant recommendations and/or default presentations of map data. If map engine selection is available and/or detected, map engine selections may be received 1720 and, if not, then a default map engine may be selected 1725. Map engines may be used in conjunction with one another such that a user can choose to flip back, forth and/or between maps generated by different engines, and/or display maps side-by-side such as to have both views available. In one implementation, a user may readily copy, e-mail, save and/or export maps internally within a HUB system and/or with external parties for on-the-fly discussion and analysis. Selected layer data may then be provided to tools associated with one or more selected map engines for map generation 1730, and generated map information, such as a graphical map display, may be retrieved and provided for display 1735. A determination may then be made as to whether any layer selection changes are desired or have been received 1740 and, if so, the Hub may return to 1712. Otherwise, a determination may be made as to whether any map engine changes are desired or have been received 1745 and, if so, the HUB may return to 1720. Otherwise, the map generation subroutine shown in FIG. 17 may conclude and/or exit.

Figure 18:
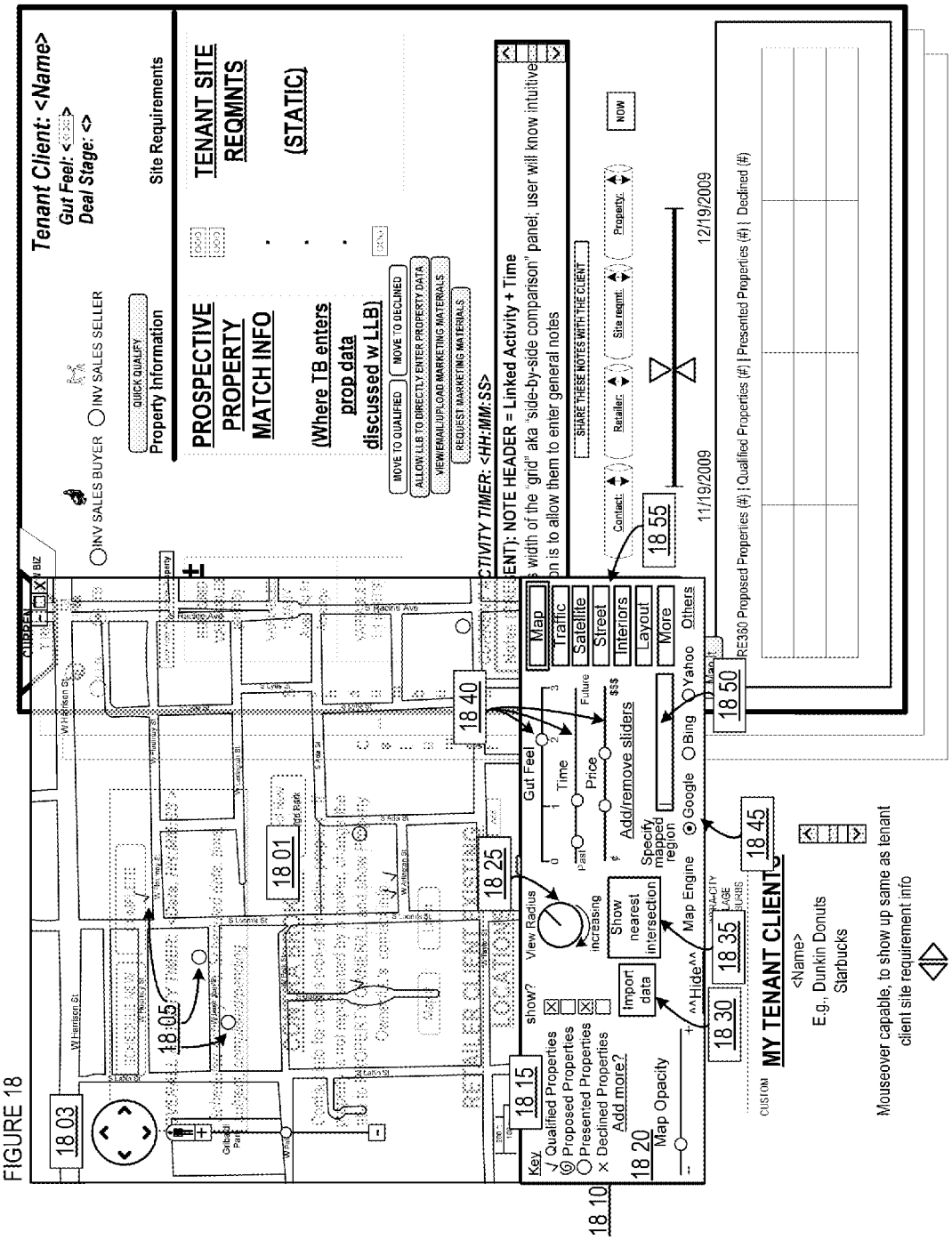
FIG. 18 shows an implementation of a HUB map user interface in one embodiment of HUB operation.

FIG. 18 shows an implementation of a HUB map user interface in one embodiment of HUB operation. A map, such as that shown in the example of FIG. 18, may allow a user to map a variety of different geospatial and/or spatiotemporal information. In one implementation, a map such as that shown in FIG. 18 may be used to map property information populating another HUB interface, such as a bifurcated display area similar to that shown in the example at 143 of FIG. 1. In such an implementation, entry of new information in another part of the HUB interface, such as a bifurcated display portion, may cause an automatic and/or dynamic updating of displayed information in a HUB map interface such as that shown in FIG. 18. A map area 1801 shows a mapped region, which may be adjusted in position, zoom or scale, view, and/or the like, such as by using the map tools shown at 1803. In addition to general geographic information associated with the mapped area, such as street names, landmarks, and/or the like, the map also includes mapped location data, indicated by icons such as those at 1805. The interface further includes a control panel 1810 with a variety of interface elements allowing for modification and/or customization of the displayed map area and/or map data. It should be understood that the interface elements shown in FIG. 18 are for illustrative purposes only, and any variety, combination, subset, and/or the like of the displayed interface elements, as well as other elements with related and/or complementary functionality, may be employed within different implementations of the HUB and HUB user interfaces. A key 1815 shows identifying information for displayed map data, such as may correspond to map layers, subcategories, and/or the like. As in the displayed implementation, the key may include checkboxes or other interface facilities allowing a user to select or deselect displayed map data, layers, subcategories and/or the like. The panel may further include a map opacity slider element 1820, allowing a user to adjust the transparency and/or opacity of the displayed map area 1801 from a low level (e.g., completely transparent) to a high level (e.g., completely opaque). The panel may further include a view radius dial 1825, allowing a user to adjust the a radius, scale, zoom, and/or the like associated with the displayed map area 1801. In one implementation, a point at the center of the displayed map area 1801 (e.g., the point from which the radius, controlled by the element at 1825, may be drawn) may be a nearest intersection, or other point of interest, in proximity to and/or otherwise associated with one or more mapped properties. The panel may further include an "Import data" button 1830, selection of which may generate a dialog box by which a user may specify one or more filenames corresponding to files, such as text files, PDF documents, word processing documents, spreadsheet documents, XML files or other structured documents, and/or the like which may contain map data. In one implementation, an "Import data" button such as that shown at 1830 may allow a user to provide location information from and/or associated with a scanned barcode, matrix code, and/or the like. For example, in one implementation, selection of an import data button may cause a number to be displayed to a user, to which the user may submit an MMS message containing an image of a code captured by a mobile device camera, which may then be decoded at a remote server in order to extract and/or retrieve associated location information. In another implementation, an import data button may allow a user to automatically transfer a captured code image (and, in some implementations, images within that image, e.g., retailer logos, street logos, demographic data logos, and/or the like) to a computing terminal, which may then be decoded thereon and/or passed over a communication network to a remote server for conversion to location information. In one implementation, a scanned barcode, matrix code, and/or the like may itself contain geospatial information and/or may allow a user to connect to a source of associated geospatial information. In another implementation, a barcode may have property identifying information (e.g., the name of a building, associated contact information, and/or the like), and a mobile device application may automatically capture geospatial information from a device sensor (e.g., a GPS unit) at the time the code is captured, and associate the position information with the captured code. Imported data, once successfully loaded, may automatically appear as icons in the map area. In one implementation, imported map data may be designated as a unique layer, subcategory, and/or the like. The panel may further include a "Show nearest intersection" button 1835, selection of which may show information related to a nearest intersection (e.g., names of crossing streets) for one or more displayed locations, such as for one or more of the icons 1805 signifying map data locations. In one implementation, selection of the button at 1835 may generate a special pointer that, when used to click on a mapped icon, may generate and display the nearest intersection information for that icon. The panel may further include a variety of sliders 1840 for filtering displayed map data based on a variety of criteria. For example, the displayed implementation includes a "gut feel" slider, whereby a user may set a value, upper value, lower value, range, and/or the like for the gut feel indicator associated with one or more properties to filter displayed properties to only those having gut feel values satisfying the specified values and/or criteria. Another example of a filtering slider shown at 1840 is a time slider, which may allow a user to specify one or more times and/or a range of times by which to filter displayed properties. Times set by the slider may, for example, correspond to the time a property has been listed for sale or rent, the last time a status change occurred for the property, the first and/or last time a HUB user communicated with a contact about a property, and/or the like. In one implementation, a time slider may be manipulated to cause displayed properties to evolve in time, such as to reveal status changes associated with the properties (e.g., for sale, shown to prospective buyers, in contract, sale closed, and/or the like). In one implementation, maps at different stages of a time evolution may be un-done and/or re-done, saved, exported, and/or the like. In one implementation, a time slider may update mapped data and/or map data statuses and/or other associated information based on the historical records of HUB activity at various times associated with the mapped properties. Another example of a possible filtering slider shown at 1840 is a price slider, which may allow a user to set a price value, minimum, maximum, range, and/or the like by which to filter displayed properties according to their sale prices, asking prices, bid prices, rent levels, geographic price averages, historical price values, and/or the like. A wide variety of other filter sliders may be employed in other implementations of the HUB and HUB user interfaces (e.g., displayed filter sliders may be selected based on a user role, user preference settings, and/or the like). The panel may further include a field for specifying a mapped region 1850, into which a user may enter information based on which a map area 1801 may be modified, such as an address or collection of addresses, city name, building name, zip code, state name, area code, intersection, retailer/restaurant name, contact name, and/or the like. The panel may further include a plurality of buttons allowing a user to vary a view and/or type of view in a map area 1801. For example, buttons may exist to allow a user to vary a map view to a map setting (e.g., schematic display of labeled streets, landmarks, parks, buildings, waterways, and/or the like); a traffic setting (e.g., showing traffic flows, densities, and/or the like, such as may be accessed from a traffic alert data source); a satellite setting, showing satellite photography images, "bird's eye" images, and/or the like associated with the map area; a street setting, showing street-level photography images, user-generated street photos, and/or the like; an interiors setting, showing overlaid images, thumbnails, and/or the like of property interiors, user and/or broker submitted interior photos, and/or the like; a layout setting, showing property layout views, blueprints, and/or the like; and/or the like. In one implementation, one or more of the map views may be employed to generate a plurality of maps that can be minimized and/or maximized for side-by-side comparison. In one implementation, one or more of the map view elements shown at 1855 may be connected to and/or may implement tools from a map engine toolkit such as those discussed above.

Figure 19:
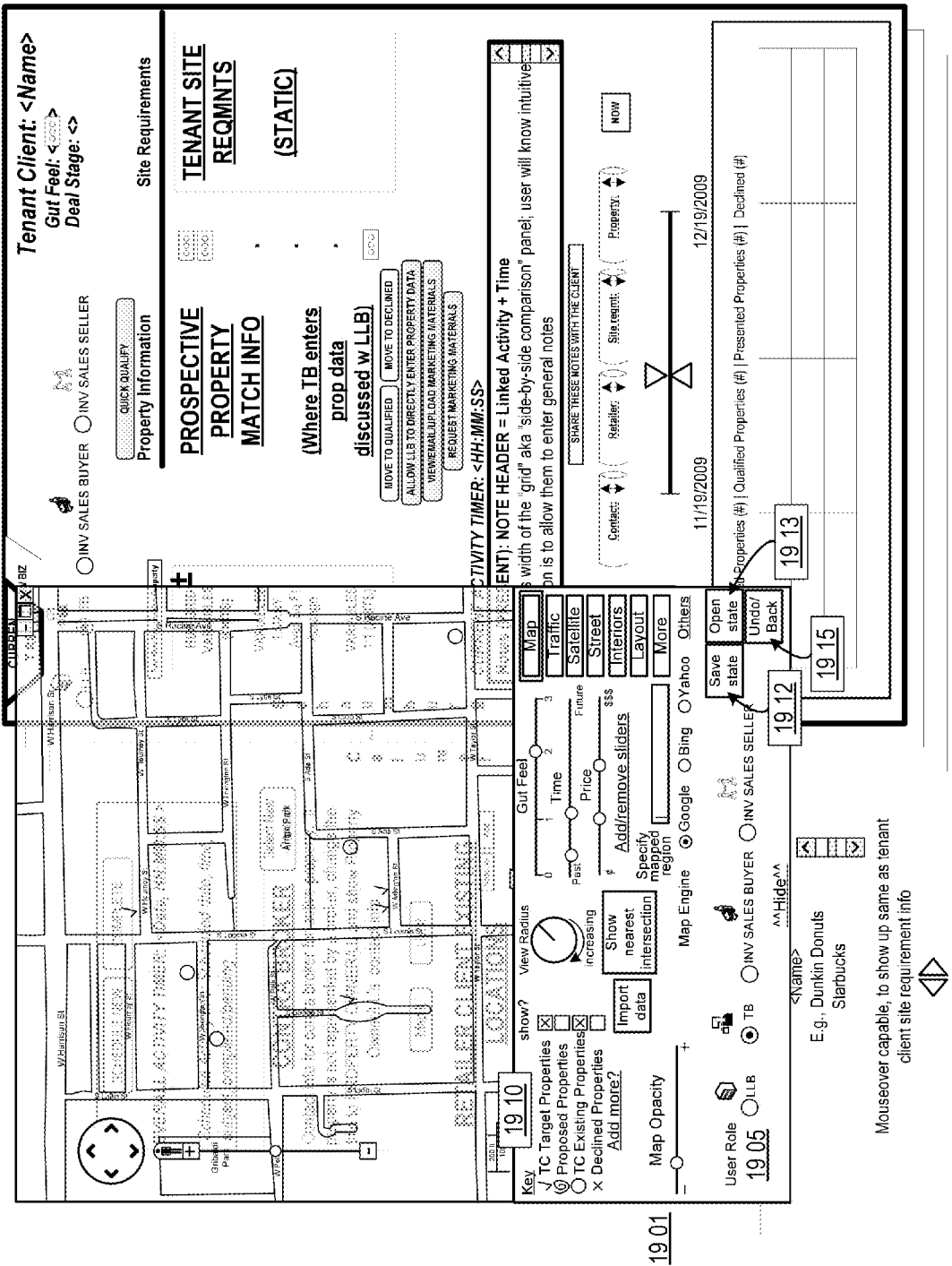
FIG. 19 shows an implementation of a HUB map user interface in another embodiment of HUB operation.

FIG. 19 shows an implementation of a HUB map user interface in another embodiment of HUB operation. In this implementation, a map control panel 1901 further includes user role selection elements 1905, whereby a user may set a desired role for association with and/or modification of the currently displayed map. In one implementation, data records associated with map data, displayed properties, panel tools, and/or the like may include connections with and/or to user role values. Selection of a user role may then have a variety of effects, such as but not limited to, changing panel tools, displayed properties, layer and/or subcategory designations and/or availability, and/or the like. For example, in the implementation illustrated in FIG. 19, a tenant broker role is selected at 1905, and consequently the key at 1910 shows tenant-broker associated and/or specific layers and/or subcategories, including tenant client target properties, tenant client existing properties, and/or the like. In one implementation, a HUB map interface may further be configured with a button 1912, or other interface element, allowing a user to save a state of control panel settings. For example, in one implementation, the HUB may maintain one or more data records having fields corresponding to each of the options in the map control panel, and saving a state may cause current values of those interface options to register as saved data values in the corresponding fields of those one or more data records. A user may then recover a given interface configuration by opening a saved state 1913. In one implementation, the HUB may automatically save a record of a finite number of previous control panel setting configurations, and allow a user to undo, step-back, and/or the like to recover a recent, prior control panel settings configuration via a corresponding interface element 1915.

Figure 20:
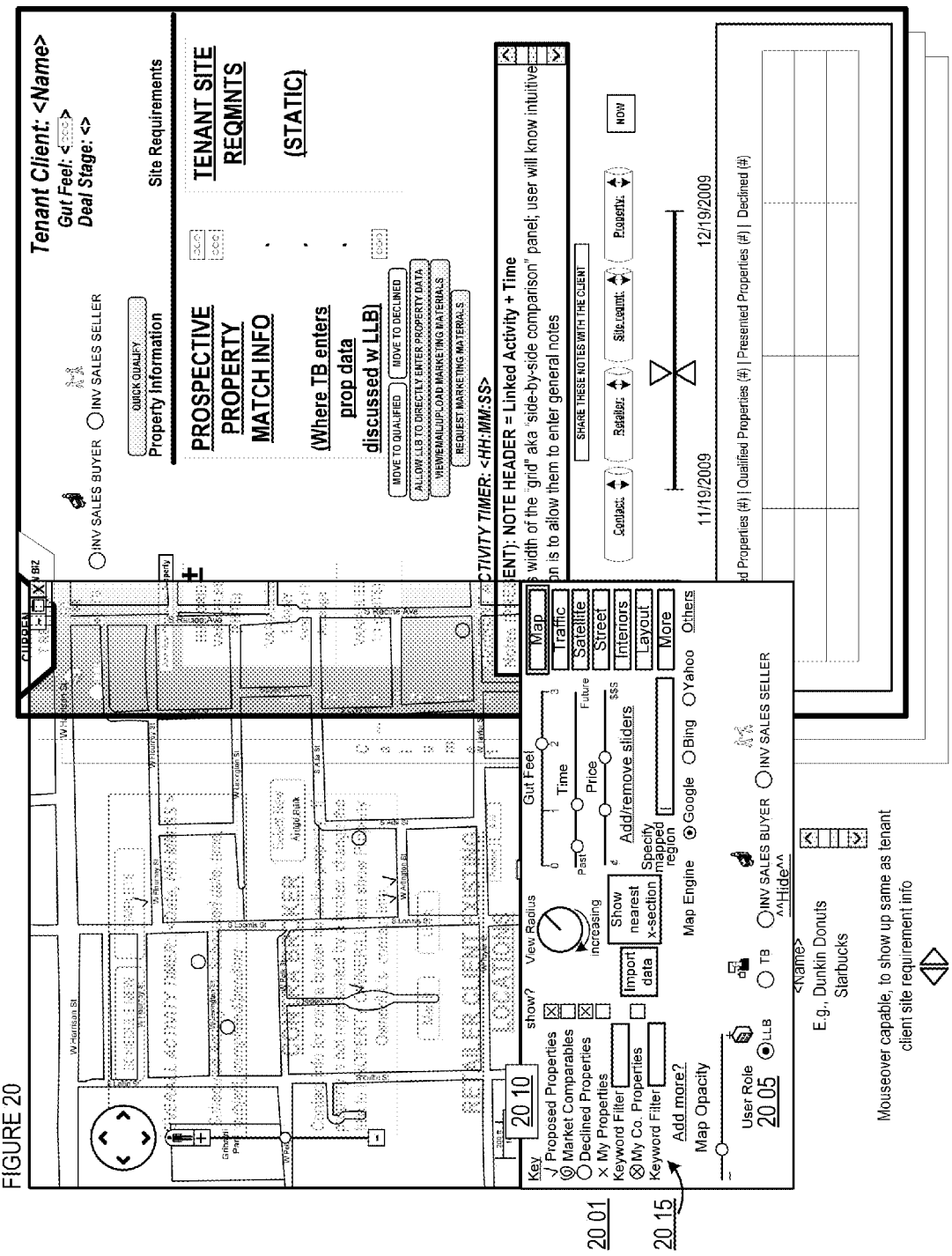
FIG. 20 shows an implementation of a HUB map user interface in another embodiment of HUB operation.

FIG. 20 shows an implementation of a HUB map user interface in another embodiment of HUB operation. As in FIG. 19, a control panel is shown 2001 with user role selection elements 2005, however here with a landlord broker role selected. Accordingly, the key at 2010 includes landlord broker associated and/or specific layers and/or subcategories, such as market comparables, and/or the like. The implementation of the displayed properties key shown in FIG. 20 further includes "My Properties" and "My Company Properties" options, which may allow a user in an LB role to view properties on a map such as those listed at element 215 of FIG. 2. These options in the displayed implementation further include fields 2015 admitting keywords, based upon which the displayed properties may be filtered. For example, entry of the keyword "Naperville" may cause only "My Properties" located in, and/or otherwise associated with, Naperville to be displayed on the map. In one implementation, a global keyword filter may be applied at once to more than one of the property types shown in the map key. In one implementation, properties shown in a map key may be displayed in a manner similar to nested folders such as those shown at 215 in FIG. 2. It should be noted that the implementations shown in FIGS. 19 and 20 are for illustrative purposes only, and that a wide variety of other roles (e.g., new business, investment sales, property management, disposition, and/or the like) and associated user interfaces may be implemented and/or available within a particular implementation.

Figure 21:
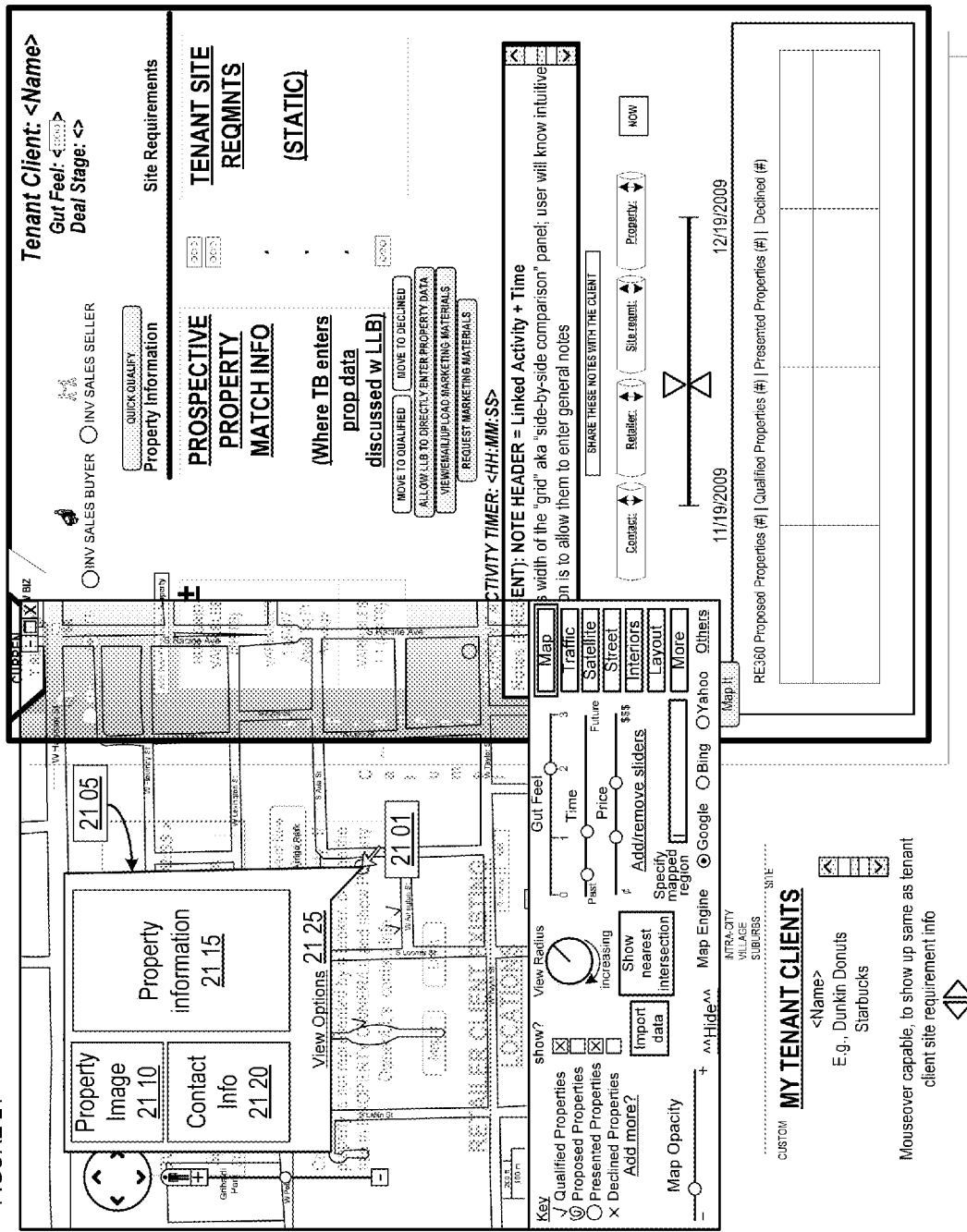
FIG. 21 shows an implementation of a HUB map user interface in another embodiment of HUB operation.

FIG. 21 shows an implementation of a HUB map user interface in another embodiment of HUB operation. In one implementation, an interface pointer element, such as a mouse pointer 2101, may be used to select, click on, mouse-over, and/or the like one or more mapped properties to produce a pop-up window, dialog box, and/or the like such as that shown at 2105. In one implementation, such a window 2105 may appear translucent or opaque, and/or may fade-in or fade-out depending on user interaction with the window and/or the map element(s) to which the window is connected. In one implementation, a user may be able to enter a timescale for fade-in and/or fade-out of the window 2105. The window 2105 may include a variety of information associated with the selected property, such as one or more property images 2110, other property information 2115 (e.g., property attributes from a HUB bifurcated display), and/or the like. The window 2105 may further include contact information 2120, such as for one or more contacts, tenants, landlord, brokers, and/or the like associated with the displayed property. The window 2105 may further include a selectable link to view other options 2125, such as to auto-populate other portions of the HUB interface (e.g., the bifurcated display) with information associated with the selected property, send the property information in an e-mail, generate a report associated with the property, view a nearest point of interest, view a site drive, view market comparables, add a push-pin to the map at the location of the property, edit property information, and/or the like.

Figure 22:
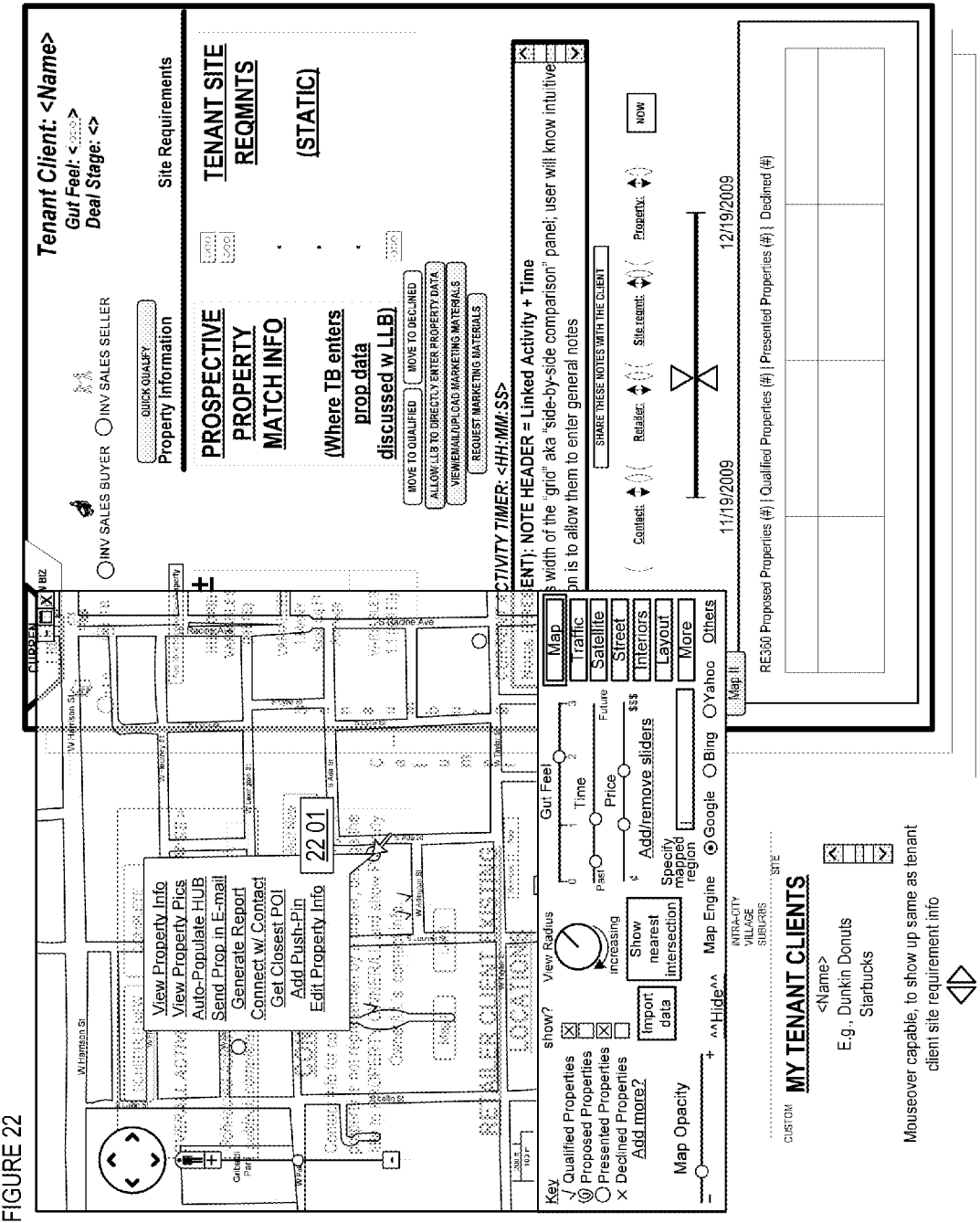
FIG. 22 shows an implementation of a HUB map user interface in another embodiment of HUB operation.

FIG. 22 shows an implementation of a HUB map user interface in another embodiment of HUB operation. Here, selection of a map data icon yields a window 2201 with a variety of options for manipulating, interacting with, viewing, and/or the like map data and/or associated property information. Such options may, for example, include viewing of property information associated with the selected icon; viewing of associated property pictures, exteriors, interiors, layouts, and/or the like; auto-population of a portion of the HUB interface (e.g., the bifurcated display) based on property information and/or property records associated with the selected map icon; sending property information in an e-mail message, instant message, fax, and/or the like; generation of one or more reports (e.g., PDF documents, word processing documents, spreadsheets, and/or the like) containing property information associated with the selected map icon; initiation of a communication connection (e.g., phone call, e-mail message, instant messaging session, and/or the like) with a contact (e.g., client, tenant, landlord, broker, agent, bank, mortgage professional, and/or the like) associated with the selected map icon; querying and/or displaying one or more nearby points of interest, site drives, cross-streets and/or intersections, market comparables, shopping centers, schools, libraries, police stations, and/or the like; adding a push-pin or other map marker at the location of the selected map icon; editing property information associated with the selected map icon; and/or the like.

Figure 23:
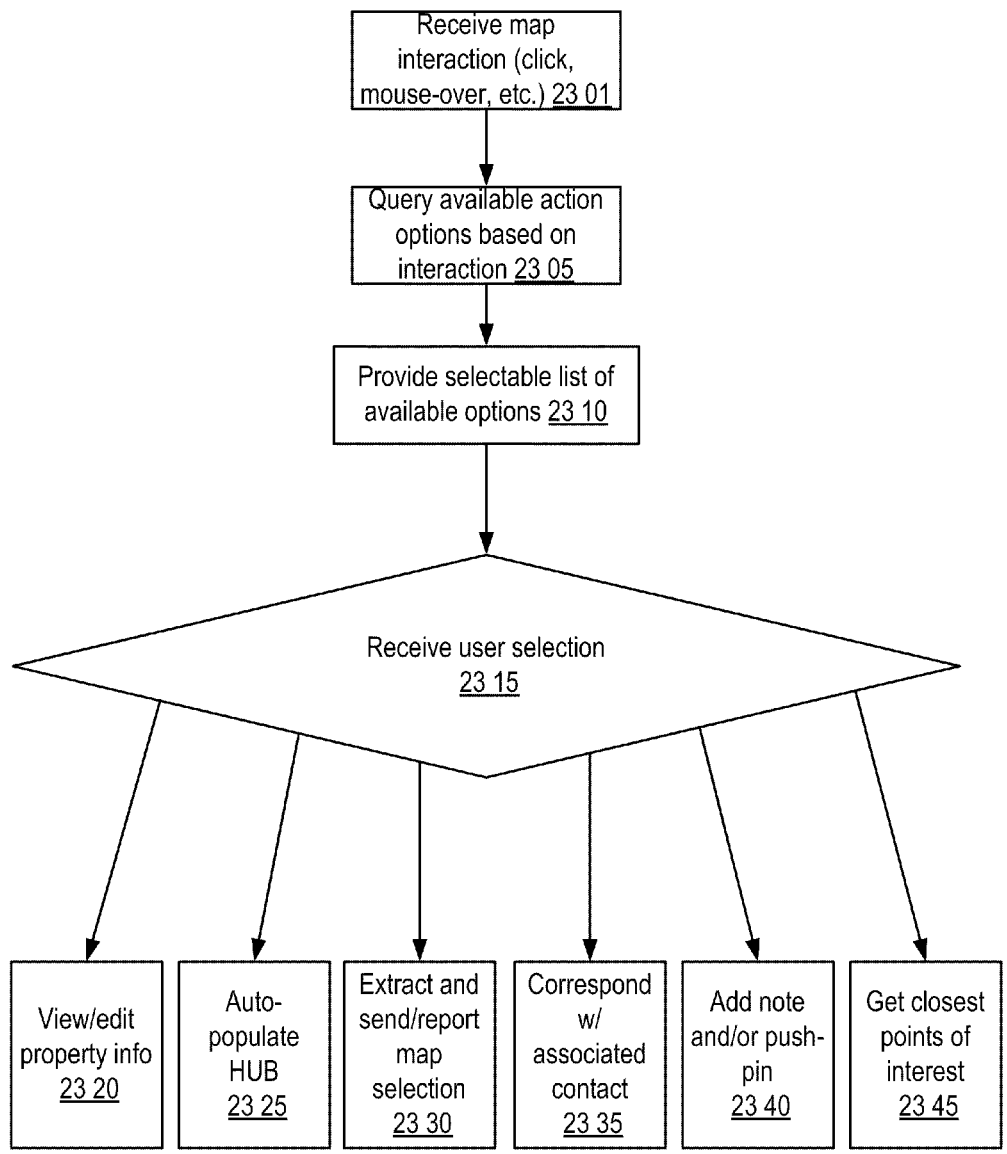
FIG. 23 shows an implementation of logic flow for map interaction and data extraction in one embodiment of HUB operation.

FIG. 23 shows an implementation of logic flow for map interaction and data extraction in one embodiment of HUB operation. An indication of a map interaction may be received 2301, such as a click, mouse-over, and/or the like on a location, icon, and/or the like within a displayed map. In response to the interaction, the HUB may query available action options 2305. Available actions may depend on a variety of factors, such as but not limited to the type of location selected, the type of interaction therewith, a selected user role, user authorizations, contact availability, property information availability, and/or the like. The HUB may provide a selectable list of available options for display to the user 2310, and receive a selected option therefrom 2315. Selectable options may include, but are not limited to, those discussed above with relation to FIGS. 21 and 22, such as viewing and/or editing property information and/or associated property records 2320; auto-populating portions of the HUB user interface, such as the bifurcated display 2325; extracting and sending and/or reporting selections of a map and/or associated property information 2330; corresponding with a contact associated with map data 2335; add a note, push-pin, and/or other marker or information for association with a point on a displayed map, a map icon, property, and/or the like 2340; get closes points of interest to a selected point 2345; and/or the like.

Figure 24:
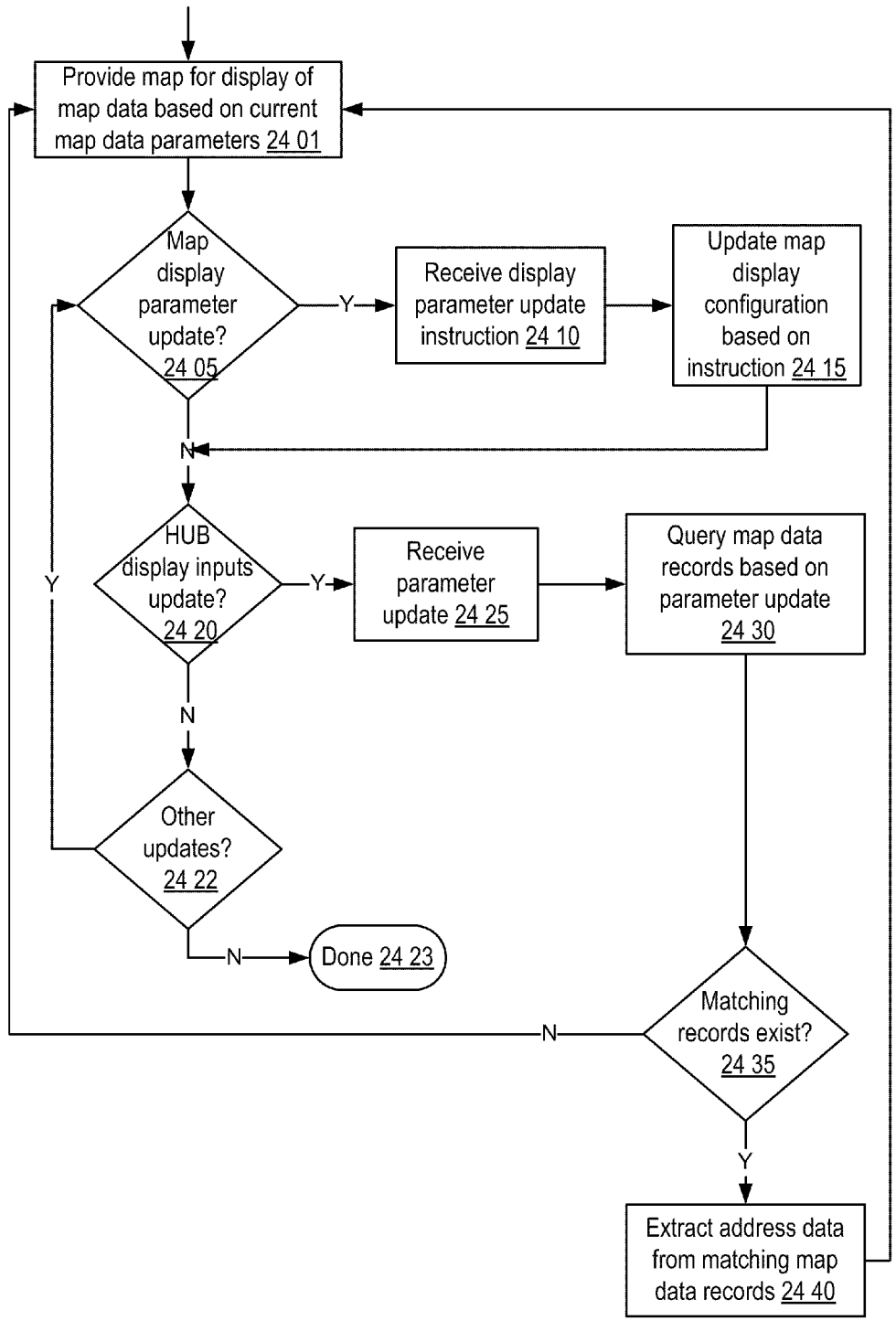
FIG. 24 shows an implementation of logic flow for dynamic map updating in one embodiment of HUB operation.

FIG. 24 shows an implementation of logic flow for dynamic map updating in one embodiment of HUB operation. A displayed map may be updated in real time based on user interactions, such as the variation of panel tool settings, map data inputs, and/or the like. A map may be provided with a display of map data based on current map data parameters and/or map settings 2401. A determination may then be made as to whether there are any map display parameter updates 2405. In one implementation, map display parameter updates may comprise the manipulation, adjustment, and/or the like of any of the panel tools shown in FIGS. 18-20. If an update exists, the instruction for that update may be received 2410 and the map display configuration may be updated based on the received instruction 2415. A determination may also be made as to whether HUB display inputs have been updated 2420. In one implementation, HUB display inputs may comprise entries to existing and/or desired property characteristics and/or requirements, such as those which may be entered into the bifurcated display of a HUB interface (see, e.g., element 143 of FIG. 1). In another implementation, HUB display inputs may include any information stored in a property record. If updates exist, they may be received 2425 and the HUB may query map data records based on the received parameter update 2430. Based on that query, a determination may be made as to whether one or more data records exist matching the submitted update and/or query 2435. If not, then the HUB may return to 2401 and provide a map for display based on the prior set of mapped records. In one implementation, an error message may further be provided and/or other error handling procedures undertaken. If one or more matching records exists, address data may be extracted therefrom 2440 and used to generate a map with new map data 2401. The HUB may also determine whether additional updates have been, can be, or will be provided 2422 and, if not, map updating may be complete 2423. In one implementation, a map update may be correlated to the date and/or time that a specific file name and/or data record identifier was last updated, such that a user can scroll through previously stored files and/or data records and updates maps based thereupon as ordered, e.g., by date relevance.

Figure 25:
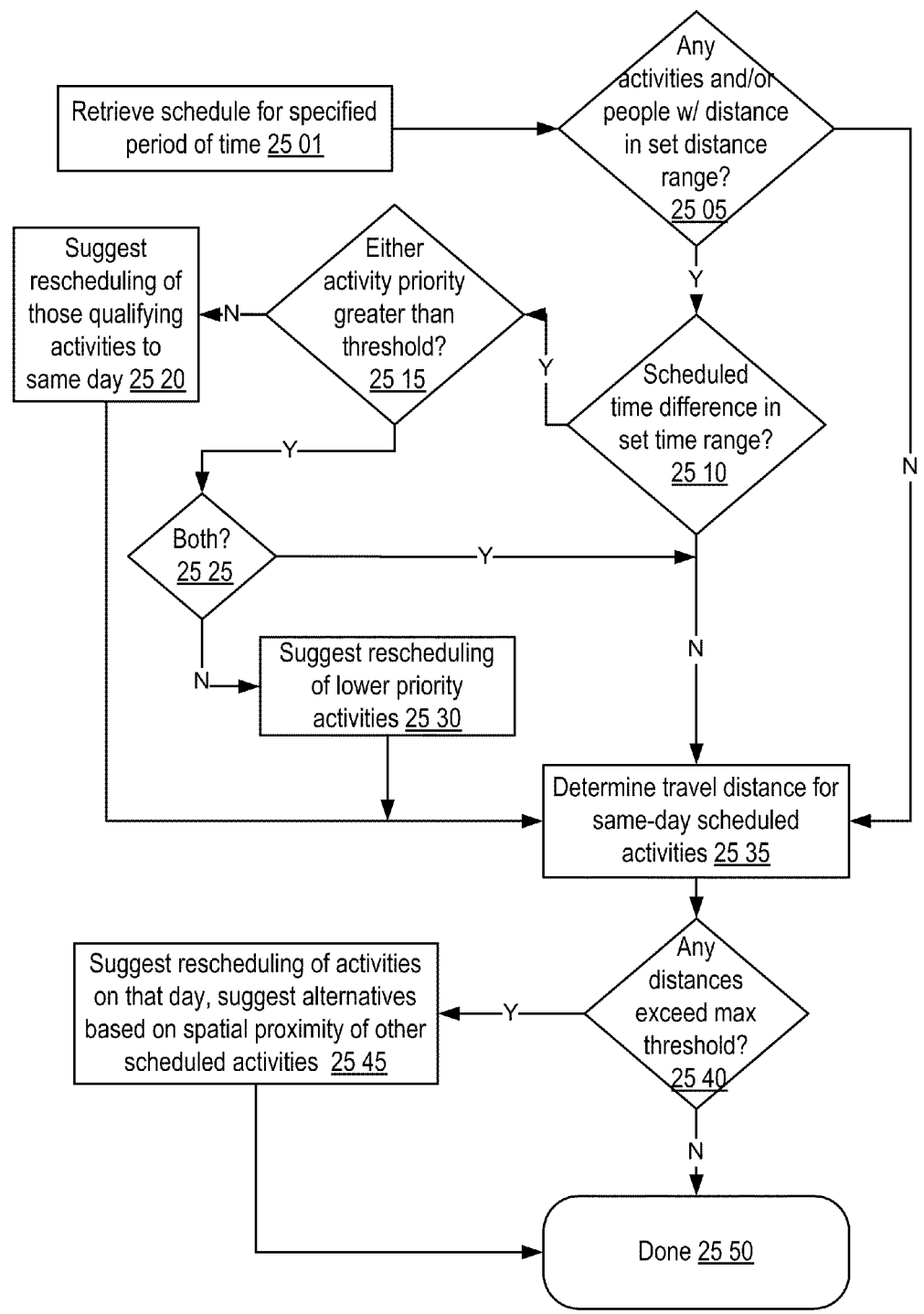
FIG. 25 shows an implementation of logic flow for spatiotemporal schedule optimization in one embodiment of HUB operation.

In keeping track of user scheduled activities, calendars, and/or the like, the HUB and/or HUB data records may track both temporal and spatial information associated therewith, such as the times and locations of scheduled appointments. The HUB may further contain information about the identities of appointment counterparties and/or meeting participants. Based on these collections of information, the HUB may allow for optimization of user schedules, such as to minimize travel times and/or distances, provide intelligent suggestions for potential new appointments based on proximity to existing appointments, group scheduled activities in time that have close spatial locations and/or separate activities in time that have disparities in spatial location, and/or the like. FIG. 25 shows an implementation of logic flow for spatiotemporal schedule optimization in one embodiment of HUB operation. Schedule information may be retrieved for a specified period and/or range of time 2501, such as from one or more data records associated with a user ID. In one implementation, schedule information may comprise a series of times and locations of scheduled activities and/or appointments (and their correlated priorities, e.g., high, medium, low). A determination may be made as to whether any of the activities, activity counterparts, and/or the like have a distance from each other that is within a set distance range, such as less than a threshold distance 2505. If so, then a determination may be made as to whether the difference between scheduled times for those activities is in a set time range, such as less than a threshold time difference but greater than the duration of the activities themselves 2510. If so, then, in an implementation where activities have designated priority values, a determination may be made as to whether any set activity priority values are greater than a threshold priority value 2515. If not (e.g., both activities have sufficiently low associated priority values), then the HUB may suggest rescheduling of those qualifying activities to the same day 2520. In one implementation, upon confirmation of rescheduling, an e-mail message, text message, instant message, alert, and/or the like notice may be provided to parties associated with the activity for notification and/or confirmation. In an alternative implementation, the HUB may automatically update a schedule and/or generate a new schedule with the activities rescheduled to the same day. If either of the activities have a priority higher than a threshold value at 2515, then a determination may be made as to whether both activities have a priority value exceeding the threshold 2525. If so (e.g., both activities have sufficiently high associated priority values), then no rescheduling is made at that time, and the HUB moves to 2535. If one of the activities has lower priority than the threshold, though, the HUB may suggest rescheduling of that lower priority activity to be on the same day as the higher priority activity 2530. The HUB may further determine one or more travel distances, such as a total day travel distance, for activities in the schedule that are scheduled on the same day 2535. In one implementation, travel distances may be determined based on tools in a map engine API toolkit. A determination may be made as to whether any of the determined distances exceed a maximum distance threshold 2540. If so, then the HUB may suggest rescheduling of activities on a day having a sufficiently large travel distance and/or may suggest alternative days to reschedule activities based on spatial proximity of activities 2545, after which spatiotemporal schedule optimization may conclude 2550.

Figure 26:
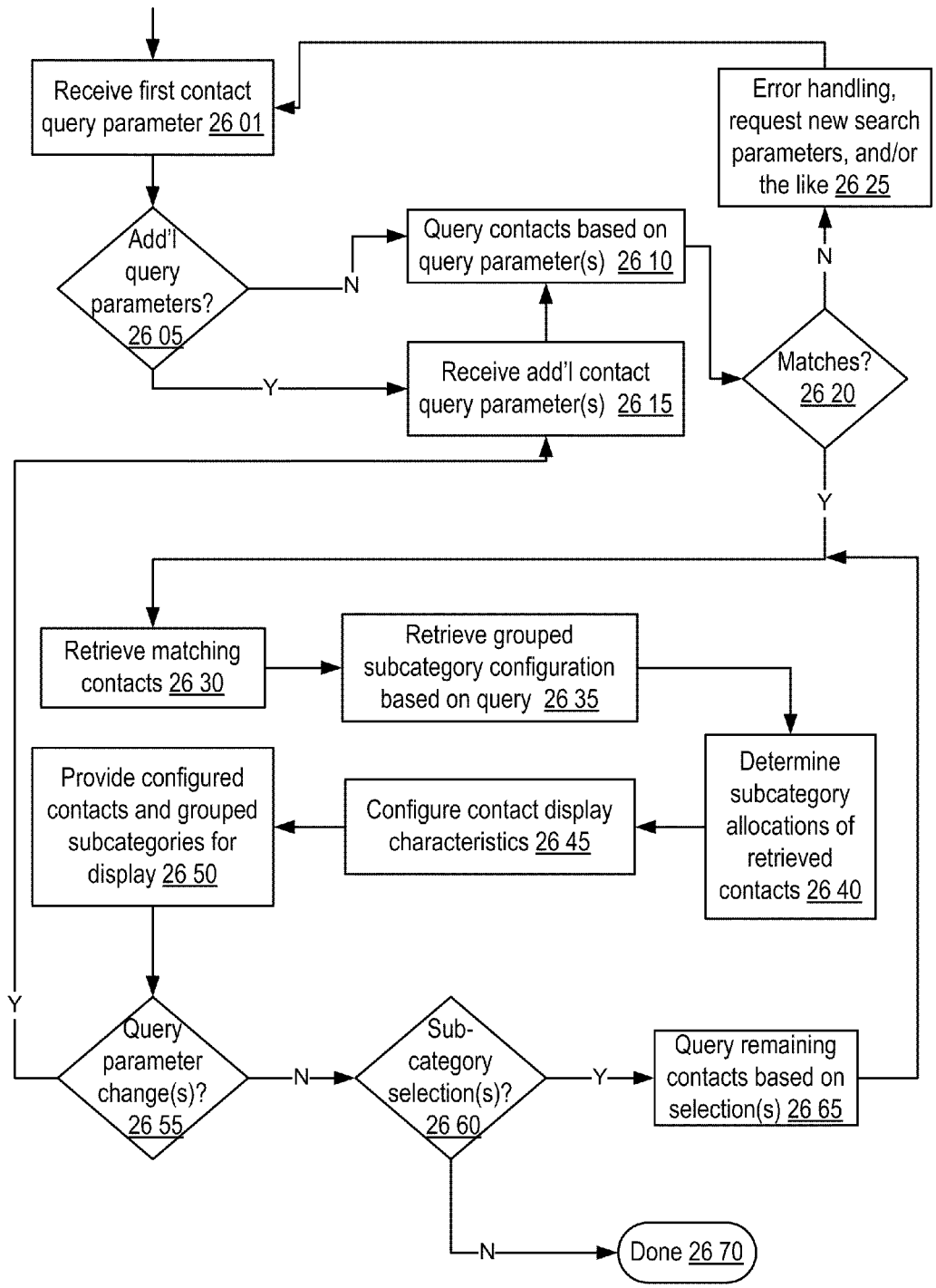
FIG. 26 shows an implementation of logic flow for a contact searching rolodex in one embodiment of HUB operation.

FIG. 26 shows an implementation of logic flow for a contact searching rolodex in one embodiment of HUB operation. The contact searching rolodex may allow for efficient and user-friendly organization, search and display of a user's list of contacts. A first contact query parameter may be received 2601, such as a contact identifier and/or characteristics, property identifier and/or characteristics, and/or the like. A determination may then be made as to whether there are to be additional query parameters 2605 and, if so, those parameters are received 2615. Contacts and/or contact records may then be queried based on received query parameters 2610. A determination may be made as to whether any matching contacts exist for the submitted query 2620 and, if not, then an error handling procedure may be undertaken, such as providing an error message, requesting the entry of new and/or modified search parameters, and/or the like 2625. If one or more matches are found at 2620, then matching contact information may be retrieved 2630. The HUB may further retrieve and/or determine grouped subcategory configuration information based on the query and/or the retrieved results 2635. In one implementation, grouped subcategory information may include any of a variety of subcategory identifiers into which contacts may be grouped, such as but not limited to: company, retail category, state or other geographic designation, job title, role, HUB status and/or label, contact type, scheduled activity status, communication frequency and/or recentness, and/or the like. In one implementation, subcategories may have further subcategories nested therein. In one implementation, the list of grouped subcategories and/or nested subcategories selected and/or retrieved at 2635 may depend on the received query parameters, retrieved results, a user role, user history (e.g., my properties, my LL properties, my tenant clients, and/or the like), and/or the like. The HUB may then determine subcategory allocations of retrieved contacts 2640, such as may comprise a number of retrieved contacts associated with and/or allocatable to each of the retrieved subcategory labels. For example, all contacts who are located in the state of California may be identified with the CA subcategory, and a number may be determined of all such identified contacts. Contact display characteristics may then be configured 2645, such as described in one implementation in FIG. 27. The HUB may then provide configured contacts and grouped subcategories for display 2650. In one implementation, configured contacts may be provided at one side of an interface display while a listing of subcategory labels may be provided on another side of the interface display (e.g., with numbers of matching contacts, determined at 2640, displayed next to each subcategory label). A determination may be made as to whether there are any query parameter changes, additions, subtractions, and/or the like 2655 and, if so, then the HUB may return to 2615. Otherwise, a determination may be made as to whether any sub-category selections have been received 2660. In one implementation, a subcategory selection may be registered when a user clicks on, mouses over, and/or otherwise interacts with a subcategory label in the HUB user interface. If a subcategory selection is registered, the HUB may query remaining contacts (e.g., those contacts retrieved in response to the prior set of query parameters and/or subcategory selections) based on the new subcategory selection 2665 and return to 2630 to retrieve contacts matching the new query. Otherwise, the contact selection and display may conclude 2670.

Figure 27:
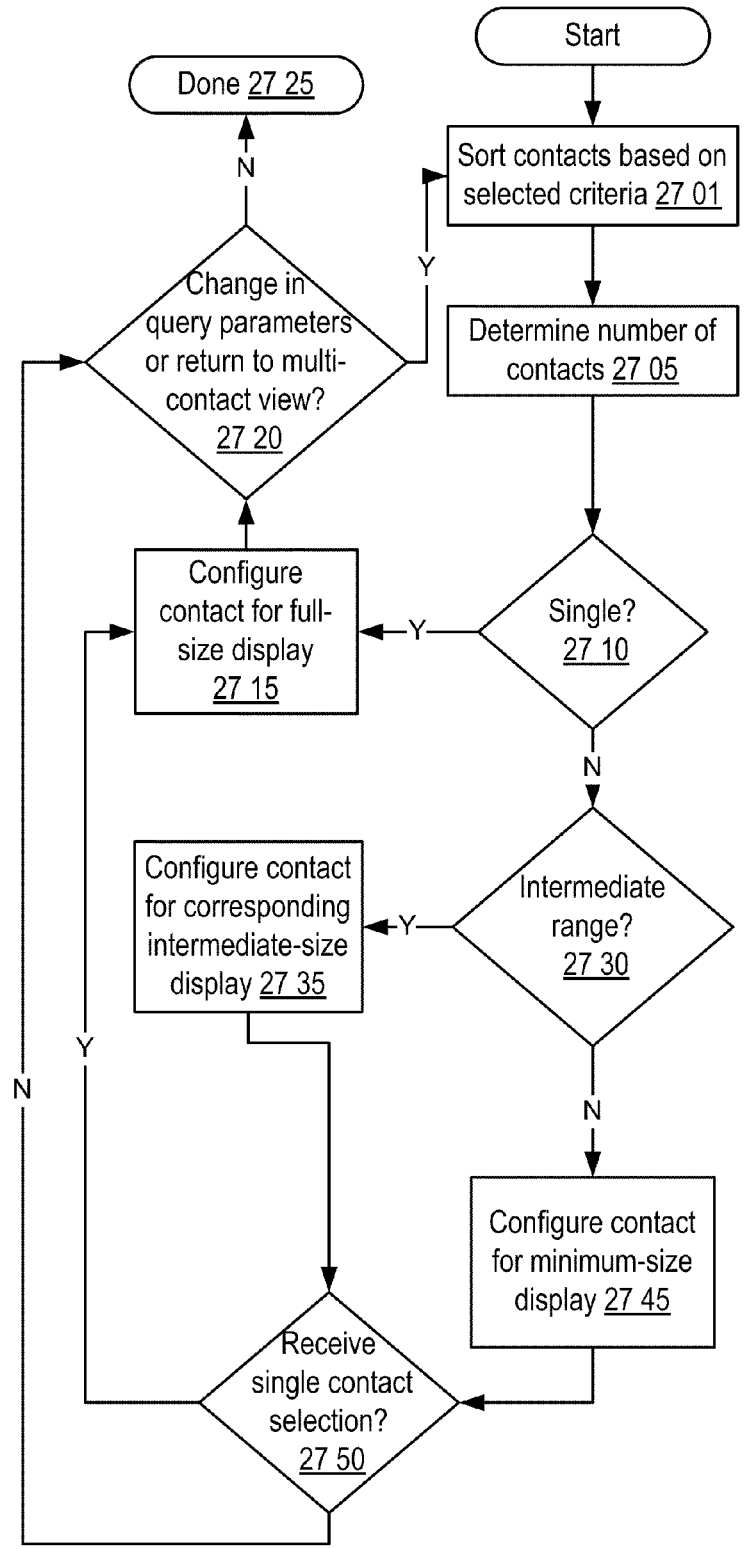
FIG. 27 shows an implementation of logic flow for contact display configuration in one embodiment of HUB operation.

FIG. 27 shows an implementation of logic flow for contact display configuration in one embodiment of HUB operation. A HUB contact display configuration flow, such as that shown in one implementation in FIG. 27, may allow for optimization of display parameters to maximize useful information displayed to the user in response to a contact query. Contacts may be sorted based on one or more selected criteria 2701, such as alphabetically, by frequency and/or recentness of correspondence, by priority value, by number and/or value of associated properties, by distance, and/or the like. The number of contacts to be displayed may be determined 2705, such as by counting the number of contact records retrieved in response to a submitted query, and a determination made as to whether there is only a single contact 2710. If so, contact information associated with the single contact may be configured for full size display, such as to occupy the entire screen and/or an entire designated area for contact information, include all available contact information that can be displayed in the screen, and/or the like. In one implementation, where a single contact exists, contact information associated with the single contact may be provided for full-size and/or full-screen display without any need for a mouse click or other further interaction from a user to open or engage such a display. If there is not a single contact at 2710, then a determination may be made as to whether the number of contacts falls into an intermediate range of values 2730. If so, then the contact information associated with those contacts may be configured for intermediate-size display 2735, for example to show approximately 3-5 contacts on the page at a time. If the number of contacts is greater than the intermediate range at 2730, then contact information may be configured for minimum size display 2745, such as showing only a single line for each contact. For any multi-contact display (e.g., 2735 and/or 2745), a determination may be made as to whether a single contact selection has been received 2750, such as a user clicking on, mousing over, and/or otherwise interacting with a single contact from the list of contacts. If so, then the HUB may return to 2715 to configure the displayed contact for full-size display. A determination may be made as to whether a change in contact query parameters is received or if the user specifies a desire to return to a multi-contact view after having selected a single contact therefrom 2720. If such a change and/or desire is registered, the HUB may return to 2701. Otherwise, contact display configuration may conclude 2725.

Figure 28:
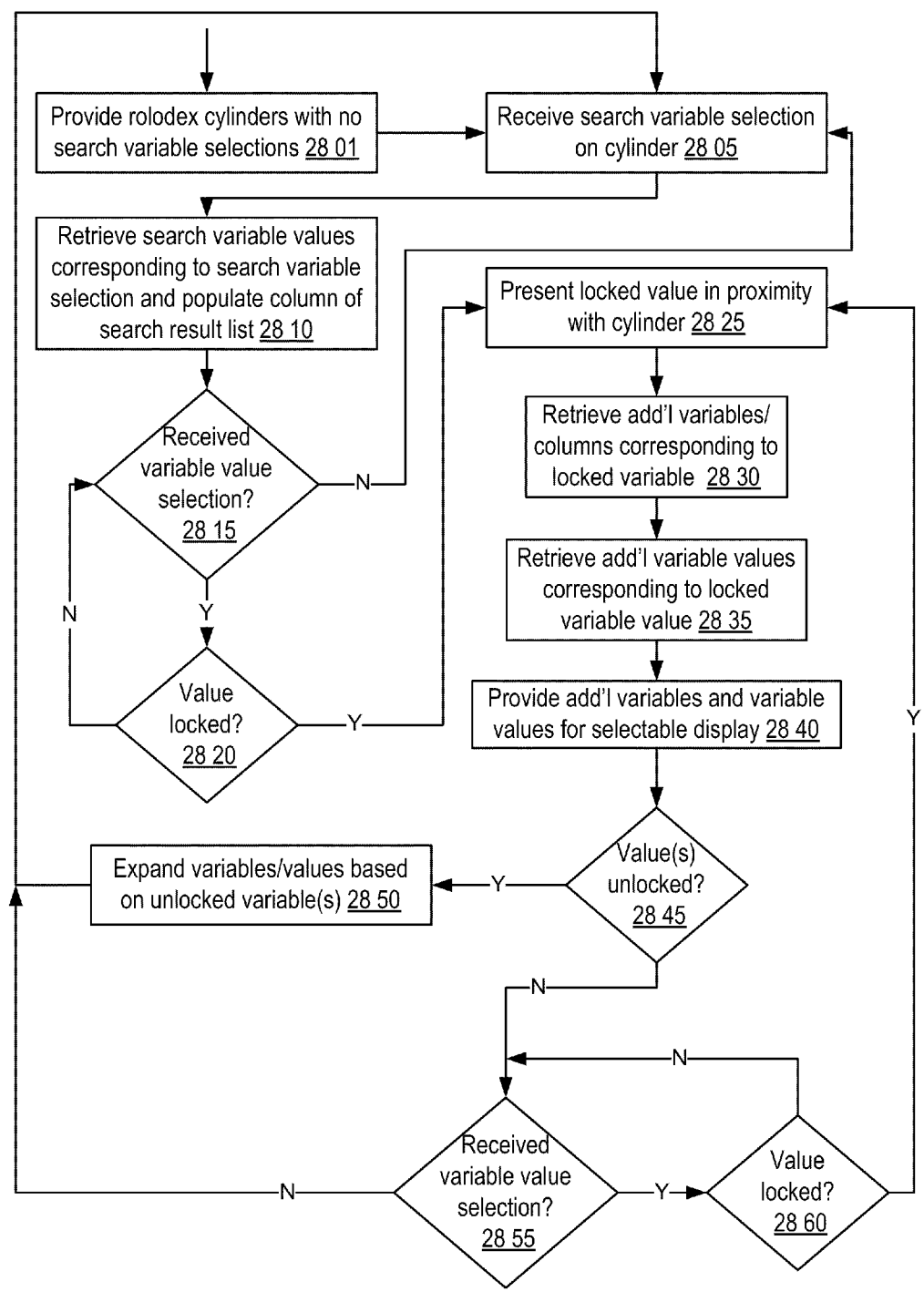
FIG. 28 shows an implementation of logic flow for a prospect generation rolodex in one embodiment of HUB operation.

FIG. 28 shows an implementation of logic flow for a prospect generation rolodex in one embodiment of HUB operation. A HUB prospect generation flow, such as that shown in the example implementation of FIG. 28, provides a powerful facility for searching information, performing nested search procedures, and quickly identifying desired and/or useful information from a collection of data. A prospect generation rolodex interface may, in one implementation, comprise a collection of rollable cylinder elements (i.e., "cylinders," "rollers," and/or the like, where these terms are used interchangeably herein), or other such interface elements, by which a user may specify variable names and/or values. In one implementation, variable names made available on one or more given rollers may be based on categories of information associated with contacts, properties, and/or the like and/or on fields in data records associated therewith. In one implementation, available search variables may further depend on a user role, an initial user query, and/or the like. The HUB may provide rolodex cylinders in an initial and/or default state, such as with no search variable selections 2801. The user may then specify, and the HUB may receive, a first search variable selection on one of the cylinders 2805. Based on the selected first search variable, the HUB may then retrieve possible values for the retrieved search variable and populate a column corresponding to the roller on which the variable has been set with the retrieved values 2810. In one implementation, the HUB may query existing data records and/or historical user activities to find all values of the selected variable existing in those records, and may only populate the column with those existing variable values. A determination may be made as to whether a variable value has been selected, such as by clicking or mousing over by a user 2815. If so, then a determination is made as to whether the selected value has been locked 2820. A user may lock a variable value by selecting a lock option, double-clicking the value, and/or otherwise registering a desire to lock the value by an appropriate user interface element. If no lock has occurred, the HUB may return to 2815. Otherwise, once a variable value is locked, the locked value of the variable may be displayed in proximity with the roller and/or cylinder on which the associated variable is shown 2825. The HUB may then retrieve additional variables based on the locked variable 2830. For example, if a first variable is locked on a first value, the HUB may restrict itself to data records having that first variable with the first value, and may limit available variables on the remaining rollers to those that are relevant to and/or have non-trivial values within the remaining data records. The HUB may further restrict values for the remaining variables to those values that exist in data records who have a first variable with the locked first value 2835. The additional variables and associated variable values may then be provided for selectable display on the remaining rollers 2840. A determination may be made as to whether any locked variables have been unlocked 2845 and, if so, available variables and/or values corresponding to that unlocked variable may be expanded 2850. If there is no unlocking at 2845, a determination may be made as to whether a variable value has been selected on any column of values corresponding to a variable-set roller 2855. If not, the HUB may return to 2805 to receive further search variable selections on one or more rollers. If a variable has been selected at 2855, a determination is made as to whether that variable value has been locked 2860. If not, the HUB may return to 2855 until a value is locked. Once a value has been locked at 2860, the HUB may return to 2825 to further refine available variables and/or variable values on any remaining rollers. Upon locking of all variables, retrieved results may be provided for display therebelow.

In one embodiment, the HUB may be configured to effectuate intelligent inbox coordination, which may facilitate the processing of messages configured as email messages, XML data, HTTP POST message content, and/or the like for economical display and interaction. The HUB's intelligent inbox coordination features may allow for the distillation of large volumes of message data and/or content to highlight and/or direct users to the particular message and/or attachment containing data that is most interesting or relevant to them. Aspects of HUB intelligent inbox coordination features may include the generation and application of email allocation rules and/or sub-rules; analysis, parsing, intelligently filing and sub-filing, and/or other processing of email content, attachments, and/or other associated data; generation of message and/or message data analytics, statistics, summaries, industry trends, news content, and/or the like; and/or the like.

Figure 29:
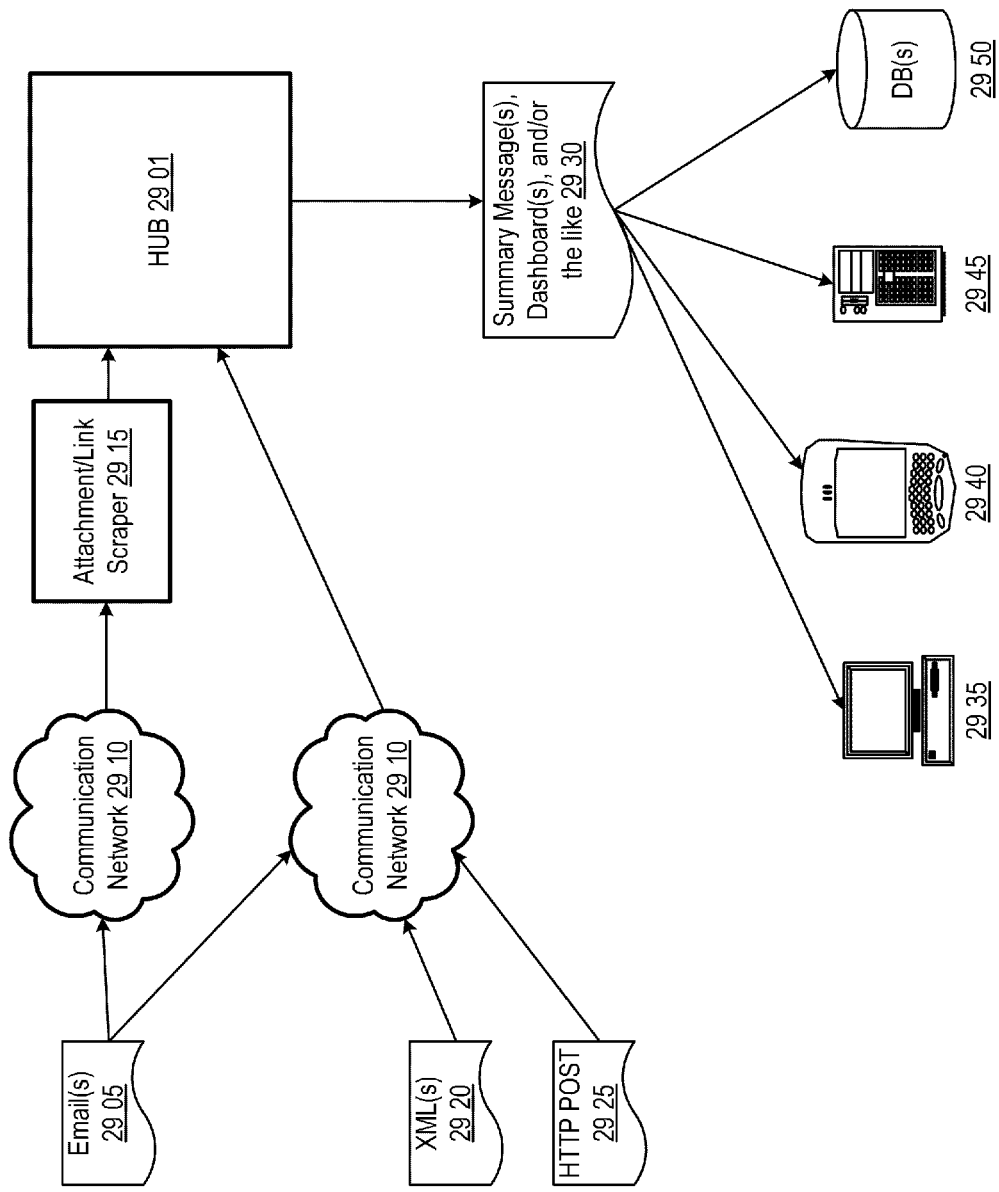
FIG. 29 shows an implementation of data flow between and among HUB components and affiliated entities in one embodiment of HUB operation.

FIG. 29 shows an implementation of data flow between and among HUB components and affiliated entities in one embodiment of HUB operation. The HUB 2901 may serve a central role to receive and process messages and to generate and/or output message summaries. For example, email messages 2905 may be received via a communication network 2910. In one implementation, email messages 2905 may be received at the HUB by being addressed to a HUB email address. In an alternative implementation, email messages may be passed through an intermediary facility for extracting attachments, accessing embedded links, scraping and/or parsing email content, and/or the like 2915. In another implementation, a user may manually pass and/or create rules to allow emails to pass. In one implementation, an attachment/link scraper 2915 may be configured as part of the HUB 2901 while, in another implementation, the attachment/link scraper 2915 may be configured as an external and/or third-party facility, data warehouse, and/or the like from which scraped and/or parsed email data is passed to the HUB 2901. In some implementations, other electronic messages may also be received and/or processed by the HUB 2901 and/or an attachment/link scraper 2915 component, such as but not limited to XML messages 2920, HTTP POST messages 2925, and/or the like. In accordance with apparatuses, methods and systems described herein, the HUB 2901 may process received messages in order to generate message analytics, statistics, summaries, and/or the like, such as may be configured for inclusion in one or more summary messages, message dashboard displays, and/or the like 2930, which may then be configured for, provided to, stored in and/or accessible by one or more client terminal devices 2935; mobile devices 2940; email and/or web servers 2945; system, web, email and/or the like databases 2950; and/or the like. In other implementations, the HUB may communicate with one or more devices, such as mobile devices, configured for code capture (e.g., scanning and/or imaging barcodes, 2D matrix codes, steganographic images, and/or the like), whereby such codes may contain data content which can be transmitted to and/or synced directly into the HUB and/or HUB databases.

Figure 30:
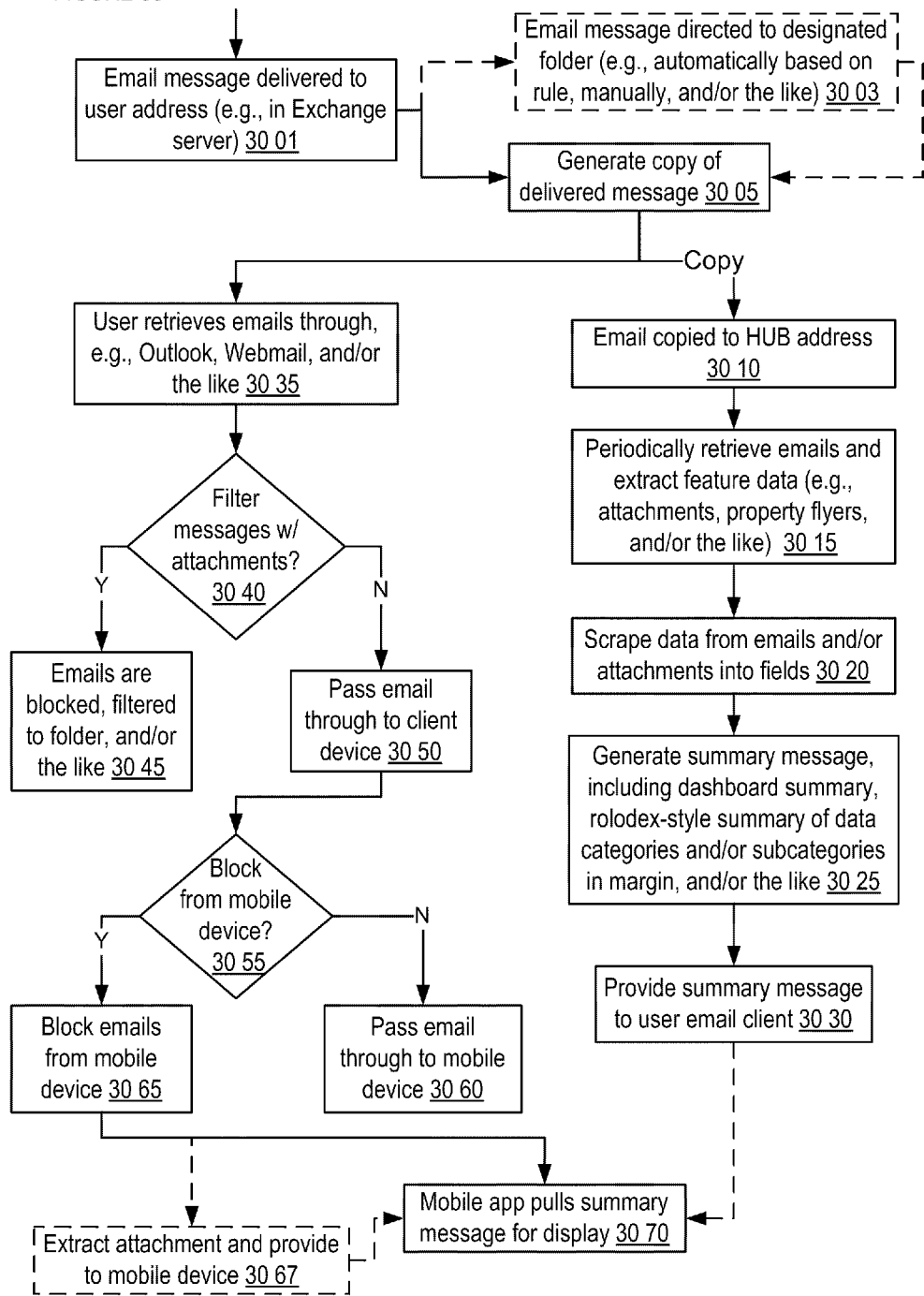
FIG. 30 shows an implementation of logic flow for intelligent inbox coordination in one embodiment of HUB operation.

FIG. 30 shows an implementation of logic flow for intelligent inbox coordination in one embodiment of HUB operation. Although FIG. 30 discusses an embodiment of the HUB directed to the processing of email messages, it is to be understood that the HUB may be configured to process other types of data transmissions, messages, code captures (e.g., barcodes), and/or the like in addition to and/or instead of email messages, such as but not limited to XML data, HTTP POST data, and/or the like. An email message, such as may be addressed to an individual user and/or to a group of users, may be delivered to a user address, such as via an exchange server 3001 or other email message processing, storage and/or access system. s (e.g., Outlook rules). A copy of the delivered message may then be generated 3005. In one implementation, copy generation may be based on an analysis of email content, sender address, attachment and/or link content, and/or the like, such as based on an evaluation of the email message vis a vis one or more email rules (e.g., Outlook rules). In one implementation, all email messages in a user's inbox may be evaluated to determine if a copy is to be generated. In another implementation, email messages may be initially directed to one or more designated email folders and/or subfolders, such as manually by a user and/or automatically based on an evaluation of those messages in accordance with one or more email rules 3003. In various implementations, such rules may be designated by a user, automatically generated, and/or the like, as discussed in accordance with various embodiments and implementations herein. Copies may then be generated at 3005 for emails residing in and/or otherwise associated with the designated folders. In one implementation, code for inserting rules into an email management program (e.g., Microsoft Outlook) within embodiments of HUB operation may take a form similar to the following example:

```
namespace EMailStatsAddIn
{
    using System;
    using Microsoft.Office.Core;
    using Extensibility;
    using System.Runtime.InteropServices;
    using Outlook = Microsoft.Office.Interop.Outlook;
    using System.Windows.Forms;
    [GuidAttribute("F73EF012-69B8-4349-83F9-5BFCD50C538D"),
ProgId("EMailStatsAddIn.Connect")]
    public class Connect : Object, Extensibility.IDTExtensibility2
    {
        IniFile iniObj = new IniFile(@"C:\\Program Files\\Citigo\\Flyer
Filter\\FlyerFilter_property.ini");
        private Outlook.Application applicationObject;
        private object addInInstance;
        // Our UI will consist of a single CommandBarButton
        private CommandBarButton btnGetEMailStats;
        /// <summary>
        ///         Implements the constructor for the Add-in object.
        /// </summary>
        public Connect( )
        {
        }
        /// <summary>
        ///         Implements the OnConnection method of the IDTExtensibility2
interface.
        ///         Receives notification that the Add-in is being loaded.
        /// </summary>
        /// <param term='application'>
        ///         Root object of the host application.
        /// </param>
        /// <param term='connectMode'>
        ///         Describes how the Add-in is being loaded.
        /// </param>
        /// <param term='addInInst'>
        ///         Object representing this Add-in.
        /// </param>
        public void OnConnection(object application,
Extensibility.ext_ConnectMode connectMode,
            object addInInst, ref System.Array custom)
        {
            // Cast to a strongly typed Application class.
            applicationObject = (Outlook.Application)application;
            addInInstance = addInInst;
            // If we are not loaded upon startup, forward to
OnStartupComplete( )
            // and pass the incoming System.Array.
            if (connectMode != ext_ConnectMode.ext_cm_Startup)
            {
                OnStartupComplete(ref custom);
            }
        }
        /// <summary>
        ///         Implements the OnDisconnection method of the IDTExtensibility2
interface.
        ///         Receives notification that the Add-in is being unloaded.
        /// </summary>
        /// <param term='disconnectMode'>
        ///         Describes how the Add-in is being unloaded.
        /// </param>
        /// <param term='custom'>
```

```
            ///         Array of parameters that are host application specific.
            /// </param>
            public void OnDisconnection(Extensibility.ext_DisconnectMode
disconnectMode, ref System.Array custom)
            {
                // If this Add-in is unloading from the host, but the
                // application is not shutting down, forward to our
                // OnBeginShutdown( ).
                if (disconnectMode !=
                        ext_DisconnectMode.ext_dm_HostShutdown)
                {
                    OnBeginShutdown(ref custom);
                }
                applicationObject = null;
            }
            ///         Implements the OnAddInsUpdate method of the IDTExtensibility2
interface.
            ///         Receives notification that the collection of Add-ins has
changed.
            public void OnAddInsUpdate(ref System.Array custom)
            {
            }
            ///         Implements the OnStartupComplete method of the
IDTExtensibility2 interface.
            ///         Receives notification that the host application has completed
loading.
            public void OnStartupComplete(ref System.Array custom)
            {
                #region Create GUI.
                // First, get access to Outlook's CommandBars on
                // the active explorer.
                CommandBars commandBars =
                        applicationObject.ActiveExplorer( ).CommandBars;
                try
                {
                    // If our button is already
                    // on the Standard CommandBar, use it.
                    btnGetEMailStats = (CommandBarButton)
                            commandBars["Standard"].Controls["Create Flyer Filter for
this Email"];
                }
                catch
                {
                    // If our button is not there,
                    // we may make a new instance.
                    // Note that the Add( ) method was
                    // defined to take optional parameters,
                    // which are not supported in C#.
                    // Thus we must specify Missing.Value.
                    btnGetEMailStats = (CommandBarButton)
                        commandBars["Standard"].Controls.Add(1,
                        System.Reflection.Missing.Value,
                        System.Reflection.Missing.Value,
                        System.Reflection.Missing.Value,
                        System.Reflection.Missing.Value);
                    btnGetEMailStats.Caption = "Create Flyer Filter for this
Email";
                    btnGetEMailStats.Style = MsoButtonStyle.msoButtonCaption;
                }
                // Setting the Tag property is not required, but can be used
                // to quickly retrive your button.
                btnGetEMailStats.Tag = "Create Flyer Filter for this Email";
                // Setting OnAction is also optional, however if you specify
                // the ProgID of the Add-in, the host will automatically
                // load the Add-in if the user clicks on the CommandBarButton when
                // the Add-in is not loaded. After this point, the Click
                // event handler is called.
                btnGetEMailStats.OnAction = "!<EMailStatsAddIn.Connect>";
                btnGetEMailStats.Visible = true;
                btnGetEMailStats.Click += new
                        _CommandBarButtonEvents_ClickEventHandler(
                        btnGetEMailStats_Click);
                #endregion
            }
            ///         Implements the OnBeginShutdown method of the IDTExtensibility2
interface.
            ///         Receives notification that the host application is being
unloaded.
```

```
        public void OnBeginShutdown(ref System.Array custom)
        {
                // Delete our button.
                CommandBars commandBars =
                        applicationObject.ActiveExplorer( ).CommandBars;
                try
                {
                        // Find our button and kill it.
commandBars["Standard"].Controls["Statistics"].Delete(System.Reflection.Missing
.Value);
                }
                catch (System.Exception ex)
                { MessageBox.Show(ex.Message); }
        }
void CreateActionRule( )
        {
                Outlook.Rules ruless =
applicationObject.Session.DefaultStore.GetRules( );
                for (int k = 1; k < ruless.Count; k++)
                {
                        if (ruless[k].Name.Equals("ActionAndDecissionRule"))
                                return;
                }
                Outlook.MAPIFolder inbox =
applicationObject.Session.GetDefaultFolder(
                                Outlook.OlDefaultFolders.olFolderInbox);
                inbox.Folders.Add("Aksiyon&Kararlar",
                        Outlook.OlDefaultFolders.olFolderInbox);
                Outlook.MAPIFolder targetfolder =
inbox.Folders["Aksiyon&Kararlar"];
                Outlook.Rules rules =
applicationObject.Session.DefaultStore.GetRules( );
                Outlook.Rule rule = rules.Create("ActionAndDecissionRule",
                        Outlook.OlRuleType.olRuleReceive);
                Outlook.TextRuleCondition sub = rule.Conditions.Body;
                sub.Enabled = true;
                sub.Text = new string[ ] { "ToplantisiKararlari-iyitoplantiKontrol"
};
                Outlook.MoveOrCopyRuleAction movecopy = rule.Actions.MoveToFolder;
                movecopy.Enabled = true;
                movecopy.Folder = targetfolder;
                rule.Execute(true, inbox, false,
                  Outlook.OlRuleExecuteOption.olRuleExecuteUnreadMessages);
                rules.Save(false);
        }
private void btnGetEMailStats_Click(CommandBarButton Ctrl,
                ref bool CancelDefault)
        {
          // DateTime today = DateTime.Today;
                string filter = "";
                #region Check Folder
                // Get items in user's inbox.
                Outlook.NameSpace outlookNS =
applicationObject.GetNamespace("MAPI");
                Outlook.MAPIFolder inboxFolder =
outlookNS.GetDefaultFolder(Outlook.OlDefaultFolders.olFolderInbox);
                Outlook.Folder targetFolder = null;
                string folderPath = inboxFolder.FolderPath + @"\Property Flyers";
                targetFolder = GetFolder(folderPath);
                if (targetFolder == null)
                {
                        //If Property Flyers folder doesn't exist, create it
                        targetFolder = inboxFolder.Folders.Add("Property Flyers",
Type.Missing) as Outlook.Folder;
                }
                #endregion
                #region Create Filter
                filter = "[Subject]=property";
                #endregion
                #region Filter, then Move mails To Property Flyers Folder,also Send
them to configured mail address
                Outlook.Items filterItems = inboxFolder.Items.Restrict(filter);
                foreach (object item in filterItems)
                {
                    Outlook.MailItem mi = item as Outlook.MailItem;
                    if (mi != null)
                    {
                        mi.Move(targetFolder);
                        //Send mail to mail configured
```

```
                SendNewMail(iniObj.IniReadValue("Email", "RecipientName"),
iniObj.IniReadValue("Email", "RecipientEmail"), mi.Subject, mi.Body);
            }
        }
        #endregion
        #region Sent items stats.
        #endregion
        MessageBox.Show("ok");
    }
    private Outlook.Folder GetFolder(string folderPath)
    {
        Outlook.Folder folder;
        string backslash = @"\";
        try
        {
            if (folderPath.StartsWith(@"\\"))
            {
                folderPath = folderPath.Remove(0, 2);
            }
            String[ ] folders = folderPath.Split(backslash.ToCharArray( ));
            folder = applicationObject.Session.Folders[folders[0]] as
Outlook.Folder;
            if (folder != null)
            {
                for (int i = 1; i <= folders.GetUpperBound(0); i++)
                {
                    Outlook.Folders subFolders = folder.Folders;
                    folder = subFolders[folders[i]]
                        as Outlook.Folder;
                    if (folder == null)
                    {
                        return null;
                    }
                }
            }
            return folder;
        }
        catch { return null; }
    }
}
}
```

The generated email message copy may then be copied to a HUB database and/or forwarded to a HUB email address 3010, from where it may be immediately accessed for further processing and/or stored for a period of time for later access, analysis, cross referencing, database updating, and/or the like. For example, in one implementation, the HUB and/or HUB subsystems may periodically retrieve email messages copied at 3010 and extract feature data therefrom, such as attached files, linked files, linked web pages, email message content, and/or the like 3015. Data may then be scraped from email message data features and/or parsed into data fields 3020, such as in accordance with the flow shown in FIG. 32 in one implementation. The HUB may then generate one or more summary messages, dashboard interfaces, rolodex-style email category summaries, and/or the like 3025, as discussed in further detail herebelow, and said summary messages may then be provided for user access 3030, such as by configuring them as email messages, configuring them as webpages embedded in an email message, configuring them as linked and/or attached files in an email message, providing them to a user email client, providing them to a mobile device application or other client computer terminal application, and/or the like. In one implementation, generated summary message data may be stored as a summary message record at a message database and accessed by one or more remote client terminals, mobile devices, and/or the like as needed.

An original copy of the message may be provided for retrieval access by a user, such as via a mail application such as Microsoft Outlook, a Webmail client, and/or the like 3035.

A decision may then be made as to whether messages having attachments are to be filtered 3040 (e.g., such a decision may be made by querying a user setting, querying user terminal device capabilities, and/or the like). If so, then emails having attachments may be blocked from the client device, may be directed to a particular folder, and/or the like 33045. Otherwise, the emails may be passed through to the client device 3050. A determination may also be made as to whether the email messages are to be blocked from one or more user mobile devices 3055. For example, a user may set a preference to block email messages and/or sync one or more mobile devices to company servers (e.g., Blackberry, Microsoft servers, and/or the like) having attachments from a mobile device in order to avoid transmission rate and/or data storage problems associated with the data requirements of those attachments. If the messages are not set for blocking, then the email messages may be passed through to and/or be accessible by the mobile device 3060. Otherwise, the emails may be blocked from the mobile device 3065, and/or the content on the mobile device and desktop may be synced. In one implementation, a mobile device application may pull summary message data such as that generated at 3025 for storage and/or display on the mobile device in lieu of the blocked emails 3070. In one implementation, the summary message data provided to and/or displayed at the mobile device may be configured as an email message. In one implementation, attachment information from the blocked emails may be extracted and provided directly to the mobile device in lieu of the email and/or the full attached file 3067, whereon it may be directly viewed, such as via a mobile application interface, mobile device web browser, mobile device email client, and/or the like.

In one implementation, property information extracted from email messages, attached and/or linked files and/or webpages, and/or the like, and/or the analytics generated based thereon may be used by the HUB to populate data records associated with one or more real estate listing services. For example, in one implementation, listing service data may be updated periodically, each time a new message is received by a participating HUB user, and/or the like frequency, and the resulting real estate information may be made available to users other than those to which the property information was originally directed. In one implementation, acquired property information provided in such a listing service may be searchable. In another implementation, authorization settings may be associated with various property information, such that only limited groups of users may be authorized to access particular sets of property information.

Figure 31:
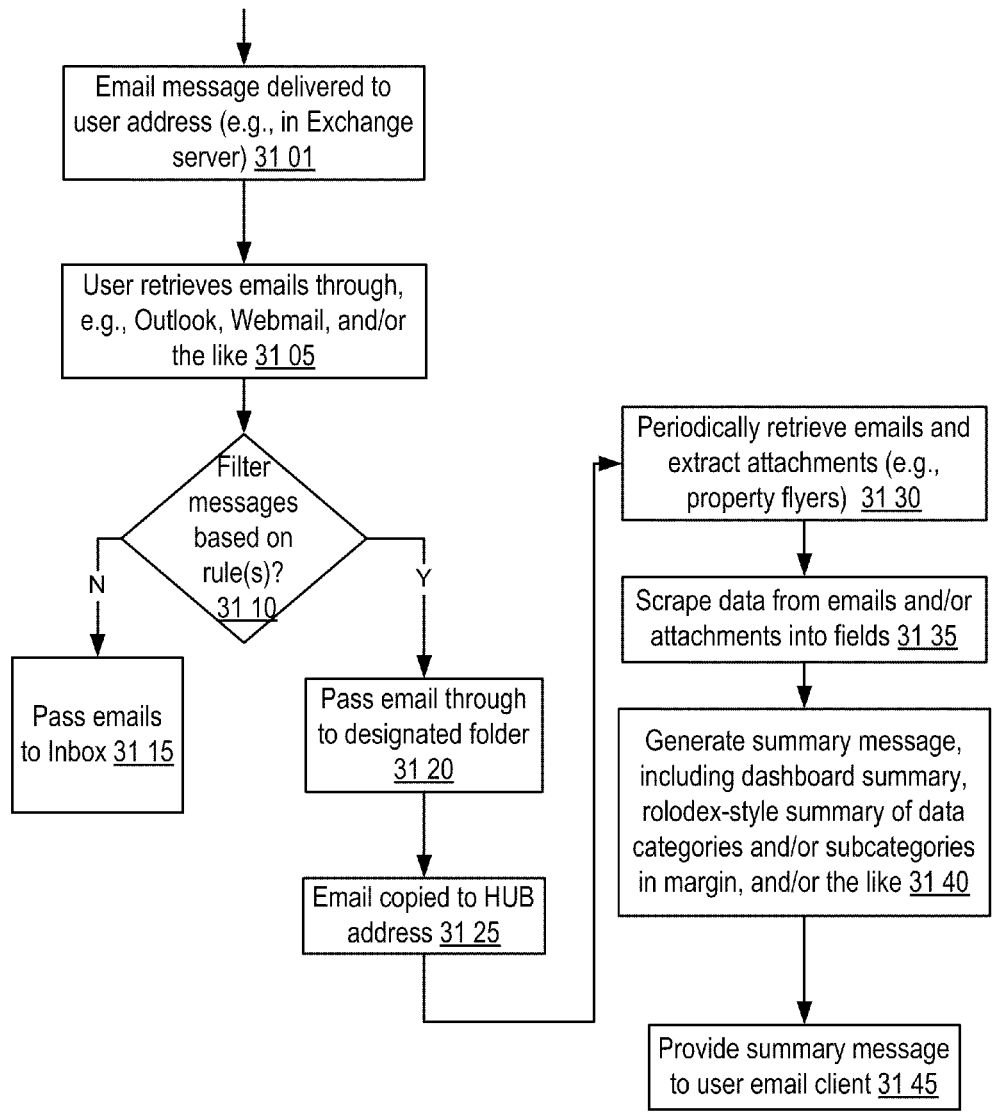
FIG. 31 shows an implementation of logic flow for intelligent inbox coordination in another embodiment of HUB operation.

FIG. 31 shows an implementation of logic flow for intelligent inbox coordination in another embodiment of HUB operation. An email message may be delivered to a user address, such as via an Exchange server 3101, and a user may have access to retrieve the message, such as via Microsoft Outlook, an Webmail client, and/or the like 3105. A determination may be made as to whether or not to filter messages (e.g., those having attached files, having embedded files and/or links, and/or the like) 3110, such as may be based on user defined filters and/or rules (such as may apply to folders, nested folders within folders, and/or the like), preference settings, client device capabilities, and/or the like and, if no filtering is to occur, then those emails may be passed to the user inbox 3115. If, on the other hand, emails having attachments are determined to be filtered at 3110, then emails having attached files, and/or matching other rule-specified criteria, may be passed to a designated folder 3120. Emails in the designated folder may then be copied and/or forwarded to a HUB address 3125, such as on an immediate, delayed, periodic, and/or the like basis. Emails sent to the HUB address may then be retrieved, such as on a scheduled and/or periodic basis, and associated email data extracted 3130. For example, extracted data may comprise one or more attached files (e.g., attached to an email or within an email, embedded files and/or links, and/or the like), linked files, linked webpages, email message content, and/or the like. Extracted data may then be scraped and/or parsed into one or more data fields 3135, such as in accordance with the implementation illustrated in FIG. 32. The HUB may then generate one or more summary messages, dashboard interfaces, rolodex-style email category summaries, and/or the like 3140, as discussed in further detail herebelow, and said summary messages may then be provided for user access 3145, such as by configuring them as email messages, providing them to a user email client, providing them to a mobile device application or other client computer terminal application, and/or the like. In one implementation, generated summary message data may be stored at a message database and accessed by one or more remote client terminals, mobile devices, and/or the like as needed.

Figure 32A:
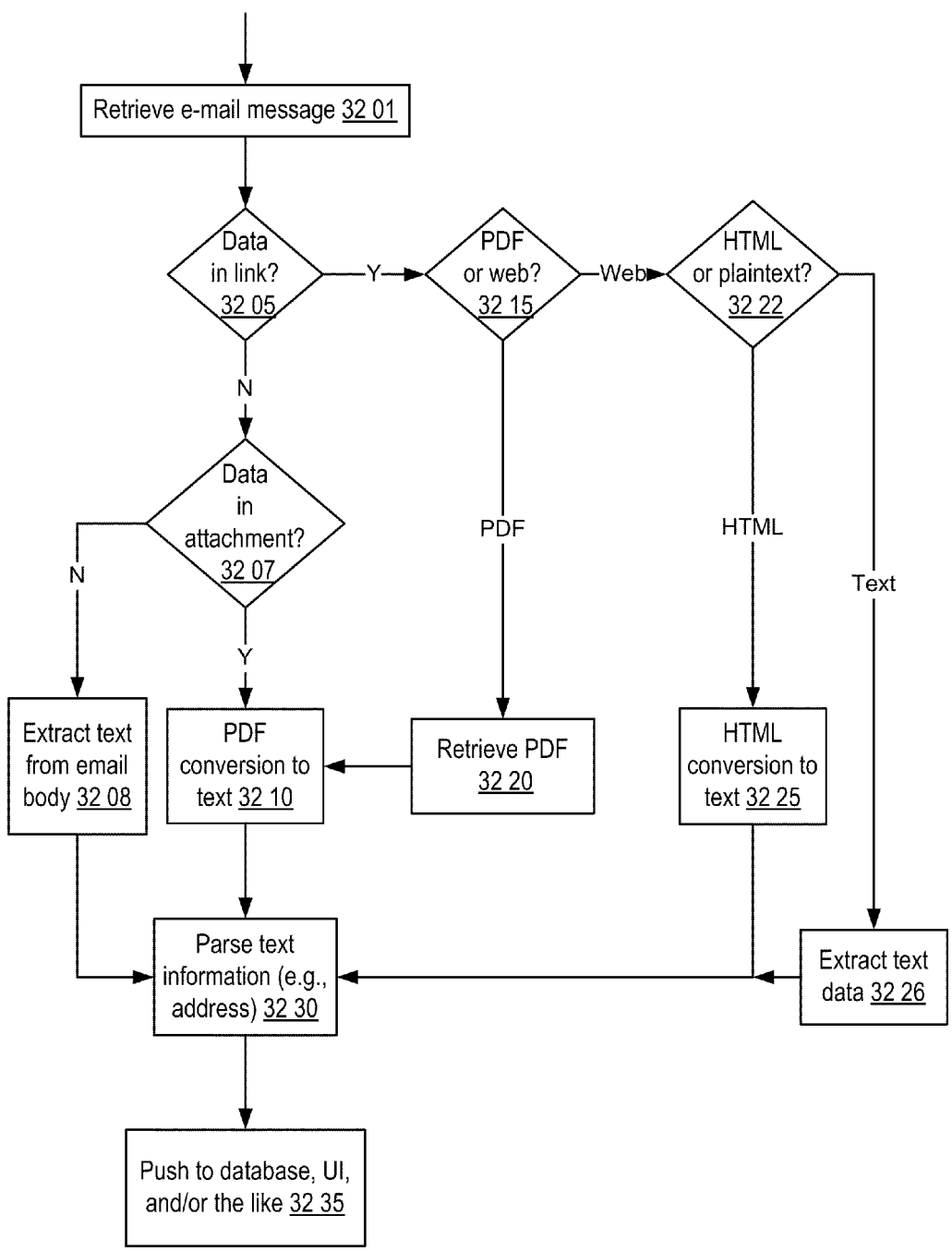

FIG. 32A shows an implementation of logic flow for data scraping in one embodiment of HUB operation. In various implementations, the HUB may employ a variety of data scraping and/or extraction tools and techniques depending on the particular goals and/or constraints of a particular application, such as but not limited to text conversion, optical character recognition, screen scraping, report mining, and/or the like. In one implementation, an email message may be retrieved 3201, such as from an email database and/or server, via a communication network, from a designated email folder, and/or the like. A determination may be made as to whether desired email data is configured as a link within the email message 3205. Such a determination may be made based on an inspection of the email message data for link data, based on an inspection of an email tag identifying the email as containing link data, and/or the like. If the data is not configured as a link at 3205, the HUB may presume, in one implementation, that the data is configured as a file attachment, a PDF file attachment, and/or the like. In an alternative implementation, the HUB may determine if data is configured as an attachment 3207, such as by inspecting whether any file is attached to the email message, whether the attached file is in one of a collection of acceptable and/or expected formats (e.g., PDF), and/or the like. If not, then the HUB may extract text from the body of the email message itself 3208. Otherwise, an attached PDF file may be extracted and a PDF to text conversion may be performed thereon 3210, such as by using online conversion tools for Adobe PDF documents (e.g., emailing the PDF document to pdf2txt@adobe.com causes a reply email to be delivered with a text file attachment containing the text information from the original PDF document), using any of a variety of pdf to text conversion tools such as pdftotext (which is an open source command-line utility for PDF to plain text conversion), and/or the like. Alternatively, if the determination at 3205 finds that the email data is configured as a link, a second determination may be made as to whether the linked data is configured as a file (e.g., PDF) or a webpage 3215. If configured as a PDF link, then the PDF may be retrieved 3220, and a PDF to text conversion may be performed 3210. If, on the other hand, the link is configured as a webpage, a determination may be made regarding the format of the webpage, such as whether it is configured as an HTML page or plaintext 3222. If configured as HTML, an HTML to text conversion may be performed 3225, such as using any of a variety of HTML to text conversion tools (e.g., EtText, HTMLCon, Aquatic Moon Software's Markup Remover, and/or the like). Otherwise, text data may be extracted directly from a page configured as text 3226. In some implementations, extraction may include opening multiple links embedded within weblinks in order, ultimately, to reach the one or more links containing particular data targeted for extraction. Text data may then be parsed to extract and/or identify specific categories of information, correlate information with particular data fields, and/or the like 3230. For example, the HUB may search for keywords in the converted text (e.g., "address," "square feet," "area," "city," "state," "company," "property type," "price," "bedrooms," "baths," "agent," "phone," and/or the like) and for text data in proximity to those keywords and/or matching particular grammatical and/or syntactic requirements (e.g., a string of numeric characters that is ten characters in length, with appropriate dashes and/or parenthesis, may be recognized as a phone number when in proximity to the word "phone"). Parsed text data may then be pushed to a database, such as configured as a message data record, may be provided for display in a user interface, may be provided to a mobile device application, and/or the like 3225. Message data may then be retrieved for use in generation of summary messages and/or dashboard interface elements, as discussed herein.

FIG. 32B shows an implementation of data parsing rules in one embodiment of HUB operation. The rules are illustrated in this implementation as a table, where each rule is correlated with a particular flyer 3240, which may be associated variously with a particular email folder, sender, email characteristic, barcode, and/or the like. Rules are then defined for each flyer with respect to various categories of data, such as but not limited to: company 3245, property type 3250, transaction type 3255, address 3260, City 3265, county 3270, state 3275, square footage 3280, and/or the like.

In one implementation, scraping rules may take a form similar to the following XML examples:

```
<rule>
    <fieldname>Company<fieldname>
    <searchWhere>From Address</searchWhere>
    <how>strpos</how> //Searches for the FIRST occurance of <string>
    <definition>
        <string>@</string>
        <position>string after</position>
        <limit>
            <how>same word</how>
        </limit>
    </definition>
</rule>
<rule>
    <fieldname>Company<fieldname>
    <searchWhere>PDF</searchWhere>
    <how>strrpos</how> //Searches for the LAST occurance of <string>
    <definition>
        <string>@</string>
        <position>string after</position>
        <limit>
            <how>same word</how>
        </limit>
    </definition>
</rule>
<rule>
    <fieldname>Company<fieldname>
    <searchWhere>PDF</searchWhere>
    <how>stripos</how> //Case insensative search for the FIRST occrance of <string>
    <definition>
        <string>Real Estate, Inc</string>
        <string>Real Estate Inc</string>
        <string>Real Estate GROUP</string>
        <position>words before</position>
        <limit>
            <how>new line</how>
        </limit>
    </definition>
</rule>
<rule>
    <fieldname>Property Type</fieldname>
    <searchWhere>PDF</searchWhere>
    <how>compare</how> //Compares text to a table
    <definition>
        <table>property type</table>
    </definition>
</rule>
<rule>
    <fieldname>Transaction Type</fieldname>
    <searchWhere>PDF</searchWhere>
    <how>stripos + compare</how>
    <definition>
        <string>Available for $compare</string> //$compare is filled in from transaction type table for use with stripos
        <position>used variable</position> //"$compare" in the above match
        <table>transaction type</table>
    </definition>
</rule>
<rule>
    <fieldname>State</fieldname>
    <searchWhere>PDF</searchWhere>
    <how>stripos + compare</how>
    <definition>
        <string>, $compare</string>//$compare is filled in from the states table for use with stripos
        <position>used variable</position> //"$compare" in the above match
        <table>states</table>
    </defintion>
</rule>
<rule>
    <fieldname>City</fieldname>
    <searchWhere>PDF</searchWhere>
```

-continued

```
    <how>strpos</how>
    <defintion>
        <string>, $state</string> //$state would be populated from the State rule above
        <position>words before</position>
        <limit> //limit how far to search "words before"
            <how>compare || words=2</how> //This means we will keep going backwards until we either reach 2 words, or match a value in the street table.
            <table>streets</table>
            <include>no=$compare</include> //do not include the found compare
        </limit>
    </definition>
</rule>
<rule>
    <fieldname>Address</fieldname>
    <searchWhere>PDF</searchWhere>
    <how>strpos</how>
    <definition>
        <string>$city</string> //$city would be populated from the City rule above
        <position>words before</position>
        <limit>
            <how>numeric || new line</how> //keep going backwards until we find numeric (street number)
            <include>yes=$numeric</include> //include the numeric if found
        </limit>
    </definition>
</rule>
<rule>
    <fieldname>Address</fieldname>
    <searchWhere>PDF</searchWhere>
    <how>strpos</how>
    <definition>
        <string>$city</string> //$city would be populated from the City rule above
        <position>words before</position>
        <limit>
            <how>numeric || new line</how> //keep going backwards until we find numeric (street number)
            <include>yes=$numeric</include> //include the numeric if found
        </limit>
    </definition>
</rule>
<rule>
    <fieldname>SQ FT</fieldname>
    <searchWhere>PDF</searchWhere>
    <how>stripos</how>
    <defintion>
        <string>Available:</string>
        <string>Space:</string>
        <position>words after</string>
        <limit>
            <how>numericspace || words=1</how>
            <include>yes=$numericspace && no=words</include>
        </limit>
        <verifyDataType>numericspace</verifyDataType>
    </definition>
</rule>
<rule>
    <fieldname>SQ FT</fieldname>
    <searchWhere>PDF</searchWhere>
    <how>stripos + compare</how>
    <defintion>
        <string>$compare</string>
        <position>words before</string>
        <limit>
            <how>numericspace || words=1</how>
            <include>yes=$numericspace && no=words</include>
        </limit>
        <table>square feet words</table>
        <verifyDataType>numericspace</verifyDataType>
    </definition>
</rule>
```

Figure 33:
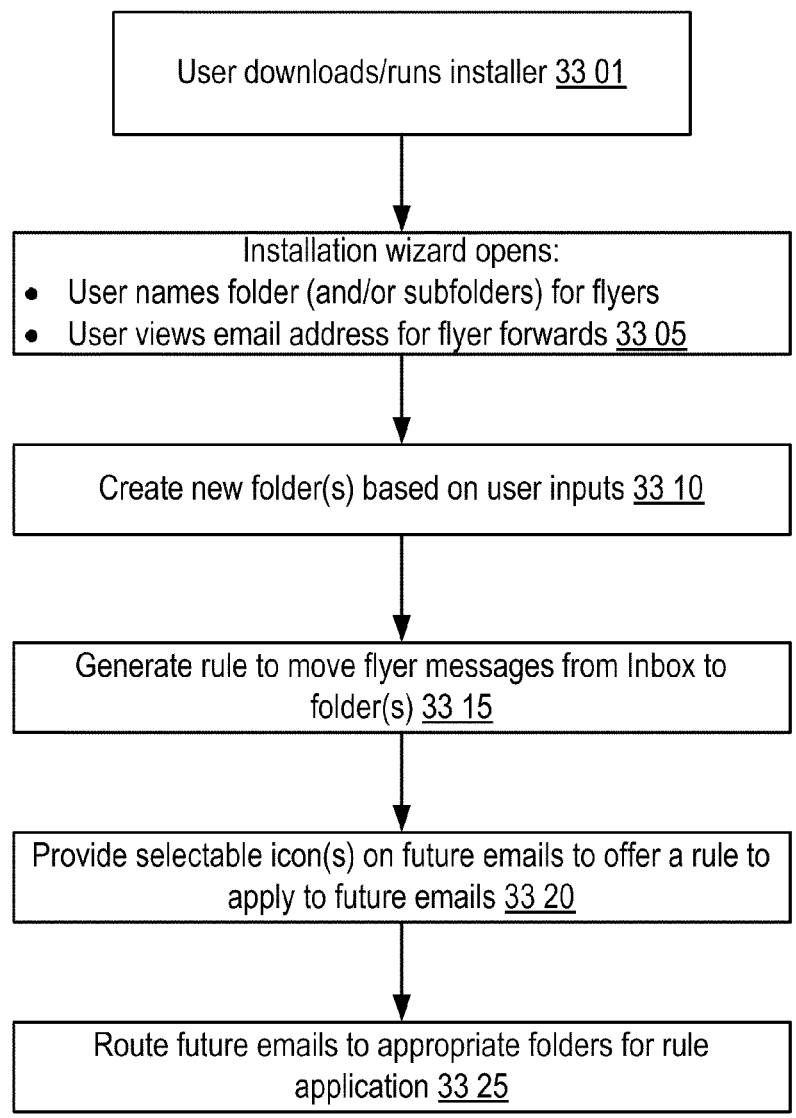
FIG. 33 shows an implementation of logic flow for inbox coordinator configuration in one embodiment of HUB operation.

FIG. 33 shows an implementation of logic flow for inbox coordinator configuration in one embodiment of HUB operation. A flow similar to that shown in the example of FIG. 33 may be employed by HUB implementations to allow a user to configure a HUB intelligent inbox coordination application, such as at a client terminal device. A user may download an installer application 3301 and run it to open an installation wizard application 3305, which may guide the user to create rules to name folders and/or subfolders, or which may guide the user to directly and/or manually name folders and/or subfolders, to which emails, email data, email attachments (e.g., flyers), and/or the like may be directed, and may allow the user to view one or more email addresses to which emails, email data, email attachments (e.g., flyers), and/or the like may be directed. New folders and/or subfolders may then be created based on user inputs to the installation wizard 3310, and the HUB may generate one or more rules to move emails, email data, email attachments (e.g., flyers) and/or the like to the specified folders and/or subfolders 3315. In one implementation, a user may be allowed to explicitly specify a rule, such as via an email client application (e.g., Microsoft Outlook). In another implementation, a user may be requested to specify email characteristics and/or tags, based on which a rule may be automatically generated. In one implementation, the HUB may subsequently provide selectable icons, buttons, and/or the like user interface elements for selectable display in association with subsequent email messages and automatically generate rules to apply to future emails based on the content and/or characteristics of those messages when the icons are selected by a user 3320, whereby future emails are routed to appropriate folders for and/or in accordance with rule application 3325. For example, if the selectable icon is selected by a user for an email message having a PDF message attachment, the HUB may automatically generate a rule for transferring all email messages having PDF messages to a designated folder. In another implementation, the HUB may evaluate and employ message content in the automatically generated rule (e.g., the HUB may discern an email message sender and generate a rule whereby all email messages from that sender are transferred to a specified folder). In another implementation, the HUB may evaluate and employ message content in the automatically generated rule (e.g., the HUB may discern that an email pertains to a specific property, specific tenant, or is within a defined proximity [e.g., mileage radius] of a property, and may generate one or more rules and/or sub-rules whereby all email messages from that sender are transferred to a specified folder and/or sub-folders). In one implementation, automatically generated rules may be displayed as prospective rules to a user, who may be allowed to accept, reject, modify, and/or the like. In one implementation, multiple selectable icons, flags, and/or the like may be provided with email messages, allowing a user to specify different rules to be applied to those messages and/or folders to which those messages should be routed and/or copied.

Figure 34:
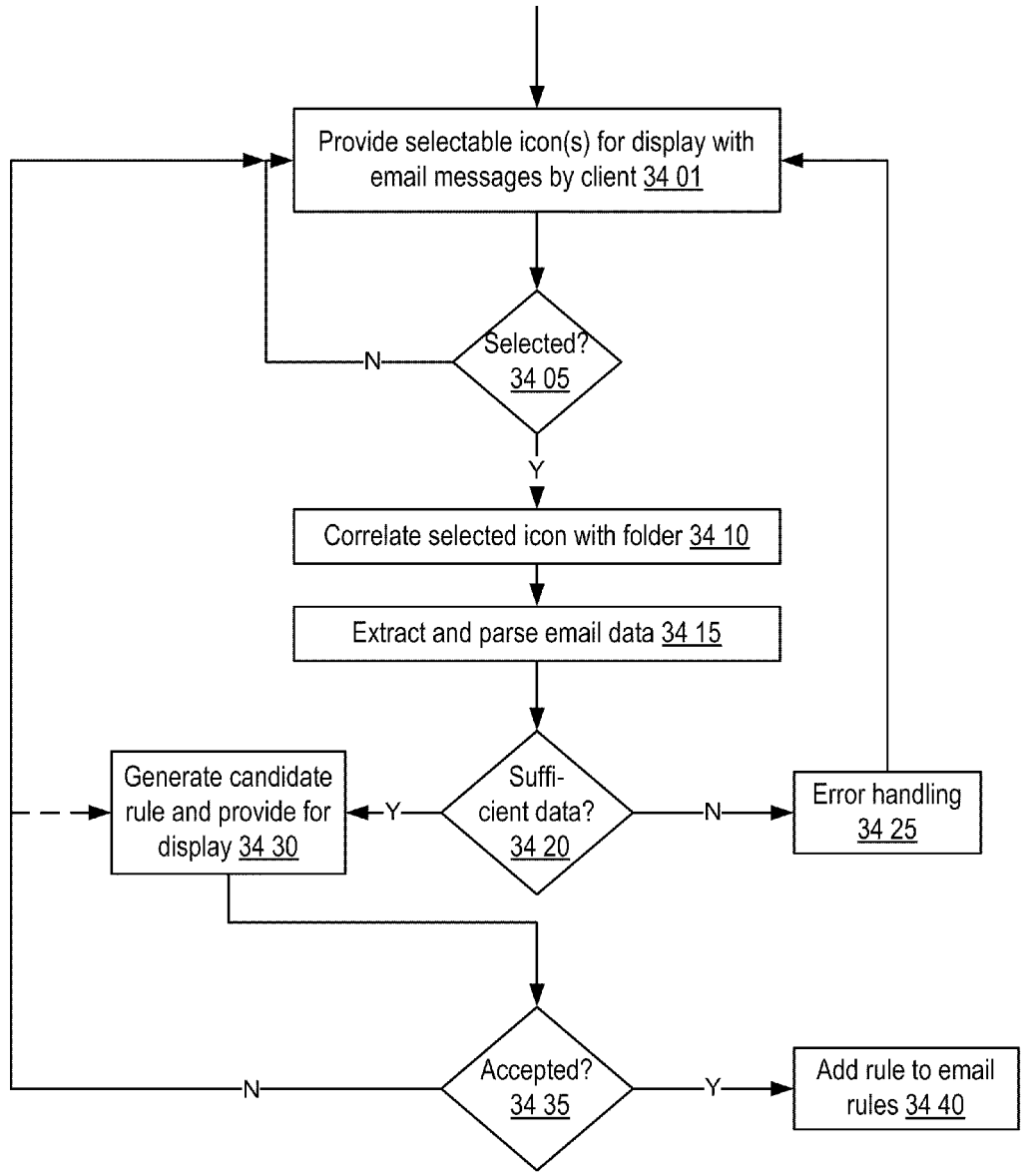
FIG. 34 shows an implementation of logic flow for one-button rule generation in one embodiment of HUB operation.

FIG. 34 shows an implementation of logic flow for one-button rule generation in one embodiment of HUB operation. In one implementation, FIG. 34 may represent an elaboration and/or extension of box 3320 in FIG. 33. Selectable icons, and/or the like interface elements, may be provided for display with email messages, such as by an email client application 3401. In one implementation, multiple icons may be displayed, such as may correspond to different email rules, different email folders and/or subfolders, and/or the like. A determination may be made as to whether the icon has been selected 3405. When it has, the selected icon may be correlated with a folder 3410, such as by correlating it with the sole folder to which all selected emails are directed, correlating it with a folder to which the particular selected icons of multiple icons corresponds (e.g., in an icon data record), providing a selectable list of possible folders for display to the user, and/or the like. The HUB may then extract and parse email data 3415, such as email message content data, sender data, addressee data, data as to whether a link or attachment is present, email attachment data, linked data, and/or the like. A determination may be made as to whether sufficient data has been or can be extracted 3420. For example, a comparison may be made of extracted data with rule generation criteria, such as an amount of extracted data, available types of data, and/or the like. If the amount of data is insufficient at 3420, then an error handling procedure may be undertaken 3425, such as providing an error message to the user, denying rule generation, requesting manual entry of rule parameters, and/or the like. Otherwise, if sufficient data exists, then one or more prospective and/or candidate rules may be generated based on the extracted and parsed email data and provided for display to the user. In one implementation, rules of varying specificity may be generated and provided on a sorted basis (e.g., order of increasing number of rule parameters) for display to a user. The user may then be requested to accept, reject, modify, and/or the like displayed candidate rules. A determination may be made as to whether the rule is accepted by the user 3435, such as based on the receipt of an acceptance action by the user (e.g., clicking an "I accept" button, and/or the like). If acceptable, then the rule may be added to other email rules for future application to qualifying emails 3440. If not acceptable, in one implementation, the HUB may presume the rule has been rejected and may return to 3401. In another implementation, the user may be provided with an opportunity to manually modify the candidate rule.

Figure 35:
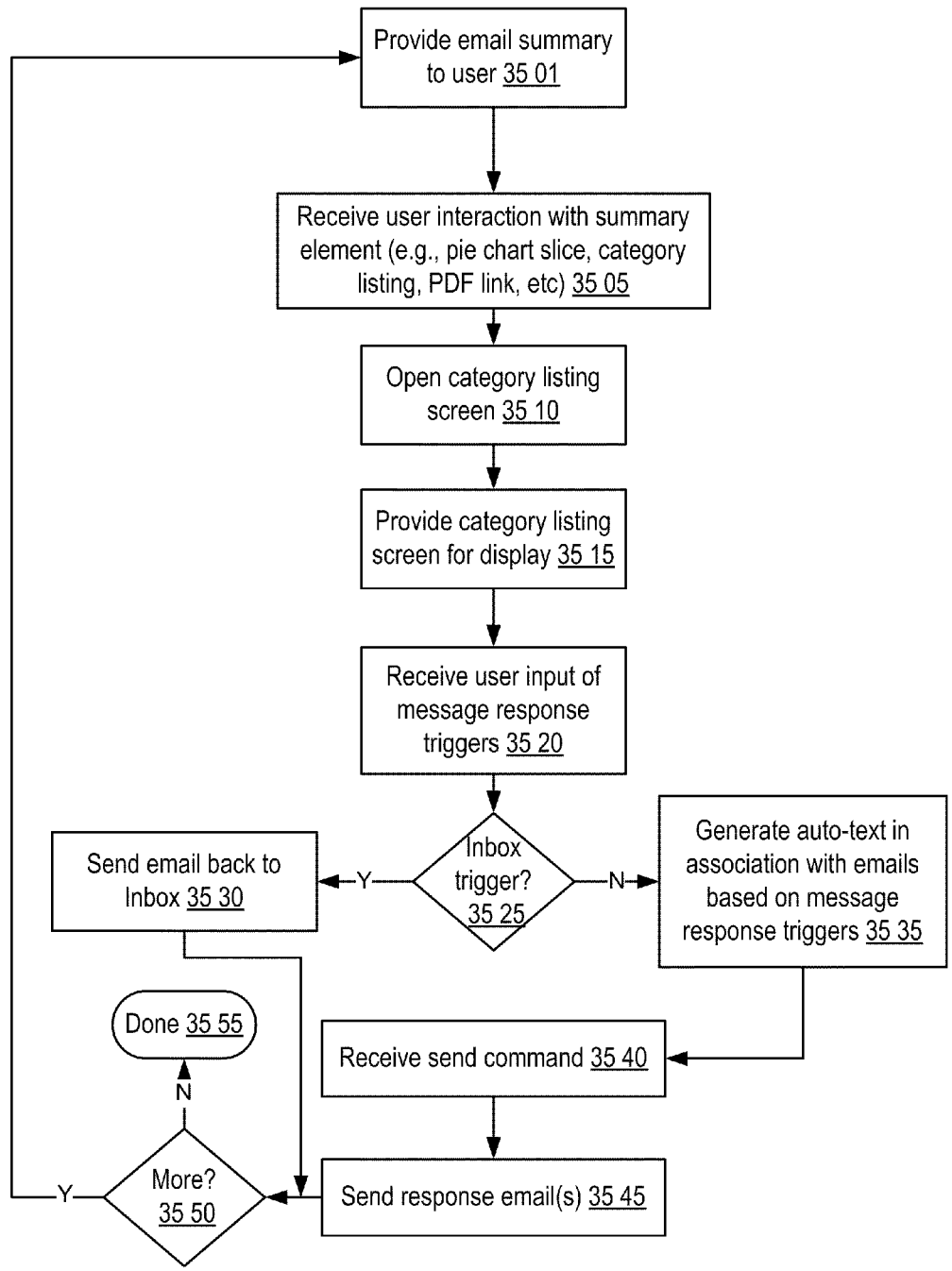
FIG. 35 shows an implementation of logic flow for summary screen interactions in one embodiment of HUB operation.

FIG. 35 shows an implementation of logic flow for summary screen interactions in one embodiment of HUB operation. In one implementation, the flow in FIG. 35 references aspects of the user interfaces shown in FIGS. 36A-B and FIGS. 37A-B. Once a summary screen has been generated, displaying summary data associated with received email and/or other messages, a user may be permitted to interact with the summary screen to retrieve original message data, evaluate received messages and/or message data, generate response messages, and/or the like. An email summary may be provided to the user 3501, and a user interaction with an element of the summary message may be received 3505. That interaction may take a variety of forms in various implementations. For example, the user may click on and/or mouseover a slice of a displayed pie chart, a point and/or segment of a line graph, a category listing, a PDF link, and/or the like 3505. The HUB may then open a category listing screen based on the user interaction 3510 and provide that screen for display 3515. In one implementation, the category listing screen may take a form similar to the examples shown in FIG. 36B and/or FIG. 37B. The HUB may then receive user input of one or more message response triggers 3520, such as may be associated with one or a sub-group of messages, may represent a "gut feel" or other evaluation of the messages in the category listing screen, and/or the like. A determination may be made as to whether the message response trigger is an inbox trigger 3525, which may indicate that the associated message is to be directed to the user's regular inbox folder instead of to any other particular folder to which it may have been previously designated or directed. If the trigger is determined at 3525 to be an inbox trigger, then the email message may be sent back to the user's inbox 3530. If not an inbox trigger, then, in one implementation, the HUB may presume the trigger to be an auto-text generation trigger, and may generate auto-text in association with the emails based on the received trigger

3535. For example, in one implementation, the message response trigger may comprise a "gut feel" indicator, which may take any of several values (e.g., green, yellow, red, and/or the like) which may correspond respectively to several automatic text outputs (e.g., "We are interested in the property. Please contact us," "This could be a possibility, but will have to be reviewed further," "We're sorry, but we're not in the market for that type of property now. Thanks," and/or the like). In one implementation, the user may enter text manually in addition to and/or instead of automatically generated text. The HUB may then receive a send command from the user 3540, and may send response messages including the auto-generated text to the message senders 3545. In one implementation, a user may send response on an individual message basis while, in another implementation, multiple response messages may be sent on a batch basis. A determination may be made as to whether additional message interactions are desired 3550 and, if so, the flow may return to 3501. Otherwise, the flow may conclude 3555.

In one implementation, a user-specified message response trigger may cause a corresponding message to be copied, forwarded, transferred, and/or the like to one or more contacts, such as those in a user's list of contact, where those contacts may be selected based on categories and/or subcategories correlated with message data elements. In another implementation, a greater target set may be specified allowing the message to be provided to a broader list of recipients beyond a user's contact list (e.g., all HUB users, all users associated with a given office, all users for a given region, all users in a given department, and/or the like). In one example, if a user who is a tenant broker receives a message including a flyer for an available property that is correlated with the city of Schaumberg, the property type of storefront, and the price of $6000/mo., and the user specifies a gut feel indicator value of green for that message, the message may automatically be sent to all tenant clients associated with the tenant broker user having contact records indicating interest in properties matching those categories and/or subcategories. In another example, if a user who is a landlord broker receives a message indicating desired property attributes that is correlated with the city of Schaumberg, the property type of storefront, and the price of $6000/mo., and the user specifies a gut feel indicator value of green for that message, the message may automatically be sent to all landlord clients associated with the landlord broker user having contact records indicating available properties matching those categories and/or subcategories. Thus, the HUB may be configured to utilize its store of message data, property flyer information, and/or the like to notify, alert, and send messages, message data, property flyers, and/or the like to all parties to create an efficient marketplace and/or bidding system for the exchange and/or transaction of those properties.

In another implementation, a message response trigger specified by a message recipient may cause a corresponding message to be re-sent, copied, forwarded, transferred, and/or the like to other recipients by an original sender, where the additional recipients may be selected based on categories and/or sub-categories correlated with message data elements. For example, if one or more message recipients who are tenant brokers enter positive message response trigger values, such as green gut-feel indicator values, for a given message and/or that message's associated property data, that message may be sent on behalf of the message-originating landlord broker and/or landlord client to other recipients, such as further tenant brokers, tenant clients, and/or the like matching message correlated categories and/or sub-categories. In another example, if one or more message recipients who are landlord brokers enter positive message response trigger values, such as green gut-feel indicator values, for a given message and/or that message's associated property data, that message may be sent on behalf of the message-originating tenant broker and/or tenant client to other recipients, such as further landlord brokers, landlord clients, and/or the like matching message correlated categories and/or sub-categories. In one implementation, further message recipients may be limited to a message originator's contact list while, in another implementation, further message recipients may be drawn broadly from all HUB users, and/or subsets of HUB users sharing particular characteristics (e.g., company, region, department, and/or the like). Provision of property messages with positive message response trigger value inputs to further recipients may, in one implementation, facilitate an efficient market for property and/or allow message originators to obtain the best deals in association with property transactions.

Figure 36A:
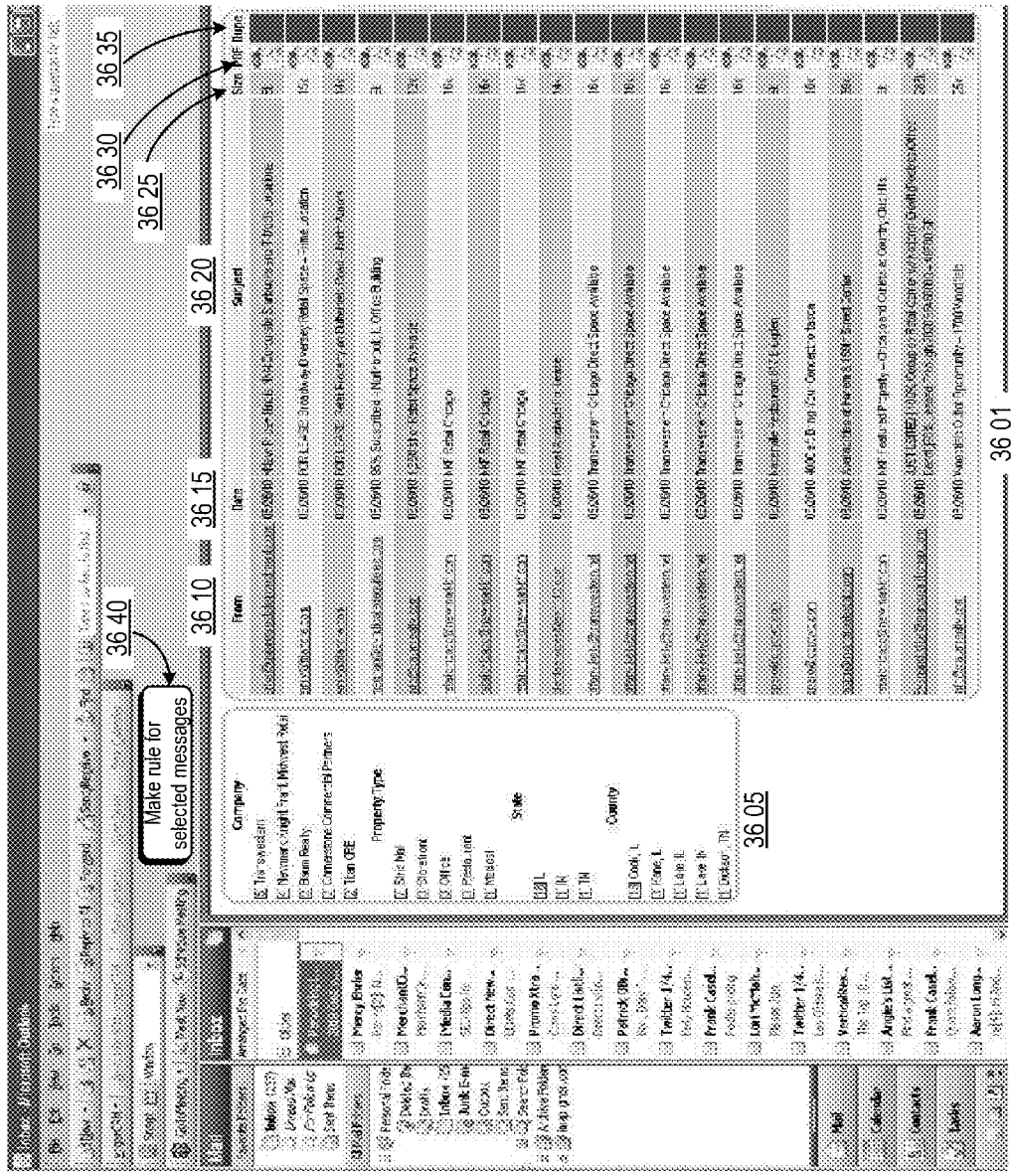
Figure 36B:
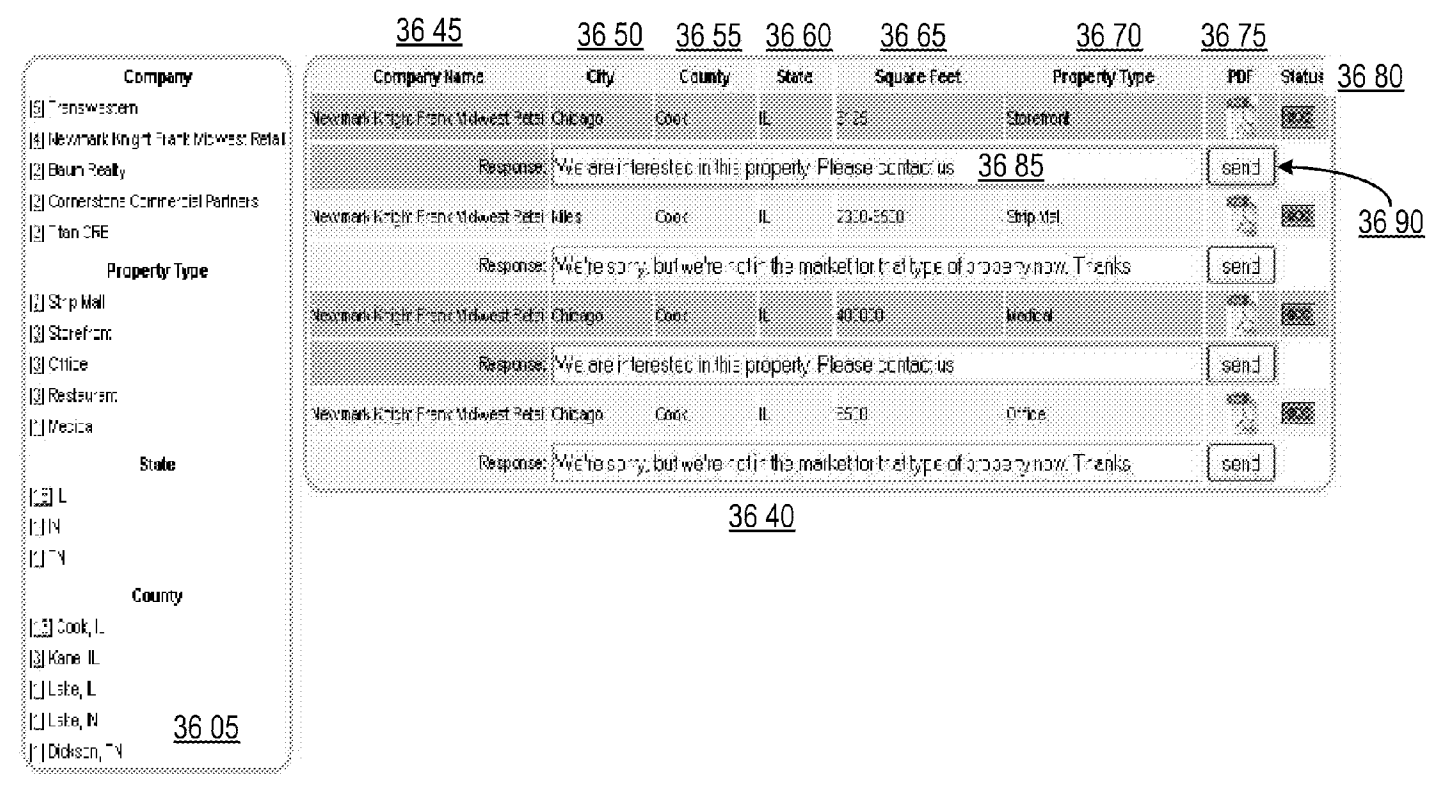

FIGS. 36A-B show implementations of summary screen user interfaces in one embodiment of HUB operation. Data associated with user messages may be provided in a selectable list 3601 in proximity with a summary display 3605, configured in the displayed implementation as a rolodex similar to the examples discussed above for display of contact information. Here, the rolodex includes four categories of data (company, property type, state, county) which may be associated with received email messages and/or information contained in attachments and/or embedded links thereof. For each category, subcategories of information are displayed with numbers reflecting the number of messages received in a period of time that are correlated with that subcategory. The selectable list of messages 3601 may comprise a variety of information associated with and/or extracted from the message data, such as sender information 3610; a date that the message was sent and/or received 3615; a subject line, first message line, and/or other message content data 3620; and a size of the message and/or any files embedded therein and/or attached thereto 3625. The illustrated implementation may further include a selectable icon 3630 allowing a user to access one or more attached files, PDFs, and/or the like associated with, attached to, embedded within, and/or linked by each message. The illustrated implementation may further include an indicator 3635 configured to show whether a given message and/or associated linked, attached, embedded, and/or the like data is a duplicate of data previously received, and/or to display any prior message response trigger values, gut indicator values, and/or the like that a user may have specified in association with a particular message. The indicator may, for example, display red when a message is received having sufficiently similar characteristics to a prior message, and display green otherwise. In another implementation, the indicator may display a check mark when a message is received having sufficiently similar characteristics to a prior message, and may display a value of a message response trigger, gut feel indicator (e.g., green, yellow, red, and/or the like), and/or the like that a user may have previously set for a prior message that is matched to the current message. In one implementation, the interface may further include a button or other such interface facility configured to automatically generate one or more email allocation rules based on characteristics of selected emails, such as in accordance with the flow shown in FIG. 34.

Selection of a category and/or subcategory of messages from a summary message, such as the rolodex display at 3605 in FIG. 36A, may, in one implementation, yield an interface similar to the example shown in FIG. 36B. Here, again, a summary message area may be shown, which may in one implementation be configured as a rolodex display 3605. The interface may further include a selectable listing of messages 3640, where each message is associated with the subcategory selection discussed above. In the displayed implementation, the selected category and subcategory reflect a particular company name 3645. The listing may display other aspects and/or facets of message data, data contained in message attachments, embedded and/or linked files, and/or the like. For example, in an implementation where message data is associated with real estate properties, the further information may include, but it not limited to: property city 3650, property county 3655, property state 3660, property area (e.g., square footage) 3665, property type 3670, and/or the like. In various implementations, displayed message data, such as that shown at 3645, 3650, 3655, 3660, 3665, and 3670, and/or other message display features may be modifiable and/or customizable by a user to suit particular display needs, preferences, and/or the like. The listing may further include a selectable element 3675 by which a user may open an attached file, such as a PDF, for viewing. In one implementation, the interface may further include a message response trigger facility, such as a gut feel indicator 3680, by which a user may register a reaction, impression, assessment, evaluation, and/or the like in association with each message and/or a group of messages. For example, in the illustrated implementation, a gut feel indicator may be set by the user, with values of either green, yellow or red. In one implementation, a selected message response trigger, gut feel indicator value, and/or the like may be stored in association with a corresponding message, message attachment, message link, message data, and/or the like. In one implementation, selection of a particular message response trigger, gut feel indicator, and/or the like may trigger the generation of an automatic text response, such as that shown at 3685, which may then be sent to the message originator, such as by pressing a send button 3690. In one implementation, a user may supplement, modify, and/or replace auto-generated text prior to sending. In one implementation, a plurality of messages, such as may be selected as a group, may be sent together with a single user action (e.g., desired messages are selected, auto-text is generated for them, and the user may then select a "send all" button).

Figure 37A:
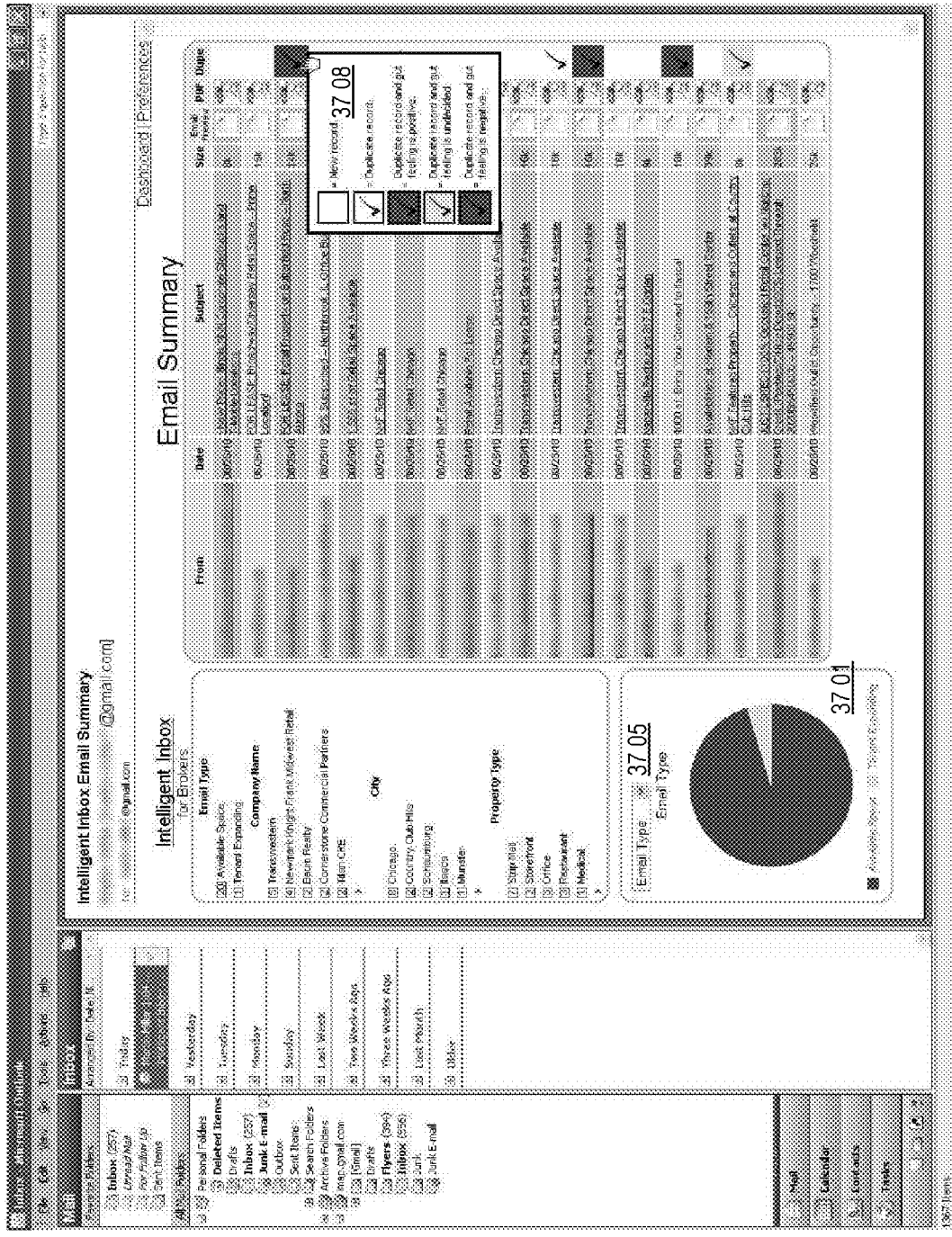
Figure 37B:
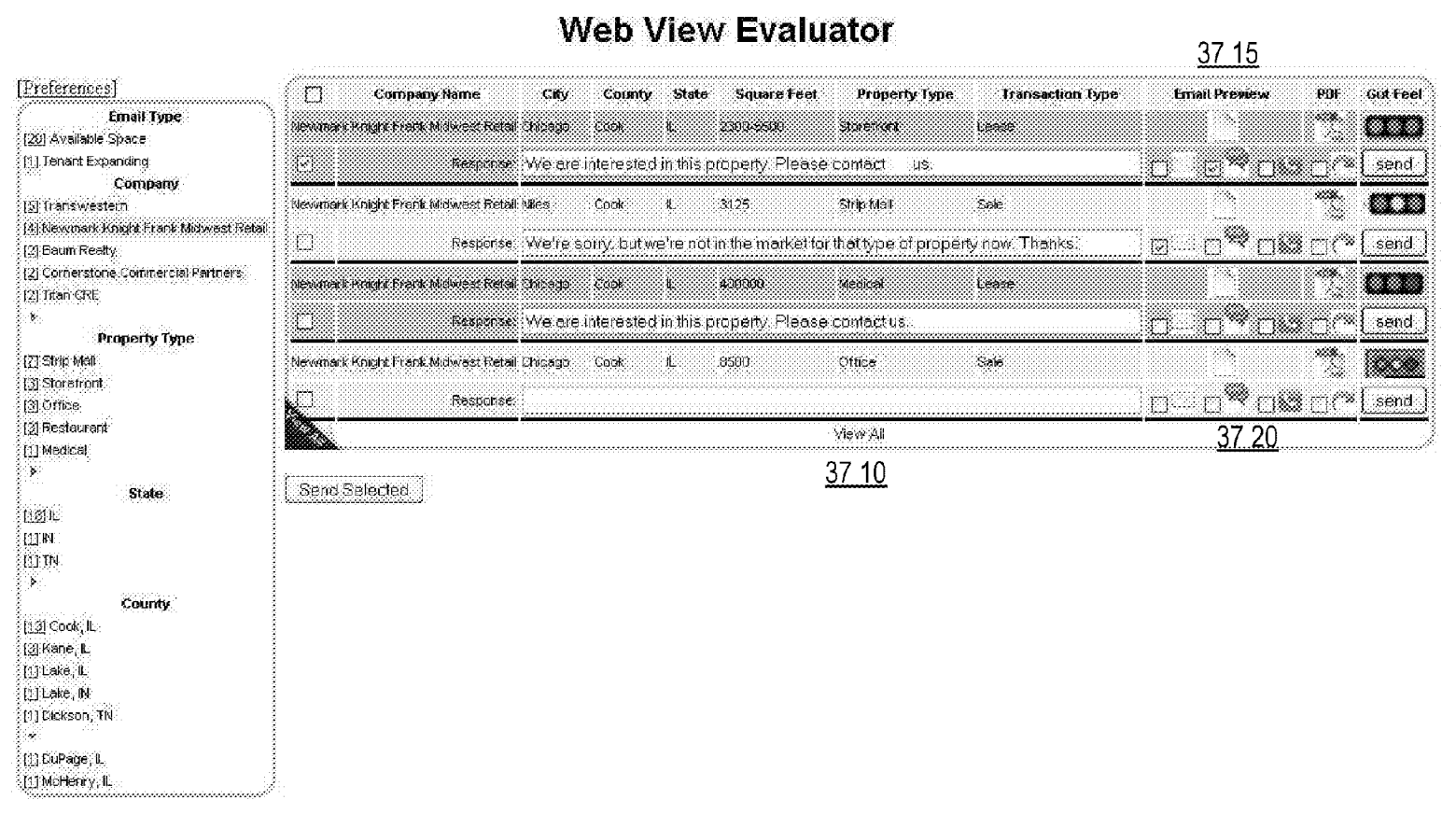

FIGS. 37A-B show implementations of summary screen user interfaces in another embodiment of HUB operation. In addition to message summary rolodex and selectable message listing areas, the implementation shown in FIG. 37A also includes a dashboard interface element comprising a pie-chart 3701, which may reflect the relative proportions of messages allocated to different subcategories within an overall category. The overall category may then be selected to view different dashboard elements, add more dashboard elements, and/or the like, such as by the category selection pull-down menu at 3705. In various implementations, a wide variety of other dashboard elements may be employed and/or configured within embodiments of HUB operation, such as but not limited to: bar graphs, histograms, line charts, timelines, cartograms, area charts, bubble charts, scatterplots, and/or the like. In one implementation, components of displayed dashboard elements may be selectable to show messages associated with those components. For example, in the illustrated implementation, a user may click on a wedge of the displayed pie chart 3701 in order to see a listing of messages corresponding to the category and/or subcategory associated with the selected wedge. FIG. 37A also includes a key 3708 for a duplication indicator similar to the example shown at 3635 in FIG. 36A, where the indicator may display a check mark when a message is received having sufficiently similar characteristics to a prior message, and may display a value of a message response trigger, gut feel indicator (e.g., green, yellow, red, and/or the like), and/or the like that a user may have previously set for a prior message that is matched to the current message. FIG. 37B shows an implementation of such a selectable listing of messages 3710. The illustrated implementation further includes a selectable icon for previewing an email in the list 3715, selection of which may trigger generation and/or display of a summary, abridgment, and/or the like of a corresponding email message. The illustrated implementation further includes selectable elements 3720 whereby a user may specify a mode of communication by which a response, such as an auto-generated response string, may be relayed to a message originator, such as may include email, instant message, phone call, audio message, postal mail, web comment, and/or the like.

Figure 38:
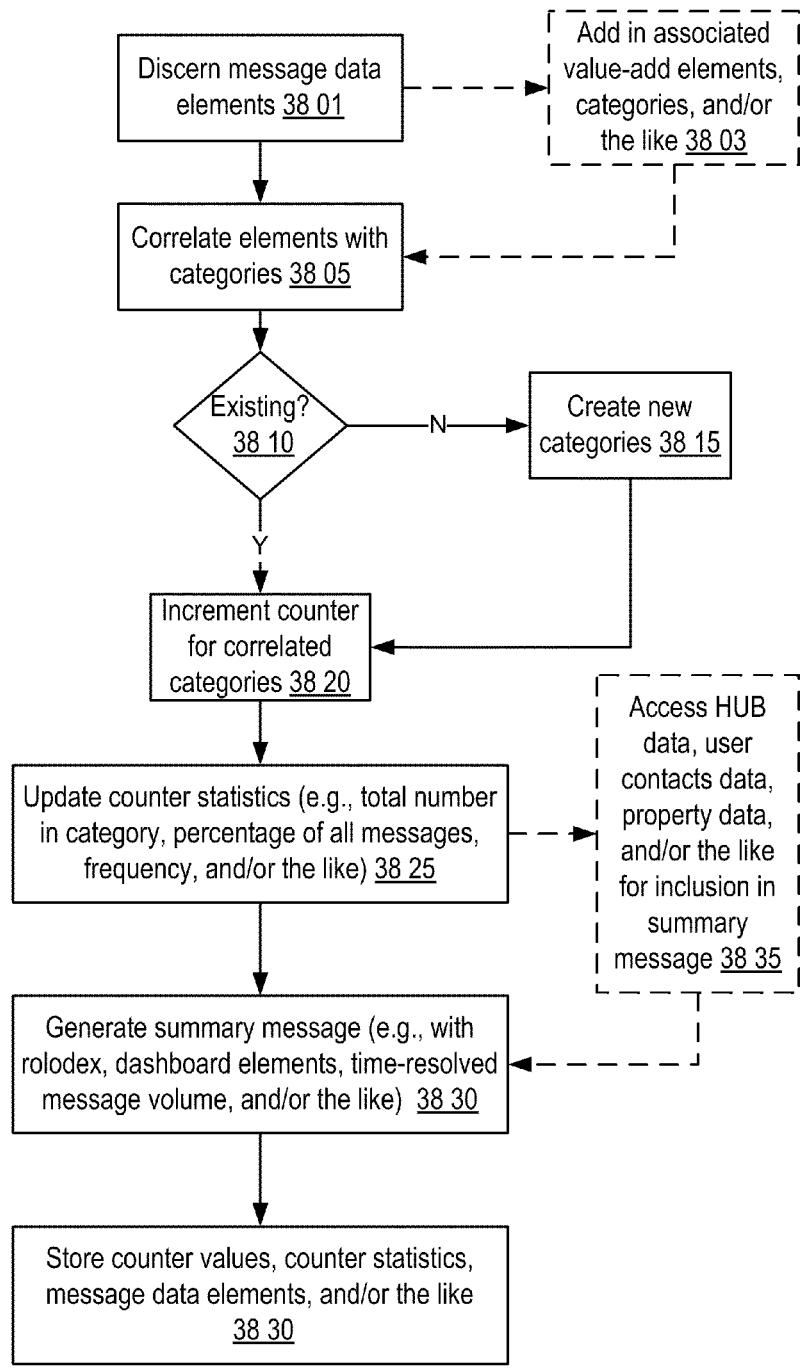
FIG. 38 shows an implementation of logic flow for summary screen generation in one embodiment of HUB operation.

FIG. 38 shows an implementation of logic flow for summary screen generation in one embodiment of HUB operation. A flow similar to that shown in the example of FIG. 38 may be employed by embodiments of the HUB to generate summary messages, rolodexes, dashboards, and/or the like and/or the analytics, statistics, industry trends, and/or the like underlying those displays. Message element data may be discerned 3801, such as in accordance with the scraping and/or parsing analyses discussed above. Those elements may then be correlated with data categories, subcategories, and/or the like 3805, such as based on rules and/or sub-rules similar to the examples shown in the table in FIG. 32B and/or the associated XML rules discussed above in one implementation. Thus, for example, a city name in an attached real estate property flyer may be recognized based on HUB rules and correlated with the "city" category and the sub-category corresponding to that particular city. In one implementation, the HUB may further add in value-add elements, categories, sub-categories and/or the like that are associated with message data elements 3803, such as by querying a database of value-add elements based on message data elements discerned at 3801. For example, the HUB may query a county name based on city and/or state information extracted from a message and/or message data that does not itself include the county information. A wide variety of other value-add information may be queried based on data retrieved from an analyzed message, such as but not limited to: city, county, latitude, longitude, global positioning system coordinates, demographic information, mapping system map links (e.g., Google Maps, Bing Maps, and/or the like). In one implementation, a first query may be conducted based on extracted message data elements, and then a second, third, and/or further query may be made based on value-add elements, categories, subcategories, and/or the like retrieved in response to a prior query. A determination may be made as to whether a category, sub-category, and/or the like exists for a particular message data element, value-add element, and/or the like. In one implementation, if no category, sub-category, and/or the like exists to accommodate the element, then an error handling procedure may be undertaken, such as to ignore the element. In another implementation, if no category, sub-category, and/or the like exists to accommodate the element, and new category, sub-category, and/or the like may be generated based on the discerned element 3815. Once categories are correlated with message data elements, counters for those categories may be incremented 3820, such as to track the number of messages having data elements correlated to those categories. For example, if ten messages arrive in a set period of time and five of those messages include data elements identifiable as correlated with the city of Chicago, Ill., then a counter corresponding to the Chicago subcategory of the city category would be at five. Counter statistics may then be updated 3825. A wide variety of different counter statistics, analytics, and/or the like may be tracked in various implementations, such as but not limited to: mean value in a given period, average value in a given period, median value in a given period, variance and/or standard deviation in a given period, percentage and/or relative value, frequency and/or rate, and/or the like. The HUB may then generate a summary message, such as a rolodex display, dashboard elements, time-resolved message volume plots, and/or the like based on the counter statistics 3830. In one implementation, the HUB may access other HUB data, such as user contact data, property data, and/or the like for analysis in conjunction with message data and/or correlated categories, and/or for inclusion in the summary message 3830. Counter values, statistics, message data elements, correlated category records, and/or the like may be stored for later access and/or retrieval 3830.

Figure 39A:
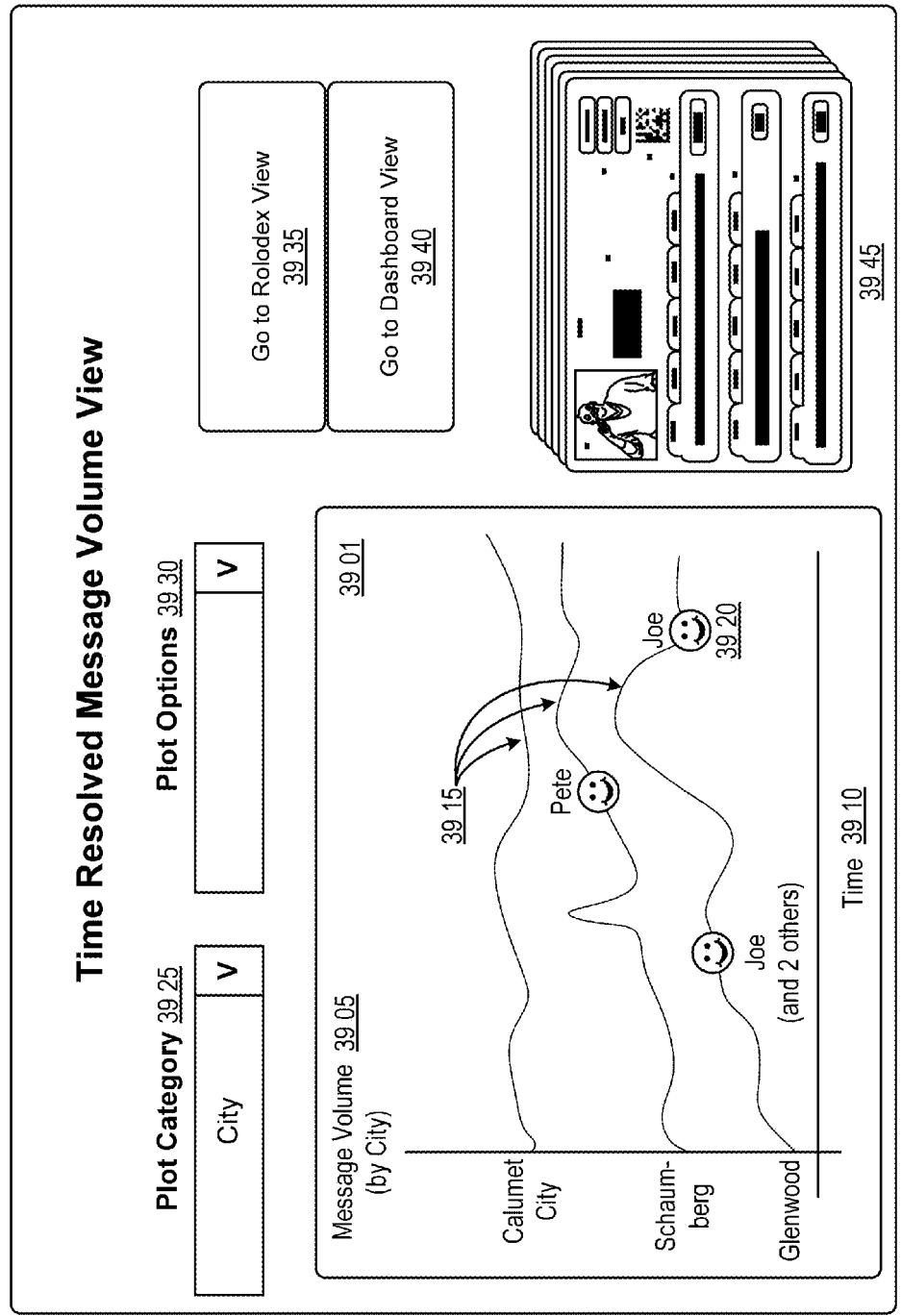
FIGS. 39A-C show implementations of user interface for time-resolved summary screen elements in one embodiment of HUB operation.
Figure 39B:
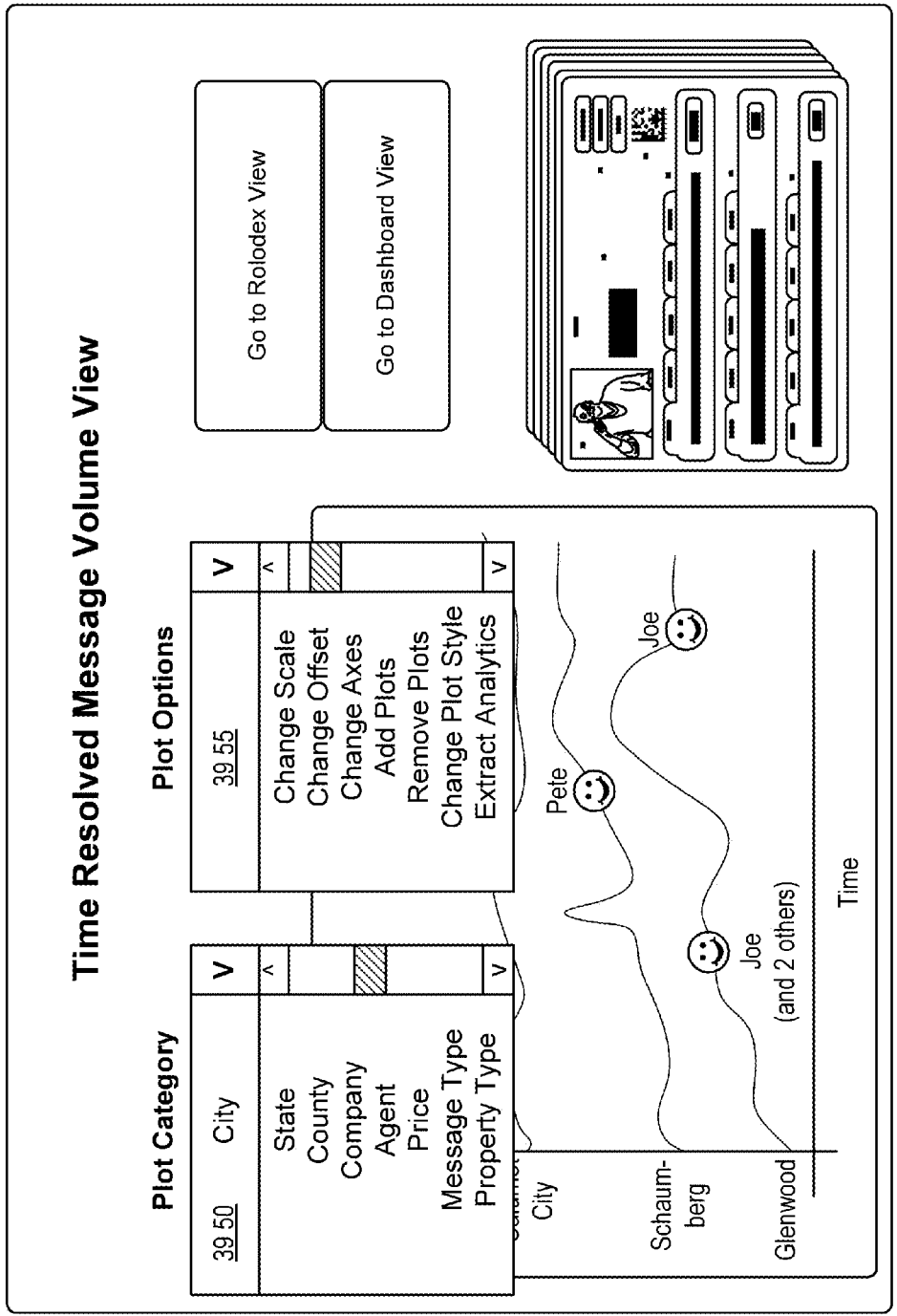
Figure 39C:
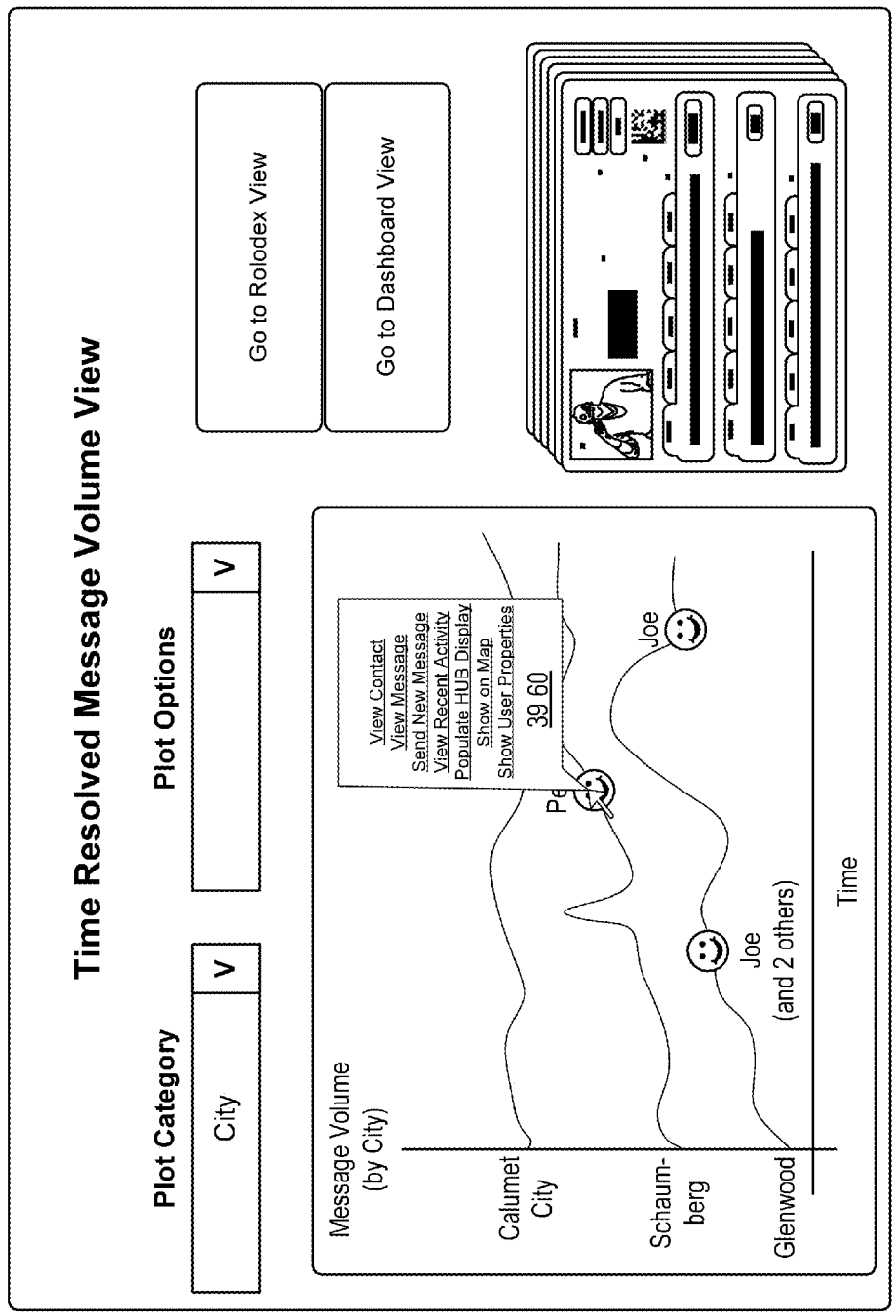

FIGS. 39A-C show implementations of user interface for time-resolved summary screen elements in one embodiment of HUB operation. An interface similar to that shown in the examples of FIGS. 39A-C may be employed by HUB embodiments to show time-resolved message volume information, analytics, and/or the like. For example, the illustrated implementation shows a plot 3901 of message volume by city 3905 as a function of time 3910, reflecting, for example, the number of messages received by a user that the HUB has correlated with particular cities over time. In the illustrated implementation, plots 3915 are displayed for three cities: Calumet City, Schaumberg and Glenwood. The plotted information may further include one or more icons 3920 indicative of other HUB data, such as the location in time of a message from a user's contact associated with the plotted city, or other category and/or subcategory. For example, in the illustrated implementation, icons are shown 3920 indicating messages from contacts Joe, Pete, and two others. The interface may further include interface elements, such as pull-down menus, allowing a user to adjust plotted categories 3925 (e.g., the data plotted on the ordinate axis 3905), other plot options 3930, revert to a rolodex view 3935, revert to a dashboard view 3940, and/or the like. In one implementation, the figure may further include contact listings 3945, selectable message listings, and/or the like to facilitate communications based on displayed data. FIG. 39B shows further aspects of a plot category pull-down menu 3950, where a user may select other data categories for plotting against time (e.g., state, county, company, agent, price, message type, property type, property characteristics, and/or the like), and of plot options 3955, where a user may select options to change plot characteristics (e.g., change scale, change offset, change axes, add plots, remove plots, change plot style, extract analytics, extract numerical data, and/or the like). FIG. 39C shows further aspects of the interface of FIG. 39A, in one implementation, where a user may click and/or mouse-over a plot icon such as that shown at 3920 to be shown a menu with further options for interacting with that icon and/or underlying data. For example, in the illustrated implementation, a pop-up menu 3960 may be displayed to allow a user to perform one or more actions related to a contact associated with the displayed icon, such as but not limited to: view contact information and/or a contact profile; view a message from the contact; send a new message to the contact; view recent HUB activity related to the contact; populate a HUB display, such as a bifurcated display area, with property information associated with the icon and/or with the contact; show the associated property information on a map; show other properties associated with the contact; and/or the like.

Figure 40:
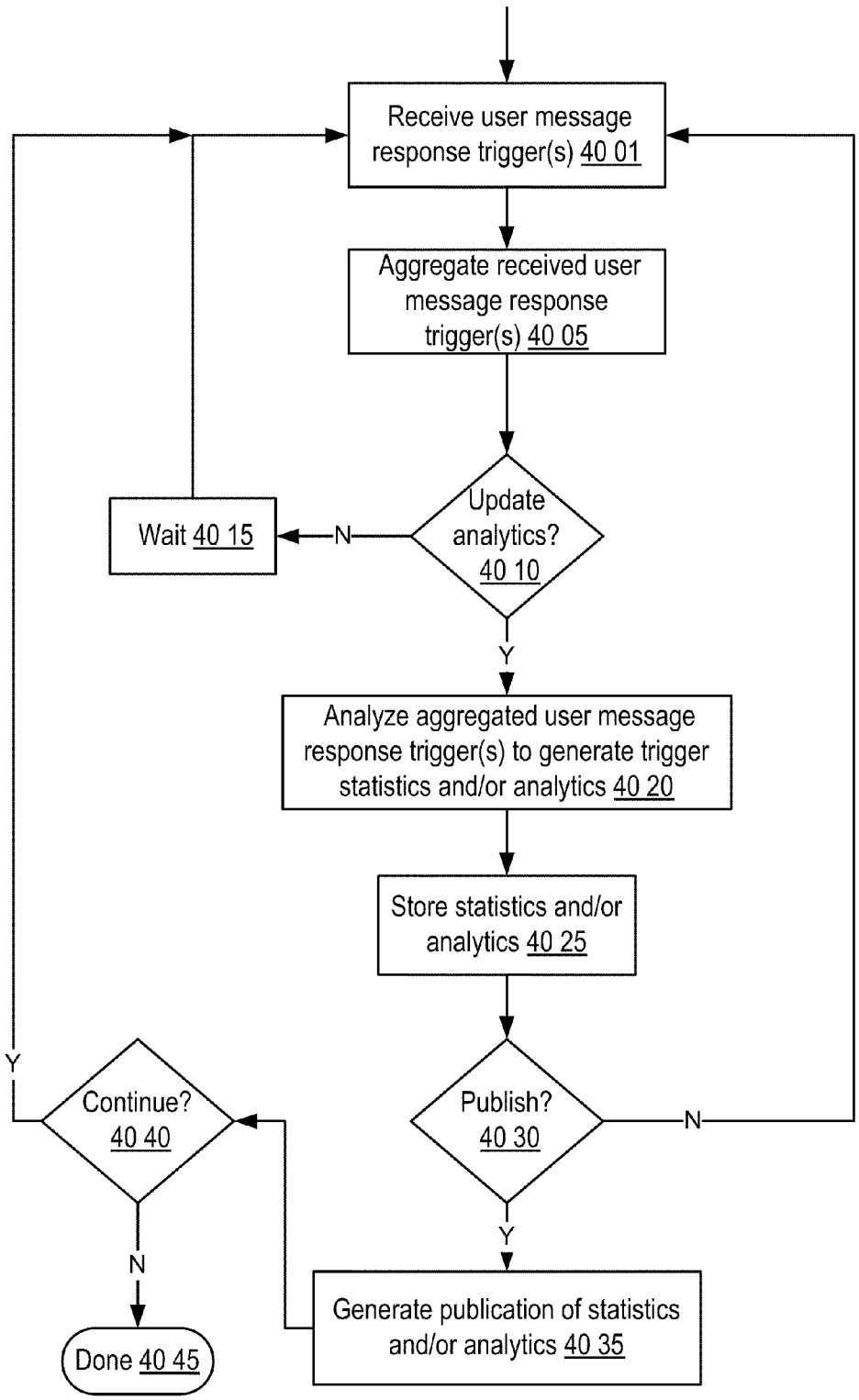
FIG. 40 shows an implementation of logic flow for tracking user message response analytics in one embodiment of HUB operation.

FIG. 40 shows an implementation of logic flow for tracking user message response analytics in one embodiment of HUB operation. In one implementation, the HUB may employ a flow similar to the example shown in FIG. 40 for generating, displaying, storing, publishing, and/or the like message analytics and/or analytics associated with message data, user response triggers to message data, and/or the like. The HUB may receive user message response triggers from one or more users 4001 and aggregate received triggers in correlation with message data elements and/or associated categories 4005. Thus, for example, in one implementation, the HUB may track the number of green gut feel indicators, yellow gut feel indicators, and red gut feel indicators that have been received for messages having real estate property flyers for the city of Schaumberg. Any other type of message trigger indicator value may be tracked for any other type of message data element, category, sub-category, and/or the like. A determination may be made as to whether analytics associated with aggregated user message response triggers are to be updated 4010. For example, in one implementation, such a determination may be made based on inspection of a clock, to determine whether an update time has been reached. If analytics are not to be updated at 4010, then the HUB may wait for a period of time 4015 and/or continue to receive and/or aggregate user message response triggers. If analytics are to be updated, the HUB may analyze aggregated user message response triggers to generate trigger statistics, analytics, and/or the like 4020. For example, in one implementation, based on the aggregate gut-feel indicators for various real estate property categories, the HUB may discern a relative desirability of different aspects of real estate. Generated statistics and/or analytics may be stored 4025 and a determination may be made as to whether or not those statistics and/or analytics are to be published 4030. Such a determination may be made based on the nature of the statistics and/or analytics, inspection of a publication schedule, and/or the like. If no publication is to occur at 4030, the HUB may return to 4001 and continue receiving and/or aggregating user message response triggers. Otherwise, the HUB may generate a publication of statistics and/or analytics, such as by providing them for display for free and/or on a fee and/or subscription basis, such as via a website, newsletter, email list, data feed, and/or the like. A determination may be made as to whether or not to continue receiving and analyzing user message response triggers 4040 and, if so, the flow may return to 4001. Otherwise, the flow may conclude 4045.

Figure 41:
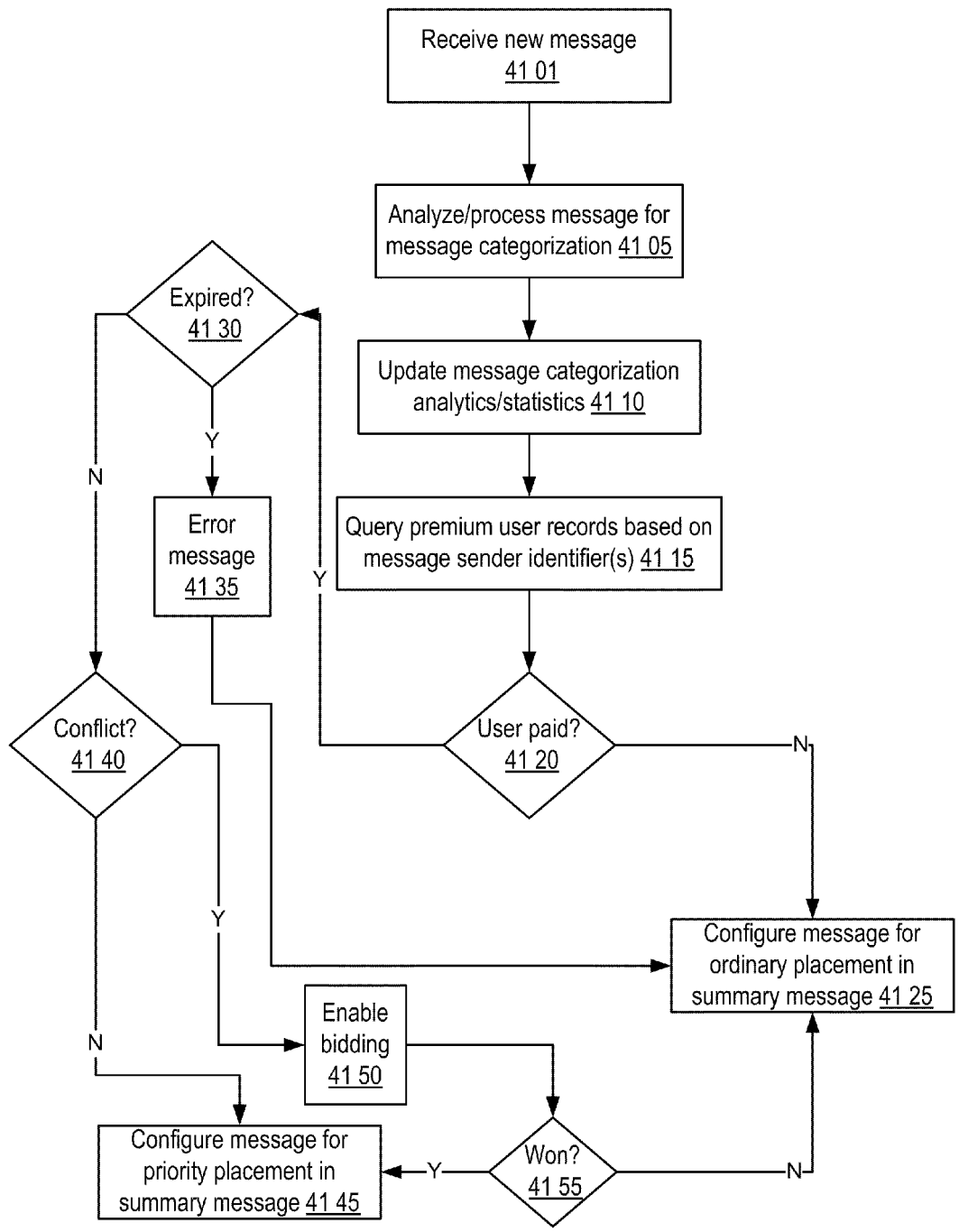
FIG. 41 shows an implementation of logic flow for message display prioritization in one embodiment of HUB operation.

FIG. 41 shows an implementation of logic flow for message display prioritization in one embodiment of HUB operation. In one implementation, the HUB may employ a flow similar to the example shown in FIG. 41 for implementing prioritized placement of messages and/or associated message content in HUB-generated message summary displays, message listings, rolodexes, dashboards, and/or the like. A new message may be received 4101, analyzed and/or processed for correlation of message data elements with one or more categories and/or sub-categories 4105, and message categorization statistics and/or analytics may be updated 4115, such as in accordance with the embodiments and implementations discussed previously. A determination may then be made as to whether the user from which the message was received (e.g., the message originator) has paid 4120. For example, a user may pay a premium amount in order to be granted priority placement of his or her messages in summary messages, message listings, and/or the like provided by the HUB to message recipients. In one implementation, a user may specify and/or such payment may be tied to a period of time during which the user's messages will receive priority placement, a number of messages for which priority placement is effectuated, and/or the like. The determination at 4120 may be made, for example, by inspection of a user profile record, priority account record, and/or the like. If no payment has been received from the user, then the message may be configured for ordinary and/or usual placement in a summary message, message listing, and/or the like 4125 (e.g., such as may be sorted according to some objective basis and/or criteria). If, however, the HUB recognizes payment from the user, a determination may be made as to whether a priority placement period has expired 4130, such as by checking a payment date against a current date in relation to a defined priority period. In another implementation, instead of and/or in addition to checking for expiration of a priority placement period, the HUB may check a number of previous priority-placed messages in relation to a limit to determine if all available priority placements have already occurred, or if the present message should also receive priority placement. If the period has expired, a message may be provided to the user, in one implementation, explaining that the priority period has expired 4135, and the message may be configured for ordinary placement 4125. If the priority period has not expired at 4130, then a determination may be made as to whether a conflict exists with another user's priority placement 4140. If not, then the message may be configured for priority placement in summary messages, message listings, dashboards, rolodex displays, and/or the like of message recipients 4145. For example, in one implementation, the message may be placed at or near the top of a message listing. In other implementations, the message and/or message data elements, correlated categories and/or sub-categories, and/or the like may be provided for prominent display, highlighted, flashing, bolded, underlined, placed in a central position in the display screen, and/or the like. If a conflict exists at 4140, then a conflict resolution procedure may be undertaken, such as implementing a priority hierarchy based on amount paid, order in time the amount was paid, user history, user characteristics, target characteristics and/or relationship with the user, and/or the like. In one implementation, when a conflict exists, the HUB may implement a bidding system 4150, such as by soliciting bids from the conflicting users and providing highest priority placement to the user or users providing the highest bid amounts. For example, a determination may be made as to whether a particular user has won the bidding session, such as by providing the highest bid and, if so, that user's messages may receive the highest priority placement 4145. Otherwise, they may be configured for ordinary placement 4125, lower priority placement, and/or the like.

Figure 42:
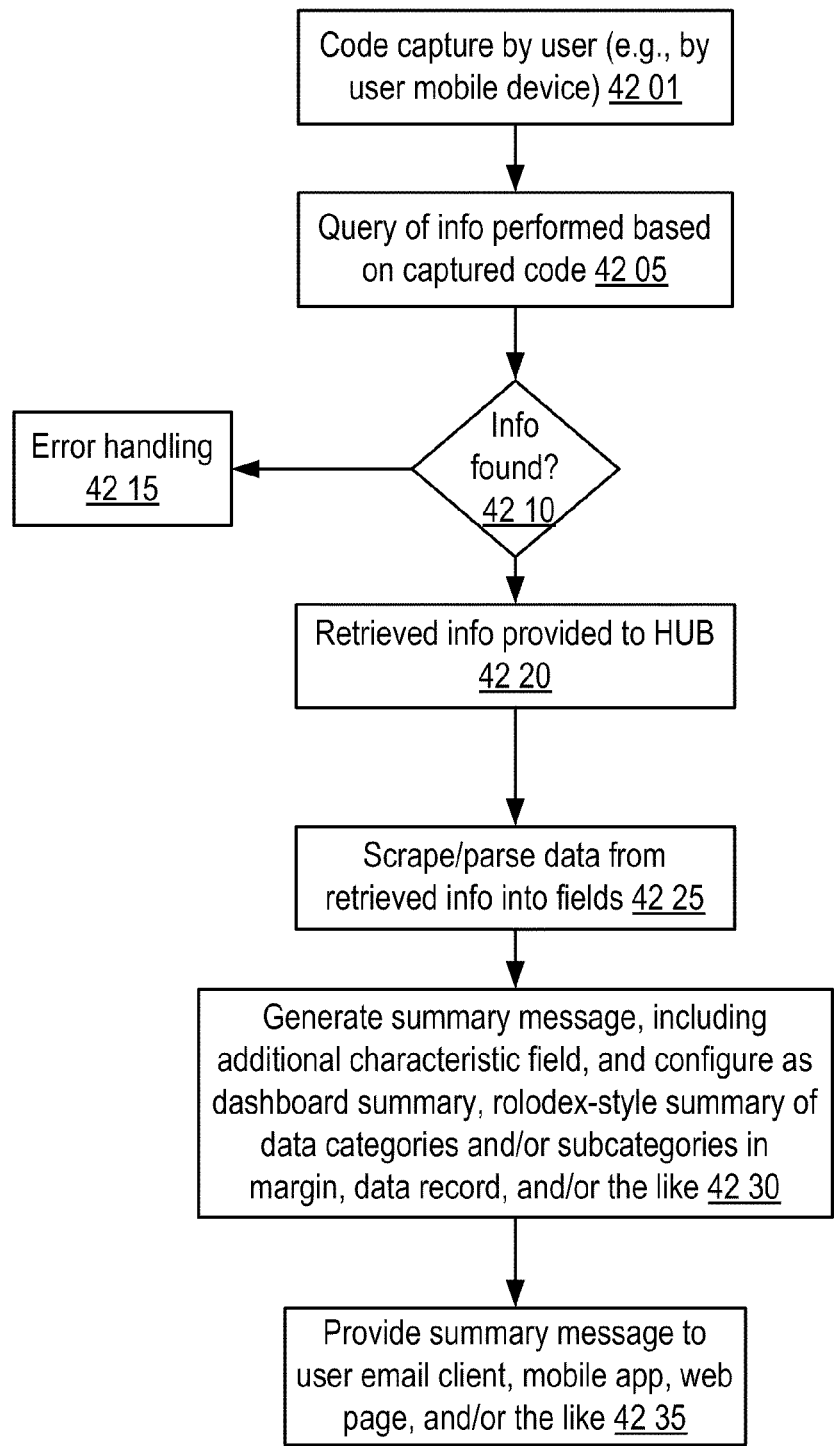
FIG. 42 shows an implementation of logic flow for code capture information retrieval and processing in one embodiment of HUB operation.

FIG. 42 shows an implementation of logic flow for code capture information retrieval and processing in one embodiment of HUB operation. In one implementation, the HUB may employ a flow similar to that shown in the example of FIG. 42 for aggregating, processing, analyzing, and/or the like information associated with barcodes and/or other codes captured, imaged, scanned, and/or the like by user mobile devices. A code may be captured by a user 4201, such as, for example, a barcode, 2D matrix code, steganographic image, and/or the like provided in association with a real estate property, other property, and/or the like. A query may then be performed to retrieve information based on the captured code 4205, and a determination may be made as to whether any information was retrievable by that query 4210. If not, an error handling procedure may be undertaken 4215, such as to ignore the code capture, provide a message to the user, and/or the like. If matching information is found at 4210, then the retrieved information and/or access thereto may be provided to the HUB 4220, which may scrape and/or parse data therefrom into one or more data fields 4225 in order to correlate the received information with one or more categories and/or subcategories. A summary message may then be generated based on the correlated categories and/or subcategories, and may include a further characteristic field indicating the origin of the data as being associated with code captures, as opposed to messages 4230. The summary message may then be provided for user display, such as via an email client, mobile application, web page, and/or the like 4235. In one implementation, real estate property information aggregated as a result of code captures may form the basis of a real-estate listing service.

In embodiments, the HUB may be configured to facilitate transaction and/or exchange of lead information, such as contact information, real estate site drives, market comparables, marketing ideas, calendar time, and/or the like. The HUB may engender a tailored and efficient forum for coordinating transactions of lead information based on a centralized database of contacts and other lead and/or market information associated with and/or belonging to users. In one embodiment, users may submit lead requests comprising parameters and/or criteria based on which one or more queries may be performed on that database. Other users having leads matching the request may then be notified and may decide whether to share their lead information with the requesting user. In one implementation, users may include a bounty or other user-specified offer price with their lead request, which bounty may be provided to a lead owner and/or provider upon transfer of the requested lead information. In one implementation, a lead provider may also set a bounty, minimum payment amount, and/or the like to act as a required price, target price, threshold price, and/or the like for the sharing of lead information. In some implementations, lead requestors may submit lead quality rating scores and/or the like subsequent to receiving lead information, which may assist future requestors in selecting the lead providers with whom they wish to engage in transactions. For example. lead requestors may be able to view such lead quality scores and/or ratings for candidate lead providers and/or leads to determine which are the most desirable to pursue and/or to pay a bounty for.

In one implementation, the HUB may facilitate transactions based on contact information, such as from one broker to another, from a broker to a retailer or other interested party, and/or the like. In another implementation, the HUB may facilitate direct contact between HUB users, such as facilitating transactions based on calendar time, such as from one retailer to another, from one retailer to a broker, and/or the like. For example, in such an implementation, a retailer may receive a message requesting access to the retailer's time (e.g., for a call, to schedule a meeting, videoconference, and/or the like) in exchange for a bounty price. In the context of commercial real estate implementations, commercial real estate professionals seeking to maximize the return on their time and efforts (which, after all, are often directed towards earning commissions) may employ the HUB to engage retailers to receive quick feedback on properties being marketed. The HUB may facilitate an incentive structure for retailers to share their time with brokers, such as to provide this kind of feedback on marketed properties, in exchange for the payment of an agreed-upon bounty. Similarly, the broker, who also has limited time and is interested in receiving the greatest return on time invested, receives some assurance that the exchange will be of some value. Therefore, the retailer or professional representing the retailer may be able to stipulate the value of his time, and the professional representing the property may decide whether or not it is worth it to him to pay for a scheduled amount of that time.

Figure 43:
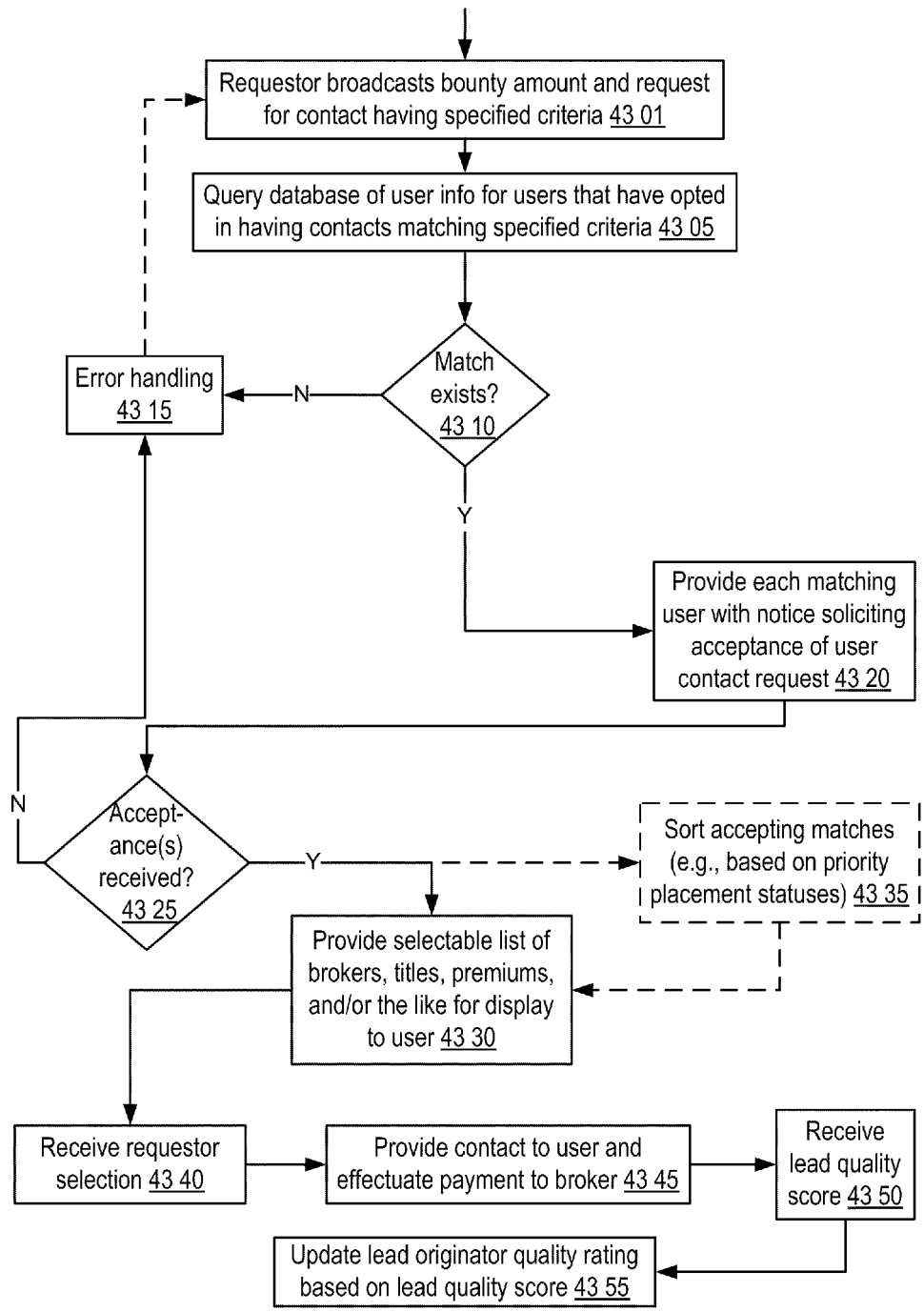
FIG. 43 shows an implementation of logic flow for lead exchange in one embodiment of HUB operation.

FIG. 43 shows an implementation of logic flow for lead exchange in one embodiment of HUB operation. A HUB user may act as a requestor, and submit a request for lead information to the HUB 4301. In various implementations, lead information may comprise contact information (e.g., name, electronic address, postal and/or business address, business and/or personal telephone numbers, instant messaging address, user identifier within an online service, contact authorization, and/or the like), site drive information, marketing ideas, notes, and/or any other community-sourced and/or user generated and/or controlled information. In one implementation, the request may further include bounty, payment offer, contingent payment offer, and/or the like, reflecting an amount of compensation that the requestor is willing to pay in exchange for the requested lead information. In one implementation, the bounty may be a fixed sum of money. In another implementation, the bounty may be a percentage of an expected future transaction amount (e.g., the sale or lease of real estate) for a transaction associated with the lead request. In one implementation, a lead request may include a requestor payment account identifier (e.g., a credit card number, bank account number, online payment facilitation service number, and/or the like) and any associated authorization information to allow the HUB to automatically deduct an amount upon successful consummation and/or fulfillment of the lead request. In one implementation, the HUB may transfer a bounty amount into a escrow account prior to consummation and/or fulfillment of the lead request, and then transfer that amount from the escrow account into a lead provider account upon consummation and/or fulfillment, as described below. In one implementation, a service fee or other percentage of the bounty may be levied by the HUB for completed transactions. In one implementation, such a service fee may be deducted from the bounty prior to payment to the lead provider while, in another implementation, such a fee may be deducted from a lead requestor account in addition to the bounty amount.

In one implementation, the request may further include any of a variety of lead identifying criteria, based on which the HUB may perform one or more queries to retrieve information pertinent to the lead request. For example, a user may specify a property identifier, location, contact name, contact role and/or title, and/or the like. The HUB may then perform a query on HUB users and/or associated user lead information based on the lead criteria provided in the request 4305. In one implementation, the query may further be based on a bounty or other payment amount specified in the lead request, whereby only lead providers having minimum compensation requirements less than the lead requestor's specified bounty are returned in response to the query. In one implementation, such a minimum compensation amount may be set by the lead provider and/or may be based in whole or in part on a quality rating associated with the lead provider. In one implementation, only lead providers who have opted in to a lead sharing service may be included in the query at 4305. In another implementation, all users may be included in the query at 4305, and a subsequent extraction of users who have opted in may then be performed. A determination may be made as to whether, in response to the query 4310, one or more HUB lead providers can be found having associated leads matching the query. If not, then an error handling procedure may be undertaken 4315, such as providing an error message to the lead requestor, requesting reentry of lead criteria parameters, and/or the like. If one or more matches are found, the HUB may provide each matching user with a message requesting acceptance of the user contact request and/or authorization to release further information about the available lead to the requestor 4320. A determination may then be made as to whether at least one acceptance has been received in response to the notice message at 4320 and, if not, then an error handling procedure may be undertaken 4315, such as notifying the requestor of the lack of acceptances, notifying the requestor of the number of rejections, requesting reentry of lead criteria, and/or the like. If at least one acceptance is received at 4325, the HUB may provide a selectable list of matching lead provider and/or lead information (e.g., broker names, titles, prices and/or premiums, redacted lead information, and/or the like) for selectable display to the requesting user 4330. In one implementation, the HUB may sort matches prior to displaying them to the requestor 4335. Sorting may be based on any one or combination of a variety of different sort criteria in various implementations. For example, the HUB may order match results based on alphabetical order; a lead provider quality rating; order in which acceptances were submitted and/or received; match quality relative to lead criteria; a difference between a proposed and an expected or required payment amount for provision of the requested lead; participation and/or status in a priority-placement program (e.g., a user may pay a premium in order to receive priority placement in such lists); and/or the like.

The HUB may receive a selection of one or more entries in the selectable list from the requesting user 4340. Lead information (e.g., such as contact information) associated with those entries may then be provided to the requesting user, and a payment may be effectuated to the one or more users (e.g., brokers) who own, control, provide, and/or are otherwise associated with the provided lead information 4345. In some implementations, access may be provided to the requested lead information via an email message, an instant message, web page access (e.g., permanent access, access for a set period of time, and/or the like), and/or the like. In one implementation, where the bounty and/or proposed payment included in the lead request is contingent on the outcome of a future transaction, the HUB may further monitor the outcome of that transaction and only effectuate payment upon receipt of an indication of successful consummation thereof. For example, where the bounty is specified as a percentage of an expected transaction amount, the HUB may withhold payment until receipt of an authorized indication (e.g., entry by a HUB administrator) of a transaction amount for the associated transaction, at which time the appropriate payment amount may be determined and effectuated. In one implementation, a service fee may be deducted from and/or added to the payment amount, and a net payment effectuated between the lead requestor and lead provider. In another implementation, a fee payment may be made based on the type of associated transaction (e.g., full payment being due at the time of a closing on a property sale; partial payment being due upon execution of a lease with remainder of payment being due upon tenant doors opening for business; and/or the like).

The HUB may then receive a lead quality score from the requesting user 4350, such as may reflect a perceived quality associated with the received lead information. Any of a variety of lead ratings may be employed in different implementations of the HUB, such as but not limited to numerical scores, radio-button ratings, "like" buttons, thumbs-up and/or thumbs-down ratings, and/or the like. A lead quality score associated with the owner, originator, controller, and/or the like of the lead may then be updated based on the received lead quality score 4355.

Figure 44:
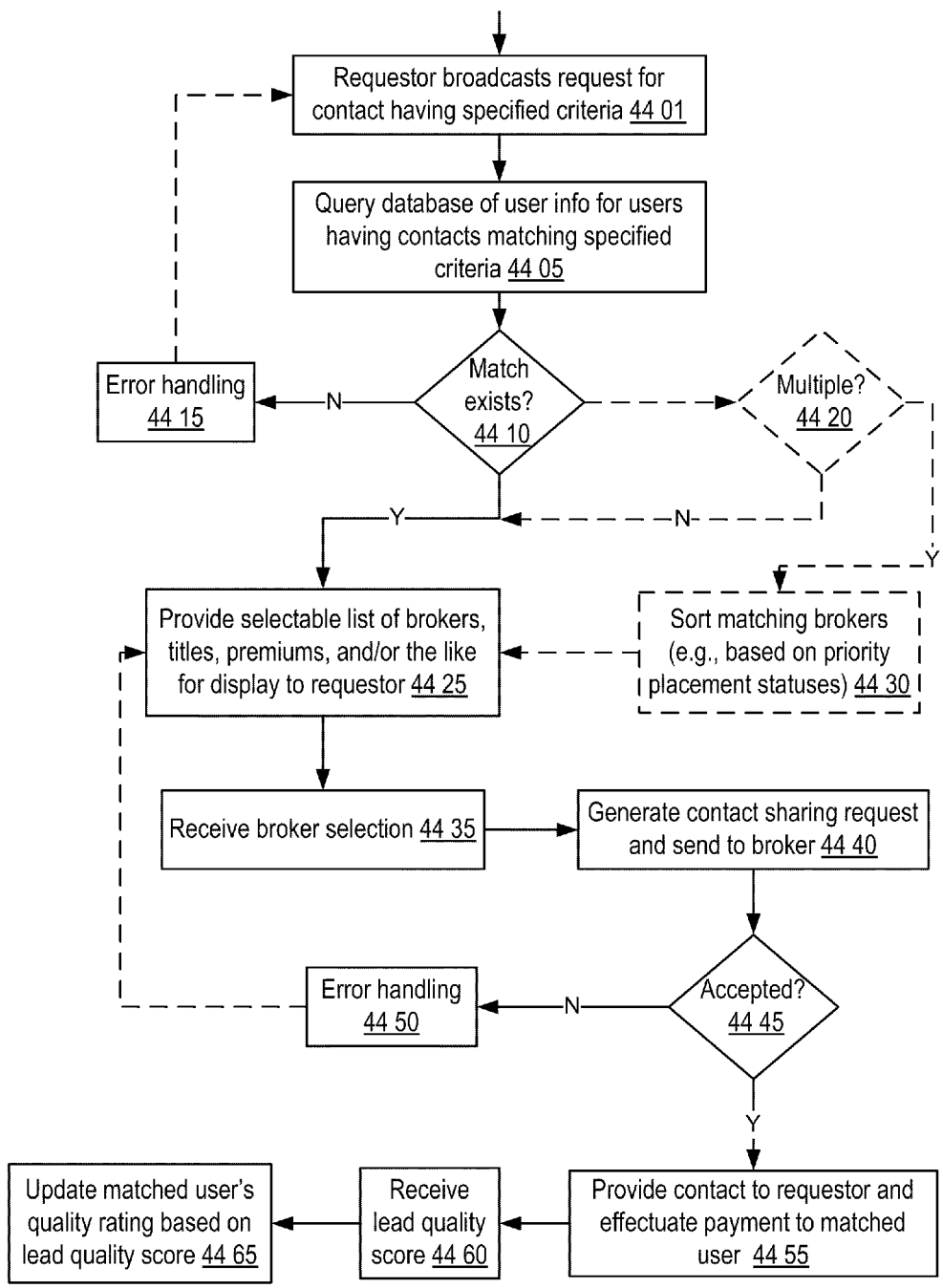
FIG. 44 shows an implementation of logic flow for lead exchange in another embodiment of HUB operation.

FIG. 44 shows an implementation of logic flow for lead exchange in another embodiment of HUB operation. A lead request, such as one similar to that shown at 4301 in FIG. 43, may be received from and/or broadcast by a requesting user 4401, and a query may be performed to find one or more lead sources, associated users, and/or the like matching specified criteria provided and/or associated with the received request

4401. In one implementation, the queried database source may, by default, include and/or be filtered to access only those users, lead providers, and/or the like who have opted in to participate in the lead sharing program. A determination may be made as to whether any matches exist 4410 and, if not, then an error handling procedure may be undertaken 4415, such as notifying the requestor of the lack of acceptances, notifying the requestor of the number of rejections, requesting reentry of lead criteria, and/or the like. If a match exists at 4410, the HUB may provide a selectable list of matches, such as user (e.g., broker) names, titles, prices and/or premiums, redacted lead information, and/or the like for selectable display to the requesting user 4425. In one implementation, a determination may be made as to whether there are multiple matches in response to the query 4420 and, if not, then the single match may be provided at 4425. If multiple matches are determined to exist at 4420, those may be sorted based on any one or combination of a variety of different sort criteria in various implementations, such as based on alphabetical order; a user quality rating; match quality relative to lead criteria; a difference between a proposed and an expected or required payment amount for provision of the requested lead; participation and/or status in a priority-placement program (e.g., a user may pay a premium in order to receive priority placement in such lists); and/or the like. The HUB may receive selection of one or more entries in the selectable list from the requesting user 4435 and may generate a lead sharing request message to be sent to one or more users (e.g., brokers) selected at 4435 to request authorization to share the requested information 4440. A determination may be made as to whether any acceptances are received 4445 and, if not, then an error handling procedure may be undertaken 4450, such as providing an error message to the requesting user, requesting re-selection, and/or the like. If at least one acceptance is received, lead information (e.g., contact information) may be provided to the requesting user, and payment may be effectuated for the user owning, controlling, and/or otherwise associated with the provided lead information 4455. The HUB may then receive a lead quality score from the requesting user 4460, such as may reflect a perceived quality associated with the received lead information. Any of a variety of lead ratings may be employed in different implementations of the HUB, such as but not limited to numerical scores, radio-button ratings, "like" buttons, thumbs-up and/or thumbs-down ratings, and/or the like. A lead quality score associated with the owner, originator, controller, and/or the like of the lead may then be updated based on the received lead quality score 4465.

Figure 45:
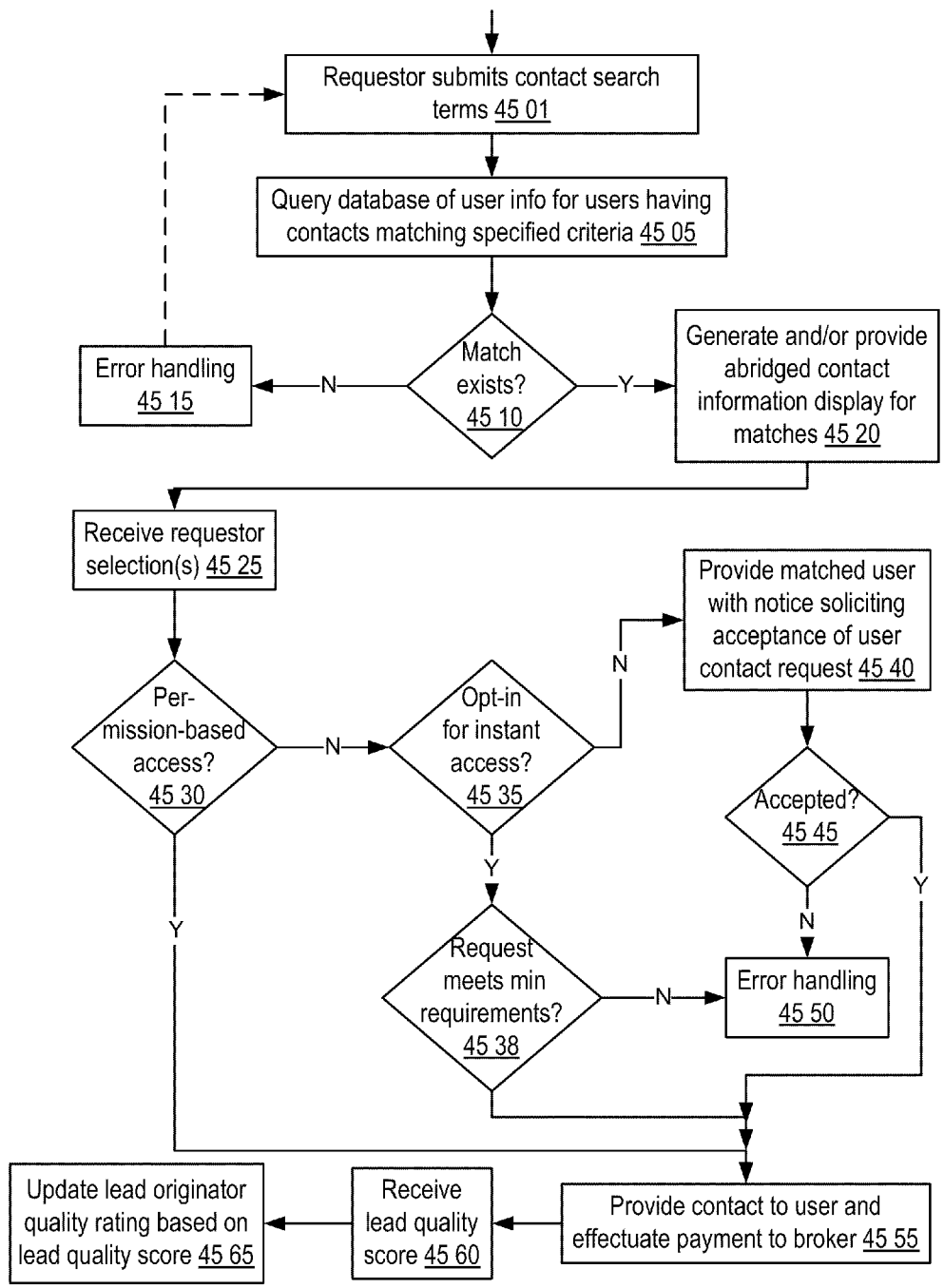
FIG. 45 shows an implementation of logic flow for lead exchange in another implementation of HUB operation.

FIG. 45 shows an implementation of logic flow for lead exchange in another implementation of HUB operation. A requestor may submit lead (e.g., contact) search terms, such as a contact name, location, business affiliation, title, price range, transactional status, and/or the like 4501, and the HUB may perform a query of user records based thereon 4505. A determination may be made as to whether a user with matching lead information exists 4510 and, if not, then an error handling procedure may be undertaken 4515, such as providing an error message to the user, requesting reentry of search terms, and/or the like. If a match exists at 4510, then the HUB may generate and/or provide abridged and/or redacted lead information for display to the requesting user. For example, if the user has requested to be provided with contact information matching specified criteria (e.g., for a broker in Peoria, Ill. with landlord clients in suburban commercial real estate), the HUB may provide only a subset of the contact information, such as one or more of a title, letters of a name, an affiliated company, general and/or granular location information, property attributes, and/or the like. The HUB may then receive a selection of one or more entries in the list of redacted list information 4525 from the requesting user. A determination may be made as to whether the requesting user is authorized for permission-based access to the selected information 4530, such as, for example, if the owner and/or controller of that information has specified an identifier associated with the requesting user as part of an authorized list of users for the requested lead information. If permission based access is authorized, then the lead information may be provided to the requesting user and, in one implementation, a payment effectuated to the lead providing user (e.g., broker) 4555. A wide variety of different payment mechanisms, methods, offerings, and/or the like may be employed in different embodiments of HUB operation, such as, but not limited to, credit card payments, cash exchanges, promissory notes and/or contracts, payment facilitation services (e.g., PayPal), virtual currency facilities, contingency fee arrangements, lead trading or other bartering, and/or the like.

If there is no permission-based access authorized at 4530, a determination may be made as to whether the one or more users associated with the selected lead information have opted in for providing instant access to lead information in response to lead requests, or if instead they have opted to receive a further opportunity to approve provision of the requested lead information 4335. If the users have opted in to provide instant access, then the HUB may determine whether the requesting user and/or the lead request itself meet minimum requirements for lead information provision 4538. For example, in one implementation, such a determination may be made based on a comparison of a bounty proposal from the lead requestor to a minimum required amount specified by the lead owner and/or controller for sharing the requested lead information, whereby the minimum requirement is met if the bounty exceeds the minimum required amount. In another example, a minimum requirement may be based on a comparison of a requesting user identifier and/or other requesting user characteristics to a list of preferred and/or prohibited identifiers and/or characteristics. If the minimum requirements have not been met, an error handling procedure may be undertaken 4550, such as providing an error message to the requesting user, prompting the user for re-selection of desired leads, and/or the like. If the minimum requirements have been met at 4538, then the requested lead information may be provided to the requesting user, and payment effectuated for the owner and/or controller of the lead information 4555.

If the lead originators have not opted in at 4535, the HUB may provide them with a lead sharing request notice and/or message 4540, and a determination may be made as to whether they have accepted the request 4545. If not, then an error handling procedure may be undertaken 4550, such as providing an error message to the requesting user, prompting the user for re-selection of desired leads, and/or the like. Otherwise, if the lead request is accepted at 4545, then the requested lead information may be provided to the requesting user, and payment effectuated for the owner and/or controller of the lead information 4555. The HUB may then receive a lead quality score from the requesting user 4560, such as may reflect a perceived quality associated with the received lead information. Any of a variety of lead ratings may be employed in different implementations of the HUB, such as but not limited to numerical scores, radio-button ratings, "like" buttons, thumbs-up and/or thumbs-down ratings, and/or the like. A lead quality score associated with the owner, originator, controller, and/or the like of the lead may then be updated based on the received lead quality score 4565.

In one implementation, the HUB may track and/or maintain records of lead requests, lead provisions, lead transactions, bounty payments, and/or the like. Tracked records may include, for example, a record of a lead requestor identifier, lead provider identifier, date, time, lead request type, lead request parameters, lead quality score, bounty amount, and/or the like. The HUB may analyze lead request and/or transaction records to discern one or more trends associated therewith. For example, the HUB may determine which brokers, retailers, tenants, landlords, and/or the like HUB users have been accessed the most and/or been the target of the most lead requests by HUB lead sharing services. In another example, the HUB may determine which locations, property types, property characteristics, price ranges, and/or the like are the most popular among lead requestors, lead requests, provided leads, and/or the like. The HUB may perform any of a wide variety of statistical analyses on accumulated information, such as, but not limited to, calculating averages, means, medians, variances, standard deviations, location and/or time resolved trends, correlations, and/or the like. In one implementation, accumulated and/or generated trend information may be made available to HUB administrators, users, and/or the like. The HUB may publish lead request and/or lead provision analytics, provide fee-based access, and/or the like.

FIG. 46 shows an implementation of user interface for lead request submission in one embodiment of HUB operation. By engaging elements of the lead request form 4601, a lead requesting user may specify a variety of lead request information, criteria, offers, and/or the like to tailor a particular lead request. The interface may, for example, allow a user to specify a request type 4605, for example as a contact information request, a marketing idea request, a site drive request, a calendar time request, a personal introduction request, a broad request covering all available categories, and/or the like. In one implementation, the interface may further include one or more fields 4610 by which a user may enter and/or submit request parameters, lead criteria, search terms, search strings, and/or the like information for use by the HUB in querying lead information stored in one or more HUB databases. In one implementation, request parameter fields may be subdivided into one or more sub-fields accepting entry of specific categories of request parameters, such as, but not limited to, lead name, lead title, lead type, location, property type, property characteristics, property name, transaction type, availability, bounty amount, and/or the like. In one implementation, the interface may further include facilities to allow a user to specify a bounty offer for association with the lead request 4615, such as in the form of a number in conjunction with a currency unit. In one implementation, the interface may further include one or more fields or other interface elements allowing a user to further target and/or refine the lead request. For example, a user may be able to specify desired characteristics of a lead originator, controller, owner, and/or the like. When the lead request is complete, the user may engage an interface element such as the button shown at 4625 to submit the request to the HUB. In one implementation, an interface similar to the example shown in FIG. 46 may be implemented as a web interface.

FIGS. 47A-C show implementations of user interface for lead candidate selection in one embodiment of HUB operation. Interfaces similar to the examples shown in FIGS. 47A-B may be employed by HUB embodiments to allow lead requesting users to select desired lead resources. In one implementation, a lead request results page 4701 may include a button or similar interface element to allow a lead requestor to return to a lead request page, such as that shown in FIG. 46, to modify request parameters 4705. A results interface may include a variety of information related to lead results returned in response to a lead request, such as information pertaining to a lead provider associated with the requested lead information 4710, a quality rating for that lead provider 4715, and/or the like. In one implementation, a quality premium 4720 may be assessed, such that a lead requesting user may be requested to agree to pay an additional amount equal to the quality premium in order to receive the lead information from the associated user. The interface may further include one or more facilities to allow a user to select one or more of the entries in the results page 4725, based on which the user may register a desire to retrieve the selected information 4730.

In one implementation, an interface similar to the example shown in FIG. 47B may allow a lead requestor to view information about lead originating, owning, controlling, and/or the like users within the results page. For example, in one implementation, interaction with a user identifier (e.g., clicking, mousing over, and/or the like), may engender a pop-up window 4735 that includes information for the contact user, such as a photo 4740, contact information 4745, and/or the like.

In one implementation, an interface similar to the example shown in FIG. 47C may further provide a subset of lead information for display to a lead requestor prior to lead selection, lead provision, bounty payment, and/or the like. For example, in the illustrated implementation, for a contact information request, the lead requestor may be provided with a contact title 4750, contact location 4755, and/or the like to assist the requestor in selecting a lead provider with whom to exchange lead information and/or payment. In various implementations, any of a variety of selected and/or redacted lead information may be provided for display, such as redacted contact information, title, location, company name, contact type, calendar availability, site drive information, redacted and/or abbreviated marketing ideas, and/or the like. FIG. 47C also illustrates an implementation whereby matching lead providers having minimum payment thresholds in excess of the bounty amount associated with a lead request may still be provided for display to the lead requestor. For example, in the illustrated implementation, a result entry is displayed 4760 where the lead provider identity is redacted, and a message is provided indicating that the lead requestor provided bounty is too low to allow for engagement in a lead sharing transaction with the corresponding lead provider. Display of this information, or other limited information related to the lead provider, may inspire a lead requestor to modify request parameters in order to be able to access lead information provided by that lead provider.

In embodiments, the HUB may be configured to identify leads for users based on user-entered information, user contacts, and/or the properties associated with a user and/or in which a user is interested. Leveraging connectivity between contact relationship management functionality, property listing service features, intelligent inbox coordination capabilities, and/or the like, the HUB may identify connections between user requirements and/or assets and opportunities to fulfill those requirements and/or to transact those assets or to alert the lead seeker of information correlating to their expressly stated needs or to notify them of potential needs derived from their historical or current activity in the contact relationship management service, property listing service, intelligent inbox coordination service, and/or the like.

Figure 48:
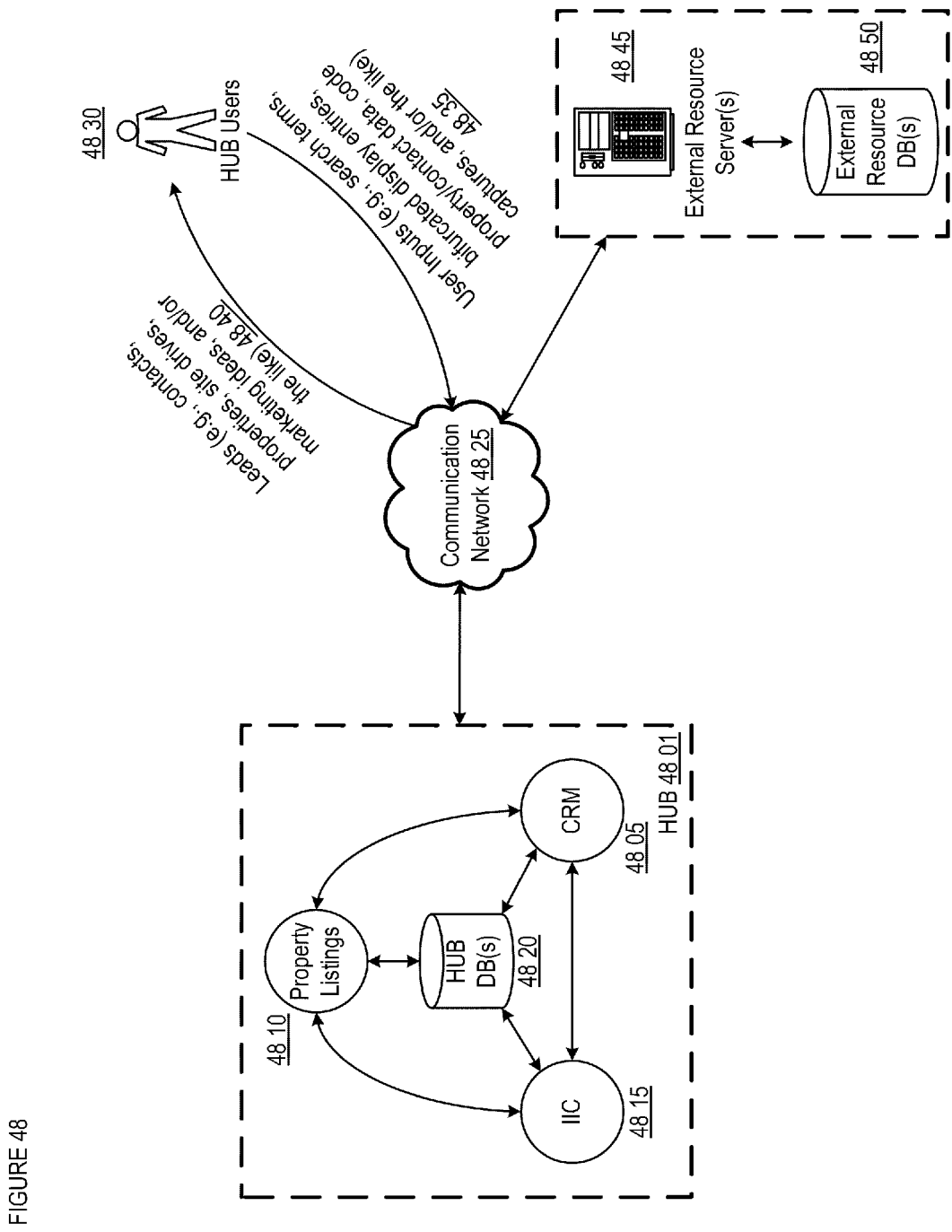
FIG. 48 shows a schematic illustration of data flow between and among HUB components and affiliated entities for lead generation in one embodiment of HUB operation.

FIG. 48 shows a schematic illustration of data flow between and among HUB components and affiliated entities for lead generation in one embodiment of HUB operation. A HUB system 4801 may include components, such as those discussed above, facilitating contact relationship management ("CRM") 4805, property listing 4810, intelligent inbox coordinating 4815, and/or the like features and/or services, all of which may be communicatively coupled with each other and/or with one or more HUB databases 4820. The HUB may further be communicatively coupled via a communication network 4825 to one or more users 4830, who may enter a variety of inputs, such as search terms, entries into a HUB bifurcated display, contact and/or property data and/or parameters, code (e.g., barcode) captures and/or associated data, scraped email and/or webpage data, and/or the like. In turn, the user may receive HUB generated leads related to received inputs, and/or which may identify possible opportunities for transactions, communications with other users, marketing, and/or the like. For example, users may receive contact information, property information, site drive information, marketing idea information, and/or the like 4840 which may be associated with and/or retrieved in response to receipt of various user inputs 4835. The HUB 4801 may further be coupled to one or more external resource servers 4845 and/or external resource databases 4850 to receive lead generation inputs and/or to access lead information. In one implementation, external resources may comprise real estate listing services, contact relationship management systems, electronic message and/or mail services, code capture data sources, and/or the like.

Figure 49:
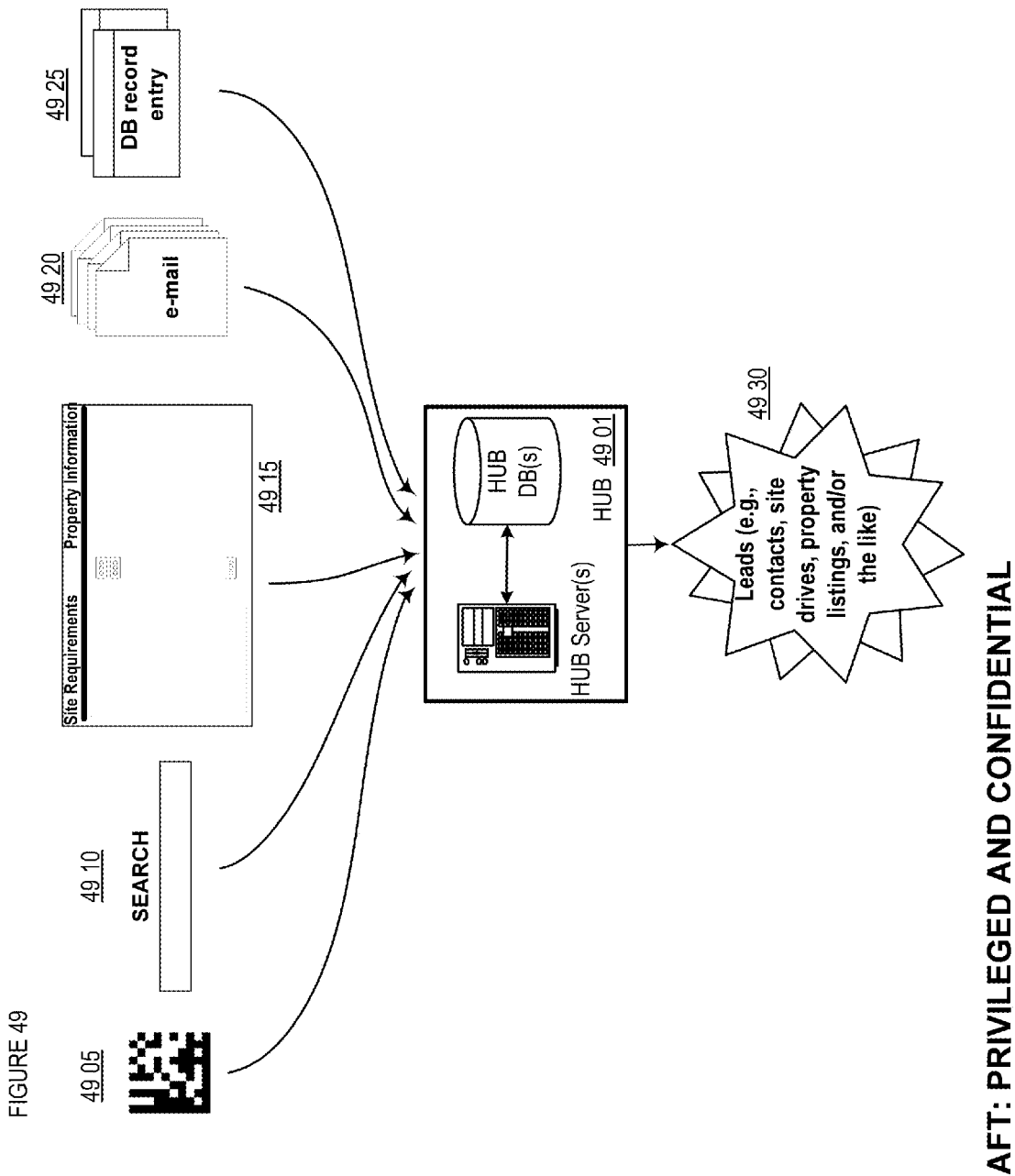
FIG. 49 shows a schematic illustration of data flow for lead generation based on various inputs in one embodiment of HUB operation.

FIG. 49 shows a schematic illustration of data flow for lead generation based on various inputs in one embodiment of HUB operation. In one implementation, the non-exhaustive catalog of data sources shown in FIG. 49 may serve both/ either as triggers for the generation and identification of new leads and/or as sources of data for the development of a body of data from which future leads may be generated and/or identified. For example, the HUB 4901 may receive one or more code captures 4905, such as described previously, based on which any of a variety of data (e.g., property requirements and/or specifications, site drive information, contact information, and/or the like) may be retrieved and/or stored. In one implementation, retrieved information may be employed, such as in accordance with the method described with reference to FIG. 50, to form a query to seek related, alternative, complementary, and/or the like information from existing data resources. In another implementation, data retrieved in response to a code capture (e.g., property parameters, a location where the code was captured, an associated contact, an identifier of the user capturing the code, and/or the like) may be stored in a HUB data record, and may be accessed at a future time by a query formed based on other inputs (e.g., property parameters) in order to identify some connection to those other inputs and/or possible leads. Other inputs which may be exploited to build lead data and/or which may be used to build queries to identify new leads include, but are not limited to: search strings and/or entries into one or more search fields (e.g., property parameters entered to seek matching properties) 4910; entries into a HUB bifurcated display 4915; email messages and/or email message summaries, such as may be generated by a HUB intelligent inbox coordinator 4920; HUB and/or external database record entries and/or existing data records 4925; and/or the like. Among the leads 4930 which may be generated in response to the receipt of one or more such inputs are contact information, site drive information, property listings, marketing ideas, and/or the like.

For further illustration, in one example, a tenant broker may enter desired site requirements of a tenant client in a HUB bifurcated display, such as during a telephone conversation with a counterbroker representing one or more landlord clients. All or a subset of the entered site requirement information may be used to construct a query statement with which existing HUB property records are queried. Such existing records may include records of property information generated directly as a result of user property information inputs, property information scraped and/or analyzed from websites, property information scraped and/or analyzed from emails (e.g., emails received by the tenant broker, emails received by the tenant brokers contacts, and/or the like), property information scraped and/or analyzed from documents (e.g., Word, HTML, PDF files and/or the like), property information of other users, property information received in response to captured codes, and/or the like. Any retrieved property information may be analyzed, rated, ranked, and/or the like to determine if the match is of sufficient closeness, quality, and/or the like (as discussed further below) to warrant identification as a potential lead for the user. If identified as a lead, the HUB may provide notice of the property information to the tenant broker, and/or may access further information linked with the property information, such as associated contact information, site drive information, marketing idea information, and/or the like, which may then be provided to the tenant broker.

In one implementation, the HUB may further identify a current role, activity, and/or the like associated with the input information, discern a complementary role, activity, and/or the like, and construct a query based on the current activity/ role and/or the complementary activity/role. For example, a current role may comprise a tenant broker role, and a complementary role may comprise a landlord broker role, whereby property information entered under a tenant broker role may be used to query property information connected with and/or entered under a landlord broker role. In another implementation, the HUB may seek leads based on patterns of property information. For example, if the HUB detects that a user has entered a particular collection of property characteristics more than a threshold number of times, it may perform a query based on that collection of information, and/or a subset thereof, to identify leads of possible continuing interest to the user. Input patterns may be detected from any combination of inputs such as those shown in FIG. 49. For example, a pattern of inputs may be discerned by cross-correlating inputs into a bifurcated display, code capture data retrievals, and user emails analyzed by a HUB intelligent inbox coordinator.

Figure 50:
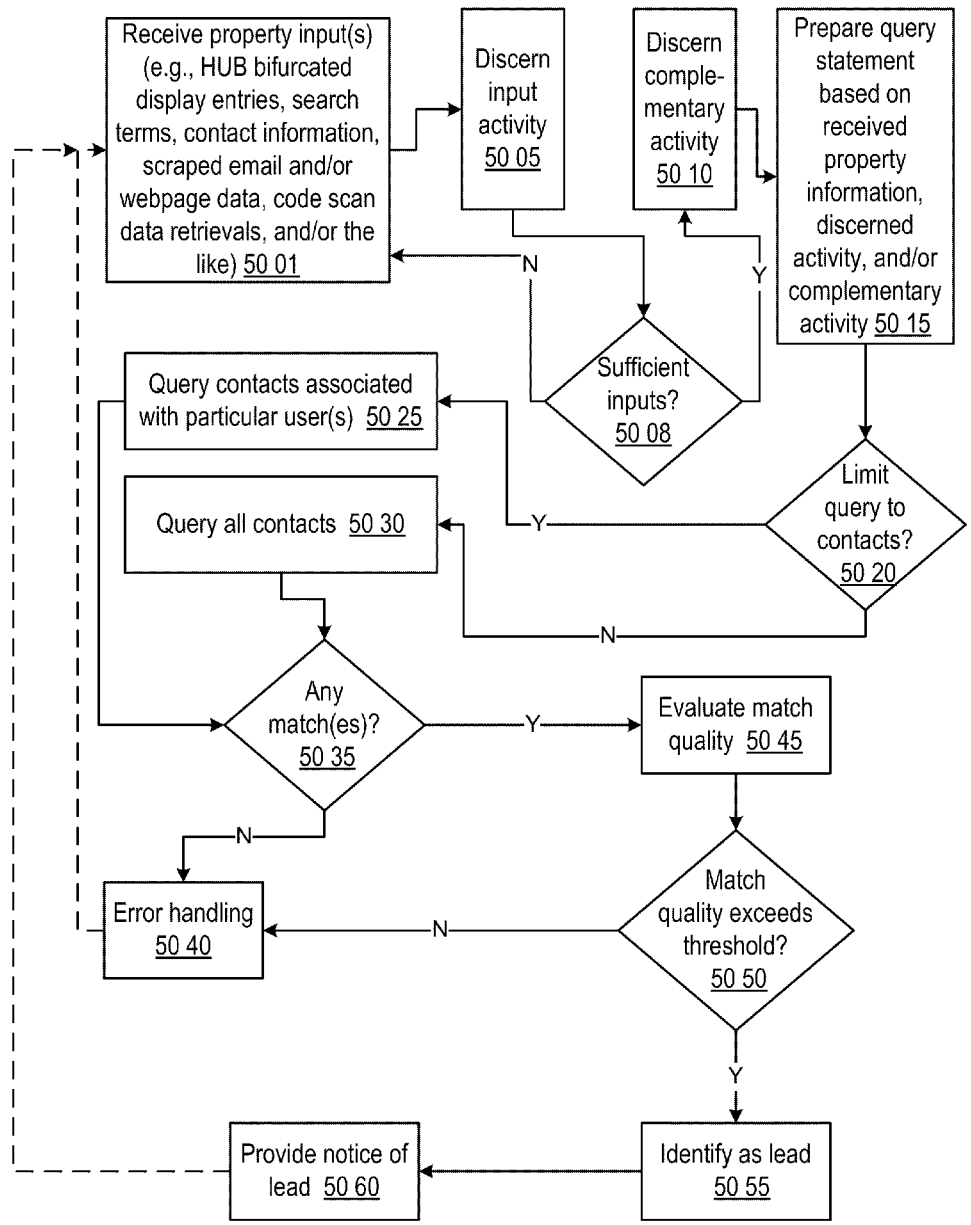
FIG. 50 shows an implementation of logic flow for lead generation in one embodiment of HUB operation.

FIG. 50 shows an implementation of logic flow for lead generation in one embodiment of HUB operation. One or more property inputs may be received 5001, such as, but not limited to, entries to a HUB bifurcated display, search strings and/or search terms, contact information, scraped and/or summarized email and/or website data, property listing information, code captures and/or data retrieved in response thereto, and/or the like. In one implementation, property inputs may exploit AJAX tools to facilitate communication of property inputs in a local client interface to a remote server for analysis, lead identification and/or generation, and/or the like. In one implementation, the HUB may collect and analyze inputs over a period of time, and proceed with lead generation for inputs, and/or subsets thereof, which have a pattern of occurrence and/or which have occurred and/or have been received more than a minimum threshold number of times. In one implementation, the HUB may discern a role, activity, and/or the like associated with a current or past pattern of inputs 5005. For example, in one implementation, an input activity may comprise a buy-side activity, sell-side activity, investment activity, tenant role, tenant broker role, landlord role, landlord broker role, and/or the like. An activity and/or role may, in one implementation, be specified by a user using one or more role specification interface elements, such as those shown at 101 in FIG. 1A.

In one implementation, a determination may be made as to whether sufficient property inputs and/or activity identifying inputs have been provided to warrant identification and/or generation of leads 5008. For example, in one implementation, the HUB may seek inputs corresponding to at least a user role, property location, and property square footage at 5008 before proceeding with further lead identification. In one implementation, different property inputs may have different weights in consideration of whether sufficient inputs have been received. For example, in one implementation, while a location and a square footage may be sufficient, a property type and a property price may be insufficient unless they also include a property visibility input. In one implementation, an initial query of possible lead matches may be performed at 5008 to discern a volume of matching results and, if that volume exceeds a threshold, the results may be discarded and the HUB may note that there are insufficient inputs. In an alternative implementation, the HUB may provide a sample of the results to the user with a notice that a high volume of results has been retrieved, and providing an option to the user as to whether he or she would like to proceed or wait until further property inputs are received.

The HUB may then discern one or more roles, activities, and/or the like that are complementary to and/or otherwise related to the input roles, activities, and/or the like 5010. In one implementation, the HUB may engage one or more rules to correlate input activities with complementary activities. For example, a rule may specify that, if the user has specified a tenant broker role, then the complementary role is landlord broker. In another example, a rule may specify that, where an input activity is a code capture of a property for sale, the complementary activity is property sales, such that lead information that is provided in response to the input may be property information for other available properties for sale. The HUB may prepare a query statement based on the received inputs 5015. In one implementation, the query statement and/or the selection of database tables and/or records to which the query statement are applied may be further be based on the discerned input activity and/or the discerned complementary activity. In one implementation, the HUB may automatically determine ranges of values centered around received property inputs, and/or may determine additional values related to received inputs, and may use those ranges and/or additional values in preparation of the query statement. For example, if received inputs include property price, property square footage, and a property type, the HUB may build ranges of price and square footage that encompass 10% above and 10% below the received values, may supplement the property type with related types, and may construct the query using the ranges and related types. In one implementation, a subset of received property information may be used in preparing the query statement, such as may be based on a prioritization schedule of different property characteristics. For example, in one implementation, property characteristics, in descending order of prioritization may be type, price, square footage, location, and/or the like. The query statement may then be constructed by first selecting all input property information and/or exact values of those inputs. In one implementation, subsequent query statements may be prepared excluding property inputs with lower prioritization values, and/or including broader ranges around received values, until a desired number of matching results are retrieved in response to the query. In one implementation, property characteristic prioritization may be different for different discerned input activities and/or discerned complementary activities.

A determination may be made as to whether the database tables and/or records searched using the query prepared at 5015 should be confined to a limited group of contacts (e.g., the contacts of the user from whom the property inputs were received) 5020. If so, then those contacts and/or associated records for properties, site drives, marketing information, and/or the like may be queried 5025. Otherwise, a broader group of contacts and/or associated records for properties, site drives, marketing ideas, and/or the like may be queried 5030, such as all records in the HUB database.

In one implementation, a query may take a form similar to the following SQL example:

```
function FindMatchingContacts {
mysql_select_db ("Contacts.rdb"); // select database to search
$query = "SELECT contact_info WHERE property_info LIKE '%'
$input_property_info;
$result = mysql_query($query);
mysql_close ("Contacts.rdb");
return $result;
}
```

A determination may be made as to whether any matches exist in response to the query 5035 and, of not, the HUB may undertake an error handling procedure 5040, such as returning to 5015 to prepare another query statement using a more restricted selection of property inputs (e.g., excluding more low priority inputs than in the first query statement). In one implementation, no action may be taken by the HUB if there are no matches retrieved at 5035. If one or more matches are found at 5035, the HUB may evaluate a match quality 5045 for each matching result. For example, in one implementation, a match quality may be based on the number of original property inputs and/or the size of ranges around those inputs used in the preparation of the query statement at 5015. In one implementation, the match quality may consider the prioritization schedule of property characteristics and weight the quality value more heavily for matches (or lack thereof) between higher priority property characteristics. The determined match quality may be compared with a threshold value and a determination made as to whether the match quality exceeds that threshold 5050. If not, an error handling procedure may be undertaken 5040. If the match quality exceeds the threshold, the HUB may identify the one or more matching results as leads 5055, such as by generating a match record with one or more links to the one or more matching contact, property, site drive, marketing idea, and/or the like records. The match record may further include a variety of other information, such as but not limited to property inputs, contact information and/or links to contact information for the user from whom the property inputs are received, match quality, and/or the like. In one implementation, the HUB may further provide notice of the lead, such as to the user from whom the property inputs were received, to a user associated with matches identified at 5035, and/or the like.

Figure 51:
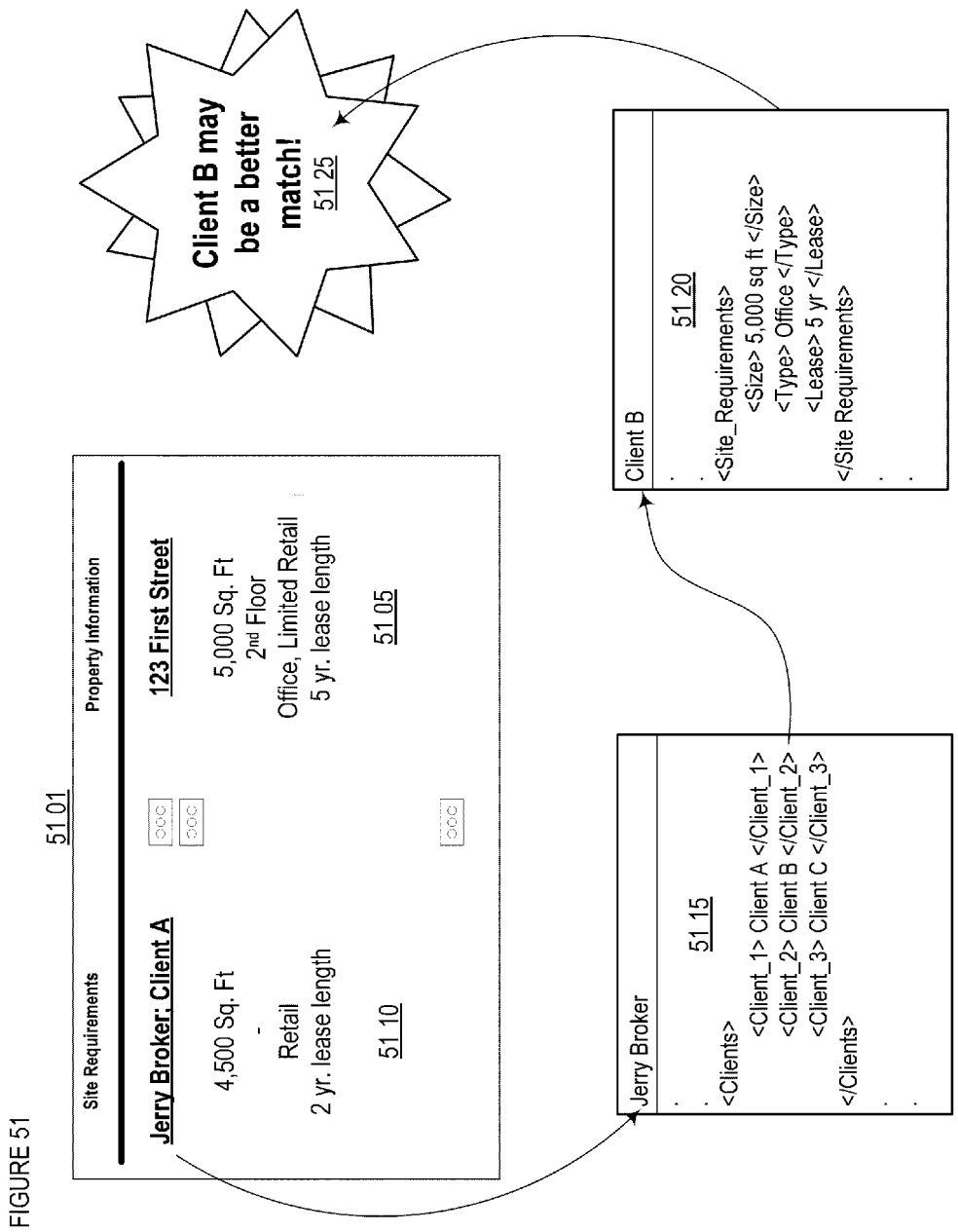
FIG. 51 shows a schematic illustration of alternative lead identification in one embodiment of HUB operation.

FIG. 51 shows a schematic illustration of alternative lead identification in one embodiment of HUB operation. In one implementation, the HUB may be configured to identify relevant alternative lead opportunities during real-time communications with other HUB users. For example, a HUB user (e.g., broker) may be engaged in a discussion and/or negotiation with a transactional counterparty (e.g., counterbroker) and may engage a HUB bifurcated display 5101 to compare property requirements with available property characteristics. The HUB may access a data record associated with the counterbroker 5115 to identify whatever other clients associated with that broker may be accessible (e.g., whatever information about the counterbroker's clients that the broker user has authorization to access). Records for those clients 5120 may then be accessed in order to evaluate whether property information associated with those clients is a closer to match to the broker's property characteristics than the ones being discussed in the current activity. If so, the alternative lead opportunity associated with the other client may be identified to the user broker 5125, which may notify the user broker to raise the possibility of a transaction involving that client with the counterbroker engaged in the current activity.

Figure 52:
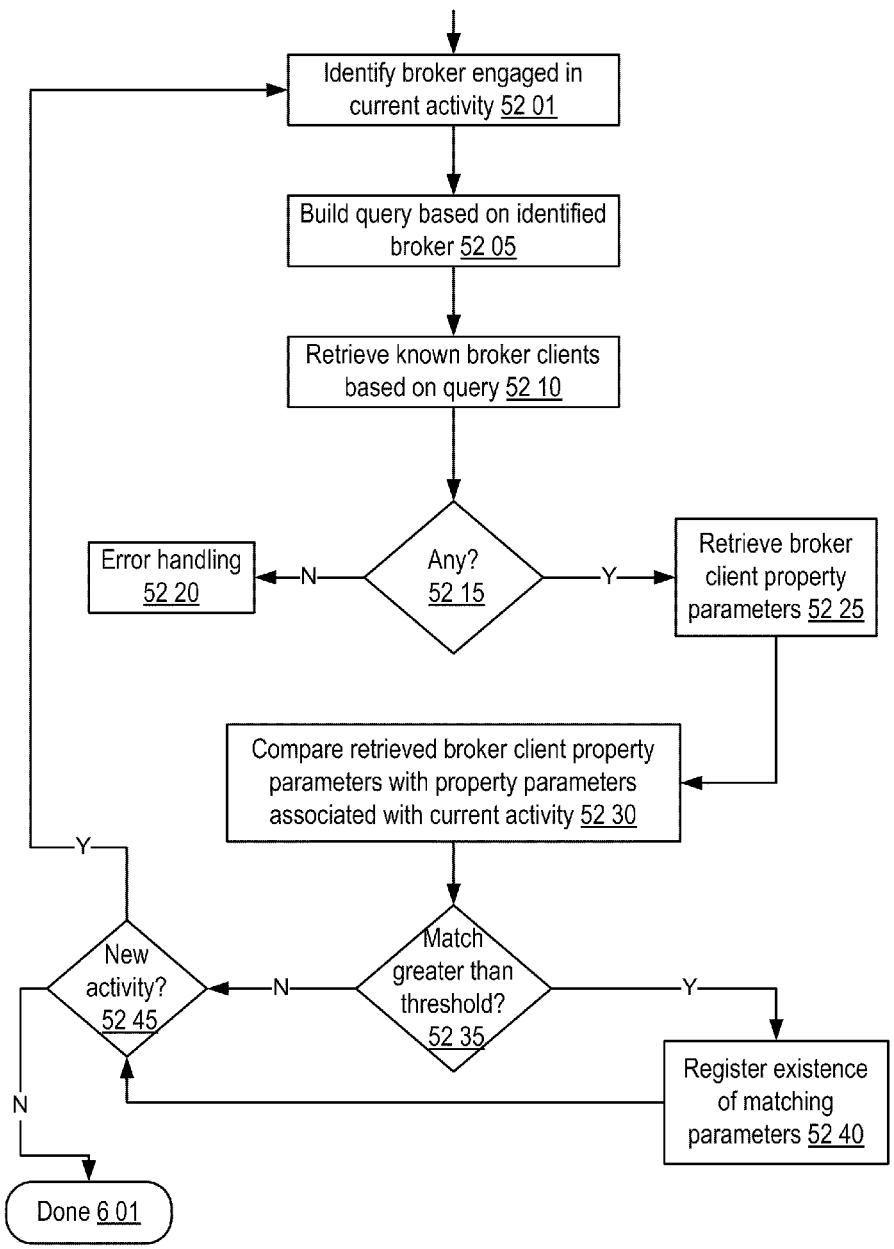
FIG. 52 shows an implementation of logic flow for alternative lead identification in one embodiment of HUB operation.

FIG. 52 shows an implementation of logic flow for alternative lead identification in one embodiment of HUB operation. The HUB may identify a broker engaged in a current activity 5201, such as a counterbroker with whom a user is currently engaged in communications and/or whose information has been entered by a current user in a HUB bifurcated display. The HUB may construct a query based on the identified broker 5205 in order to retrieve identifiers of clients associated with the broker 5210. In one implementation, a user may be restricted in access to information about a broker's clients, and may only have access to a limited subset of client identities (e.g., clients entered by the user himself in association with the broker, clients specifically designated as accessible to the user, and/or the like). A determination may be made as to whether any clients can be identified 5215 and, if not, then an error handling procedure may be undertaken 5220, such as notifying the user that no other clients can be identified. In one implementation, the HUB may take no action if no clients can be identified at 5215. If another client can be identified at 5215, the HUB may retrieve client property parameters 5225 from an associated client record, such as property requirements for a tenant client or available property characteristics for a landlord client. The HUB may then compare retrieved broker client property parameters with property parameters associated with the current activity 5230. For example, if a user has entered site requirements in the current activity and the client is a landlord client, the property characteristics of available properties associated with the landlord client may be compared with those site requirements. In another example, if a user has entered available property characteristics in the current activity and the client is a tenant client, the tenant client's site requirements may be compared with those available property characteristics. A match quality may be determined based on the comparison at 5230. In one implementation, such a match quality rating may be based on a weighted sum of normalized differences between client property parameters and property parameters associated with the current activity. A determination may be made as to whether the match exceeds a minimum threshold value 5235. For example, in one implementation, the threshold value may be taken as a determined match quality between property parameters associated with the current activity and property parameters associated with a client involved in the current activity. In another implementation, the threshold value may be a fixed value regardless of a current activity. If the match is greater than the threshold, the HUB may register the existence of the matching parameters 5240, such as by providing notice of the match to the user. A determination may be made as to whether there is a new activity 5245 for which a further evaluation of alternative leads is to be made. If so, then the HUB may return to 5201. Otherwise, the flow may conclude 5250.

HUB Controller

Figure 53:
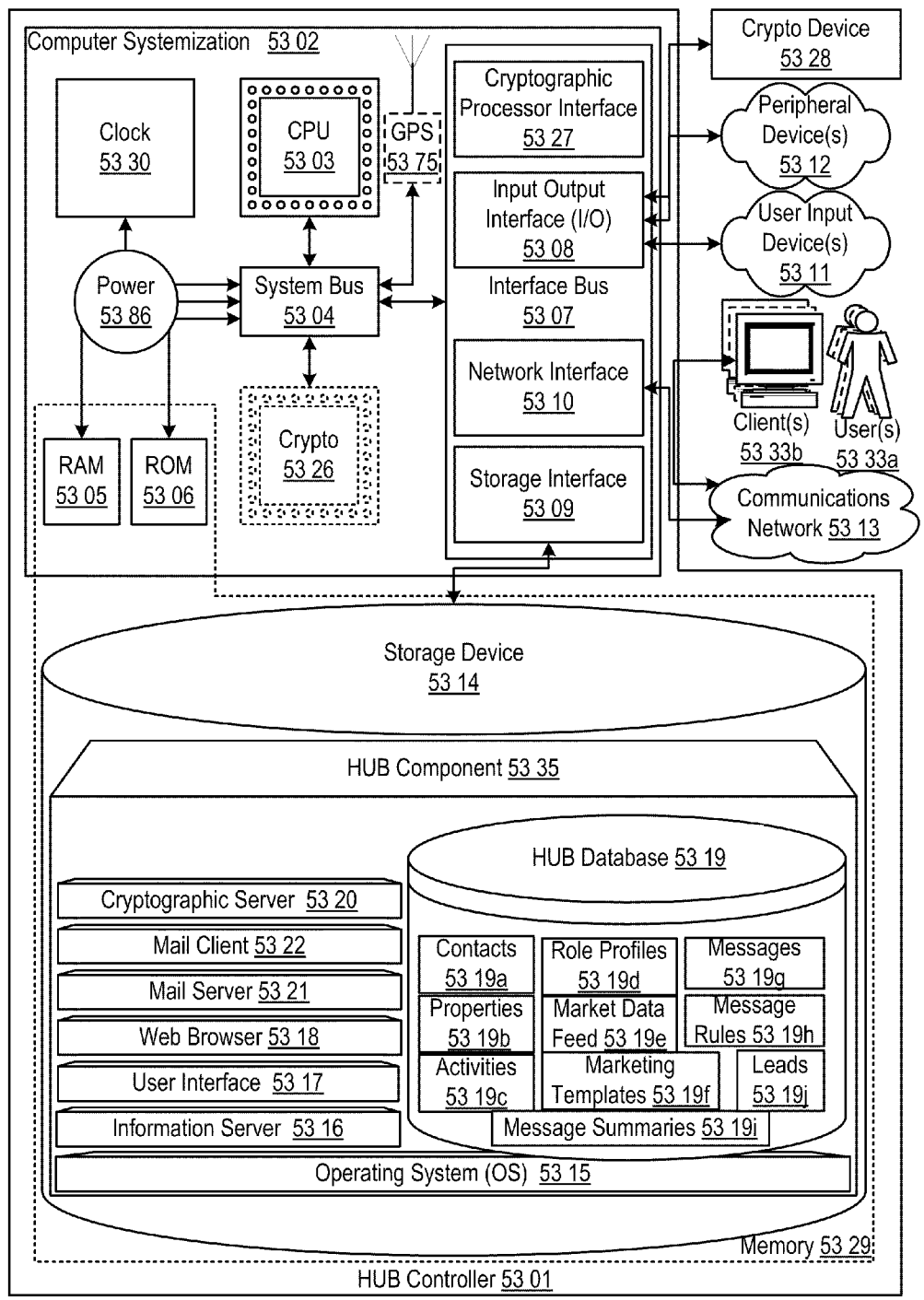
FIG. 53 is of a block diagram illustrating embodiments of the HUB controller.

FIG. 53 illustrates inventive aspects of a HUB controller 5301 in a block diagram. In this embodiment, the HUB controller 5301 may serve to aggregate, process, store, search, serve, identify, instruct, generate, match, and/or facilitate interactions with a computer through property transaction facilitating and associated activity and communication recording technologies, and/or other related data.

Typically, users, which may be people and/or other systems, may engage information technology systems (e.g., computers) to facilitate information processing. In turn, computers employ processors to process information; such processors 5303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 5329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the HUB controller 5301 may be connected to and/or communicate with entities such as, but not limited to: one or more users from user input devices 5311; peripheral devices 5312; an optional cryptographic processor device 5328; and/or a communications network 5313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The HUB controller 5301 may be based on computer systems that may comprise, but are not limited to, components such as: a computer systemization 5302 connected to memory 5329.

Computer Systemization

A computer systemization 5302 may comprise a clock 5330, central processing unit ("CPU(s)" and/or "processor(s)" (these terms are used interchangeable throughout the disclosure unless noted to the contrary)) 5303, a memory 5329 (e.g., a read only memory (ROM) 5306, a random access memory (RAM) 5305, etc.), and/or an interface bus 5307, and most frequently, although not necessarily, are all interconnected and/or communicating through a system bus 5304 on one or more (mother)board(s) 5302 having conductive and/or otherwise transportive circuit pathways through which instructions (e.g., binary encoded signals) may travel to effect communications, operations, storage, etc. Optionally, the computer systemization may be connected to an internal power source 5386. Optionally, a cryptographic processor 5326 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the HUB controller and beyond through various interfaces. Should processing requirements dictate a greater amount speed and/or capacity, distributed processors (e.g., Distributed HUB), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the HUB may be achieved by implementing a microcontroller such as CAST's R8051XC2 microcontroller; Intel's MCS 51 (i.e., 8051 microcontroller); and/or the like. Also, to implement certain features of the HUB, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the HUB component collection (distributed or otherwise) and/or features may be implemented via the microprocessor and/or via embedded components; e.g., via ASIC, coprocessor, DSP, FPGA, and/or the like. Alternately, some implementations of the HUB may be implemented with embedded components that are configured and used to achieve a variety of features or signal processing.

Depending on the particular implementation, the embedded components may include software solutions, hardware solutions, and/or some combination of both hardware/software solutions. For example, HUB features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the HUB features. A hierarchy of programmable interconnects allow logic blocks to be interconnected as needed by the HUB system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the HUB may be developed on regular FPGAs and then migrated into a fixed version that more resembles ASIC implementations. Alternate or coordinating implementations may migrate HUB controller features to a final ASIC instead of or in addition to FPGAs. Depending on the implementation all of the aforementioned embedded components and microprocessors may be considered the "CPU" and/or "processor" for the HUB.

Power Source

The power source 5386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 5386 is connected to at least one of the interconnected subsequent components of the HUB thereby providing an electric current to all subsequent components. In one example, the power source 5386 is connected to the system bus component 5304. In an alternative embodiment, an outside power source 5386 is provided through a connection across the I/O 5308 interface. For example, a USB and/or IEEE 1394 connection carries both data and power across the connection and is therefore a suitable source of power.

Interface Adapters

Interface bus(ses) 5307 may accept, connect, and/or communicate to a number of interface adapters, conventionally although not necessarily in the form of adapter cards, such as but not limited to: input output interfaces (I/O) 5308, storage interfaces 5309, network interfaces 5310, and/or the like. Optionally, cryptographic processor interfaces 5327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 5309 may accept, communicate, and/or connect to a number of storage devices such as, but not limited to: storage devices 5314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 5310 may accept, communicate, and/or connect to a communications network 5313. Through a communications network 5313, the HUB controller is accessible through remote clients 5333*b* (e.g., computers with web browsers) by users 5333*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed HUB), architectures may similarly be employed to pool, load balance, and/or otherwise increase the communicative bandwidth required by the HUB controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 5310 may be used to engage with various communications network types 5313. For example, multiple network interfaces may be employed to allow for the communication over broadcast, multicast, and/or unicast networks.

Input Output interfaces (I/O) 5308 may accept, communicate, and/or connect to user input devices 5311, peripheral devices 5312, cryptographic processor devices 5328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 5311 may be card readers, dongles, finger print readers, gloves, graphics tablets, joysticks, keyboards, mouse (mice), remote controls, retina readers, trackballs, trackpads, and/or the like.

Peripheral devices 5312 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the HUB controller may be embodied as an embedded, dedicated, and/or monitor-less (i.e., headless) device, wherein access would be provided over a network interface connection.

Cryptographic units such as, but not limited to, microcontrollers, processors 5326, interfaces 5327, and/or devices 5328 may be attached, and/or communicate with the HUB controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 5329. However, memory is a fungible technology and resource, thus, any number of memory embodiments may be employed in lieu of or in concert with one another. It is to be understood that the HUB controller and/or a computer systemization may employ various forms of memory 5329. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 5329 will include ROM 5306, RAM 5305, and a storage device 5314. A storage device 5314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 5329 may contain a collection of program and/or database components and/or data such as, but not limited to: operating system component(s) 5315 (operating system); information server component(s) 5316 (information server); user interface component(s) 5317 (user interface); Web browser component(s) 5318 (Web browser); database(s) 5319; mail server component(s) 5321; mail client component(s) 5322; cryptographic server component(s) 5320 (cryptographic server); the HUB component(s) 5335; and/or the like (i.e., collectively a component collection). These components may be stored and accessed from the storage devices and/or from storage devices accessible through an interface bus. Although non-conventional program components such as those in the component collection, typically, are stored in a local storage device 5314, they may also be loaded and/or stored in memory such as: peripheral devices, RAM, remote storage facilities through a communications network, ROM, various forms of memory, and/or the like.

Operating System

The operating system component 5315 is an executable program component facilitating the operation of the HUB controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HUB controller to communicate with other entities through a communications network 5313. Various communication protocols may be used by the HUB controller as a subcarrier transport mechanism for interaction, such as, but not limited to: multicast, TCP/IP, UDP, unicast, and/or the like.

Information Server

An information server component 5316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HUB controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HUB database 5319, operating systems, other program components, user interfaces, Web browsers, and/or the like.

Access to the HUB database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HUB. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HUB as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 5317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 5318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the HUB enabled nodes. The combined application may be nugatory on systems employing standard Web browsers.

Mail Server

A mail server component 5321 is a stored program component that is executed by a CPU 5303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the HUB.

Access to the HUB mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 5322 is a stored program component that is executed by a CPU 5303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 5320 is a stored program component that is executed by a CPU 5303, cryptographic processor 5326, cryptographic processor interface 5327, cryptographic processor device 5328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the HUB may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HUB component to engage in secure transactions if so desired. The cryptographic component facilitates the secure accessing of resources on the HUB and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HUB Database

The HUB database component 5319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HUB database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the HUB database is implemented as a data-structure, the use of the HUB database 5319 may be integrated into another component such as the HUB component 5335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 5319 includes several tables 5319a-i. A Contacts table 5319a may include fields such as, but not limited to: contact_ID, contact_name, postal_address(es), email address(es), phone_number(s), instant_messenger_ID(s), property_ID(s), user_status, activity_ID(s), related_contact_ID(s), job_title(s), role_ID(s), client_ID(s), client_role(s), client_type(s), priority_status, and/or the like. The Contacts table may support and/or track multiple entity accounts on a HUB. In one implementation, user profiles and/or user information may be stored in the contacts table. In another implementation, user profiles and/or other user information may be stored in association with an independent users table. In one implementation, client roles and/or types may indicate a relationship between the user and/or contact and the client (e.g., tenant client, landlord client, and/or the like), and may act as query linkages that pivot off the user's selected role. A Properties table 5319b may include fields such as, but not limited to: property_ID, property_name, property_type, property_dimensions, address, price_parameter(s), transaction_history, contact_ID(s), property_status, property_type, activity_ID(s), transaction_information, rating_indicator(s), and/or the like. An Activities table 5319c may include fields such as, but not limited to: activity_ID, activity_name, contact_ID(s), property_ID(s), contact_attribute(s), property_attribute(s), rating_indicator(s), transaction_information, role_ID(s), client_ID(s), time, date, user_ID(s), activity_type, and/or the like. A Role Profiles table 5319d may include fields such as, but not limited to: role_ID, role_UI_matrix_element(s), role_query_matrix_element(s), role_name, role_type, and/or the like. A market data table 5319e includes fields such as, but not limited to: market_data_feed ID, property_ID, spot_price, bid_price, ask_price, interest_rate, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. A Marketing Templates table 5319f may include fields such as, but not limited to: template_ID, template_name, contact_ID(s), property_ID(s), authorization_criteria, and/or the like. A Messages table 5319g may include fields such as, but not limited to: message_ID, sender_ID, contact_ID(s), property_ID(s), sender_address(es), message_source, message_format, recipient address(es), subject, message_data, attachment(s), link(s), embedded_data, and/or the like. A Message Rules table 5319h may include fields such as, but not limited to: rule_ID, rule_name, rule_input(s), categories, sub-categories, folder_ID(s), folder_name(s), and/or the like. A Message Summaries table 5319i may include fields such as, but not limited to: message_summary_ID, message_summary_name, contact_ID(s), message_ID(s), statistics, analytics, time, message_source, and/or the like. A Leads table 5319j may include fields such as, but not limited to: Lead_ID, match_score, property_inputs, input_user, site_drive, marketing_idea, contact_ID(s), message_ID(s), property_ID(s), activity_ID(s), statistics, analytics, time, message_source, and/or the like.

In one embodiment, the HUB database may interact with other database systems. For example, employing a distributed database system, queries and data access by search HUB component may treat the combination of the HUB database, an integrated data security layer database as a single database entity.

In one embodiment, user programs may contain various user interface primitives, which may serve to update the HUB. Also, various accounts may require custom database tables depending upon the environments and the types of clients the HUB may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 5319a-i. The HUB may be configured to keep track of various settings, inputs, and parameters via database controllers.

The HUB database may communicate to and/or with other components in a component collection, including itself, and/or facilities of the like. Most frequently, the HUB database communicates with the HUB component, other program components, and/or the like. The database may contain, retain, and provide information regarding other nodes and data.

The HUBs

The HUB component 5335 is a stored program component that is executed by a CPU. In one embodiment, the HUB component incorporates any and/or all combinations of the aspects of the HUB that was discussed in the previous figures. As such, the HUB affects accessing, obtaining and the provision of information, services, transactions, and/or the like across various communications networks.

The HUB component enables the generation, evaluation, and recording of information and activities related to property transactions and the communications surrounding them as well as the relationships' dependencies, work flows, activites related to activity tracking, property transaction facilitation, intelligent inbox coordination, message analysis, summary message generation, rule generation, lead exchange facilitation, lead identification and/or generation, and/or the like and use of the HUB.

The HUB component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the HUB server employs a cryptographic server to encrypt and decrypt communications. The HUB component may communicate to and/or with other components in a component collection, including itself, and/or facilities of the like. Most frequently, the HUB component communicates with the HUB database, operating systems, other program components, and/or the like. The HUB may contain, communicate, generate, obtain, and/or provide program component, system, user, and/or data communications, requests, and/or responses.

Distributed HUBs

The structure and/or operation of any of the HUB node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HUB controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

---
http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
--- and other parser implementations:

---
http://publib.boulder.ibm.com/infocenter/tivihelp/v2r1/index.jsp?topic=/com.ibm.IBMDI.doc/referenceguide259.htm
--- all of which are hereby expressly incorporated by reference.

In order to address various issues and improve over previous works, the application is directed to APPARATUSES, METHODS AND SYSTEMS FOR A LEAD GENERATING HUB. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a HUB individual and/or enterprise user, database configuration and/or relational model, data type, data transmission and/or network framework, syntax structure, and/or the like, various embodiments of the HUB, may be implemented that enable a great deal of flexibility and customization. For example, aspects of the HUB may be adapted for other types of commerce, transactions of services, chattels, and/or the like, non-commercial exchanges, transactions of property and/or real estate in a virtual world, and/or the like. While various embodiments and discussions of the HUB have been directed to real estate listings and transactions, especially as mediated by real estate brokers, however, it is to be understood that the embodiments described herein may be readily configured and/or customized for a wide variety of other applications and/or implementations.

What is claimed is:

1. An intelligent inbox coordinating processor-implemented method, comprising:
   periodically retrieving a plurality of email messages addressed to a user from at least one designated email message folder, wherein the plurality of email messages are previously directed to the at least one designated email message folder based on an evaluation of the plurality of email messages in relation to at least one email direction rule;
   identifying at least one flyer file associated with each email message of the plurality of email messages, wherein the at least one flyer file is configured as either an attached portable document format file, a linked remote portable document format file, or a linked webpage;
   accessing the at least one flyer file to extract property data, wherein accessing includes downloading the flyer file when configured as an attached portable document format file, and accessing an associated link when configured as either a linked remote portable document format file or a linked webpage, and wherein extracting property data includes converting the at least one flyer file to text;
   analyzing extracted property data to determine property category associations of the plurality of email messages, wherein analyzing includes:
      parsing the extracted property data into a plurality of data fields;
      correlating the data fields based on positional proximity in the flyer file, and
      identifying property data values based on correlation of corresponding data fields with data fields of property data identifiers, and
   categorizing the plurality of email messages into at least one property category association, the at least one property category association including a company, a property type, and an address field;
   incrementing counters for property category identifiers based on property category associations; and
   generating a summary message including statistical analytics based on the counters; and
   providing the summary message for display to the user.

2. The method of claim 1, further comprising a message repository which includes an email folder, and wherein the at least one email message is allocated to the email folder based on at least one email allocation rule.

3. The method of claim 1, wherein the plurality of email messages are retrieved in response to a mobile device code capture.

4. The method of claim 1, further comprising:
   receiving at least one message response trigger in association with at least one message;
   generating a response message based on the at least one message response trigger; and
   sending the response message to an originator of the at least one message.

5. The method of claim 4, wherein the at least one message response trigger comprises a gut feel indicator.

6. The method of claim 4, further comprising:
   updating at least one category message response trigger aggregation record associated with the at least one category identifier based on the received at least one message response trigger; and
   publishing the at least one category message response trigger aggregation record.

7. The method of claim 1, further comprising a message repository which comprises a third-party data warehouse.

8. The method of claim 1, further comprising:
   receiving at least one message response trigger in association with at least one message;
   querying additional recipients based on at least one category association when the at least one message response trigger satisfies positive reaction criteria; and
   providing the at least one message to additional recipients.

9. The method of claim 1, further comprising:
   providing an email direction rule for approval; and
   receiving an approval indicator in response to the providing.

10. The intelligent inbox coordinating processor-implemented method of claim 1, wherein the property type includes any of real residential property, real commercial property, a URL address, and intellectual property.

11. The intelligent inbox coordinating processor-implemented method of claim 1, wherein the address field includes addresses from any of addresses for real residential property, addresses for real commercial property, a URL address, and addresses for intellectual property.

12. An intelligent inbox coordinating apparatus, comprising:
   a memory;
   a processor disposed in communication with said memory, and configured to issue a plurality of processing instructions stored in the memory to:
   periodically retrieve a plurality of email messages addressed to a user from at least one designated email message folder, wherein the plurality of email messages are previously directed to the at least one designated email message folder based on an evaluation of the plurality of email messages in relation to at least one email direction rule;

identify at least one flyer file associated with each email message of the plurality of email messages, wherein the at least one flyer file is configured as either an attached portable document format file, a linked remote portable document format file, or a linked webpage;

access the at least one flyer file to extract property data,
 wherein accessing includes downloading the flyer file when configured as an attached portable document format file, and accessing an associated link when configured as either a linked remote portable document format file or a linked webpage, and
 wherein extracting property data includes converting the at least one flyer file to text;

analyze extracted property data to determine property category associations of the plurality of email messages,
 wherein analyzing includes:
  parsing the extracted property data into a plurality of data fields;
  correlating the data fields based on positional proximity in the flyer file, and
  identifying property data values based on correlation of corresponding data fields with data fields of property data identifiers, and
  categorizing the plurality of email messages into at least one property category association, the at least one property category association including a company, a property type, and an address field;

increment counters for property category identifiers based on property category associations; and generate a summary message including statistical analytics based on the counters; and provide the summary message for display to the user.

13. The apparatus of claim 12, wherein the processor is further configured to issue a plurality of processing instructions stored in the memory to:
allocate at least one email message to an email folder based on at least one email allocation rule.

14. The apparatus of claim 12 wherein the processor is further configured to issue a plurality of processing instructions stored in the memory to:
retrieve the plurality of email messages in response to a mobile device code capture.

15. The apparatus of claim 12 wherein the processor is further configured to issue a plurality of processing instructions stored in the memory to:
receive at least one message response trigger in association with at least one message;
generate a response message based on the at least one message response trigger; and
send the response message to an originator of the at least one message.

16. The apparatus of claim 15 wherein the at least one message response trigger comprises a gut feel indicator.

17. The apparatus of claim 12 wherein the processor is further configured to issue a plurality of processing instructions stored in the memory to:
update at least one category message response trigger aggregation record associated with the at least one category identifier based on the received at least one message response trigger; and
publish the at least one category message response trigger aggregation record.

18. The apparatus of claim 12 wherein the processor is further configured to issue a plurality of processing instructions stored in the memory to receive messages from a message repository which comprises a third-party data warehouse.

19. The apparatus of claim 12 wherein the processor is further configured to issue a plurality of processing instructions stored in the memory to:
receive at least one message response trigger in association with at least one message;
query additional recipients based on at least one category association when the at least one message response trigger satisfies positive reaction criteria; and
provide the at least one message to additional recipients.

20. The apparatus of claim 12 wherein the property type includes any of real residential property, real commercial property, a URL address, and intellectual property.

21. The apparatus of claim 12 wherein the address field includes addresses from any of addresses for real residential property, addresses for real commercial property, a URL address, and addresses for intellectual property.

22. An intelligent inbox coordinating system, comprising:
memory means;
processor means disposed in communication with said memory means, and configured to issue a plurality of processing instructions stored in the memory to:
 means for periodically retrieving a plurality of email messages addressed to a user from at least one designated email message folder, wherein the plurality of email messages are previously directed to the at least one designated email message folder based on an evaluation of the plurality of email messages in relation to at least one email direction rule;
 means for identifying at least one flyer file associated with each email message of the plurality of email messages, wherein the at least one flyer file is configured as either an attached portable document format file, a linked remote portable document format file, or a linked webpage;
 means for accessing the at least one flyer file to extract property data,
  wherein accessing includes downloading the flyer file when configured as an attached portable document format file, and accessing an associated link when configured as either a linked remote portable document format file or a linked webpage, and
  wherein extracting property data includes converting the at least one flyer file to text;
 means for analyzing extracted property data to determine property category associations of the plurality of email messages,
  wherein analyzing includes:
   parsing the extracted property data into a plurality of data fields;
   correlating the data fields based on positional proximity in the flyer file, and
   identifying property data values based on correlation of corresponding data fields with data fields of property data identifiers, and
   categorizing the plurality of email messages into at least one property category association, the at least one property category association including a company, a property type, and an address field;
 means for incrementing counters for property category identifiers based on property category associations; and
 means for generating a summary message including statistical analytics based on the counters; and means for providing the summary message for display to the user.

23. The system of claim 22 further comprising
means for allocating at least one email message to an email folder based on at least one email allocation rule.

24. The system of claim 22 further comprising:
means for retrieving the plurality of email messages in response to a mobile device code capture.

25. The system of claim 22 further comprising:
means for receiving at least one message response trigger in association with at least one message;
means for generating a response message based on the at least one message response trigger; and
means for sending the response message to an originator of the at least one message.

26. The system of claim 25 wherein the at least one message response trigger comprises a gut feel indicator.

27. The system of claim 22 further comprising:
means for updating at least one category message response trigger aggregation record associated with the at least one category identifier based on the received at least one message response trigger; and
means for publishing the at least one category message response trigger aggregation record.

28. The system of claim 22 further comprising means for receiving messages from a message repository which comprises a third-party data warehouse.

29. The system of claim 22 further comprising:
means for receiving at least one message response trigger in association with at least one message;
means for querying additional recipients based on at least one category association when the at least one message response trigger satisfies positive reaction criteria; and
means for providing the at least one message to additional recipients.

30. The system of claim 22 wherein the property type includes any of real residential property, real commercial property, a URL address, and intellectual property.

31. The system of claim 22 wherein the address field includes addresses from any of addresses for real residential property, addresses for real commercial property, a URL address, and addresses for intellectual property.

32. A processor-readable non-transient medium storing processor-executable components, the components comprising:
a component collection stored in the medium, wherein the component collection, stored in the medium, includes processor-issuable instructions to:
periodically retrieve a plurality of email messages addressed to a user from at least one designated email message folder, wherein the plurality of email messages are previously directed to the at least one designated email message folder based on an evaluation of the plurality of email messages in relation to at least one email direction rule;
identify at least one flyer file associated with each email message of the plurality of email messages, wherein the at least one flyer file is configured as either an attached portable document format file, a linked remote portable document format file, or a linked webpage;
access the at least one flyer file to extract property data, wherein accessing includes downloading the flyer file when configured as an attached portable document format file, and accessing an associated link when configured as either a linked remote portable document format file or a linked webpage, and
wherein extracting property data includes converting the at least one flyer file to text;
analyze extracted property data to determine property category associations of the plurality of email messages, wherein analyzing includes:
parsing the extracted property data into a plurality of data fields;
correlating the data fields based on positional proximity in the flyer file, and
identifying property data values based on correlation of corresponding data fields with data fields of property data identifiers, and
categorizing the plurality of email messages into at least one property category association, the at least one property category association including a company, a property type, and an address field;
increment counters for property category identifiers based on property category associations; and
generate a summary message including statistical analytics based on the counters; and
provide the summary message for display to the user.

33. The processor-readable non-transient medium of claim 32 wherein the processor-issuable instructions further include instructions to:
allocate at least one email message to an email folder based on at least one email allocation rule.

34. The processor-readable non-transient medium of claim 32 wherein the processor-issuable instructions further include instructions to:
retrieve the plurality of email messages in response to a mobile device code capture.

35. The processor-readable non-transient medium of claim 32 wherein the processor-issuable instructions further include instructions to:
receive at least one message response trigger in association with at least one message;
generate a response message based on the at least one message response trigger; and
send the response message to an originator of the at least one message.

36. The processor-readable non-transient medium of claim 35 wherein the at least one message response trigger comprises a gut feel indicator.

37. The processor-readable non-transient medium of claim 32 wherein the processor-issuable instructions further include instructions to:
update at least one category message response trigger aggregation record associated with the at least one category identifier based on the received at least one message response trigger; and
publish the at least one category message response trigger aggregation record.

38. The processor-readable non-transient medium of claim 32 wherein the processor-issuable instructions further include instructions receive messages from a message repository which comprises a third-party data warehouse.

39. The processor-readable non-transient medium of claim 32 wherein the processor-issuable instructions further include instructions to:
receive at least one message response trigger in association with at least one message;
query additional recipients based on at least one category association when the at least one message response trigger satisfies positive reaction criteria; and
provide the at least one message to additional recipients.

40. The processor-readable non-transient medium of claim 32 wherein the property type includes any of real residential property, real commercial property, a URL address, and intellectual property.

41. The processor-readable non-transient medium of claim 32 wherein the address field includes addresses from any of addresses for real residential property, addresses for real commercial property, a URL address, and addresses for intellectual property.

* * * * *